US00RE47356E

(19) United States
(12) Reissued Patent
Orihashi et al.

(10) Patent Number: US RE47,356 E
(45) **Date of Reissued Patent: *Apr. 16, 2019**

(54) COMMUNICATION APPARATUS AND COMMUNICATION SYSTEM

(71) Applicant: PANASONIC INTELLECTUAL PROPERTY CORPORATION OF AMERICA, Torrance, CA (US)

(72) Inventors: Masayuki Orihashi, Kyoto (JP); Yutaka Murakami, Kanagawa (JP); Katsuaki Abe, Kyoto (JP); Akihiko Matsuoka, Kanagawa (JP)

(73) Assignee: PANASONIC INTELLECTUAL PROPERTY CORPORATION OF AMERICA, Torrance, CA (US)

( * ) Notice: This patent is subject to a terminal disclaimer.

(21) Appl. No.: 14/571,857

(22) Filed: Dec. 16, 2014

Related U.S. Patent Documents

Reissue of:
(64) Patent No.: 7,515,714
Issued: Apr. 7, 2009
Appl. No.: 10/502,048
PCT Filed: Feb. 27, 2003
PCT No.: PCT/JP03/02174
§ 371 (c)(1),
(2) Date: Jul. 30, 2004
PCT Pub. No.: WO03/073689
PCT Pub. Date: Sep. 4, 2003

U.S. Applications:
(63) Continuation of application No. 13/045,876, filed on Mar. 11, 2011, now Pat. No. Re. 45,368.

(30) Foreign Application Priority Data

Feb. 28, 2002 (JP) ..... 2002-054064
May 7, 2002 (JP) ..... 2002-132068
Feb. 25, 2003 (JP) ..... 2003-048364

(51) Int. Cl.
*H04W 12/04* (2009.01)
*H04K 1/00* (2006.01)
(Continued)

(52) U.S. Cl.
CPC ..... *H04B 1/7113* (2013.01); *H04K 1/00* (2013.01); *H04L 9/0858* (2013.01);
(Continued)

(58) Field of Classification Search
CPC ... H04K 1/08; H04K 1/10; H04K 1/00; H04B 1/7113; H04W 12/04; H04L 9/0858
(Continued)

(56) References Cited

U.S. PATENT DOCUMENTS 3,633,105 A * 1/1972 Lender et al. ..... 375/236
3,671,967 A * 6/1972 Fries ..... 342/413
(Continued)

FOREIGN PATENT DOCUMENTS

CN 1179249 4/1998
CN 1330816 1/2002
(Continued)

OTHER PUBLICATIONS

European Search Report for EP 11184395.9, dated Jun. 27, 2012.
(Continued)

*Primary Examiner* — Matthew E Heneghan
(74) *Attorney, Agent, or Firm* — Greenblum & Bernstein, P.L.C.

(57) ABSTRACT

A communication apparatus includes a reference signal generating section, a transmitting section, a propagation estimating section, a first data acquiring section, and a decoding section. The reference signal generating section generates a first reference signal to enable a communicating party to estimate a propagation environment. The transmitting section transmits the first reference signal. The propa-
(Continued)

gation estimating section estimates a first propagation estimation value of the propagation environment using a second reference signal transmitted from the communicating party. The first data acquiring section generates first data using the first propagation estimation value. The decoding section decodes a transmission signal encoded using a second propagation estimation value that is estimated by the communicating party using the first reference signal, to obtain second data using the first data.

4 Claims, 78 Drawing Sheets

(51) Int. Cl.

| | |
|---|---|
| ***H04B 1/7113*** | (2011.01) |
| ***H04L 9/08*** | (2006.01) |
| *H04K 1/10* | (2006.01) |
| *H04B 1/7115* | (2018.01) |
| *H04K 1/08* | (2006.01) |

(52) U.S. Cl.
CPC ..... *H04W 12/04* (2013.01); *H04B 1/7115* (2013.01); *H04K 1/08* (2013.01); *H04K 1/10* (2013.01); *H04L 2209/60* (2013.01); *H04L 2209/80* (2013.01)

(58) Field of Classification Search
USPC ..... 380/31
See application file for complete search history.

(56) References Cited

U.S. PATENT DOCUMENTS

| | | | | |
|---|---|---|---|---|
| 4,514,753 | A * | 4/1985 | Southworth et al. | 348/23 |
| 5,027,123 | A | 6/1991 | Haykin et al. | |
| 5,532,706 | A | 7/1996 | Reinhardt et al. | |
| 5,604,806 | A | 2/1997 | Hassan et al. | |
| 5,675,648 | A * | 10/1997 | Townsend | 380/278 |
| 5,995,533 | A | 11/1999 | Hassan et al. | |
| 6,144,339 | A | 11/2000 | Matsumoto et al. | |
| 6,405,020 | B1 | 6/2002 | Oestreich et al. | |
| 6,492,958 | B2 | 12/2002 | Yoshida | |
| 6,590,532 | B1 | 7/2003 | Ogawa et al. | |
| 7,349,545 | B2 | 3/2008 | Kim | |
| 7,929,592 | B1 | 4/2011 | Okumura et al. | |
| 2002/0012380 | A1 * | 1/2002 | Hottinen | H04B 7/0634 375/130 |
| 2008/0318606 | A1 | 12/2008 | Tsutsui et al. | |
| 2012/0127889 | A1 | 5/2012 | Yomo et al. | |
| 2013/0148757 | A1 | 6/2013 | Tsutsui | |
| 2013/0156122 | A1 | 6/2013 | Tsutsui et al. | |

FOREIGN PATENT DOCUMENTS

| | | |
|---|---|---|
| JP | 60-20660 | 2/1985 |
| JP | 63-7010 | 1/1988 |
| JP | 63-121334 | 5/1988 |
| JP | 4-220033 | 8/1992 |
| JP | 5-41607 | 2/1993 |
| JP | 5-95352 | 4/1993 |
| JP | 2000-46939 | 2/2000 |
| JP | 2000-286751 | 10/2000 |
| JP | 2001-308761 | 2/2001 |
| JP | 2001-244911 | 9/2001 |
| JP | 2001-326630 | 11/2001 |
| JP | 2003-069516 | 3/2003 |
| JP | 2003-258771 | 9/2003 |
| WO | 96/22643 | 7/1996 |

OTHER PUBLICATIONS

European Search Report for EP 11184399.1, dated Jun. 27, 2012.
European Search Report for EP 11184390.0, dated Jun. 27, 2012.
China Office action, dated Aug. 14, 2012.
Japan (JP Appl. No. 2003-048364) Office action, dated Jun. 30, 2011.
Japan (JP Appl. No. 2006-049160) Office action, dated Jun. 30, 2011.
Official Actions, dated Nov. 16, 2012, Jan. 28, 2014, and Mar. 4, 2013, Jul. 24, 2013 in related U.S. Appl. No. 13/353,627.
An article by C. Uchiyama entitled "Ryoshi Rikigaku no Kiso to Ryoshi Ango Ryoshi Tsushin Channel no Shiten" ("Basics of Quantum Mechanics and Quantum Cryptography"), published in Surikagaku (Mathematical Sciences), No. 402, Dec. 1, 1996, pp. 53-61.
An article by M. Muroya et al. entitled "Digital Communication Series Digital Musen Tsushin" ("A Compensation Technique in Digital Radio Transmission"), published in Sangyo Tosho Kabushiki Kaisha ("Digital Radio Communication"), 5th Edition, Mar. 10, 1992, pp. 103-127 and pp. 169-170.
English Language Abstract of JP 5-41607.
J. Hershey et al., IEEE Transactions on Communications, vol. 43, No. 1, Jan. 1995, pp. 3-6.
A.O. Hero, Dept. of Electrical Engineering and Computer Science, University of Michigan, Apr. 24, 2001, pp. 1-37, downloaded from http://citeseer.ist.psu/edu/cs on Feb. 17, 2005.
H. Koorapaty, IEEE Communications Letters, vol. 4, No. 2, Feb. 2000, pp. 52-55.
English language Abstract of CN 1179249, Apr. 15, 1998.

* cited by examiner

ESTIMATION OF THE DIRECTION OF ARRIVAL (a) FRAME STRUCTURE1

| | | | | | |
|---|---|---|---|---|---|
| PILOT SIGNAL | DATAn | DATAn | DATAn | DATAn | DATAn |
| | : | : | : | : | : |
| | DATA2 | DATA2 | DATA2 | DATA2 | DATA2 |
| | DATA1 | DATA1 | DATA1 | DATA1 | DATA1 |

(b) FRAME STRUCTURE2

| | | | | | |
|---|---|---|---|---|---|
| DATAn | DATAn | DATAn | DATAn | DATAn | DATAn |
| : | : | : | : | : | : |
| DATA1 | DATA1 | DATA1 | DATA1 | DATA1 | DATA1 |
| PILOT SIGNAL | PILOT SIGNAL | PILOT SIGNAL | PILOT SIGNAL | PILOT SIGNAL | PILOT SIGNAL |

(c) FRAME STRUCTURE3

| | | | | | |
|---|---|---|---|---|---|
| DATAn | DATAn | DATAn | DATAn | DATAn | DATAn |
| : | : | : | : | : | : |
| PILOT SIGNALm | PILOT SIGNALm | PILOT SIGNALm | PILOT SIGNALm | PILOT SIGNALm | PILOT SIGNALm |
| : | : | : | : | : | : |
| DATA1 | DATA1 | DATA1 | DATA1 | DATA1 | DATA1 |
| PILOT SIGNAL1 | PILOT SIGNAL1 | PILOT SIGNAL1 | PILOT SIGNAL1 | PILOT SIGNAL1 | PILOT SIGNAL1 |

FIG.50

$$(h_1\ h_2\ h_3\ h_4)\begin{pmatrix} v_{11} & v_{21} & v_{31} & v_{41} \\ v_{12} & v_{22} & v_{32} & v_{42} \\ v_{13} & v_{23} & v_{33} & v_{43} \\ v_{14} & v_{24} & v_{34} & v_{44} \end{pmatrix}\begin{pmatrix} d_1 \\ d_2 \\ d_3 \\ d_4 \end{pmatrix} = \lambda d_1$$

COMMUNICATION APPARATUS AND COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*NOTICE: The present application is a Reissue Application of U.S. Pat. No. 7,515,714 and is a continuation of Reissue application Ser. No. 13/045,876.*

TECHNICAL FIELD

The present invention relates to a technique used in a digital communication, and more particularly, to a security technique.

BACKGROUND ART

Digital wireless communications have occupied an important position in communication fields due to developments of the techniques. However, wireless communications use public controlled radio-signal spaces, and thus, include a fundamental problem that a third party can receive data. Therefore, there is always a risk that the communication content is intercepted by a third party and the information leaks.

In order to overcome the problems, the processing is performed currently for encrypting the communication information to prevent information from leaking when the information is intercepted.

Encryption of information is studied in various fields, and is applied in a variety of fields. This is principally based on a significant feature that security is ensured to a certain extent without varying the communication system.

However, since it is not possible to prevent encrypted communication information from being intercepted by a third party, a problem arises that the third party decrypts the encrypted communication information from the intercepted received information by consuming time.

DISCLOSURE OF INVENTION

It is an object of the present invention to ensure high security without varying the communication system greatly.

The object is achieved by acquiring, as confidential information, information of propagation environment estimated using a reference signal transmitted from a communicating party.

BRIEF DESCRIPTION OF DRAWINGS

FIGS. 50(a), 50(b), and 50(c) are views illustrating a frame structure of signal according to Embodiment 21 of the present invention;

BEST MODE FOR CARRYING OUT THE INVENTION

Embodiments of the present invention will be specifically described below with reference to accompanying drawings.

Embodiment 1

Figure 1:
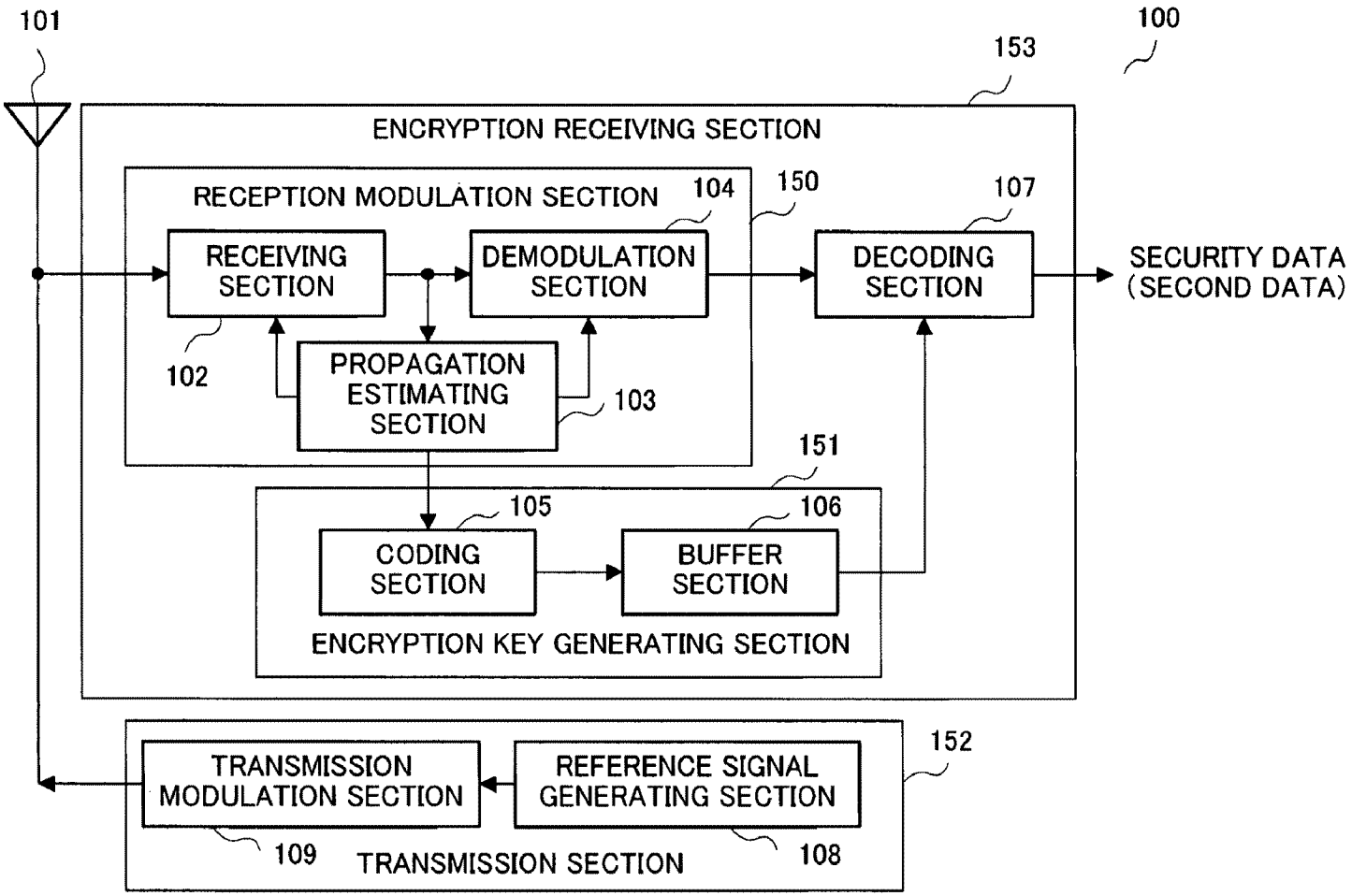
FIG. 1 is a block diagram illustrating a configuration of a communication apparatus according to Embodiment 1 of the present invention.
Figure 2:
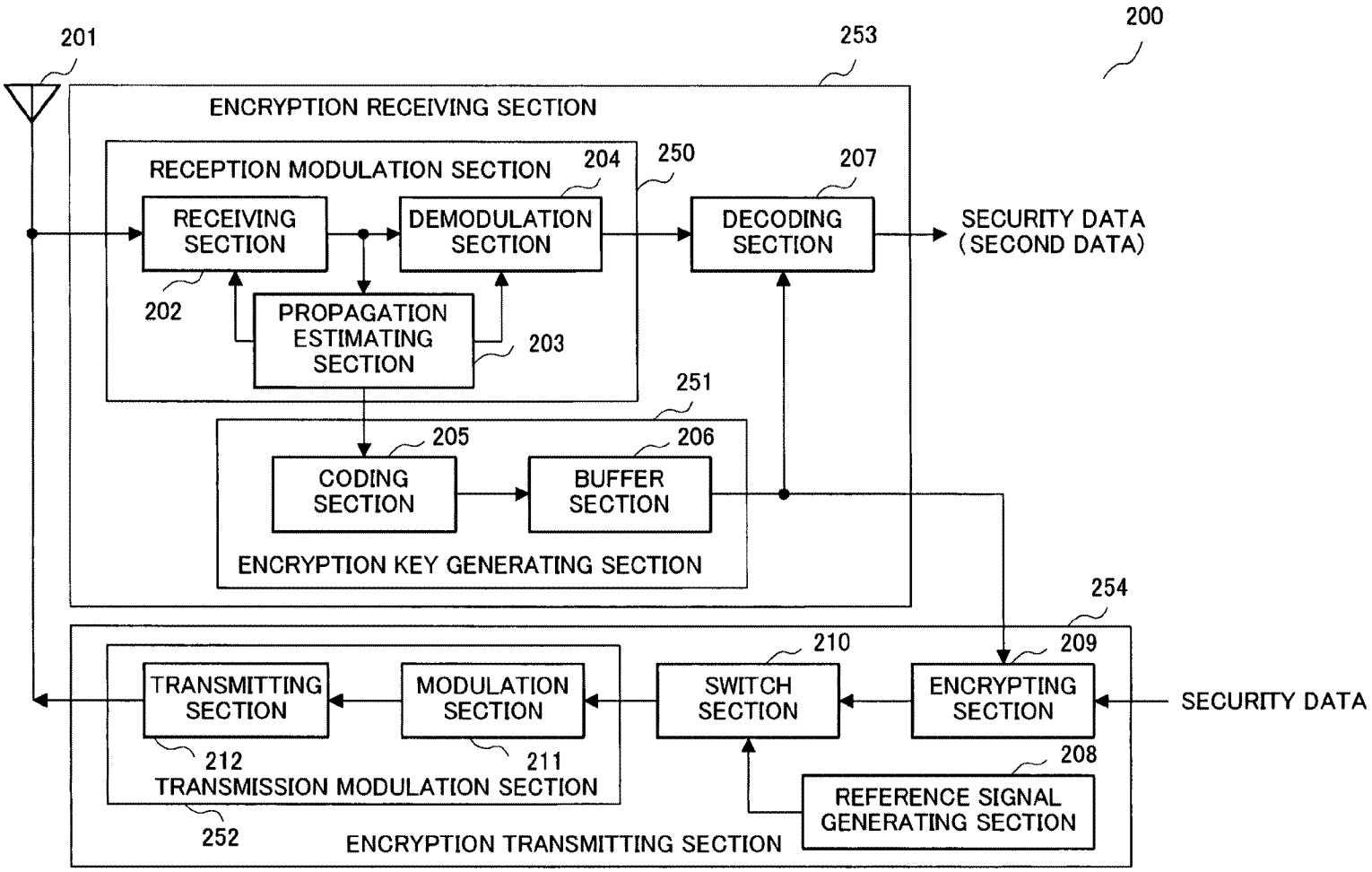
FIG. 2 is a block diagram illustrating another configuration of a communication apparatus according to Embodiment 1 of the present invention.
Figure 3:
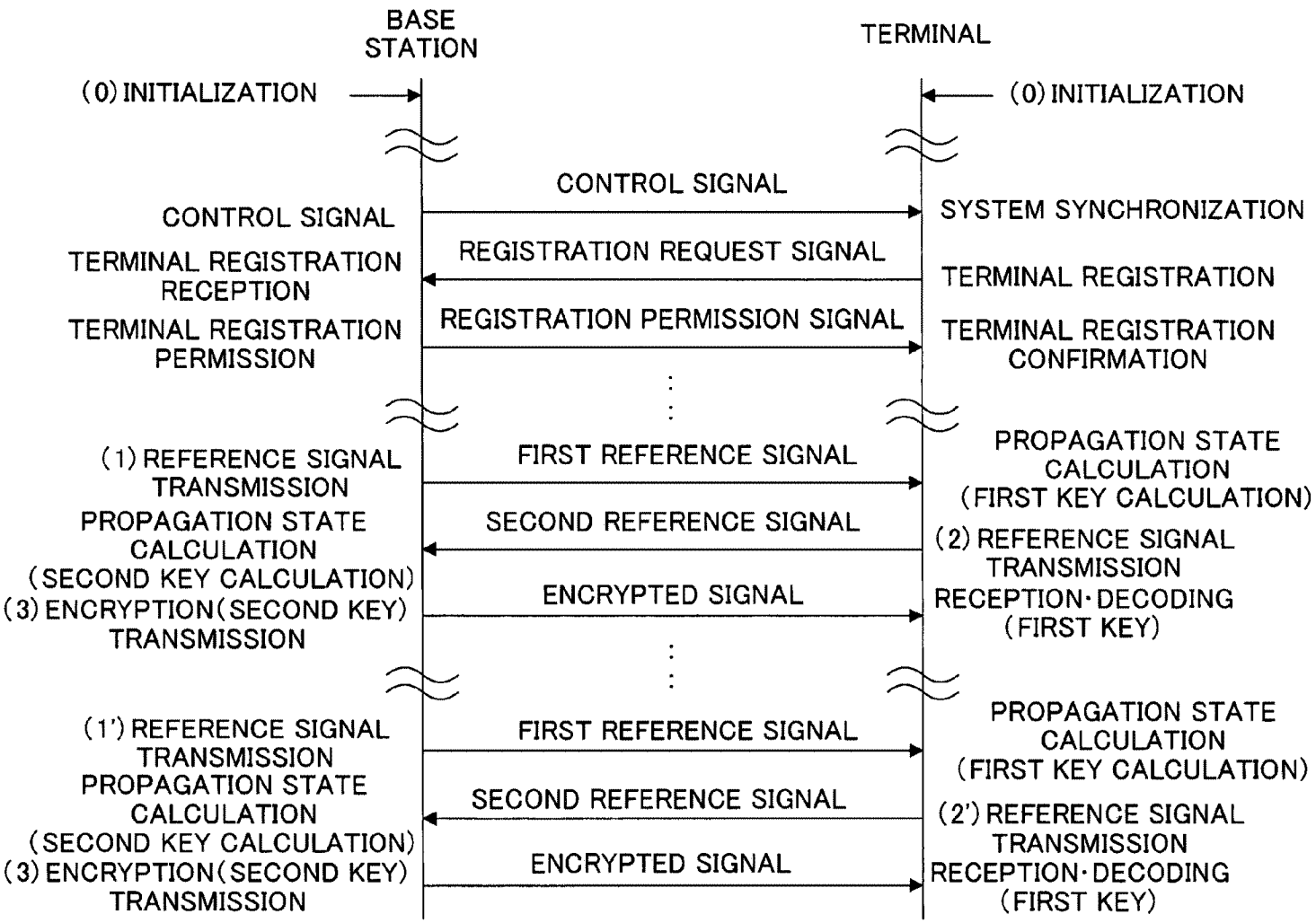
FIG. 3 is a sequence diagram illustrating the operation of the communication apparatus according to Embodiment 1 of the present invention.

The invention using propagation information as encryption key information of security will be described below with reference to FIGS. 1 to 3. With respect to communication apparatuses according to Embodiment 1 of the present invention, FIG. 1 illustrates a specific configuration of an encryption receiving apparatus, and FIG. 2 illustrates a specific configuration of an encryption transmitting/receiving apparatus. FIG. 3 illustrates communication procedures performed between terminals. For convenience in description, it is herein assumed that a base station in FIG. 3 is the encryption transmitting/receiving apparatus as illustrated in FIG. 2, and that a terminal in FIG. 3 is the encryption receiving apparatus as illustrated in FIG. 1. However, the combination is not limited particularly, and each of the base station and terminal may be the encryption transmitting/receiving apparatus.

The apparatus in FIG. 1 has encryption receiving section 153 and transmitting section 152. Encryption receiving section 153 estimates a propagation state from a received RF signal, performs decryption using the estimated state as an encryption key to output security data, and has reception demodulation section 150, encryption key generating section 151 and decoding section 107. Transmitting section 152 outputs a reference RF signal, and has reference signal generating section 108 and transmission modulation section 109. Antenna 101 receives/transmits RF signals. Reception demodulation section 150 receives an RF signal, outputs the propagation information and demodulated information, and has receiving section 102, propagation estimating section 103 and demodulation section 104.

Receiving section 102 receives the RF signal and propagation information, controls the RF signal to be in a suitable reception state, and outputs a received signal. Propagation estimating section 103 estimates a propagation characteristic from the received signal to output the propagation information. Demodulation section 104 performs appropriate demodulation using the received signal and propagation information, and outputs demodulated information. Encryption key generating section 151 receives the propagation information, outputs encryption key information, and has coding section 105 and buffer section 106.

Coding section 105 extracts a characteristic from the propagation information, and generates and outputs the encryption key (first data). Buffer section 106 stores the coded encryption key, and outputs the stored encryption key information. Decoding section 107 receives the encryption key information and demodulated information, decodes the encryption of the demodulated information from the encryption key information, and outputs security data (second data). Reference signal generating section 108 generates a predetermined reference signal to output. Transmission modulation section 109 receives the reference signal, and modulates the signal into an RF signal to output.

The apparatus in FIG. 2 has antenna 201, encryption receiving section 253, and encryption transmitting section 254. Antenna 201 and encryption receiving section 253 have the same functions as those in corresponding sections in FIG. 1. Encryption transmitting section 254 receives the security data and encryption key information, switches between a reference signal for propagation estimation and encrypted information encrypted from the encryption key information and security data by a predetermined method to modulate and output, and has transmission modulation section 252, reference signal generating section 208, encrypting section 209, and switch section 210.

Transmission modulation section 252 modulates selected communication information to output an RF signal, and has modulation section 211 and transmitting section 212. Reference signal generating section 208 generates a predetermined reference signal to output. Encrypting section 209 receives the encryption key information and security data, encrypts the security data using the encryption key information, and generates and outputs encrypted information. Switch section 210 receives the reference signal and encrypted information, and selects either one to output communication information. Modulation section 211 modulates the selected communication information to output a modulated signal. Transmitting section 212 converts the modulated signal into an RF signal to transmit, and outputs the RF signal.

The base station (the encryption transmitting/receiving apparatus as illustrated in FIG. 2) and terminal (the communication apparatus including the encryption receiving apparatus as illustrated in FIG. 1) each with the above-mentioned configuration perform the communication in procedures as illustrated in FIG. 3.

The operation of the apparatus as illustrated in FIG. 1 will be described below. Antenna 101 receives an RF signal to output. Reception demodulation section 150 receives the received RF signal, and outputs propagation information and demodulated information. Receiving section 102 receives the RF signal and propagation information, and outputs a received signal while controlling to maintain the most suitable reception state by keeping the gain constant or compensating for frequency or time shift according to the propagation information. Propagation estimating section 103 receives the received signal, and detects a reception time, propagation time, state of frequency, state of polarization, reception power, multipath state, state of phase, propagation distortion, etc.

Each state is output to receiving section 102 and demodulation section 104 as propagation information for reception demodulation parameters, and also output to encryption key generating section 151. Demodulation section 104 receives the received signal and propagation information, removes a multipath component from the received signal or adjusts the phase according to the propagation information to demodulate, and outputs demodulated. Encryption key generating section 151 extracts the characteristic of the propagation state from the propagation information output from reception demodulation section 150, and generates and stores an encryption key to output the encryption key information.

Coding section 105 receives the propagation information output from propagation estimating section 103, and extracts the characteristic of the propagation state of the received signal from the propagation information. For example, using a multipath state as an example, in multipath propagation formed of a plurality of propagation paths, the multipath characteristic can be detected using the correlation function.

Among thus obtained multipath electric field information, according to a predetermined method using a delay time and power of a path component with the detected maximum power, coding is carried out, and an encryption key used in encrypting is generated and output. Buffer section 106 receives and stores the generated encryption key, and outputs the encryption key information. Decoding section 107 receives the demodulated information and encryption key information, decodes the demodulated information according to a predetermined method, and outputs the security data. Transmitting section 152 generates a reference signal, and modulates the signal to output an RF signal. Reference signal generating section 108 generates the reference signal to estimate a propagation state for a communicating terminal targeted for communication to output. Transmission demodulation section 109 receives the reference signal, and performs modulation and frequency conversion on the signal to output an RF signal. The output RF signal is transmitted from antenna 101.

The operation of the apparatus as illustrated in FIG. 2 will be described. Only differences are described herein from the apparatus as illustrated in FIG. 1.

Encryption receiving section 253, where the RF signal input from antenna 201 is decoded in decoding section 207 and the security data is output, has the same configuration as that of the corresponding section in FIG. 1. Encryption transmitting section 254 receives the encryption key information and security data, and output an RF signal to transmit. Reference signal generating section 208 generates a reference signal to estimate a propagation state for a communicating terminal targeted for communication to output. Encrypting section 209 receives the encryption key information and security data, and outputs encrypted information encrypted according to a predetermined method.

Switch section 210 selects either the reference signal input from reference signal generating section 208 or the encrypted information input from encrypting section 209, and outputs the selected communication information. Transmission modulation section 252 modulates the selected communication information, and converts the resultant signal into an RF signal to output as a transmission signal. In other words, modulation section 211 receives the communication information, and performs predetermined modulation on the information to output as a modulated signal. Transmitting section 212 converts the input modulated signal into an RF signal to output. The RF signal is transmitted from antenna 201.

The above-mentioned operation will be described in terms of communication procedure with reference to FIG. 3.

(0) Base Station and Terminal: Initialization

The base station and terminal are set for the initial state immediately after the power is supplied or a specific signal is received. At the same time, the frequency, time-synchronization, etc. is set according to predetermined procedures.

A predetermined time later after finishing the initial operation, the base station transmits control information in a control signal at predetermined time intervals.

Meanwhile, the terminal starts a search for the control signal after finishing the initial operation. When receiving the control signal transmitted from the base station, the terminal detects the time, frequency, etc. for synchronization with the time, frequency, etc. that the system has (system synchronization). After the system synchronization is finished properly, the terminal transmits a registration request signal for notifying the base station of existence of the terminal. In response to the registration request from the terminal, the base station transmits a registration permission signal and thus performs registration permission of the terminal.

(1) Base Station: Transmission of First Reference Signal

The base station transmits a reference signal for propagation estimation performed in the terminal as a first reference signal. Specifically, switch section 210 selects the reference signal generated in reference signal generating section 208 to output to transmission modulation section 252. Transmission modulation section 252 converts the selected communication information into an RF signal, and the signal is transmitted from antenna 201.

In the terminal awaiting the signal from the base station, propagation estimating section 103 detects the first reference signal from the received signal, and performs propagation estimation from the received signal and the reference signal that is a known signal. Coding section 105 receives the propagation information from propagation estimating section 103, extracts the characteristic of the propagation state, and converts the extracted characteristic information into an encryption key. This operation will be described specifically later. The base station and terminal are assumed to share in advance the characteristic extracted in coding section 105 and a method of converting the characteristic into an encryption key. The converted encryption key is stored in buffer section 106, and encryption key information is output. The base station uses the encryption key as a first encryption key for subsequent communications.

(2) Terminal: Transmission of Second Reference Signal

The terminal transmits a reference signal for propagation estimation performed in the base station as a second reference signal in the same way as described in procedure (1).

Upon receiving a signal from the terminal, the base station detects the second reference signal, and propagation estimating section 203 performs propagation estimation from the received signal and the reference signal that is a known signal. In the same way as in (1), coding section 205 converts the propagation information output from propagation estimating section 203 into an encryption key, and buffer section 206 stores the encryption key information to output. The terminal uses the encryption key as a second encryption key for subsequent communications.

(3) Base Station: Transmission of Encryption

The base station switches switch section 210 to select encrypted information output from encrypting section 209. Using the second key obtained in procedure (2), encrypting section 209 encrypts the security data according to a predetermined method, and outputs the encrypted information. Switch section 210 selects the encrypted information, and outputs the communication information to transmission modulation section 252. Transmission modulation section 252 modulates the communication information, and the encrypted signal is transmitted from antenna 201 as an RF signal.

When the terminal receives the encrypted signal, reception demodulation section 150 demodulates the received signal to demodulated information. Decoding section 107 uses the demodulated information and the first key obtained in (1), and decodes the encryption according to a predetermined method to output the security data. Subsequently, the terminal repeats the encryption communication in procedure (3) and general communication.

A propagation path formed between communication terminals is determined uniquely corresponding to relative positions of the terminals, spatial form, reflectors and so on, and it is known that the propagation state formed from the base station to the terminal is the same as the propagation state formed from the terminal to the base station due to the reverse characteristic of optical propagation. Therefore, the same result is obtained in the propagation state (for example, delay profile) obtained in (1) and the propagation state obtained in (2). Further, the base station and terminal share procedures for converting the propagation information into an encryption key in advance. In other words, the encryption key (first key) obtained in (1) is the same as the encryption key (second key) obtained in (2), and can be used as common keys between communication terminals. As a result, in the communication procedure of (3), encryption and decoding is carried out using the common keys, and the information encrypted in the base station is decoded properly in the terminal.

A case is considered that all communications are intercepted by a third party using a third terminal in this situation. As described earlier, the propagation path is determined by a propagation space formed between the base station and terminal. Therefore, when communications of procedures (1) to (3) are observed in a position physically different from the base station or terminal, the propagation characteristic obtained between the third terminal and base station, or the third terminal and the terminal is different from that obtained in (1) or (2). Further, since the base station and terminal do not provide/receive a key for encryption, the third terminal cannot know the key.

In this way, it is understood that high security can be ensured in a physical layer of communication. Further, since it is possible to perform the processing basically independently of encryption and decoding using conventional arithmetic methods, there is an advantage that high security is expected by implementing the present invention in addition to conventional techniques.

In the above description, procedure (0) that is of initialization operation is explained under the assumption that the general operation is carried out, but is not a procedure required for the present invention.

Further, the propagation state is estimated by transmitting a reference signal in (1) or (2). This is because using the reference signal that is a known signal generally improves accuracy in estimation, and it is needless to say that propagation estimation can be carried out without using a reference signal particularly. In other words, for example, it is possible to perform propagation estimation using a control signal, registration request signal and registration permission signal performed in (0).

The invention as described above has a feature of using the propagation state as an encryption key, and therefore, there is a fear of occurrence of a problem when the base station or terminal moves. In this case, by repeating transmission and reception of reference signal as indicated by (1'), (2') and (3') in FIG. 3, it is possible to avoid the problem.

Thus, according to the communication apparatus and communication system of Embodiment 1, propagation estimating section 103 estimates the propagation environment based on the reference signal, and outputs an estimation value that is a propagation parameter such as a correlation function, while coding section 105 outputs data obtained from the estimation value, whereby the base station and terminal do not need to provide/receive a key for encryption, the third terminal cannot know the key, and it is possible to ensure high security in a physical layer of communication without changing the communication system greatly. Further, according to the communication apparatus and communication system of Embodiment 1, since it is possible to ensure the security by the processing independent from encryption and decoding using conventional arithmetic methods, extremely high security can be ensured by using the conventional encryption and decoding techniques together. Furthermore, according to the communication apparatus and communication system of Embodiment 1, since a coding pattern can be varied corresponding to the propagation state, it is possible to perform communications resistant to changes in environment. Still furthermore, according to the communication apparatus and communication system of Embodiment 1, since an encryption key can be acquired by obtaining a propagation parameter from the estimated propagation environment, it is possible to transmit/receive information using a non-modulated signal.

In addition, in Embodiment 1, decoding section 107 uses the encryption key information output from buffer section 106 as an encryption key to decode the security key, but the present invention is not limited to such a case. It may be possible to use the encryption key information output from buffer section 106 as an encryption key to decode security data other than the security data decoded in decoding section 107. In this case, the need of decoding section 107 is eliminated. Although in Embodiment 1 the delay profile is used as a parameter indicating the propagation state, it is considered using a polarization state such as a polarization plane and circulating direction, phase information, propagation delay time, direction of arrival estimation information, reception power information, or a combination of various parameters. In this way, observation in the third terminal becomes more complicated, and it is thereby possible to ensure security to a high extent. In particular, using the polarization and phase which are varied greatly due to the propagation environment provides a feature that makes estimation by another terminal more difficult.

Further, by applying an array antenna structure comprised of a plurality of antenna elements as a plurality of antennas 201, it is possible to add the direction of arrival as a parameter for propagation estimation. It is thereby possible to construct a more flexible system.

In the foregoing, a modulation scheme and multiplexing scheme are not explained, but it is apparent that the present invention is applied to any modulation schemes principally. The present invention is applicable to PSK, QAM, Star QAM, TDMA, FDMA, SS (FH and CDMA), OFDM, spatial multiplexing (SDM and MIMO), etc.

Further, in the communication procedures, when reference signals are transmitted, the first reference signal and second reference signals are transmitted. However, it is obvious that whether to first transmit the first reference signal or the second reference signal does not affect the system of this Embodiment. Furthermore, while reference signals are transmitted separately in the communication procedures, by inserting reference signals to a data stream as in frame structures (b) and (c) in FIG. 12 described later, such an advantage is provided that procedures of (1) and (3) are carried out at the same time.

Embodiment 2

Figure 4:
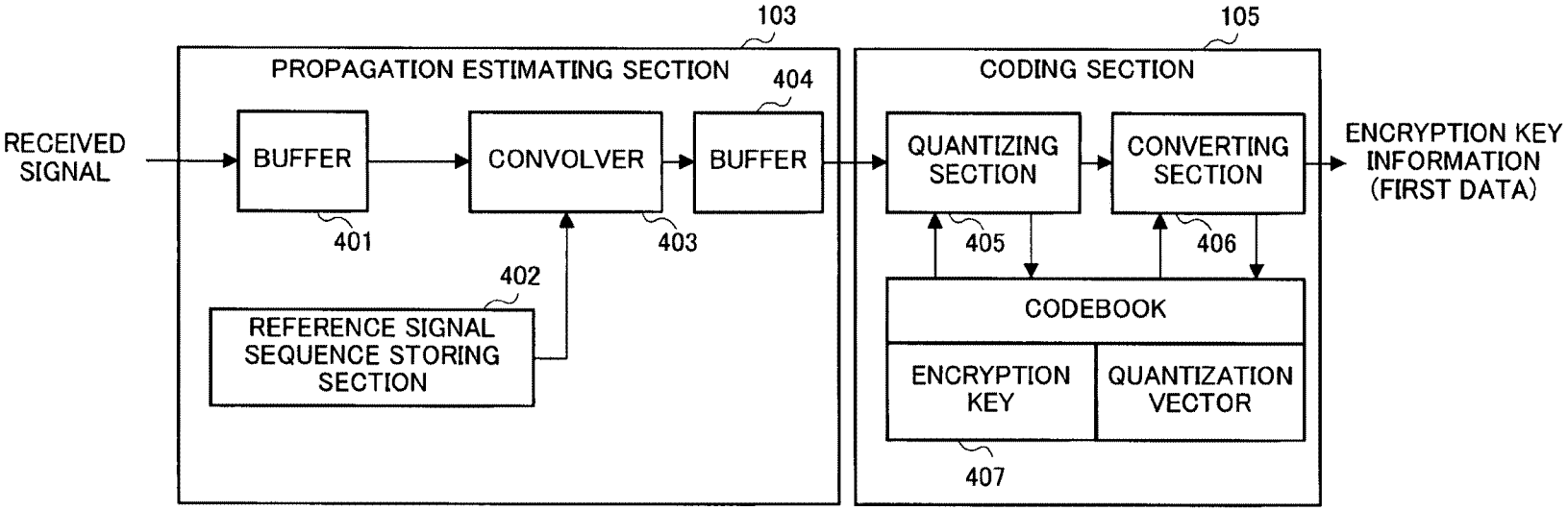
FIG. 4 is a block diagram illustrating configurations of a propagation estimating section and coding section in a communication apparatus according to Embodiment 2 of the present invention.

A communication apparatus according to Embodiment 2 of the present invention is to describe a method of converting the propagation estimation into an encryption key, and has configurations of propagation estimating section 103 and coding section 105 as illustrated in FIG. 4 in communication apparatus 100 according to Embodiment 1 of the present invention as illustrated in FIG. 1. The configuration except the sections 103 and 105 is the same as in FIG. 1, and descriptions thereof are omitted.

Herein, it is assumed to use a delay profile as a representative example of parameter indicating a propagation state. The delay profile includes a delay time, power and phase of each path component. An example will be described that the delay time and power of a path component is used.

Propagation estimating section 103 in FIG. 1 fetches a received signal including a reference signal, and estimates the propagation state. When the delay profile is obtained as the propagation state, it is known that the delay profile is obtained using the correlation between a signal as a reference and received signal. In this case, propagation estimating section 103 uses the reference signal that is a known signal, and calculates correlation values of the signal sequence with a received signal sequence to obtain the delay profile.

Coding section 105 extracts a characteristic of thus obtained propagation information. As an example of characteristic extraction, it is considered using a vector quantization method. A number of templates of representative delay profiles are prepared in a reference table as quantization vectors, and encryption keys are stored in the reference signal in association with the quantization vectors respectively. Coding section 105 compares a result estimated in propagation estimating section 103 with a template in thus prepared reference table, and selects and outputs an encryption key associated with a template of a delay profile with the highest similarity.

The method is described above of estimating a propagation state to convert into an encryption key, and will be described more specifically with reference to FIG. 4.

FIG. 4 illustrates propagation estimating section 103 and coding section 105 to further explain corresponding functions in FIG. 1 in detail. In descriptions about FIG. 1, propagation estimating section 103 is assumed to estimate various states such as frequency shift, time shift and phase information, but only a method is herein described of estimating a delay profile.

Propagation estimating section 103 has buffer 401, reference signal sequence storing section 402, convolver 403 and buffer 404. Coding section 105 has quantizing section 405, converting section 406 and codebook 407. Buffer 401 temporarily holds an input signal of a certain length. Reference signal sequence storing section 402 stores predetermined reference signal sequences to output sequentially. Convolver 403 calculates the convolution of the temporarily stored received signal and reference signal sequence to output the correlation value. Buffer 404 temporarily stores a calculated correlation sequence. Quantizing section 405 searches quantization vectors stored in codebook 407 for the most similar one to an input vector string, and outputs a code. Converting section 406 selects an encryption key (first data) corresponding to the code output from quantizing section 405 from the codebook to output.

Figure 5:
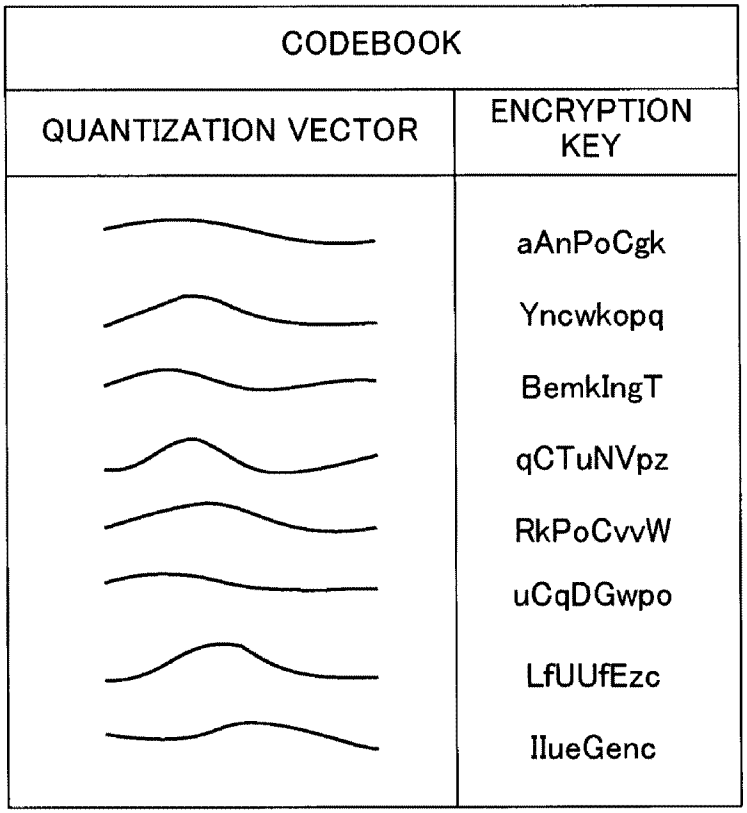
FIG. 5 is a table illustrating a codebook.

Codebook 407 stores quantization vectors and encryption keys. FIG. 5 shows an example of codebook storing quantization vectors that are templates of delay profiles and encryption keys associated with the vectors.

Next, the operations of propagation estimating section 103 and coding section 105 will be described.

Figure 6:
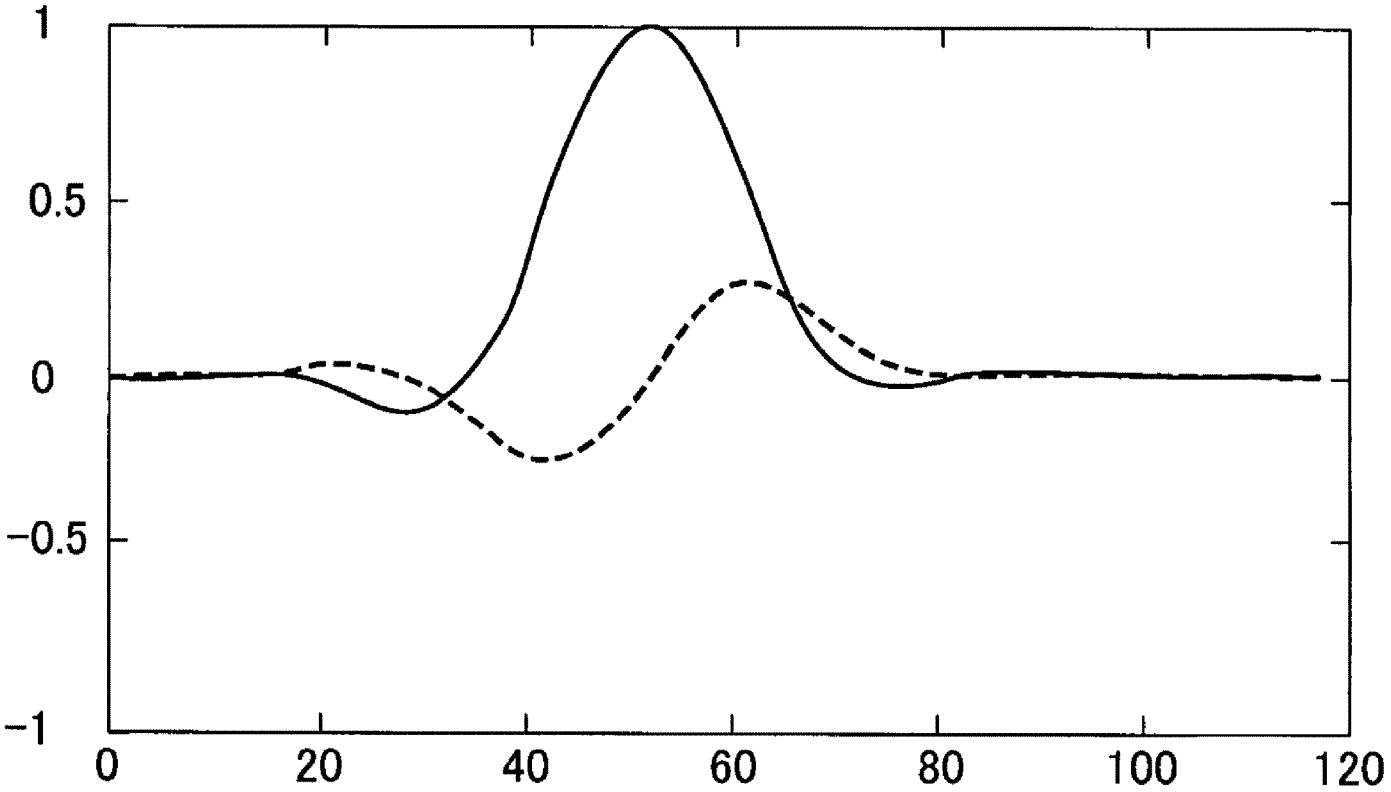
FIG. 6 is a graph illustrating a delay profile.

Propagation estimating section 103 holds a received signal including a reference signal in buffer 401. Convolver 403 outputs as a correlation sequence results obtained by performing sliding correlation between the reference signal sequence from reference signal sequence storing section 402 and the received signal sequence held in buffer 401, and holds results sequentially in buffer 404. The correlation sequence held in buffer 404 has correlation values between the reference signal sequence and received signal sequence, i.e., data corresponding to the delay profile. The delay profile information is provided to coding section 105 as a series of input vector. FIG. 6 shows an example of thus obtained delay profile information.

Quantizing section 405 compares an input vector from buffer 404 with each quantization vector stored in codebook 407, extracts a vector with the highest similarity, and outputs a code associated with the vector. Specifically, assuming an input vector is Xin, and quantization vector of code m is Xqm (m: 1~M), Xqm that minimizes the following equation is obtained:

$$d=|Xin-Xqm|^2 \quad (1)$$

The section 405 outputs code m associated with the thus obtained quantization vector.

Converting section 406 outputs an encryption key associated with code m of the delay profile referring to the content of the encryption key table in the codebook. Thus determining an encryption key enables flexible setting of encryption key to be implemented in simple circuitry.

In this way, according to the communication apparatus and communication system of Embodiment 2, in addition to the effects of Embodiment 1, propagation estimating section 103 generates a delay profile and obtains a correlation function with the reference signal as an estimation value, while coding section 105 reads encryption key information corresponding to the estimation value input from propagation estimating section 103 using the codebook associating the correlation function with the encryption key, and it is thereby possible to implement flexible setting of encryption key in simple circuitry.

In addition, in Embodiment 2, the method is described of using a quantization vector technique as a coding method of delay profile in coding section 105. However, various methods are considered such as a method of approximating a data string of delay profile with an evaluation equation and using coefficients of the obtained approximation equation to code, a method of dividing the delay profile into a number of blocks to perform coding according to the size or the order, or to code according to the delay time and the size of a path with the maximum power.

Embodiment 3

Communication apparatus 700 according to Embodiment 3 has the same configuration as that of communication apparatus 200 according to Embodiment 1 as illustrated in FIG. 2, except that propagation control section 701 is added, coding section 703 replaces coding section 205, modulation section 704 replaces modulation section 211, and transmitting section 705 replaces transmitting section 212. In addition, the same sections as in FIG. 2 are assigned the same reference numerals as in FIG. 2, and descriptions thereof are omitted.

The invention of a stable communication method by propagation control will be described below with reference to FIGS. 7 and 8.

Figure 7:
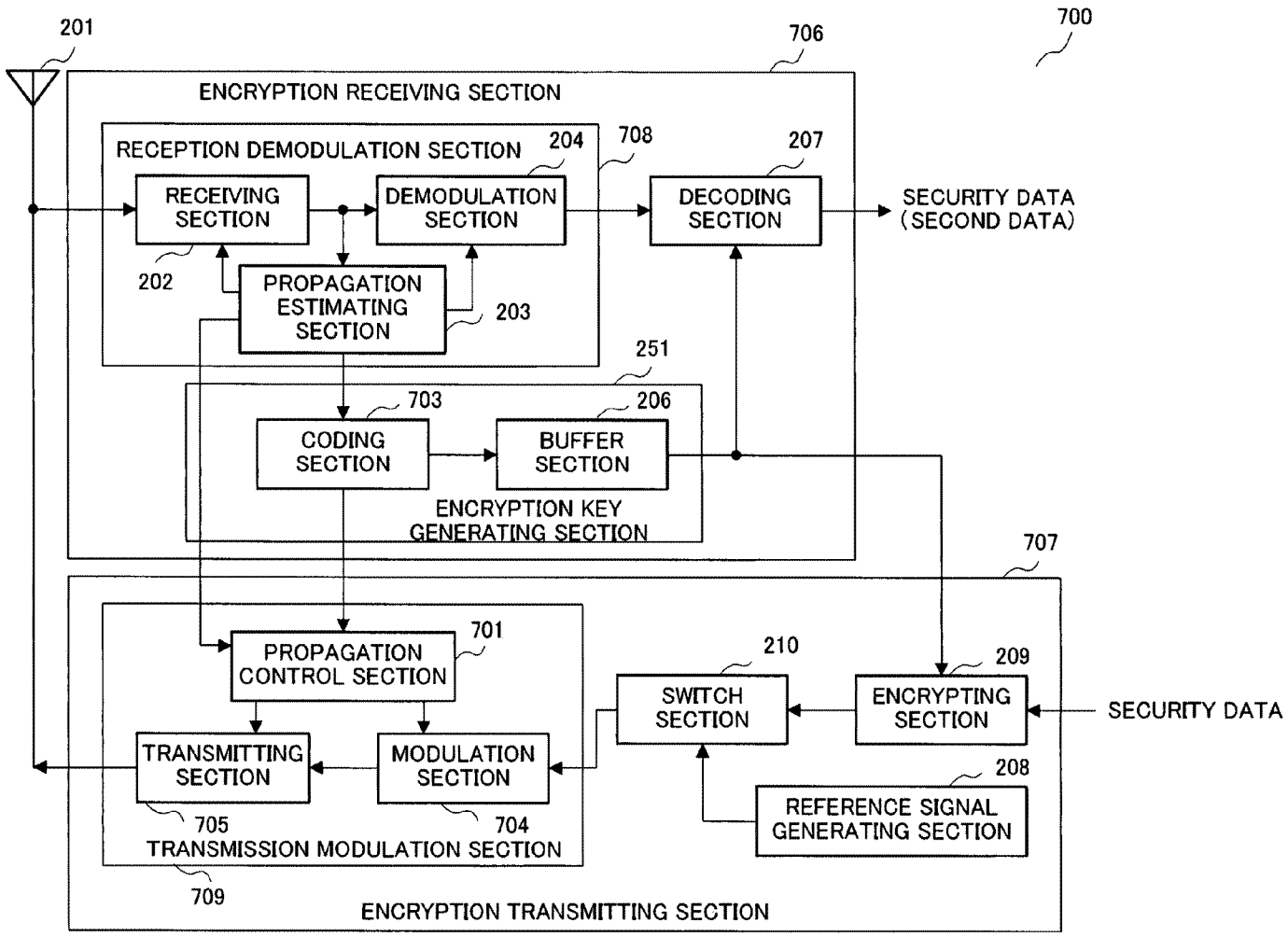
FIG. 7 is a block diagram illustrating a configuration of a communication apparatus according to Embodiment 3 of the present invention.
Figure 8:
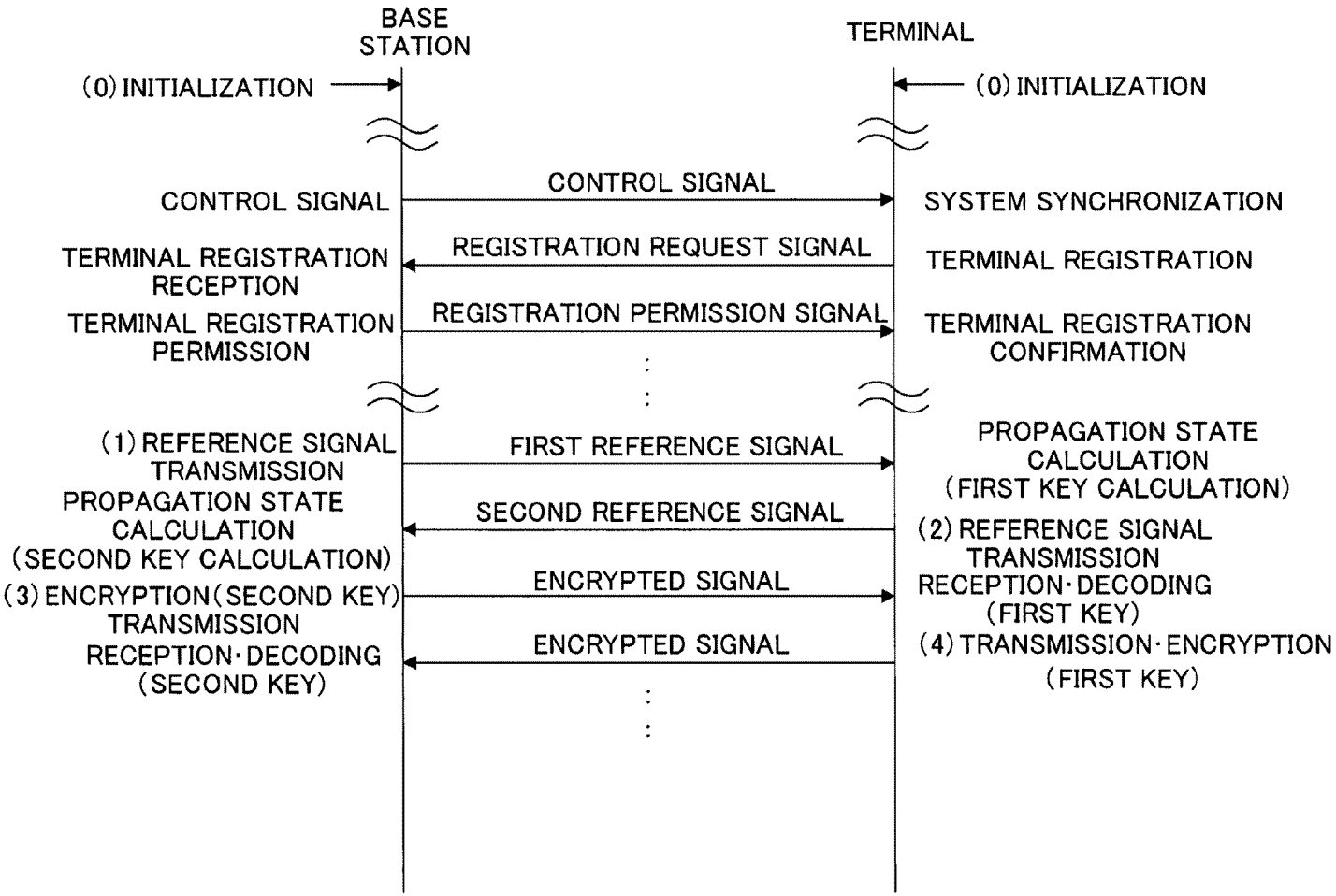
FIG. 8 is a sequence diagram illustrating the operation of the communication apparatus according to Embodiment 3 of the present invention.

Communication apparatus 700 in FIG. 7 has antenna 201 comprised of a plurality of antenna elements, encryption receiving section 706, and encryption transmitting section 707. Encryption receiving section 706 has reception demodulation section 708, encryption key generating section 251, and decoding section 207, and is of the same configuration as in FIG. 1. Encryption transmitting section 707 has reference signal generating section 208, encrypting section 209, switch section 210 and transmission modulation section 709, and the sections 208, 209 and 210 are the same as respective sections in FIG. 2.

Transmission modulation section 709 has propagation control section 701, modulation section 704, and transmitting section 705. Propagation control section 701 receives propagation information output from propagation estimating section 203 and propagation characteristic information (first data) obtained by coding section 703 extracting a characteristic from the propagation information, and outputs a modulation control signal and transmission control signal so as to control the propagation state to be optimal for a terminal as a communicating party. Demodulation section 704 receives the demodulation control signal output from propagation control section 701 and communication information, modulates the communication information while performing fine adjustment on a phase, output timing and amplitude based on the modulation control signal, and outputs a modulated signal for each of the antenna elements.

Transmitting section 705 receives the transmission control signal and modulated signal, converts the modulated signal into an RF signal for each of the antenna elements while controlling the frequency and output timing based on the transmission control signal, and outputs the RF signal to antenna 201.

The communication apparatus with the above-mentioned configuration will be described more specifically with reference to communication procedures in FIG. 8. In FIG. 8, it is assumed that each of the base station and terminal is the communication apparatus as illustrated in FIG. 7. In addition, only differences from Embodiment 1 are described herein.

(0) Base Station and Terminal: Initialization

The same operation as in Embodiment 1 is carried out.

(1) Base Station: Transmission of First Reference Signal

The base station transmits a reference signal for propagation estimation performed in the terminal as a first reference signal. Specifically, switch section 210 selects the reference signal generated in reference signal generating section 208 to output to transmission modulation section 709. Transmission modulation section 709 receives the selected communication information, propagation information and propagation characteristic information, and outputs an RF signal while controlling the propagation state for the terminal as a communicating party, and the signal is transmitted from antenna 201. The propagation control will be described specifically later.

In the terminal awaiting the signal from the base station, propagation estimating section 203 detects the first reference signal from the received signal, and performs propagation estimation from the received signal and the reference signal that is a known signal. The propagation information that is an estimation value is provided to coding section 703 and propagation control section 701. Coding section 703 receives the propagation information from propagation estimating section 203, extracts the characteristic of the propagation state, outputs the propagation characteristic information to propagation control section 701, and at the same time, converts the extracted propagation characteristic information to an encryption key. The converted encryption key is held in buffer section 206, and the encryption key information is output. The base station uses the encryption key as a first encryption key for subsequent communications.

(2) Terminal: Transmission of Second Reference Signal

The terminal transmits a reference signal for propagation estimation performed in the base station as a second reference signal in the same way as described in procedure (1). At this point, propagation control section 701 transmits the second reference signal while controlling modulation section 704 and transmitting section 705 so that the propagation state becomes a state corresponding to the encryption key (first key) for the base station that is a communicating party, using the propagation information obtained in (1) and propagation characteristic information.

Upon receiving a signal from the terminal, the base station detects the second reference signal, and propagation estimating section 203 performs propagation estimation from the received signal and the reference signal that is a known signal. In the same way as in (1), propagation estimating section 203 outputs the propagation information, coding section 703 extracts the propagation characteristic information from the propagation information to output, and converts the propagation characteristic information into an encryption key, and buffer section 206 holds the encryption key information. The terminal uses the encryption key as a second encryption key for subsequent communications.

(3) Base station: Transmission of Encryption

The base station switches switch section 210 to select encrypted information output from encrypting section 209. Using the second key obtained in procedure (2), encrypting section 209 encrypts the security data according to a predetermined method, and outputs the encrypted information. Switch section 210 selects the encrypted information, and outputs the selected communication information to transmission modulation section 709. In transmission modulation section 709, propagation control section 701 controls modulation section 704 and transmitting section 705 so that the propagation state becomes a state corresponding to the encryption key (second key) for the terminal that is a communicating party, using the propagation information obtained in (1) and propagation characteristic information, while the encrypted signal is transmitted from antenna 201 as an RF signal.

When the terminal receives the encrypted signal, reception demodulation section 708 demodulates the received signal to demodulated information. Decoding section 207 uses the demodulated information and the first key obtained in (1), and decodes the encryption according to a predetermined method to output the security data.

(4) Terminal: Transmission of Encryption

In the same way as in (3), the terminal performs encryption using the first key, and outputs encrypted information. In transmission modulation section 709, modulation section 704 and transmitting section 705 are controlled so that the propagation state becomes a state corresponding to the encryption key (first key) for the base station that is a communicating party, using the propagation information obtained in (1) and (3) and propagation characteristic information corresponding to the encryption key selected in (1), while the encrypted signal is transmitted from antenna 201 as an RF signal. In the same way as in (3), the base station uses the second key obtained in (2), decodes the encryption according to a predetermined method, and outputs the security data.

As described in Embodiment 1, encryption keys (first key and second key) generated in the base station and terminal can be used as common keys. In other words, it is understood that encryption and decoding in (3) and (4) is processed without any problems.

Thus, according to the communication apparatus and communication system of Embodiment 3 of the present invention, in addition to the effects of Embodiment 1, propagation control section 701 controls modulation section 704 and transmitting section 705 so that the same encryption key as that generated in coding 703 can be obtained in the communicating party, and thus controls the propagation environment in transmitting a reference signal, whereby it is possible to decrease the error in propagation environment between transmitting a reference signal from the communicating party and transmitting a reference signal to the communicating party, and to decrease the error in generating common encryption keys. Further, according to the communication apparatus and communication system of Embodiment 3, using propagation information obtained in reception and propagation characteristic information indicative of a propagation state corresponding to an encryption key, transmission modulation section 709 controls the propagation state for the terminal that is a communicating party to be of the propagation characteristic information. Thus, the error is decreased between the propagation state in reception and estimated propagation state (corresponding to the encryption key), and there provides an advantage that the communication quality is largely improved.

Further, it is possible to improve the stability of communication by performing propagation control even when the propagation state varies.

Furthermore, when a plurality of similar templates exists in templates searched by coding section 703 in selecting an encryption key, by the transmitting side explicitly controlling the propagation state, it is possible to eliminate the ambiguity.

In addition, in Embodiment 3, in the communication procedures, when reference signals are transmitted, the first reference signal and second reference signals are transmitted. However, it is obvious that whether to fir transmit the first reference signal or the second reference signal does not affect the system of this Embodiment. Also in the procedures of encryption communication, the order in which the reference signal is transmitted does not affect the system of this Embodiment.

In the system of this Embodiment, encryption keys are provided and received through communications of reference signals, and with respect to encrypted signals subsequent to the reference signal, it is only required that an encryption key matches one that is communicated earlier. In other words, although the transmitting side performs the propagation control for the receiving side while communicating in (3) and (4), it is not required to match the propagation state indicated by the encryption key.

Further, while reference signals are transmitted separately in the communication procedures, by inserting reference signals to a data stream, such an advantage is provided that procedures of (1) and (3) or procedures of (2) and (4) are carried out at the same time.

Embodiment 4

Figure 9:
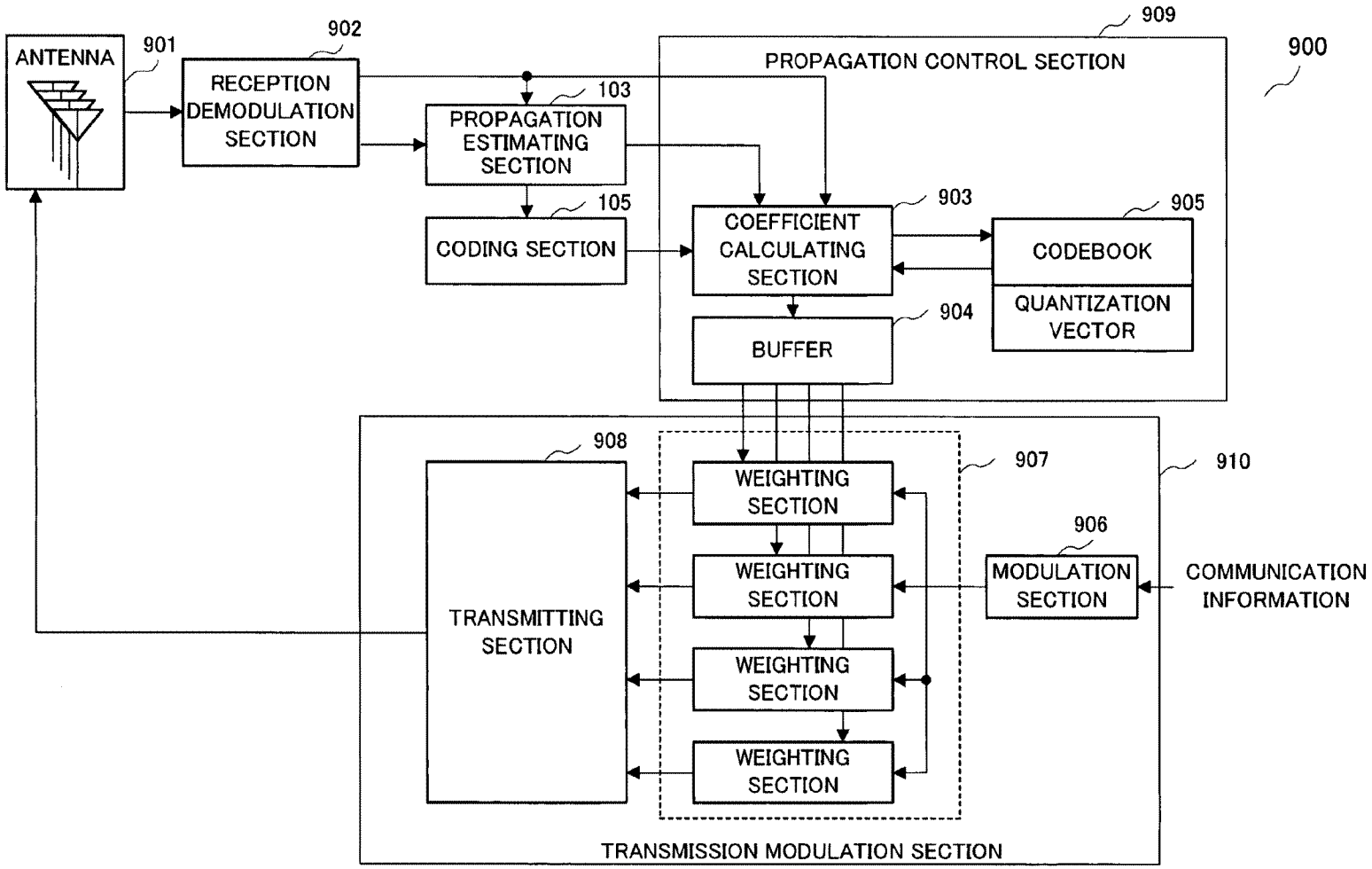
FIG. 9 is a block diagram illustrating a configuration of a communication apparatus according to Embodiment 4 of the present invention.

Referring to FIGS. 4 and 9, a method will be described below of controlling the propagation state for a terminal that is a communicating party. It is herein assumed that antenna 901 of a communication terminal has four antenna elements (AN 1 to AN 4).

The operation in FIG. 4 is basically the same as in described in Embodiment 2. Only differences will be described.

Convolver 403 generates a delay profile for each received signal using a reference signal, and buffer 404 stores four kinds of delay profiles. The delay profiles are assumed to be Ds1 to Ds4. Further, using the received signal and reception weighting coefficients (Wr1 to Wr4) delay profile (Ds0) of received signal R0 expressed by the following equation is calculated and output.

$$R0=\Sigma Rm\cdot Wrm \quad (2)$$

Among these delay profiles (Ds0 to Ds4), Ds0 is input to coding section 105, and encryption key K0 and corresponding code m0 are output.

In addition, it is assumed that reception weighting coefficients Wr1 to Wr4 are set at respective initial values, for example, in the initial state.

Referring to FIG. 9, a specific method will be described below of performing propagation control using thus obtained Ds1 to Ds4, Wr1 to Wr4 and Ds0 and m0.

Antenna 901 in FIG. 9 is comprised of four antenna elements. Reception demodulation section 902 receives respective RF signals from the antenna elements, and outputs the received signals and reception weighting coefficients corresponding to the reception sequence. Propagation estimating section 103 receives the reception weighting coefficients and received signals, and performs propagation estimation to output propagation information. Coding section 105 extracts a characteristic from the propagation information, and outputs a corresponding code of an encryption key. Propagation control section 909 receives the propagation information, corresponding code of the encryption key, and reception weighting coefficients, and outputs transmission weighting coefficients. Transmission modulation section 910 generates transmission signals respectively for the antenna elements to output, using the communication information and transmission weighting coefficients. Propagation control section 909 has coefficient calculating section 903, codebook 905 and buffer 904. Coefficient calculating section 903 receives the propagation information, corresponding code of the encryption key, reception weighting coefficients and quantization vector, and outputs transmission weighting coefficients of a transmission signal corresponding to the antenna elements.

Buffer 904 holds transmission weighting coefficients, and codebook 905 stores corresponding codes and quantization vectors. Transmission modulation section 910 has modulation section 906, weighting sections 907, and transmitting section 908. Modulation section 906 receives the communication information, modulates the information in a predetermined modulation scheme, and outputs a modulated signal. Weighting sections 907 multiply the modulated signal by respective weighting coefficients corresponding to the antenna elements to output weighted modulated signals. Transmitting section 908 receives the weighted modulated signals corresponding to the antenna elements, and converts the signals to RF signals corresponding to the antenna elements to output.

Figure 10:
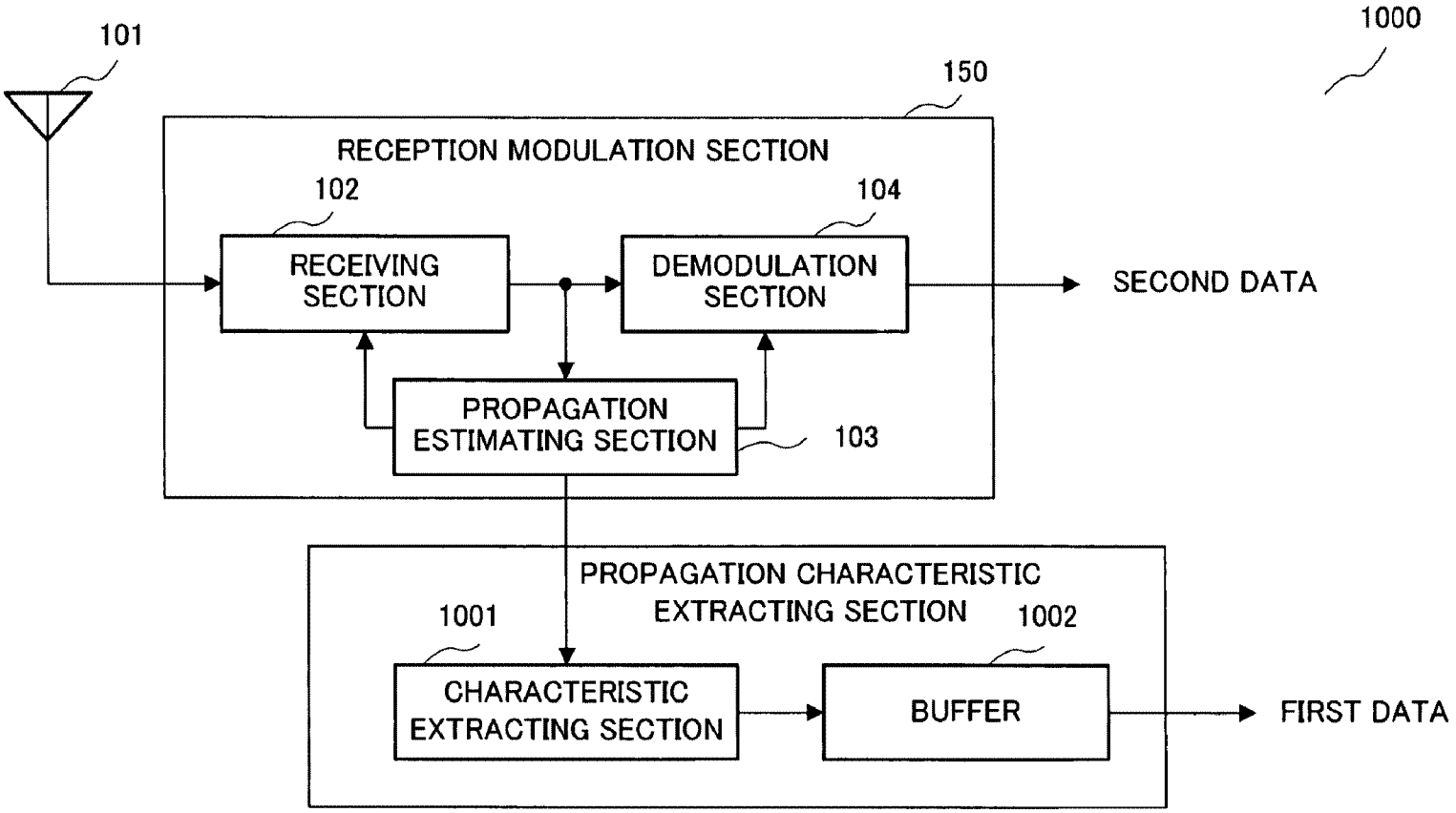
FIG. 10 is a block diagram illustrating another configuration of a communication apparatus according to Embodiment 4 of the present invention.

Receiving apparatus 1000 will be described below with reference to FIG. 10.

Characteristic extracting section 1001 receives the propagation information obtained from the received signal, and extracts a characteristic from the information.

Buffer 1002 temporarily stores the extracted characteristic extraction information. Buffer 1002 outputs the stored characteristic extraction information as first data.

The function of each block explained in FIG. 9 is almost the same as a respective block described in FIG. 4 or FIG. 9. Only differences are described herein.

Antenna 901 has four antenna elements (AN1 to AN4) and outputs four received RF signals respectively from the antenna elements, and at the same time, outputs reception weighting coefficients (Wr1 to Wr4) for the elements used in reception. The received signals (R1 to R4) respectively corresponding to AN1 to AN4 are input to propagation estimating section 103. As described above, propagation estimating section 103 outputs propagation states (Ds1 to Ds4) corresponding to received signals (R1 to R4), and coding section outputs encryption key K0 and corresponding code m0.

Coefficient calculating section 903 searches codebook 905 for the code m0 corresponding to the encryption key K0, and reads a quantization vector (Xqm0) associated with the code m0 to store. Using the quantization vector (Xqm0) and input propagation information (Ds0 to Ds4), the section 903 obtains Wm (m:1 to 4) that minimizes the square error obtained by the following equation:

$$d=|Wm\cdot Dsm-Xqm0|^2 \quad (3)$$

The least square method is famous as the method of calculating such an error.

Using thus obtained weighting coefficients (W1 to W4) and reception weighting coefficients (Wr1 to Wr4), the section 903 calculates transmission weighting coefficients (Wt1 to Wt4) given with the following equation (4):

$$Wtm=Wm/Wrm(m:1 \text{ to } 4) \quad (4)$$

Buffer 904 holds the transmission weighting coefficients.

Meanwhile, modulation section 906 having received the communication information modulates the communication information according to a predetermined modulation scheme, and outputs a modulated signal. The modulated signal is branched to modulated signal strings (S1 to S4) corresponding to antenna elements (AN1 to AN4), and output to weighting sections 907. Weighting sections 907 multiply modulated signals (S1 to S4) corresponding to AN1 to AN4 respectively by transmission weighting coefficients (Wt1 to Wt4) from buffer 904.

$$Swm=Wtm\cdot Sm(m:1 \text{ to } 4) \quad (5)$$

The section 906 outputs thus obtained weighted modulated signals (Sw1 to Sw4). Transmitting section 908 receives the weighted modulated signals, and converts the signals respectively into RF signals (Srf1 to Srf4) to output to antenna 901.

Transmission modulation section 910 multiplies transmission weighting coefficients while performing calculations as described above, and it is thereby possible to control the propagation characteristic indicated by Xqm0 in a terminal receiving the signals.

Then, in receiving apparatus 1000 having received transmission signals transmitted from antenna 901, propagation estimating section 103 estimates the propagation state from the received signals, and outputs the estimated propagation state information to characteristic extracting section 1001. Characteristic extracting section 1001 extracts a characteristic corresponding to the propagation state from the propagation state information to output as first data.

Thus, according to the communication apparatus and communication system of Embodiment 4, in addition to the effects of Embodiment 1, transmitting/receiving apparatus 900 adjusts the weighting coefficients used in transmitting the communication information, based on the propagation environment estimated in propagation estimating section 103, so as to enable transmitting/receiving apparatus 900 and receiving apparatus 1000 to acquire the same first data, whereby it is possible to prevent occurrences of a situation that transmitting/receiving apparatus 900 and receiving apparatus 1000 cannot acquire the same first data due to effects of noise or the like in estimating the propagation environment, and to eliminate the ambiguity of the first data. Further, according to the communication apparatus and communication system of Embodiment 4, transmitting/receiving apparatus 900 varies weighting coefficients in transmitting the communication information based on the propagation environment estimated in propagation estimating section 103, and thereby is capable of intentionally varying the first data that receiving apparatus 1000 acquires, whereby it is possible to prevent occurrences of harmful effects such that the confidential information is interpreted caused by using the same first data for the long term. In this way, since it is possible to change an encryption key when the first data is the encryption key, it is possible to ensure high security.

In addition, while Embodiment 4 describes controlling the delay profile, the present invention is not limited to the foregoing. It may be possible to use a polarization state (polarization plane and/or circulating direction), phase state or propagation delay time to perform propagation estimation. Further, in Embodiment 4 codebook 905 is the same as that in coding section 105, and it is enough that either codebook only exists in terms of structure. Further, while Embodiment 4 describes the case where antenna 901 has four antenna elements, the present invention is not limited to the case, and it is needless to say that two or more antenna elements have the same effectiveness. Furthermore, each sigh indicated in the equations is applicable irrespective of a natural number or complex number. When each value is of complex number, since the signal control is performed in amplitude and phase, higher control is expected.

Embodiment 5

Figure 11:
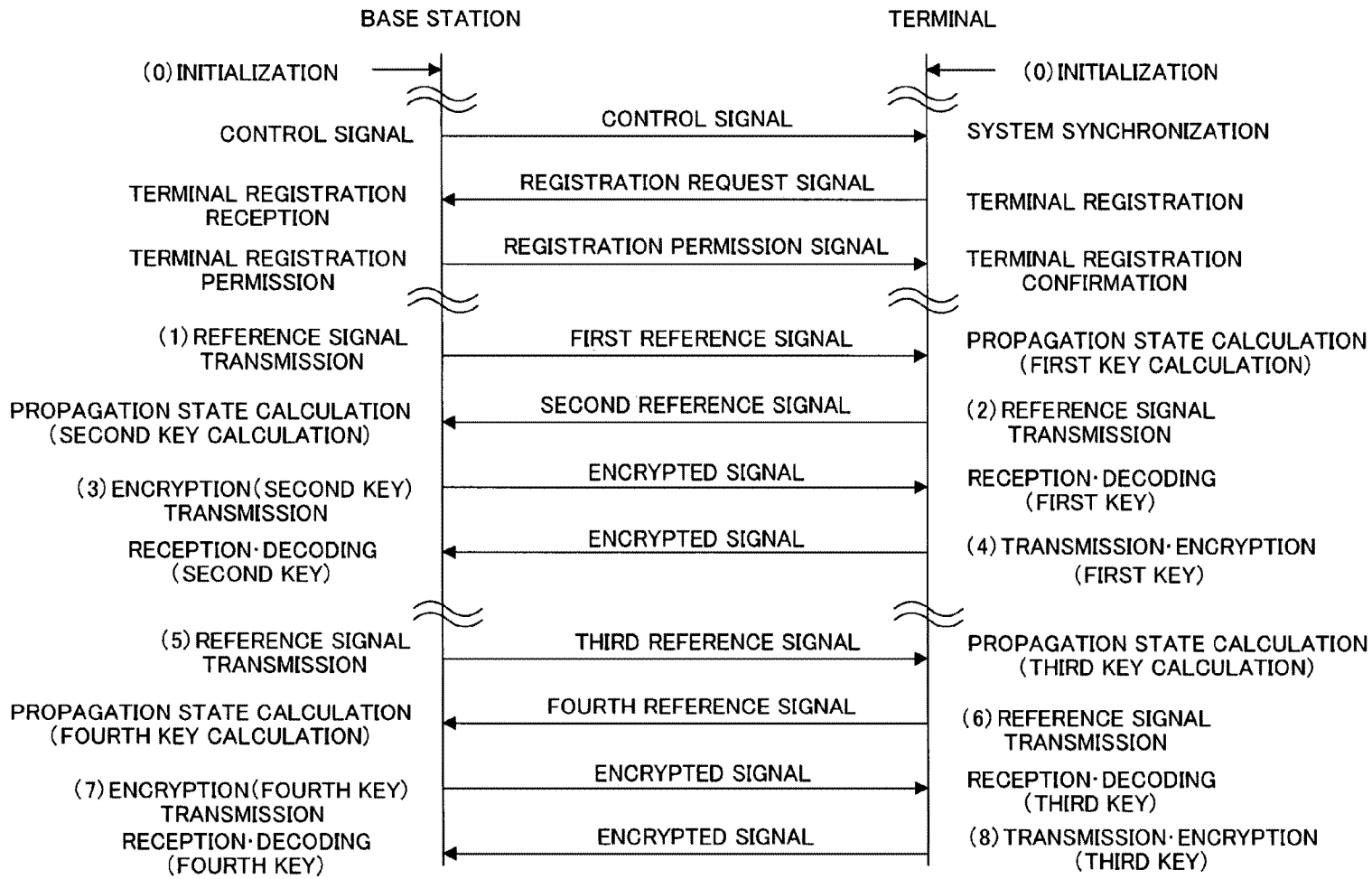
FIG. 11 is a sequence diagram illustrating the operation of the communication apparatus according to Embodiment 5 of the present invention.

A communication apparatus according to Embodiment 5 is capable of selecting an arbitrary encryption key by performing propagation control, and FIG. 11 illustrates communication procedures regarding the present invention. In addition, the communication apparatus in Embodiment 5 has the same configuration as that of communication apparatus 700 as illustrated in FIG. 7, and descriptions thereof are omitted.

In Embodiments 1 to 4 as described above, an encryption key is selected corresponding to the estimated propagation state, and therefore, when the propagation state is constant, the same encryption key is used for a long time. There arises a fear of facilitating estimation of the encryption key. Further, since the same encryption keys are used in both communication apparatuses, there is a fear that when either encryption key is determined, the other encryption key is also determined. Embodiment 5 enables a transmitter to select an encryption key, and in this respect, differs from Embodiments 1 to 3 where the first and second keys are the same.

FIG. 11 illustrates communication procedures regarding the present invention. In addition, procedures of (0) to (4) are the same as in FIG. 8, and descriptions thereof are omitted.

(5) Base Station: Transmission of Third Reference Signal

The base station selects a third key as an encryption key, and determines weighting coefficients from the propagation characteristic information corresponding to the encryption key and last estimated propagation information of the communication. Propagation control section 701 (second data selecting means) performs propagation control on the reference signal for propagation estimation performed in the terminal using the weighting coefficients to output as a third reference signal.

In the terminal awaiting the signal from the base station, propagation estimating section 203 detects the third reference signal from the received signal, and performs propagation estimation from the received signal and the reference signal that is a known signal. The propagation information that is an estimation value is provided to coding section 703 and propagation control section 701. Coding section 703 receives the propagation information from propagation estimating section 203, extracts the characteristic of the propagation state, outputs the propagation characteristic information to propagation control section 701, and at the same time, converts the extracted propagation characteristic information into an encryption key. The converted encryption key is held in buffer section 206, and the encryption key information is output. The base station uses the encryption key as a third key for subsequent communications.

(6) Terminal: Transmission of Fourth Reference Signal

As in procedure (5), the terminal selects a fourth key as an encryption key, and determines weighting coefficients from the propagation characteristic information corresponding to the encryption key and last estimated propagation information of the communication. Then, the terminal performs propagation control on the reference signal for propagation estimation performed in the base station using the weighting coefficients to output as a fourth reference signal.

Upon receiving a signal from the terminal, the base station detects the fourth reference signal, and propagation estimating section 203 performs propagation estimation from the received signal and the reference signal that is a known signal. In the same way as in procedure (5), propagation estimating section 203 outputs the propagation information, and coding section 703 extracts the propagation characteristic information from the propagation information to output. The propagation characteristic information is converted into an encryption key, and buffer section 206 holds the encryption key information. The terminal uses the encryption key as a fourth encryption key for subsequent communications.

(7) Base Station: Transmission of Encryption

Using the third key selected in (5), the base station encrypts the security data according to a predetermined method, and transmits an encrypted signal.

When the terminal receives the encrypted signal, reception demodulation section 708 demodulates the received signal into demodulated information. Using the demodulated information and the third key obtained in (5), the terminal decodes the encryption according to a predetermined method, and outputs the security data.

(8) Terminal: Transmission of Encryption

Using the fourth key selected in procedure (6), the terminal encrypts the security data, and transmits an encrypted signal.

As in procedure (7), using the fourth key obtained in (6), the base station decodes the encryption according to a predetermined method, and outputs the security data.

The aforementioned operation will be described below using equations.

Assuming propagation function indicative of a characteristic of radio-signal propagation is H, received signal is Sr and transmission signal is St, the following equation is obtained:

$$Sr=H\cdot St \tag{6}$$

Assuming the number of antenna elements is N, H is a square matrix of N×N, and each of Sr and St is a matrix of 1×N. The terminal is capable of calculating using a base-station transmitted signal (first reference signal in FIG. 3), while the base station is capable of calculating using a terminal transmitted signal (second reference signal in FIG. 3). The communication of the first and second reference signals is represented using following equations:

$$Sr_b=Hu\cdot St_m \tag{7}$$

$$Sr_m=Hd\cdot St_b \tag{8}$$

Hu and Hd indicate uplink propagation function and downlink propagation function, respectively. St_b and Sr_b indicate transmission signal and reception signal in the base station, respectively. St_m and Sr_m indicate transmission signal and reception signal in the terminal, respectively. Since St_b and St_m are known signals (respectively first and second reference signals) the propagation functions are obtained by following equations:

$$Hu=Sr_b\cdot St_m^{-1} \tag{9}$$

$$Hd=Sr_m\cdot St_m^{-1} \tag{10}$$

Since the propagation functions are the same in transmission and reception due to the inverse characteristics of propagation, the following equation is obtained:

$$H\equiv Hu=Hd \tag{11}$$

Embodiment 1 describes using thus obtained propagation function H as an encryption key (first key (=second key)).

Meanwhile, a method will be described below of controlling the propagation state using transmission weighting coefficients Wb and Wm. When an error $\epsilon$ exists between propagation function H' represented by the quantization vector obtained in selecting the encryption key (first key (=second key)) and actual propagation function H, Sr is expressed by the following equation:

$$Sr=(H'\cdot\epsilon)\cdot St \tag{12}$$

Therefore, the error component E is obtained by the following equation:

$$\epsilon=H'^{-1}(Sr\cdot St^{-1}) \tag{13}$$

Substituting weighting coefficients Wm and Wb, correction can be carried out as described below:

$$Sr_b=(H'\cdot Wm)\cdot St_m \tag{14}$$

$$Sr_m=(H'\cdot Wm)\cdot St_b \tag{15}$$

Embodiment 4 describes performing encrypted communication while correcting the propagation state using the weighting coefficients in this way. Extending the correction function enables an encryption key to be set on transmitting side. A case will be described below of using the third and fourth keys that are different from the first key (=second key). The base station performs control using the weight W3_b so as to obtain propagation function H3 corresponding to the third key, and transmits the third key via the third reference signal. In other words, when Sr is:

$$Sr_m=(H\cdot W3_b)\cdot St_b \tag{16}$$

H3 is:

$$H3=H\cdot W3_b \tag{17}$$

Subsequently, the base station performs the encrypted communication while using the third key to encrypt.

The terminal receives the third reference signal, analyzes the propagation state, thereby obtains propagation function H3, and using the encryption key (third key) corresponding to H3, decodes subsequent encrypted information. As in the base station, the terminal selects the fourth key (that is assumed to correspond to propagation function H4), and transmits the fourth key via the fourth reference signal while performing control using the weighting coefficient W4_m.

$$Sr_b=(H\cdot W4_m)\cdot St_m \tag{18}$$

$$H4=H\cdot W4_m \tag{19}$$

The terminal performs the encrypted communication while using the fourth key to encrypt. As in the terminal, the base station is capable of performing decoding using the fourth key.

Thus, according to the communication apparatus and communication system of Embodiment 5, in addition to the effects of Embodiment 1, since propagation control section 701 controls transmitting section 705 and modulation section 704 in transmitting a reference signal so as to vary the propagation environment, it is possible to vary the encryption key at arbitrary timing. Therefore, the possibility is eliminated that the third party decrypts the encryption key, and high security is provided.

Embodiment 6

Frame structures explained in Embodiments 1 to 5 are based on that in FIG. 12(a). In other words, two bursts exist separately, where one burst includes a reference signal, while the other one includes an encrypted signal. Using this scheme increases a reference signal period, and thereby provides an advantage that an error in estimation is decreased on receiving side.

FIG. 12(b) is to explain a method of inserting a reference signal into a data stream (or burst) for a predetermined period in a frame structure. Using this method makes it possible to provide/receive the encryption key concurrently with encrypted signal, and thus enables efficient transmission.

Meanwhile, FIG. 12(c) illustrates an arrangement of an encryption key indicated by the reference signal and an encryption key for use in encrypted signal. As illustrated in FIG. 12(c), a change in time (or frequency) is provided between an encryption key indicated by the reference signal and a data signal corresponding to the key, it is thereby possible to provide/receive the encryption key and encrypted signal separately, and there is an advantage of decreasing the risk of leaks of the key and signal to the third party.

Provision and receipt of the encryption key is carried out using reference signals, as explained in communication procedures in the other Embodiments, and corresponds to procedures (1) and (2) in FIG. 11. In FIG. 11, provision and receipt of the encryption key is not carried out in communications except communications of procedures of (1) and (2), which indicates that decoding operation is not affected by the propagation state of encrypted communication. In other words, the propagation control is carried out at the time of transmitting the reference signal so that characteristic propagation information can be conveyed corresponding to the propagation environment, thereby enabling stable provision and receipt of the encryption key.

The operation of the propagation control in response to communication procedures will be described with reference to FIG. 13.

The communication in the frame structure in FIG. 12(a) will be described first.

Figure 13:
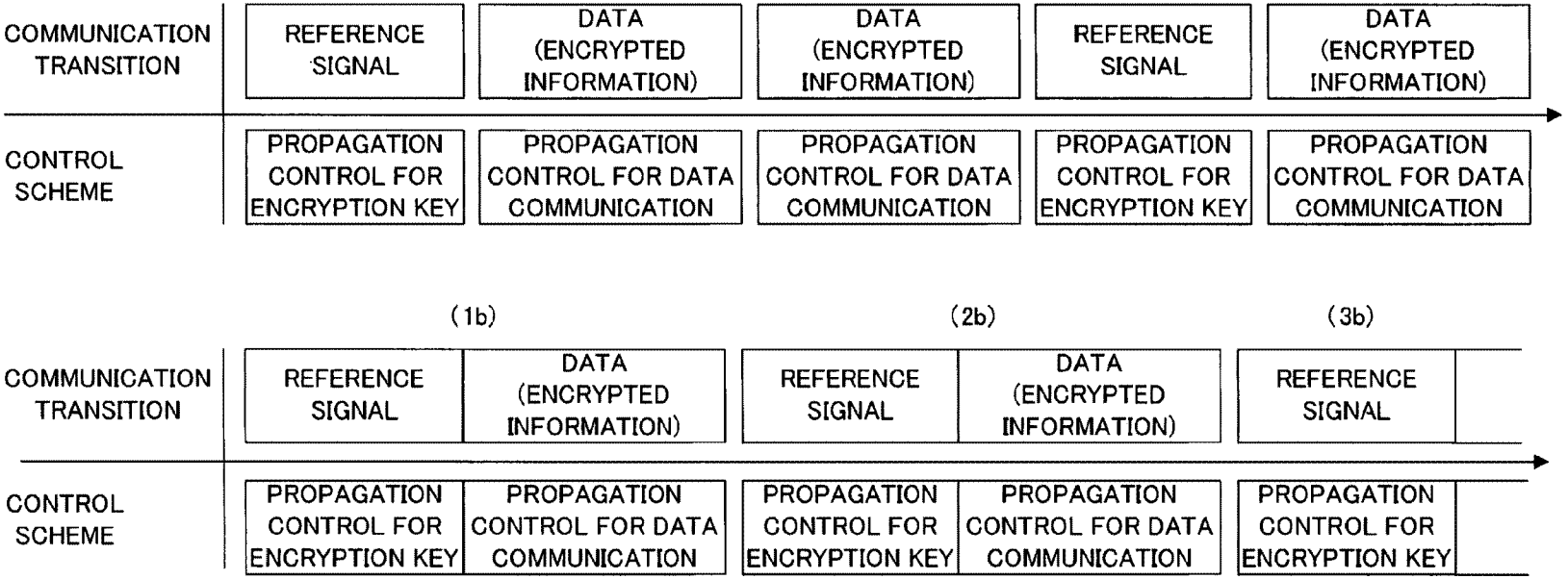
FIG. 13 is another view illustrating a frame structure of signal according to Embodiment 6 of the present invention.

In transmitting a reference signal in (1a) in FIG. 13, the propagation control is to perform communications for provision and receipt of the encryption key as described in the other Embodiments. At this point, when propagation estimation has been carried out before, it is possible to perform control for compensating for a difference between a result of the estimation and the propagation state corresponding to the encryption key. In this way, the receiving side is capable of receiving the reference signal in an excellent propagation state, resulting in stable provision and receipt of the encryption key. Meanwhile, when performing data communications (encrypted signal) in (2a) in FIG. 13, the encryption key has arrived at the receiving side already, and the propagation information does not need to be used in reception and decoding. Therefore, data communications can be carried out stably by performing control such that the reception is carried out stably (there are known beam forming, equalization on transmitting side, and transmission diversity, for example). Thereafter, performing communications subsequent to (3a) in FIG. 13 expects significant increases in communication quality.

Communications in the frame structure (b) in FIG. 12 will be described below.

As illustrated in (1b) in FIG. 13, it is considered switching the propagation control scheme between reference signal communications and data communications. Using this system enables concurrent provisions of the encryption key and encrypted signal. It is described earlier that the transmitting side is able to select encryption, and using this feature makes it possible to flexibly vary the encryption key for each block. Further, the feature is provided that stable communications can be carried out as described above.

Meanwhile, as a matter of course, it is possible to use the same propagation control scheme in reference signal communications and data communications. In this case, it is possible to use the reference signal in decoding in data communications, and increases in communication quality are expected.

In the above descriptions, the reference signal is assumed to be a known signal. However, the reference signal does not need to be a known signal. In this case, a variation in propagation is estimated while demodulating, and an encryption key is determined. In this way, information for determining the encryption key is increased, and it is made possible to detect the encryption key with stability. Further, as the reference signal, it is possible to use a pilot signal used in QAM or the like, a synchronization signal sequence for burst synchronization used in TDMA or the like, and so on. Using such a signal provides a feature of providing communications with high security and with little changes in the conventional configuration.

Figure 12:
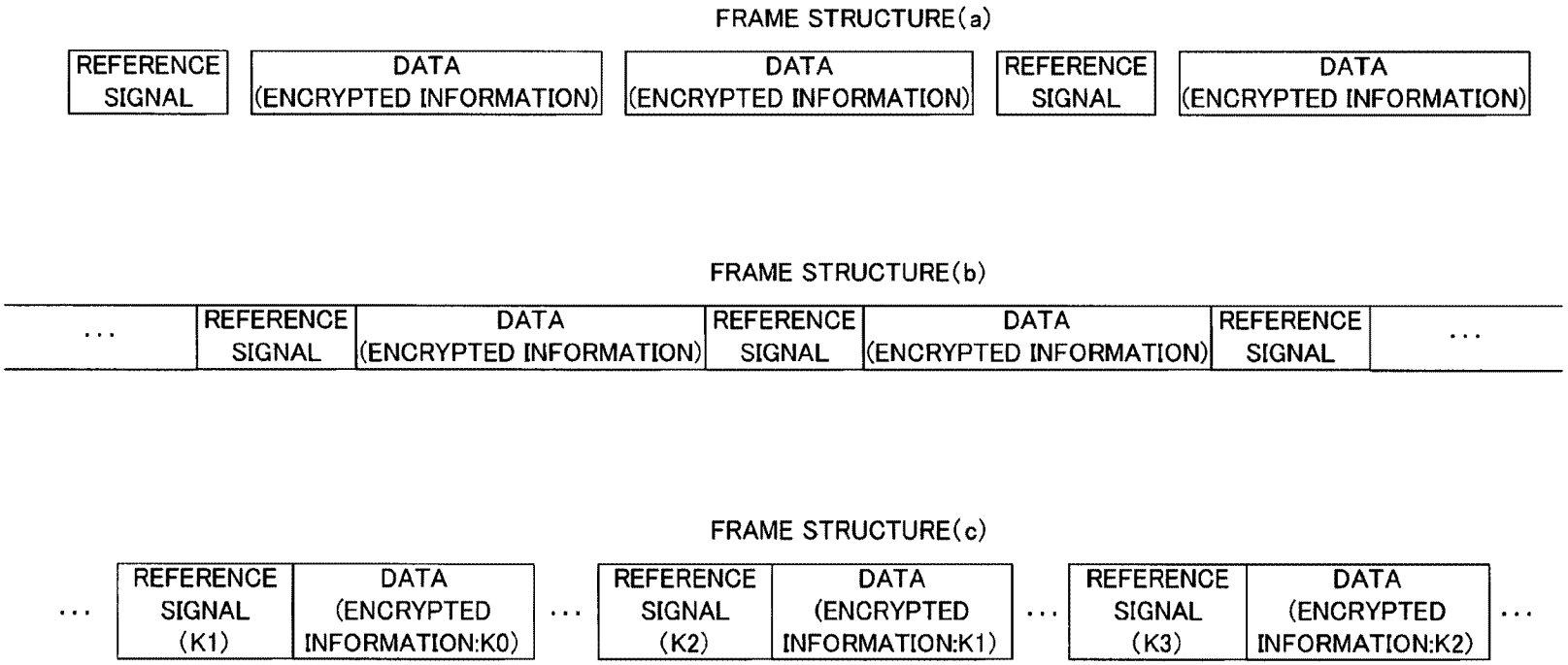
FIGS. 12(a), 12(b) and 12(c) are views illustrating a frame structure of signal according to Embodiment 6 of the present invention.

As illustrated in frame structures (b) and (c) in FIG. 12, inserting reference signals into a data stream provides an advantage that procedures of (1) and (3) in FIGS. 11 or of (2) and (4) in FIG. 11 are implemented at the same time.

In the above descriptions, beam forming, precoding (equalization on transmitting side) and transmission diversity is considered as the propagation control scheme in data communications. Further, it is considered using control of MIMO (Multi-Input Multi-Output) and Space Division Multiplexing. In particular, MIMO multiplexing technique and Space Division Multiplexing technique are to increase the channel capacity using the propagation characteristic actively, and are good consistent with the technique described in the present invention where the propagation characteristic is actively used. For example, after the confidential communication is performed using the technique described in one of Embodiments as described above, the propagation control is changed to the control for MIMO (or Space Division Multiplexing) to succeed, and it is thereby possible to perform MIMO or Space Division Multiplexing. In this way, without adding a specific technical constitution, it is possible to increase the confidentiality of important information, while increasing the channel capacity in data communications.

Thus, according to the communication apparatus and communication system of Embodiment 6, in addition to the effects of Embodiments 1 to 5, propagation environments are changed between the time of transmitting a signal to cause a communicating party to acquire an encryption key (first data) based on the propagation environment and the time of transmitting signals other than such a signal, whereby it is possible to transmit signals other than the signal to transmit to cause a communicating party to acquire an encryption key, in optimal control scheme corresponding to the communication environment.

In addition, in Embodiment 6 the reference signal is assumed to be a known signal. However, the reference signal does not need to be a known signal. In this case, a change in propagation is estimated while demodulating, and an encryption key is determined. In this way, information for determining the encryption key is increased, and it is made possible to detect the encryption key with stability. Further, as the reference signal, it is possible to use a pilot signal used in QAM or the like, a synchronization signal sequence for burst synchronization used in TDMA or the like, and so on. Using such a signal provides a feature of providing communications with high security and with little changes in the conventional configuration.

Embodiment 7

Figure 14:
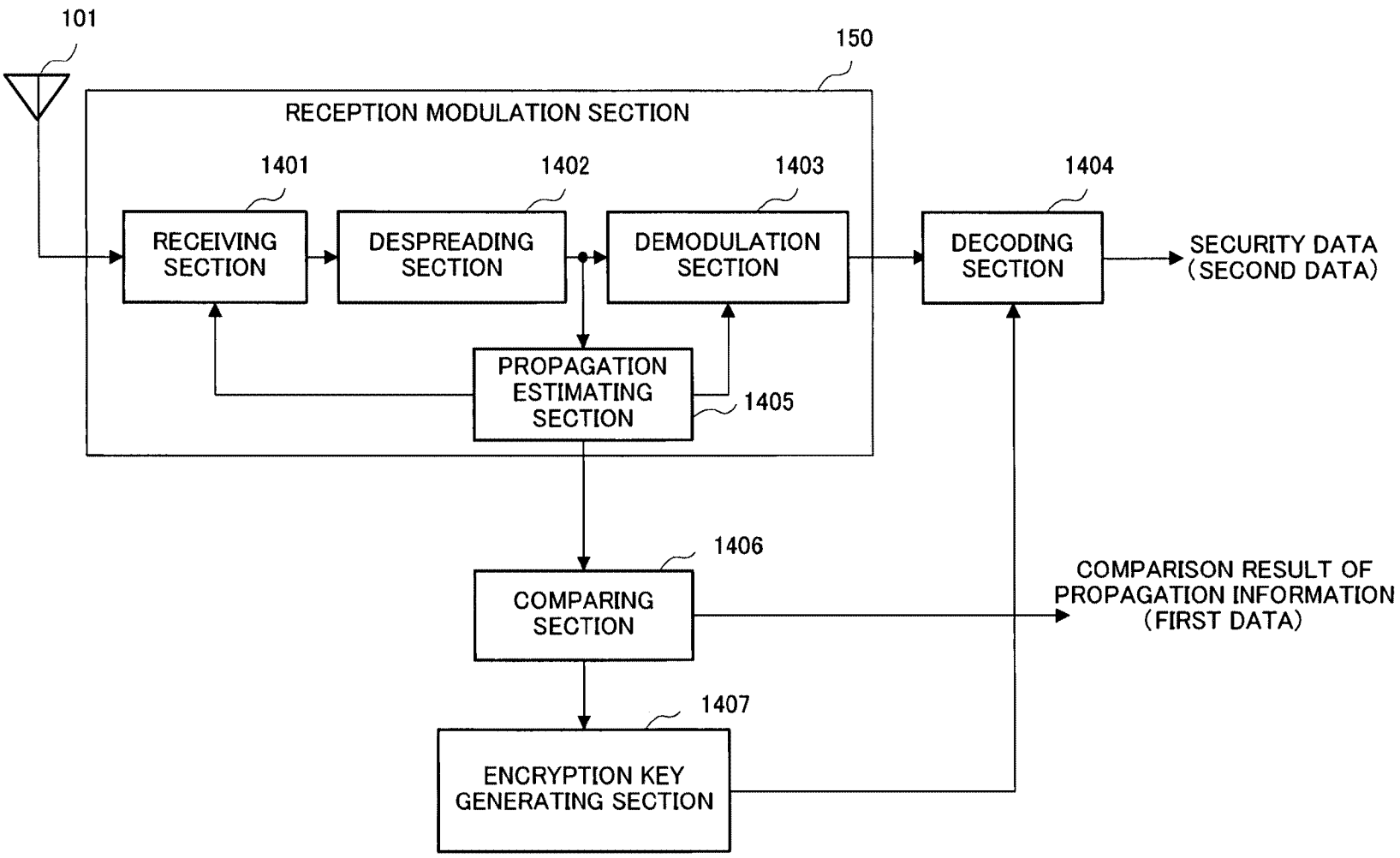
FIG. 14 is a block diagram illustrating a configuration of a communication apparatus according to Embodiment 7 of the present invention.
Figure 15:
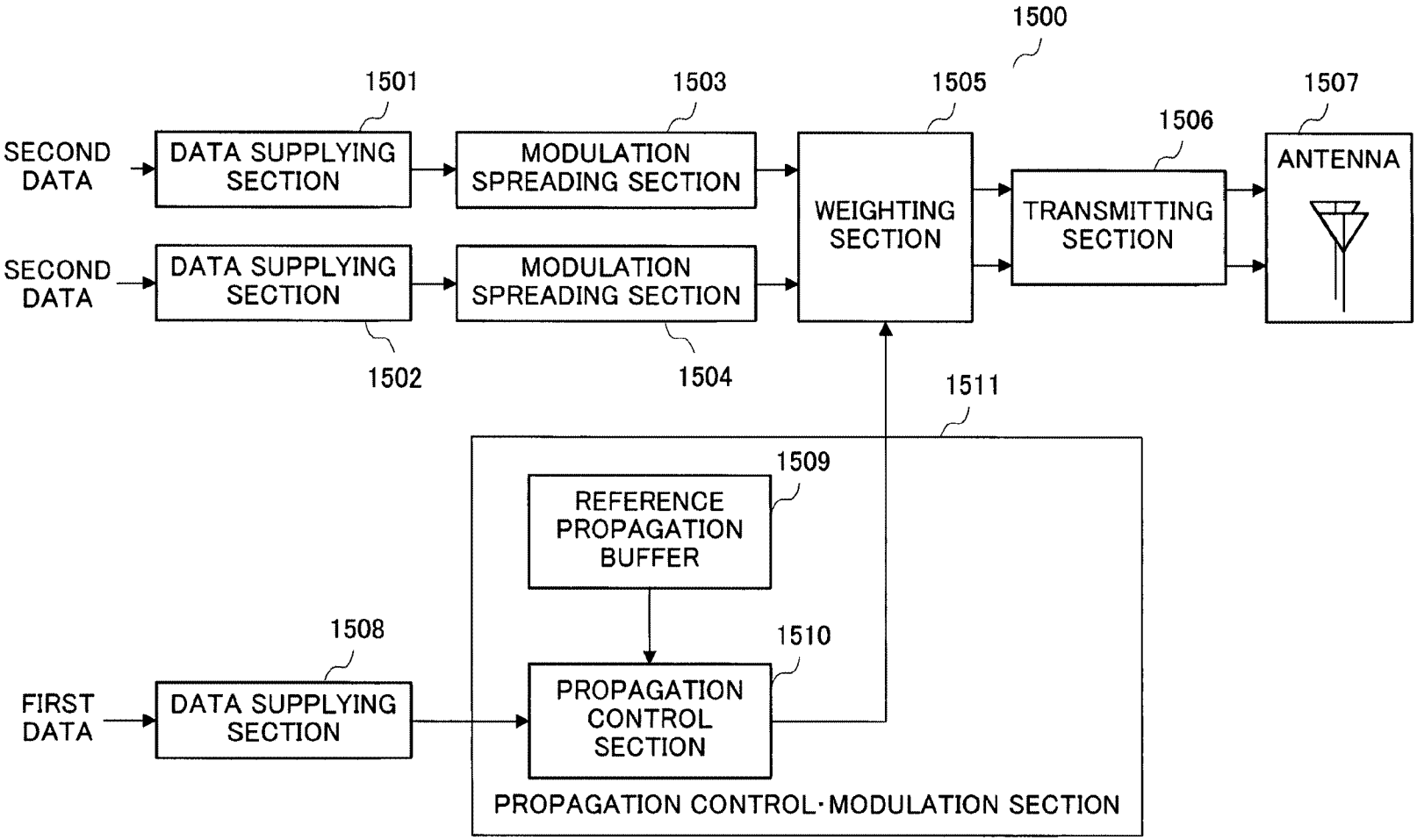
FIG. 15 is a block diagram illustrating another configuration of a communication apparatus according to Embodiment 7 of the present invention.

FIG. 14 illustrates part of a receiving apparatus in a communication apparatus according to Embodiment 7 of the present invention, and FIG. 15 illustrates part of a transmitting apparatus in the communication apparatus according to Embodiment 7. In addition, the same sections as those in the communication apparatus in Embodiment 1 are assigned the same reference numerals, and descriptions thereof are omitted.

A method is described herein of applying the present invention to a multiplexed signal. CDMA is described as an example of a multiple access system.

Reception demodulation section 150 outputs a received signal of a received RF signal and demodulated information. Reception demodulation section 150 has receiving section 1401, despreading section 1402, propagation estimating section 1405 and demodulation section 1403.

FIG. 14 illustrates part of the receiving apparatus for use in the present invention.

Receiving section 1401 receives an RF signal and propagation information, and controls the RF signal in a suitable reception state to output a received signal. Despreading section 1402 calculates the convolution of the received signal and a spreading code in response to the channel, and outputs a despread signal. Demodulation section 1403 performs suitable demodulation using the received signal and propagation information, and outputs demodulated information. Decoding section 1404 receives the encryption key information and demodulated information, decodes the encryption of the demodulated information using the encryption key information, and outputs security data. Propagation estimating section 1405 performs propagation estimation on each channel, and outputs propagation information for each channel. Demodulation section 1403 performs suitable demodulation using the received signal and propagation information, and outputs demodulated information. Comparing section 1406 compares the propagation information between channels, and outputs a comparison result (first data). Encryption key generating section 1407 receives the propagation information, and outputs the encryption key information (first data).

FIG. 15 illustrates part of the transmitting apparatus for use in the present invention.

Data supplying sections 1501 and 1502 hold data of respective channels. Modulation spreading sections 1503 and 1504 modulate data of respective channels, spread the data with respective spreading codes of the channels, and outputs spread signals. Weighting section 1505 multiplies the transmission signal by each transmission weighting coefficient. Transmitting section 1506 converts the modulated signal into an RF signal to be transmitted to output. Antenna 1507 transmits the transmission signal. Data supplying section 1508 stores the first data. Reference propagation buffer 1509 holds the reference information of propagation state. Propagation control section 1510 receives an encryption key, second data and propagation information, and calculates the transmission weighting coefficient.

The operation of transmitting apparatus 1500 will be described below.

In transmitting apparatus 1500, data of a plurality of channels are provided from data supplying sections 1501 and 1502, modulated, and spread with respective spreading codes set in advance, thereby generating spread signals for each channel. Data supplying section 1508 outputs first data, and propagation control section 1510 receives the first data, and performs propagation control in response to the first data using the transmission weighting coefficients, based on the information from reference propagation buffer 1509 that holds the propagation information estimated previously. Weighting section 1505 performs weighting calculation using the transmission weighting coefficients, and the signals are transmitted through transmitting section 1506.

For simplicity in description, it is assumed that data supplying section 1508 does not output data. The control in propagation control section 1510 is the same as that in propagation control section 701 as illustrated in FIG. 7. For example, the case of a single channel matches a situation where a reference signal is output as described in Embodiment 4. A case of a plurality of channels is considered. Spreading codes are set for each channel, but there is not correlation between the codes, and therefore, are considered as being processed independently in signal processing. In other words, propagation control section 1510 is capable of performing propagation control for each channel using M×N transmission weighting coefficients or more when the number of channels and the number of antennas are respectively assumed to be M and N.

It is understood from the forgoing that propagation control can be carried out corresponding to the encryption key as in Embodiment 5.

When a plurality of channels is multiplexed, it is possible to control reception power at the receiving end by performing propagation control for each channel. For example, it is possible to perform control such that which channel is set for the highest power corresponding to the state of an encryption key, and the receiving apparatus is capable of determining the encryption key from the relationship between the channel number and reception power. Further, as described above, since, for example, a delay profile is set as a propagation parameter, it is understood that more pieces of secure information can be transmitted by using, for example, the delay profile for the encryption key information and further using the first data for the relationship between the channel and reception power (or, it may be possible to use the information and data in the inverse way, or use only the encryption key information or only the second data).

Further, it is possible to set data stored in either data supplying section 1501 or 1502 as a reference signal. In this way, the receiving apparatus is capable of performing propagation estimation using a reference signal at the same time as that of the first data and second data, and thus has a feature of enabling transmission that is remarkably high in efficiency.

The operation of the receiving apparatus will be described below.

A method of providing/receiving the encryption key information using the propagation parameter (delay profile) can be performed in the same way as described above except the despreading processing. A case is only described herein that the information is superimposed on the relationship between the multiplexed channels and reception power.

Receiving section 1401 receives an RF signal input from antenna 101, and outputs a received signal. Despreading section 1402 calculates the convolution of the received signal with spreading codes predetermined for each channel, and outputs a number of despread signals the same as the number of channels. Propagation estimating section 1405 receives the despread signals, and estimates the propagation state. It is assumed herein to use the reception power among propagation states. When propagation estimating section 1405 outputs reception power for each channel, comparing section 1406 compares the reception power with one another, and outputs the result as the encryption key information (or first data).

Using thus determined encryption key, decoding section 1404 decodes subsequent demodulated information, and obtains security data.

In this way, according to the communication apparatus and communication system of Embodiment 7, in addition to the effects of Embodiment 1, comparing section 1406 is capable of providing a result of comparison of propagation parameter such as reception power of each channel signal in the multiplexed received signal, and it is thereby possible to increase the information amount in the case of transmitting a multiplexed signal. Further, according to the communication apparatus and communication system of Embodiment 7, in the case of multiplexing a plurality of channels, performing propagation estimation for each channel enables controlling the reception power at the receiving end. For example, it is possible to perform control such that which channel is set for the highest power corresponding to the state of an encryption key, and the receiving apparatus is capable of determining an encryption key using the relationship between the channel number and reception power, whereby it is possible to maintain the security of data of a plurality of channels. Furthermore, according to the communication apparatus and communication system of Embodiment 7, it is possible that the encryption key is included in a propagation parameter such as a delay profile in the first data, and is set as the second data different from the first data using the relationship between the channel and reception power, thus enabling transmission of more pieces of secure information.

In addition, in Embodiment 7 CDMA is described as an example, it is naturally apparent using OFDM obtains the same effectiveness. In the case of OFDM, in the above descriptions, channels are replaced with subcarriers, the despreading processing in FIG. 14 is replaced with Fourier transform processing, and the spreading processing in FIG. 15 is replaced with the inverse Fourier transform processing.

Embodiment 8

Figure 16:
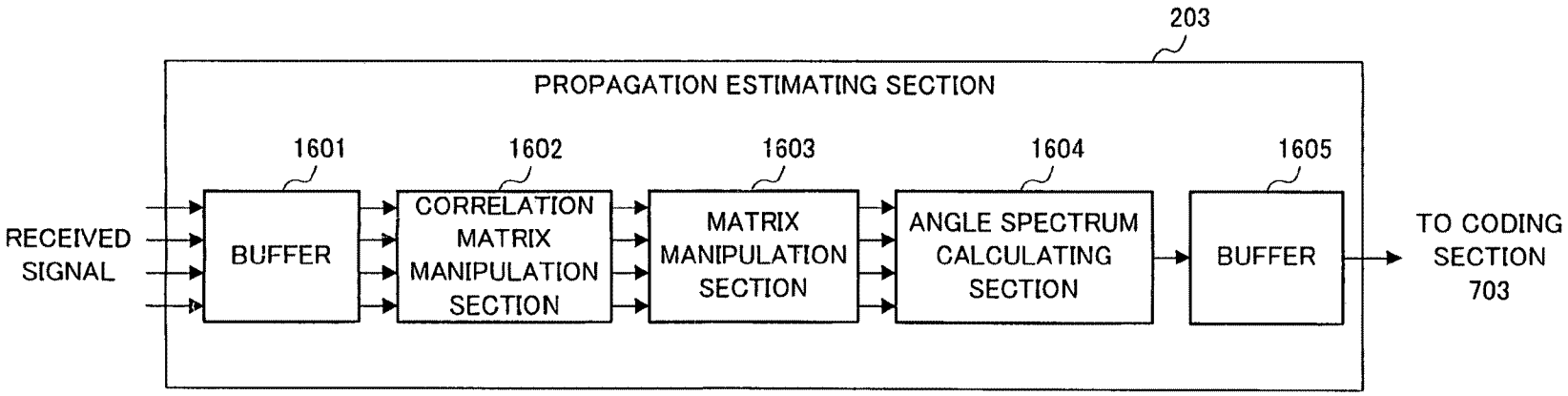
FIG. 16 is a block diagram illustrating a configuration of a propagation estimating section in a communication apparatus according to Embodiment 8 of the present invention.

FIG. 16 is a block diagram illustrating a configuration of part of a communication apparatus according to Embodiment 8. In addition, a configuration of the entire communication apparatus is the same as that in FIG. 1, and descriptions thereof are omitted.

Embodiment 8 describes a scheme using information of the direction of arrival as the propagation information. FIG. 16 illustrates a specific block diagram of propagation estimating section 203 in FIG. 7 in performing estimation of direction of arrival.

Propagation estimating section 203 has buffer 1601, correlation matrix manipulation section 1602, matrix manipulation section 1603, angle spectrum calculating section 1604 and buffer 1605.

Buffer 1601 temporarily holds an input signal. Correlation matrix manipulation section 1602 obtains a correlation matrix of the input signal. Matrix manipulation section 1603 receives the calculated correlation matrix, outputs a characteristic vector obtained in matrix manipulation (herein, characteristic vector). Angle spectrum calculating section 1604 receives the characteristic vector, calculates the angle spectrum, and outputs the information of direction-of-arrival estimation. Buffer 1605 temporarily holds the calculation result.

The aforementioned configuration uses MUSIC method knows as a method of estimating the direction of arrival. In addition to the method, there are known Fourier method and CAME method, which are sorted according to the content of manipulation in matrix manipulation section 1603.

The operation of propagation estimating section 203 performing the direction of arrival estimation as the propagation information in the aforementioned configuration will be described specifically below.

Figure 17:
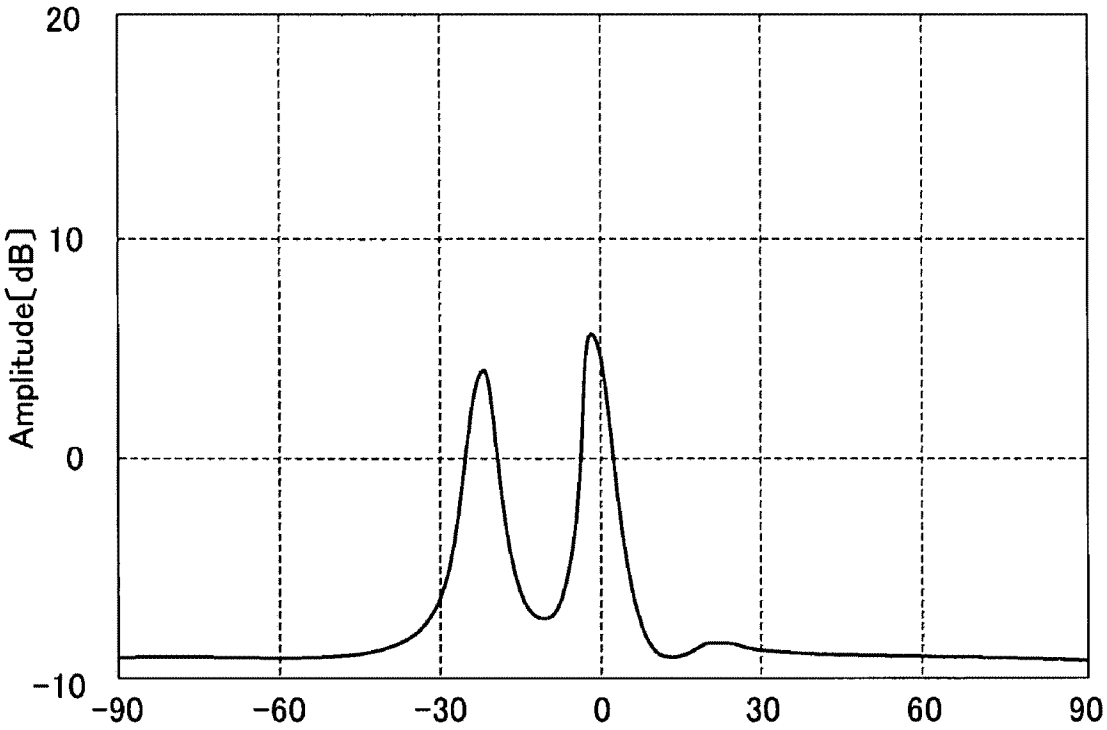
FIG. 17 is a graph for explaining the direction of arrival estimation result.

Buffer 1601 holds received signals input from a plurality of antenna elements. Correlation matrix manipulation section 1602 obtains correlation matrixes of the held received signals, and calculates the characteristic vectors. Angle spectrum calculating section 1604 calculates arrival pattern information of received signal from the characteristic vectors to output. Buffer 1605 holds thus obtained arrival pattern information of received signal. FIG. 17 illustrates an example of thus obtained information of the direction-of-arrival of received signal. FIG. 17 shows a result of estimation of a case where two directions of arrival of received signal exist.

Procedures as shown in FIG. 11 are explained using thus obtained arrival pattern information of received signal. In addition, the operation in Embodiment 8 different from the operation in Embodiment 5 is only described.

(1) Base Station: Transmission of First Reference Signal

The base station transmits a first reference signal for propagation estimation to the terminal. At this time, the base station performs beam steering using a plurality of antenna elements, and transmits the signal while varying a radiation pattern.

In the terminal, upon detecting the reference signal transmitted from the base station, propagation estimating section 203 performs the direction-of-arrival estimation, and stores in a reference table data of comparison of the radiation direction that the base station controls and the arrival pattern information of received signal in the terminal. The aforementioned operation generates the reference table of the radiation pattern and the reception arrival pattern in the base station and terminal.

(2) Terminal: Transmission of Second Reference Signal

The terminal selects the encryption key (first key), and outputs the direction-of-arrival information corresponding to the key from the codebook. Using the direction-of-arrival information, the terminal detects the most similar radiation pattern stored in the reference table, and sets the arrival pattern information corresponding to the most similar one as a radiation pattern in transmission. Then, the terminal transmits the second reference signal for propagation estimation in the base station while controlling so as to obtain the set radiation pattern.

In the base station, propagation estimating section 203 performs the direction-of-arrival estimation, and outputs the reception arrival pattern. Coding section 703 selects an encryption key (second key) from the reception arrival pattern and codebook to output to decoding section 207 via buffer 206.

(3) Base Station: Transmission of Encrypted Signal

Using the reception arrival pattern obtained in (2), the base station sets a radiation pattern such that the reception state in the terminal is excellent. Then, the base station encrypts the security data using the second key, and transmits the encrypted signal while controlling so as to obtain the set radiation pattern.

The terminal demodulates the RF signal in reception demodulation section 708, decodes the demodulated signal using the first key in decoding section 207, and outputs the security data.

(4) Terminal: Transmission of Encrypted Signal

Using the reception arrival pattern obtained in (1), the terminal sets a radiation pattern such that the reception state in the base station is excellent. Then, the terminal encrypts the security data using the first key, and transmits the encrypted signal while controlling so as to obtain the set radiation pattern.

The base station demodulates the RF signal in reception demodulation section 708, decodes the demodulated signal using the second key in decoding section 207, and outputs the security data.

Thus, according to the communication apparatus and communication system of Embodiment 8, in addition to the effects of Embodiment 1, angle spectrum calculating section 1604 uses a result of the direction-of-arrival estimation of received signal as an estimation value of propagation environment, the reception arrival pattern arriving at the third party greatly changes, and it is thereby possible to ensure extremely high security.

In addition, in Embodiment 8 the encryption key information is generated using the reception arrival pattern. However, the present invention is not limited to such a case, and has a feature of expecting higher security in a combination with a scheme using the delay profile as the propagation information. Further, in Embodiment 8 it may be possible to superimpose information on the direction of arrival of received signal, or to multiplex communications on the direction of arrival. Further, as in other Embodiments, the communication procedures are not limited to those described in this Embodiment.

Embodiment 9

Embodiment 9 describes a security communication scheme using polarization.

Figure 18:
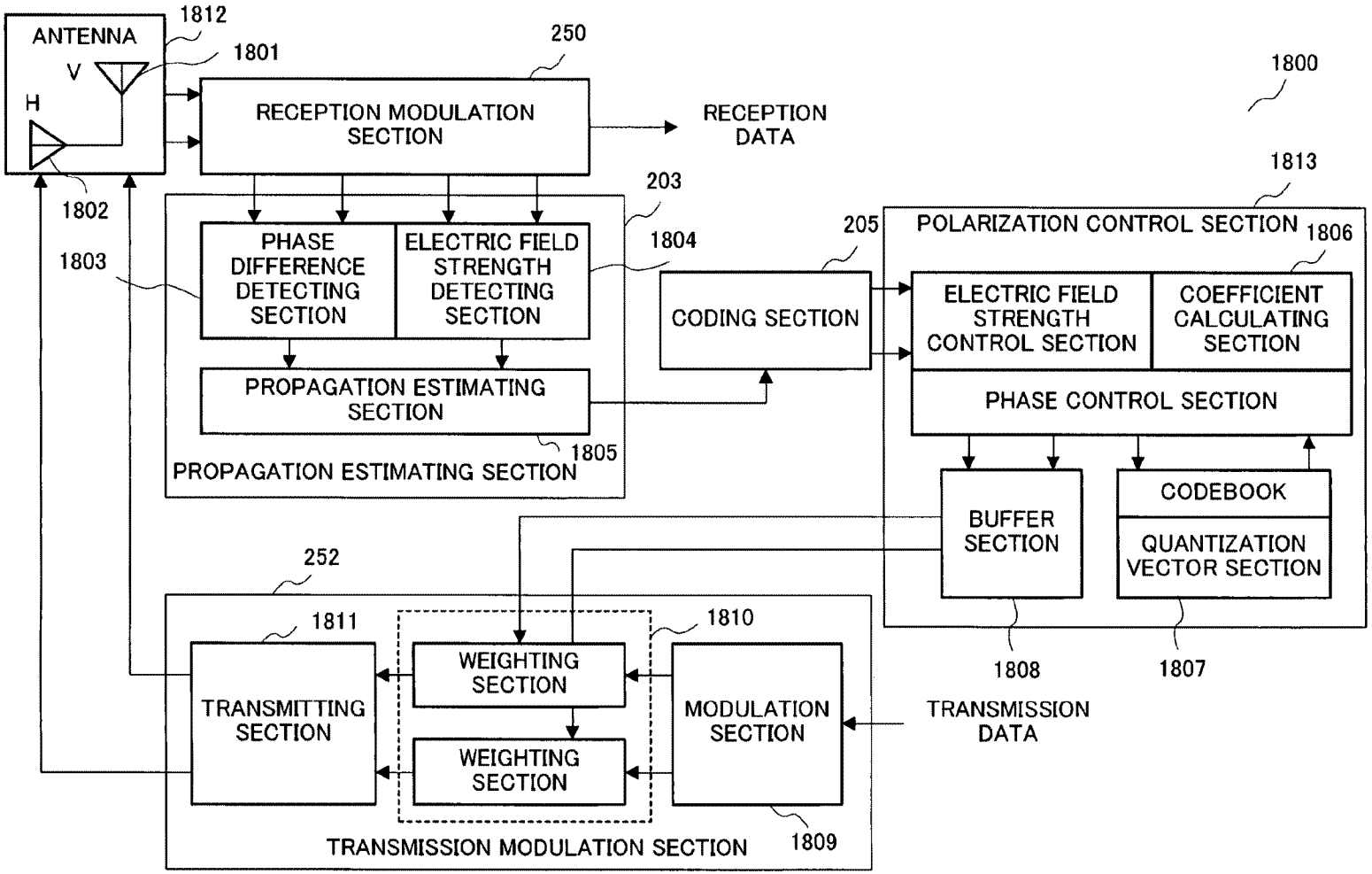
FIG. 18 is a block diagram illustrating a configuration of a communication apparatus according to Embodiment 9 of the present invention.

FIG. 18 is a diagram illustrating a configuration of transmitting/receiving apparatus 1800 that is a communication apparatus according to Embodiment 9. In addition, in FIG. 18 the same sections as in FIG. 2 are assigned the same reference numerals as in FIG. 2, and descriptions thereof are omitted.

Antenna 1812 has vertical polarization antenna 1801 and horizontal polarization antenna 1802. Propagation estimating section 203 has phase difference detecting section 1803, electric field strength detecting section 1804 and propagation estimating section 1805. Polarization control section 1813 has coefficient calculating section 1806, codebook 1807 and buffer section 1808. Transmission modulation section 252 has modulation section 1809, weighting section 1810 and transmitting section 1811.

Vertical polarization antenna 1801 receives a vertically polarized component. Horizontal polarization antenna 1802 receives a horizontally polarized component. Phase difference detecting section 1803 detects a phase difference from the polarized received signals. Electric field strength detecting section 1804 detects respective electric field strengths from the vertically polarized received signal and horizontally polarized received signal. Polarization estimating section 1805 estimates a polarization state from the phase difference and electric field strengths. Coefficient calculating section 1806 receives the propagation information and polarization code indicated in the codebook, performs control of a phase difference and electric field strengths between/of the vertically polarized transmission signal and horizontally polarized transmission signal, and calculates coefficients to perform polarization control of transmission signal. Codebook 1807 stores the relationship between the coefficient and polarization code. Buffer section 1808 temporarily holds the data input from coefficient calculating section 1806 to output to weighting section 1810.

Modulation section 1809 receives the communication information, modulates the information with a predetermined modulation scheme, and outputs a modulated signal.

Weighting section 1810 multiplies the modulated signal by a weighting coefficient corresponding to each antenna element, and outputs weighted modulated signals.

Transmitting section 1811 receives the weighted modulated signals corresponding to the antenna elements, and converts the signals to respective RF signals corresponding to the antenna elements to output.

The operation of transmitting/receiving apparatus 1800 will be described below.

Vertical polarization antenna 1801 and horizontal polarization antenna 1802 select respective polarized components of received signal selectively, and output respective RF signals to reception demodulation section 250. Reception modulation section 250 outputs received signals corresponding to respective polarized components to propagation estimating section 203. In propagation estimating section 203, polarization estimating section 1805 receives the reception phase difference information and reception electric field strength information respectively output from phase difference detecting section 1803 and electric field strength detecting section 1804, and outputs the polarization information of received signal.

Figure 19:
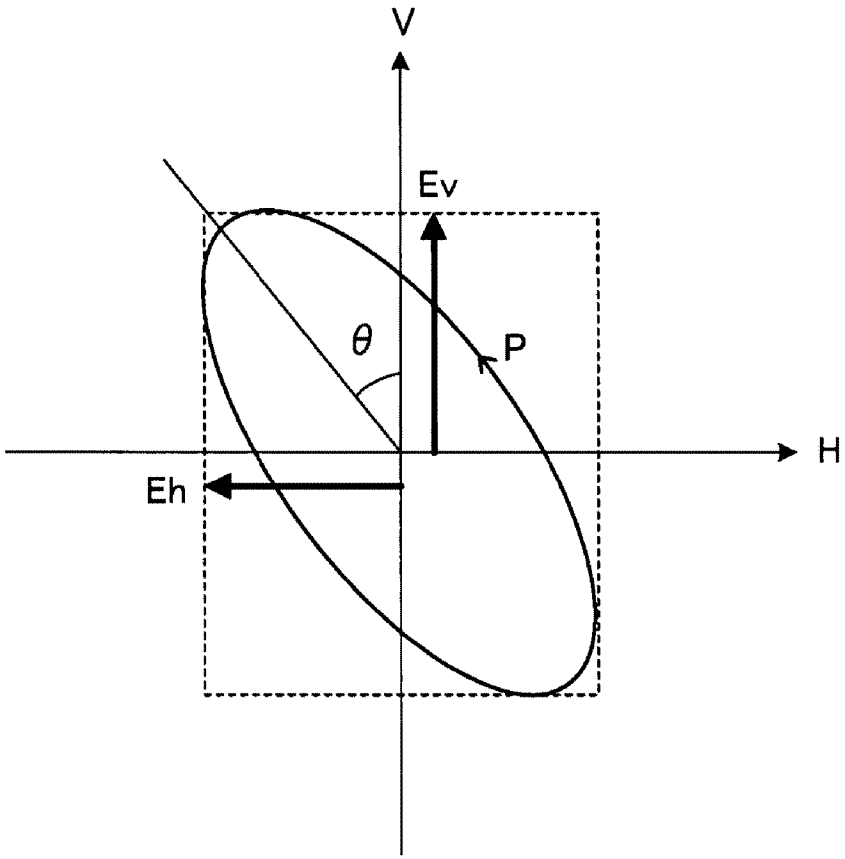
FIG. 19 is a view for explaining the polarization of signal.

FIG. 19 shows a specific example of polarization. Ev indicates an electric field strength of vertically polarized wave, Eh indicates an electric field strength of horizontally polarized wave, p indicates a circulating direction, and θ indicates an angle of the major axis.

Coding section 205 codes thus obtained polarization information into polarization code to select an encryption key. The polarization code is input to polarization control section 1813. In polarization control section 1813, coefficient calculating section 1806 retrieves the polarization state corresponding to the polarization code from codebook 1807, calculates transmission weighting coefficients while performing the phase control and electric field strength control, and holds the weighting coefficients in buffer section 1808. Using the transmission weighting coefficients held in buffer section 1808, transmission modulation section 252 performs weighting on the vertically polarized transmission signal and horizontally polarized transmission signal, and the RF signals are transmitted from corresponding antenna elements.

Operating as described above enables information such as vertically polarized wave, horizontally polarized wave, angle of the major axis, phase between polarized components, and circulating direction to be used as an encryption key.

Among propagation states, the polarization wave has a feature of being separated only by antennas.

In addition, it is assumed that codebook 1807 stores quantization vectors corresponding to polarization states (such as polarization plane and circulating direction). Communication procedures are almost the same as in other Embodiments. Detection of delay profile or propagation control is replaced with polarization information or polarization control, respectively.

Thus, according to the communication apparatus and communication system of Embodiment 9, in addition to the effects of Embodiment 1, polarization estimating section 1805 estimates the polarization state from the electric field strengths and phase difference to obtain an estimation value of propagation environment, and the polarized waves are only separated by antennas. Therefore, even if another receiving apparatus intercepts the radio signal, the apparatus needs corresponding antennas, and high security is thus expected.

In addition, in Embodiment 9, it may possible to use information together with such as the delay profile, reception power and the direction of arrival.

Embodiment 10

In addition to the methods as described in Embodiments 1 to 9, a method will be described of making the interception by third party impossible using a method of controlling the communication state in a reception terminal and superimposing the information on the controlled state.

Embodiment 5 describes enabling the propagation state on the receiving side to be controlled arbitrarily. Using this method enables physically confidential communications, which is explained briefly.

Embodiment 5 indicates the case that the propagation state can be controlled using weighting coefficients of transmission signal, which is equivalent to conveying an arbitrary reception state to the receiving side, i.e, which means that communications can be carried out through propagation parameters.

In other words, it is suggested that communications can be carried out through propagation parameters, by substituting the information for the content (encryption key in the figure) in the codebook as illustrated in FIG. 5.

The communication using this method uses, as a base, propagation environments formed between communicating parties as described above, and therefore has a feature of having high confidentiality in principle over apparatuses different in physical position. Further, using propagation parameters specifies a propagation path, i.e., a place of the communicating party, and is applicable to specification and authentication of a communicating party.

This method is applicable irrespective of conventionally used modulation schemes (such as ASM, FSK, PSK and QAM), and expects sheer increases in data capacity.

Further, this method has a feature of being applicable irrespective of multiplexing methods (such as TDMA, FDMA, CDMA and OFDM). The method enables the multiplexing using the spatial orthogonality. In other words, combining the multiplexing method using the spatial orthogonality and the above-mentioned multiplexing method expects the effectiveness of increasing the conventional channel capacity greatly.

It is apparent that when an apparatus does not require particularly the processing of encryption and decoding as described in either Embodiment, such functions are not essential to the apparatus, and the apparatus operates without such functions.

Further, when it is not necessary to transmit the encryption key information in procedures as described in either Embodiment, increases in communication quality are expected by performing the propagation control to be optimal in communications (for example, by removing the multipath component, or setting the reception power at a maximum value).

Furthermore, also at the time of reception, by performing the control (as in the foregoing) such that a received signal is optimal using the reception weighting coefficients, increases in communication quality are also expected.

A configuration of the receiving apparatus in Embodiment 10 will be described with reference to FIG. 20.

Figure 20:
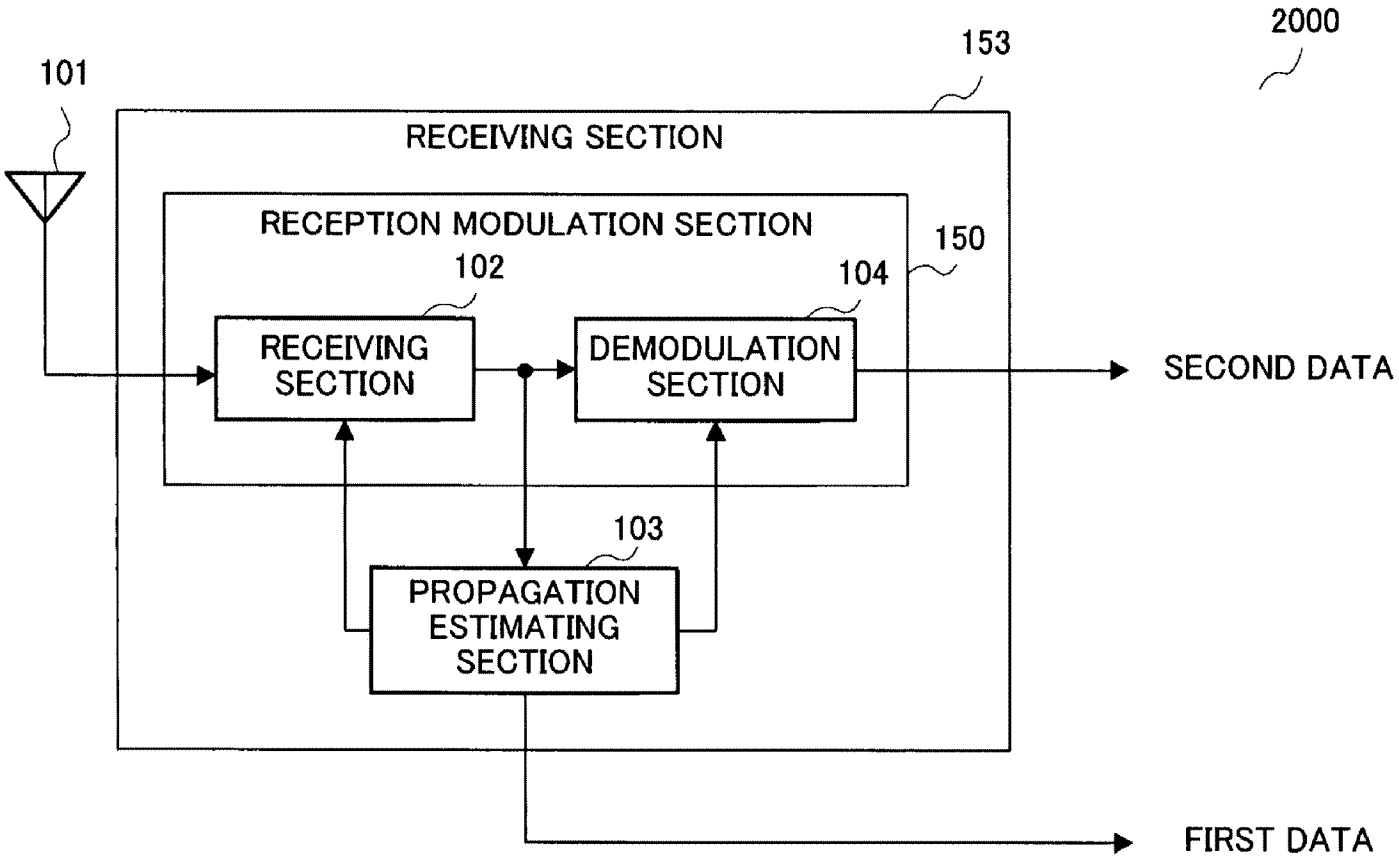
FIG. 20 is a block diagram illustrating a configuration of a communication apparatus according to Embodiment 10 of the present invention.

FIG. 20 illustrates a configuration of receiving apparatus 2000 that is the communication apparatus according to Embodiment 10. In addition, the same sections as those in FIG. 1 are assigned the same reference numerals in FIG. 1, and descriptions thereof are omitted.

Propagation estimating section 103 estimates the propagation characteristic from the received signal input from receiving section 102, and outputs the estimated propagation information as data. The propagation information output from propagation estimating section 103 is information of whether or not to discard the data output from demodulation section 104.

In the case of the receiving apparatus that outputs the propagation characteristic as the communication information, the configuration as illustrated in FIG. 20 enables its implementation, and a transmitting section is not required necessarily. By configuring as described above, it is possible to use the propagation information as the first data that is information with high confidentiality. In this case, it is considered that a transmitting apparatus superimposes important information on the first data, and further, it is possible to use to specify a terminal that transmits a communication signal using the first data.

Thus, according to the communication apparatus and communication system of Embodiment 10, in addition to the effects of Embodiment 1, since propagation estimating section 103 uses the estimated propagation information as data, it is possible to increase the information amount to transmit, improve the transmission efficiency, and transmit the information with high confidentiality as the propagation information, thus enabling reliable security to be ensured. Further, according to the communication apparatus and communication system of Embodiment 10, it is possible to transmit information with low confidentiality using the conventional communication scheme, thereby enabling a communication apparatus with versatility to be provided.

Embodiment 11

Figure 21:
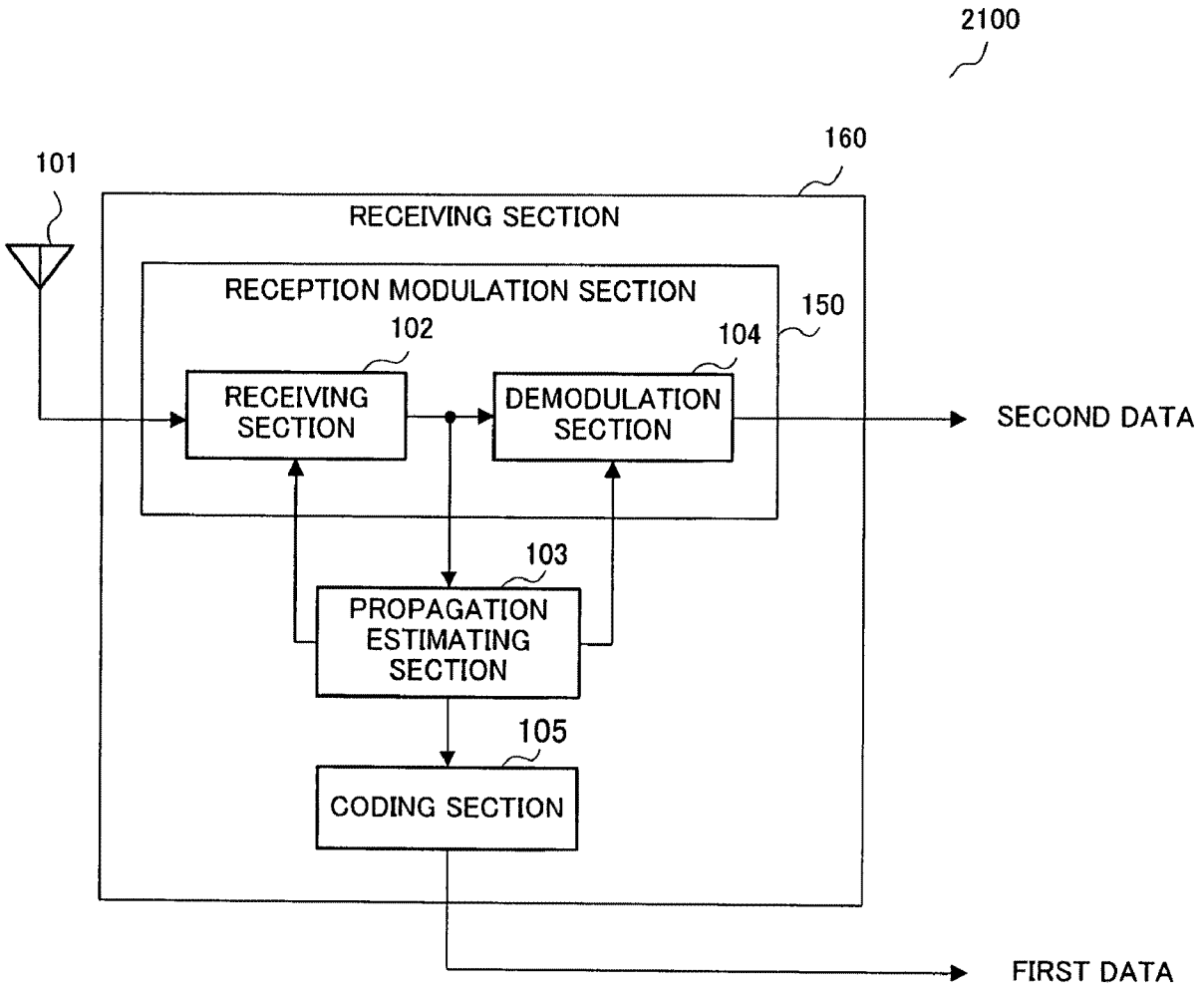
FIG. 21 is a block diagram illustrating a configuration of a communication apparatus according to Embodiment 11 of the present invention.

FIG. 21 is a diagram illustrating a configuration of receiving apparatus 2100 that is a communication apparatus according to Embodiment 11. In addition, the same sections as in FIG. 1 are assigned the same reference numerals as in FIG. 1, and descriptions thereof are omitted.

Coding section 105 encodes the estimated propagation information input from propagation estimating section 103 as the first data. As a technique of coding the estimated propagation information, it is possible to code the information, for example, using a vector quantization method, and to output as the transmission information. In this way, such a feature is provided that coded data can be output with simplicity and with stability on inputs of various parameters.

Thus, according to the communication apparatus and communication system of Embodiment 11, in addition to the effects of Embodiments 1 and 10, since coding section 105 encodes the propagation information to extract as data, increases in communication quality are expected.

Embodiment 12

Figure 22:
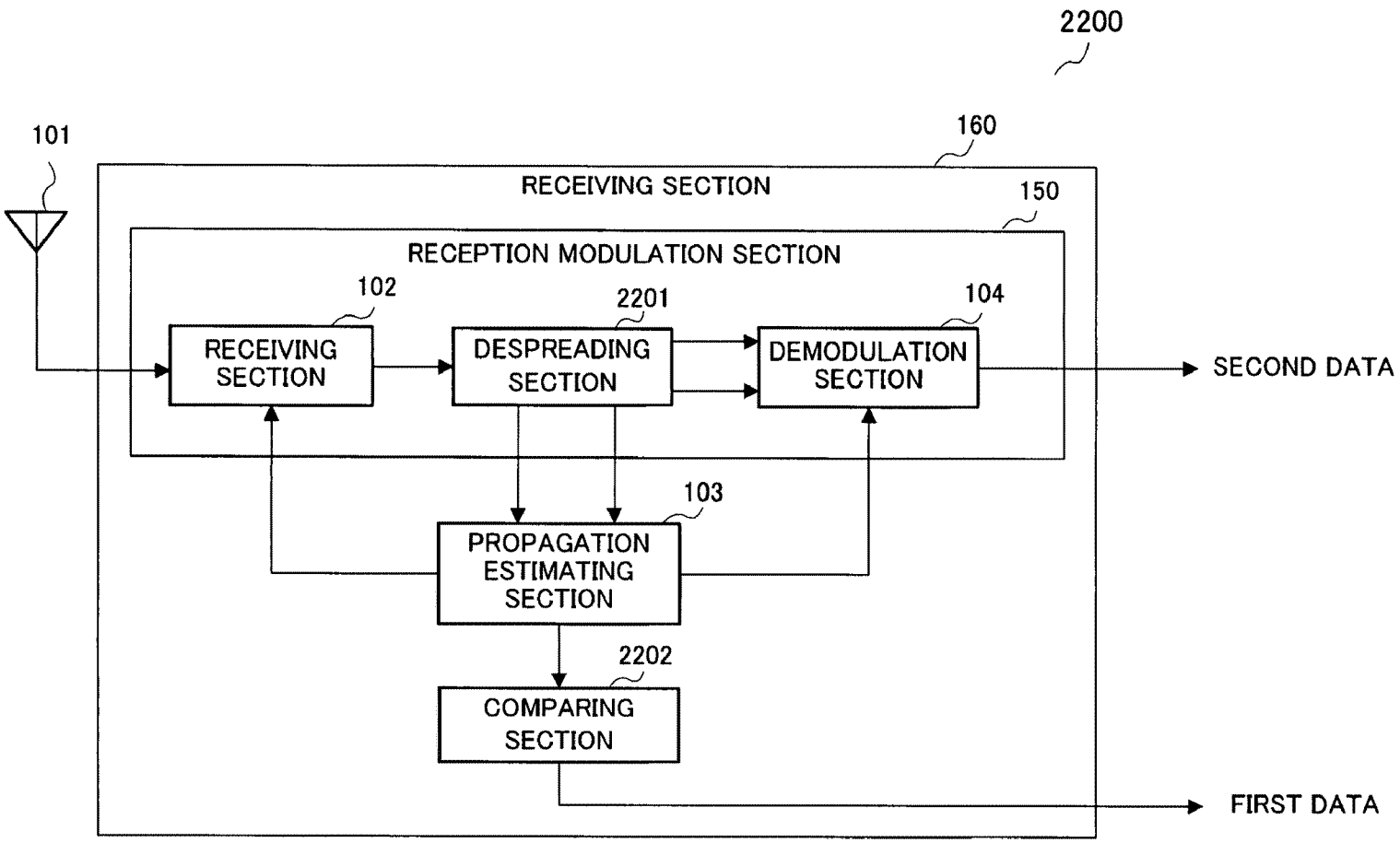
FIG. 22 is a block diagram illustrating a configuration of a communication apparatus according to Embodiment 12 of the present invention.

FIG. 22 is a diagram illustrating a configuration of receiving apparatus 2200 that is a communication apparatus according to Embodiment 12. In addition, the same sections as in FIG. 22 are assigned the same reference numerals as in FIG. 22, and descriptions thereof are omitted.

Despreading section 2201 calculates the convolution of a received signal and a spreading code associated with the channel, and outputs a despread signal.

Comparing section 2202 encodes the propagation information for each channel, compares coded propagation information of each channel with one another, and outputs a result of comparison as the first data.

Thus, according to the communication apparatus and communication system of Embodiment 12, in addition to the effects of Embodiment 1, comparing section 2202 compares data of a plurality of channels with one another, and obtains the first data from a result of comparison, resulting in features that the confidentiality is enhanced and that more items of data can be transmitted.

In addition, in Embodiment 12, a despreading section is provided to obtain the data using a CDMA signal. The present invention is not limited to the foregoing, and it may be possible to obtain data by receiving a signal subjected to orthogonal frequency division multiplexing and comparing each of signals assigned to subcarriers with one another. Further, the communication apparatus of Embodiment 12 is applicable to a case of performing communications using MIMO (Multi-Input Multi-Output) signals.

Embodiment 13

Figure 23:
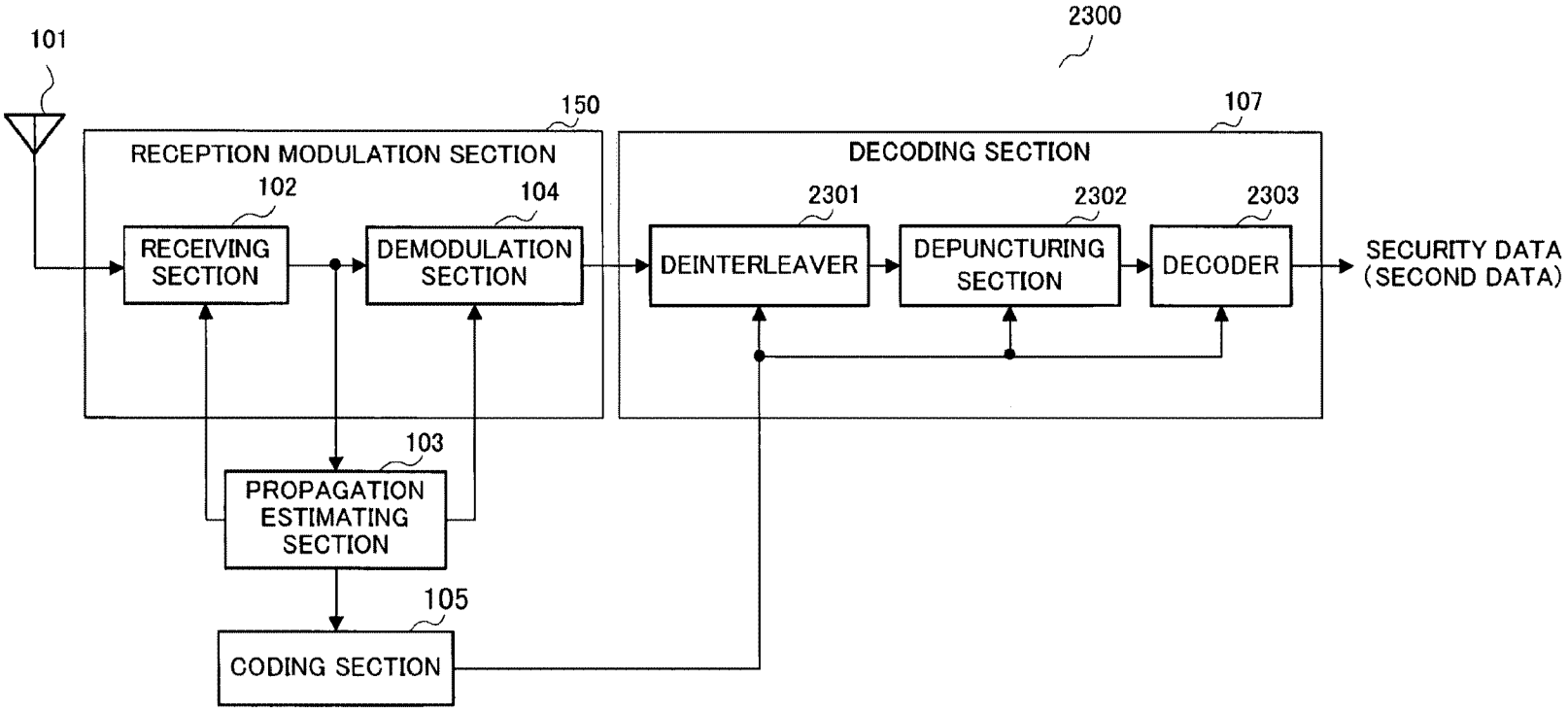
FIG. 23 is a block diagram illustrating a configuration of a communication apparatus according to Embodiment 13 of the present invention.
Figure 24:
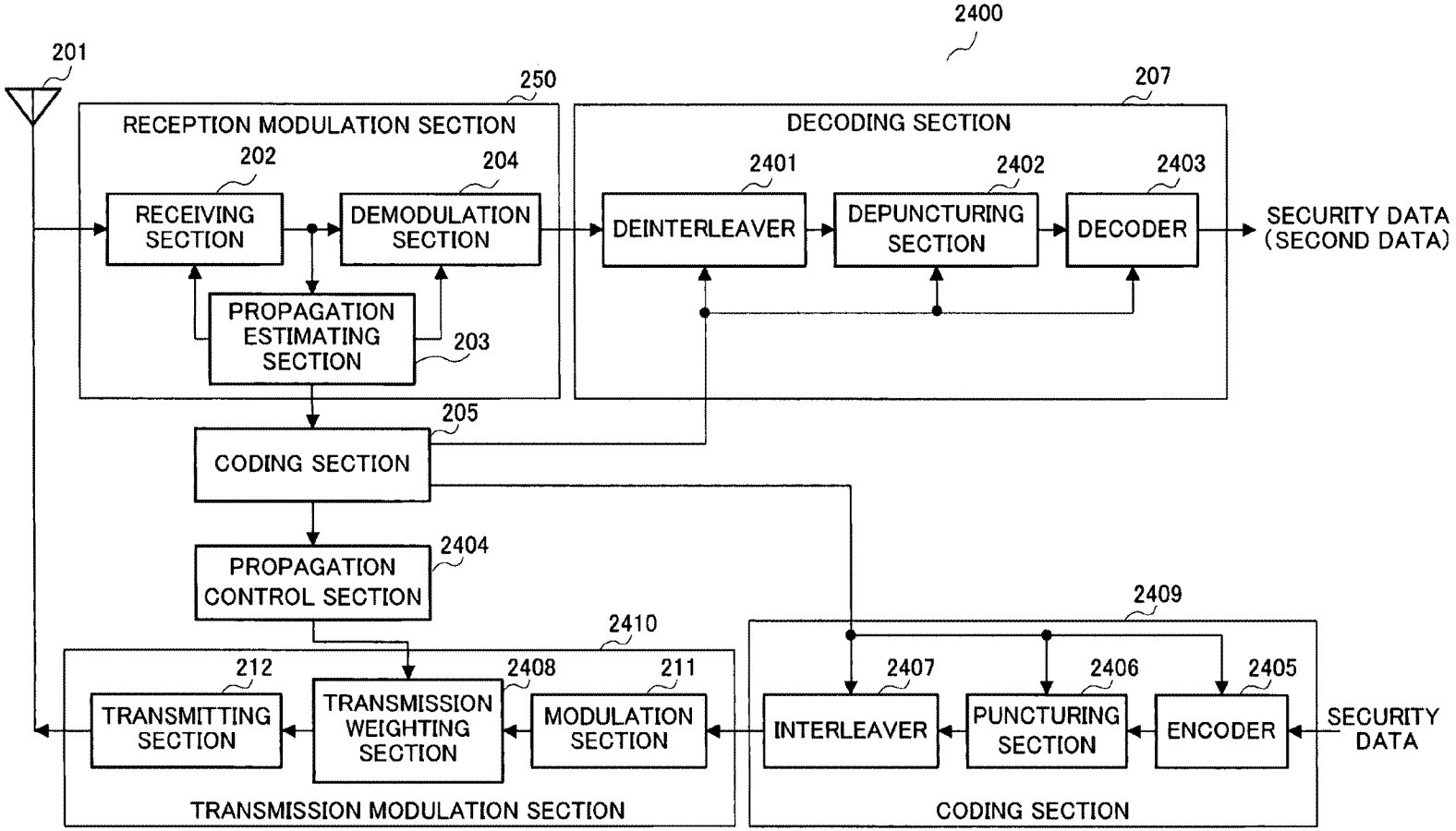
FIG. 24 is a block diagram illustrating another configuration of a communication apparatus according to Embodiment 13 of the present invention.

In Embodiment 13, FIG. 23 is a diagram illustrating receiving apparatus 2300, and FIG. 24 is a diagram illustrating transmitting/receiving apparatus 2400. In addition, the same sections as those of receiving apparatus 100 or transmitting/receiving apparatus 200 in FIG. 2 are assigned the same reference numerals as in FIG. 1 or 2, and descriptions thereof are omitted.

Receiving apparatus 2300 will be described first.

Reception demodulation section 150 receives a received RF signal, and outputs the estimated propagation information and demodulated signal. Coding section 105 receives the propagation information to extract its characteristic, and outputs propagation characteristic code (first data). Decoding section 107 receives the code indicating the characteristic of the propagation information and demodulated signal, performs deinterleaving using an interleaving pattern associated with the propagation characteristic code, adds null information (depuncturing), decodes the signal, outputs security data (second data), and has deinterleaver 2301 that receives the demodulated signal and performs deinterleaving based on the interleaving pattern associated with the propagation characteristic code, depuncturing section 2302 which receives the deinterleaved signal, and adds neutral information (in judging a code in the decoder disposed subsequently) to a signal of a portion removed based on the puncturing pattern associated with the propagation characteristic code, and decoder 2303 which receives the depuncutured signal, and decodes the signal corresponding to the convolutional code associated with the propagation characteristic signal.

Transmitting/receiving apparatus 2400 will be described below.

Reception demodulation section 250 receives a received RF signal, and outputs the propagation information indicative of the estimated propagation state and demodulated information. Decoding section 207 receives the code indicating the characteristic of the propagation information and demodulated signal, performs deinterleaving using an interleaving pattern associated with the propagation characteristic code, adds null information (depuncturing), decodes the signal, outputs data, and has deinterleaver 2401 that receives the demodulated signal and performs deinterleaving based on the interleaving pattern associated with the propagation characteristic code, depuncturing section 2402 which receives the deinterleaved signal, and adds neutral information (in judging a code in the decoder disposed subsequently) to a signal of a portion removed based on the puncturing pattern associated with the propagation characteristic code, and decoder 2403 which receives the depunctured signal, and decodes the signal corresponding to the convolutional code associated with the propagation characteristic signal. Coding section 205 receives the propagation information to extract its characteristic, and outputs a propagation characteristic code (first data). Propagation control section 2404 outputs transmission weighting coefficients to control the propagation state to be brought close to the input propagation characteristic code. Coding section 2409 receives the data, encodes the data, outputs the coded information subjected to puncturing and interleaving, and has encoder 2405 that receives the data and outputs a convolutional code, puncturing section 2406 that receives the convolutional code and outputs a punctured code where part of the code is removed, and interleaver 2407 which rearranges the punctured code in a predetermined order to output coded information. Transmission modulation section 2410 receives the coded information, modulates the information, performs the propagation control, outputs an RF signal to transmit, and has modulation section 211 which receives the coded information, performs predetermined modulation on the information, and outputs a modulated signal, transmission weighing section 2408 which receives the modulated signal, and performs propagation control by multiplying the signal by each of the weighting coefficients, and transmitting section 212 which receives transmission weighted signals, and outputs RF signals to transmit.

Figure 25:
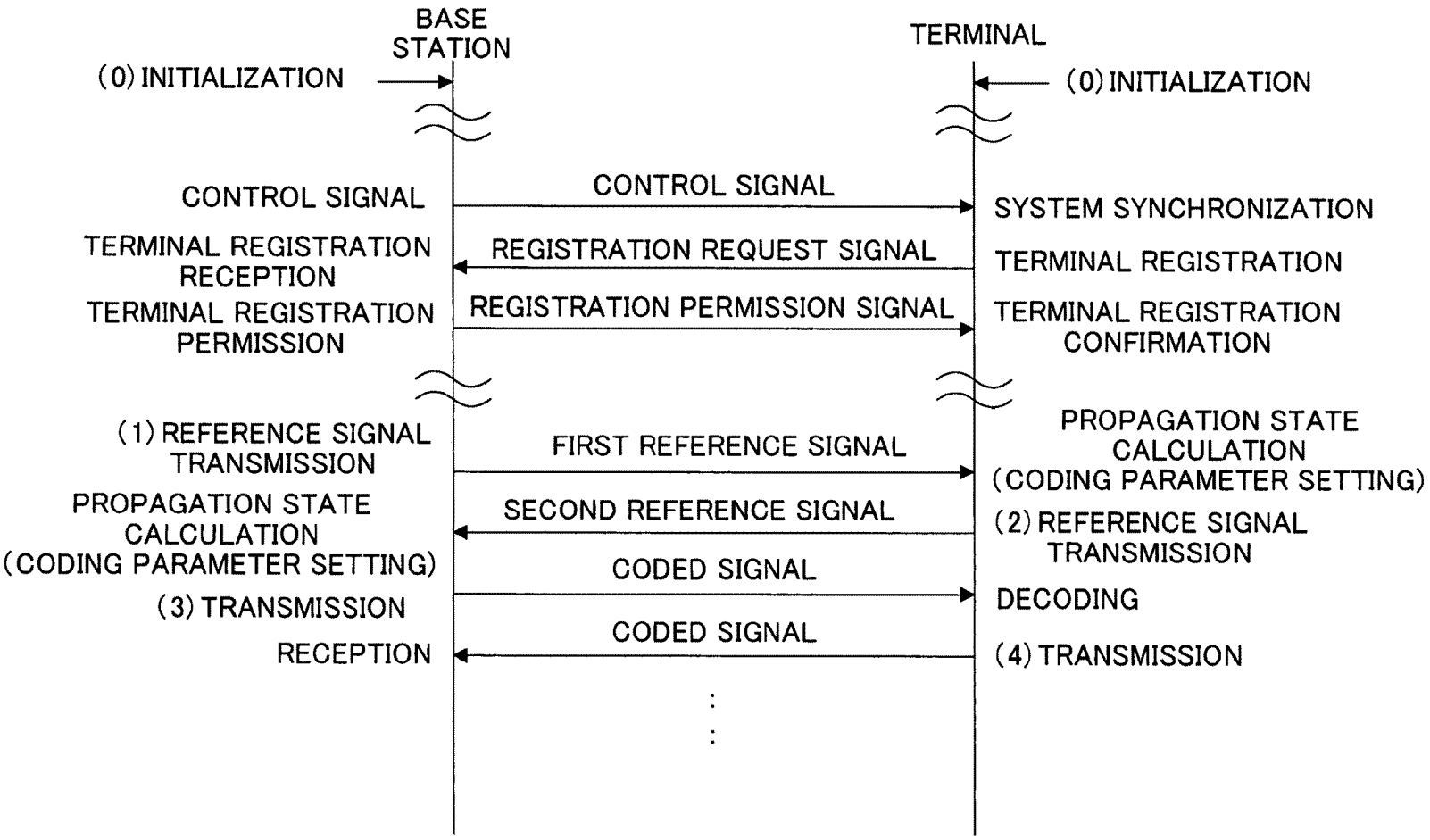
FIG. 25 is a sequence diagram illustrating the operation of the communication apparatus according to Embodiment 13 of the present invention.

The operation of transmitting/receiving apparatus 2400 will be described with reference to FIG. 25. The descriptions are given assuming that transmitting/receiving apparatus 2400 is a base station or terminal in FIG. 25. In addition, in Embodiment 13, the terminal is not limited to the configuration of transmitting/receiving apparatus 2400, and may have the configuration of receiving apparatus 2300.

In the operation of transmitting/receiving apparatus 2400 of Embodiment 13, sections that have the same operations as in FIG. 3 will not be further explained.

Interleaving patterns, puncturing patterns and encoding pattern associated with propagation states re prepared in advance, and the base station and terminal share the information.

The terminal estimates the propagation state, using a reference signal transmitted from the base station, and sets various patterns based on the estimated state. Similarly, the base station estimates the propagation state, using a reference signal transmitted from the terminal, and sets various patterns based on the estimated state. At this point, among set interleaving patterns, puncturing patterns and encoding patterns, the same patters are selected in the base station and terminal, as described earlier.

As in the foregoing, when encoding patterns are set for the base station and terminal, the base station and terminal start communications. In the base station, encoder 2405 performs convolutional coding on the information based on the encoding pattern. Puncturing section 2406 performs puncturing on the resultant. Interleaver 2407 performs interleaving on the resultant. Thus obtained coded information is provided to transmission modulation section 2410. Propagation control section 2404 receives the propagation characteristic code output from coding section 205, and outputs transmission weighting coefficients. Transmitting section 212 outputs RF signals to transmit. The calculation of transmission weighting coefficients is the same as in described in Embodiment 3.

In the terminal having received the signal from the base station, reception demodulation section 250 receives the signal, performs the propagation estimation, demodulates the signal, and outputs the propagation information and demodulated signal. Based on the input propagation characteristic code, decoding section 207 selects the interleaving pattern, puncturing pattern, and encoding pattern. Decoding section 207 receives the propagation characteristic code and demodulated signal. Deinterleaver 2401 performs deinterleaving corresponding to the inverse pattern of interleaving, and outputs a deinterleaved signal. Depuncturing section 2402 receives the deinterleaved signal, and outputs a depunctured signal where a null signal (of a neutral value in judgment in the decoder disposed subsequently) is inserted (depancturing) to a portion corresponding to the puncturing pattern. Decoder 2403 decodes the depunctured signal based on the input encoding pattern, and outputs data.

The transmitting side and receiving side share various encoding patterns as described above, and it is understood that data transmitted from the base station is provided to the terminal properly.

(0) is the Same Operation in FIG. 3.

(1) Base station: Transmission of First Reference Signal

The base station outputs a reference signal for propagation estimation performed in the terminal as a first reference signal. In the terminal awaiting the signal from the base station, propagation estimating section 203 detects the first reference signal from the received signal, and performs the propagation estimation from the received signal and the reference signal that is a known signal. Coding section 205 receives the propagation information from propagation estimating section 203, extracts a characteristic of the propagation state, and outputs the propagation characteristic code. Deinterleaver 2401, depuncturing section 2402 and decoder 2403 respectively have a table of interleaving pattern, table of puncturing pattern and a table of encoding pattern, where each table is associated with the propagation characteristic code, and select patterns (encoding patterns) corresponding to the input propagation characteristic code.

(2) Terminal: Transmission of Second Reference Signal

The terminal transmits a reference signal for propagation estimation performed in the base station as a second reference signal as in (1).

Upon receiving the signal from the terminal, the base station detects the second reference signal, and propagation estimating section 203 performs propagation estimation from the received signal and the reference signal that is a known signal. As in (1), coding section 205 converts the propagation information output from propagation estimating section 203 into a propagation characteristic code, and decoding section 207 selects an encoding pattern corresponding to the propagation characteristic code.

(3) Base station: Transmission of Coded Signal

In the base station, coding section 2409 outputs coded information obtained by performing encoding, puncturing and interleaving on the data using coding parameters obtained in item (2). The coded information is output to transmission modulation section 2410, and the RF signal is transmitted as a coded signal via modulation section 211, transmission weighting section 2408, and transmitting section 212.

In the terminal, upon receiving the coded signal, reception demodulation section 250 demodulates the RF signal into the demodulated signal via receiving section 202 and demodulation section 204. Decoding section 207 performs deinterleaving, depuncturing, and decoding in this order using the demodulated signal and coding parameter obtained in (1), and outputs the data.

(4) Terminal: Transmission of Coded Signal

In the terminal, coding section 2409 outputs the coded information obtained by performing encoding, puncturing and interleaving on the data using coding parameters obtained in item (1). The coded information is output to transmission modulation section 2410, and the RF signal is transmitted as a coded signal via modulation section 211, transmission weighting section 2408, and transmitting section 212.

In the base station, upon receiving the coded signal, reception demodulation section 250 demodulates the RF signal into the demodulated signal via receiving section 202 and demodulation section 204. Decoding section 207 performs deinterleaving, depuncturing, and decoding in this order using the demodulated signal and coding parameter obtained in (2), and outputs the data. Communicating as described above enables data to be provided and received.

Thus, according to the communication apparatus and communication system of Embodiment 13, in addition to the effects of Embodiment 1, coding section 205 encodes control information such as interleaving pattern and puncturing pattern from the estimation value of the propagation environment to obtain, and decodes the data using the obtained control information, whereby the optimal code (decoding) is made possible corresponding to the propagation state, and increases in communication quality are expected. Further, according to the communication apparatus and communication system of Embodiment 13, the conventional need is eliminated of providing and receiving the coding parameter by handshake in communication, and therefore, significant features are provided that enable a quick response to the propagation environment, as well as increased efficiency.

In addition, in Embodiment 13, methods are described that communications are carried out by varying a coding parameter corresponding to the propagation state, and that the propagation control is carried out at the time of transmission. However, the present invention is not limited to such methods, and as described in other Embodiments, the methods are not inevitable, and an arbitrary method may be used of transmitting signals without performing the propagation control. Further, while Embodiment 13 describes using convolutional code as a coding scheme, the present invention is not limited to such a coding scheme, and an arbitrary coding scheme is applicable such as block coding.

Moreover, Embodiment 13 describes the case of varying encoding pattern, puncturing pattern, and interleaving pattern as coding parameters corresponding to the propagation state. However, the present invention is not limited to such a case, and part of encoding pattern, puncturing pattern, and/or interleaving pattern may be fixed to use. It is thereby possible to simplify configurations of the coding section and decoding section. In this case, it is important to select a pattern effective in increasing the communication quality. For example, the puncturing pattern is one of important parameters that affect the data capacity and error rate greatly, and changes in the puncturing pattern are often the most effective. Further, it is apparent in Embodiment 13 that procedures of (1) and (2) or procedures (3) and (4) in FIG. 25 can be in changed in its order.

The coded signal is provided and received after providing and receiving a reference signal. However, for example, it may be possible to dispose a reference signal and coded signal on the same format, and perform decoding (or coding) after the coding parameter is selected. Thus associating the data with a reference signal for coding parameter estimation has a feature of enabling fine selection of coding parameter.

Further, the method is described above of varying an optimal coding parameter corresponding to the propagation parameter. However, it is apparent that the modulation scheme (such as QPSK and 16QAM) or a spreading code length in CDMA can be varied as well as the coding parameter. In this way, advantages are obtained of providing communications with the same flexibility as in using the coding parameter and with higher efficiency.

Embodiment 14

The above-mentioned Embodiments describe primarily data communications using the propagation state, where accuracy in estimating the propagation state is required. Generally, the accuracy in estimation is proportional to the data amount used in calculation, and the increased data amount decreases the efficiency. Further, a result of propagation estimation is affected by auto-correlation of a reference signal used in the propagation estimation. The means for solving the aforementioned issues will be described below with reference to FIG. 26.

Figure 26:
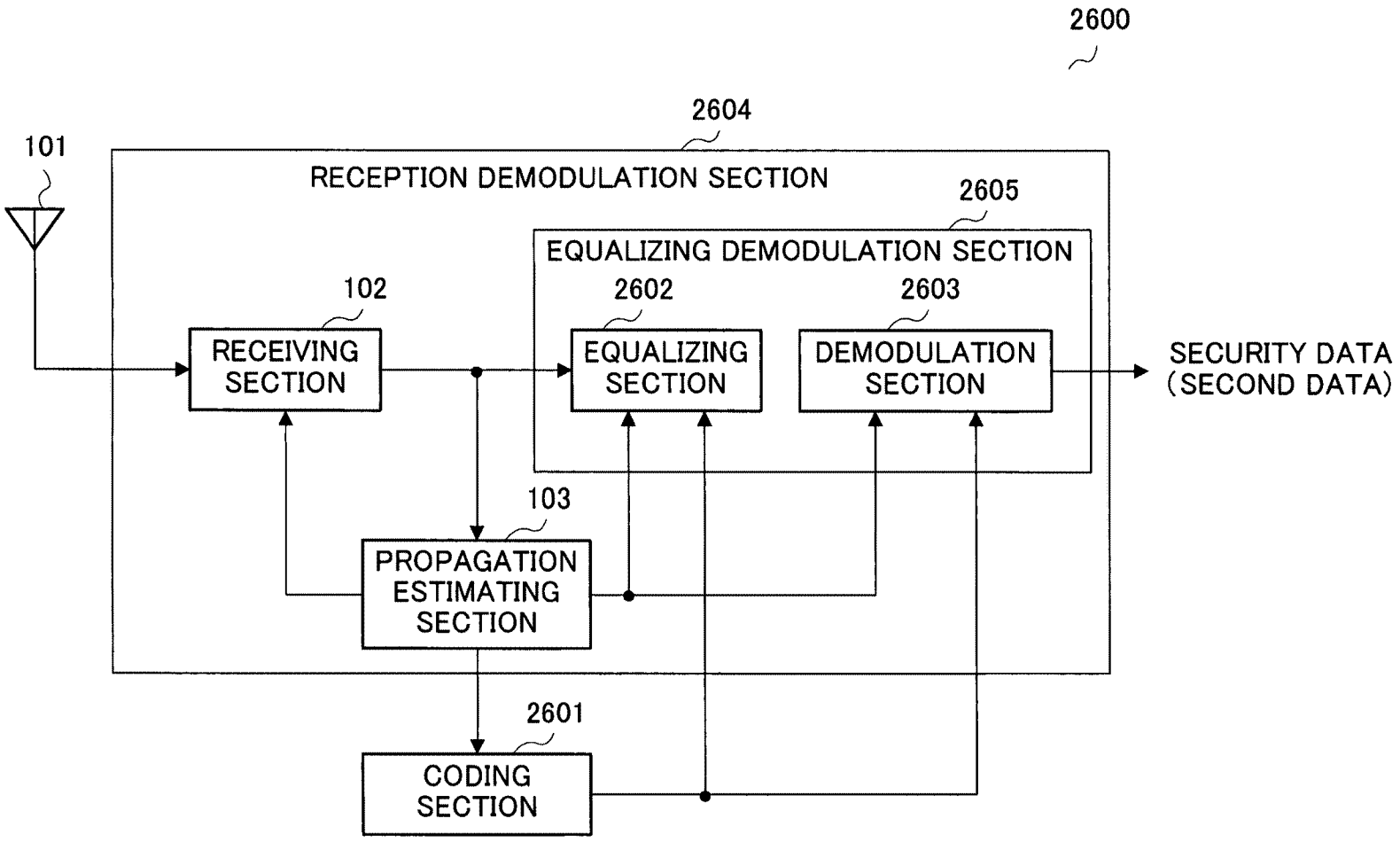
FIG. 26 is a block diagram illustrating a configuration of a communication apparatus according to Embodiment 14 of the present invention.
Figure 27:
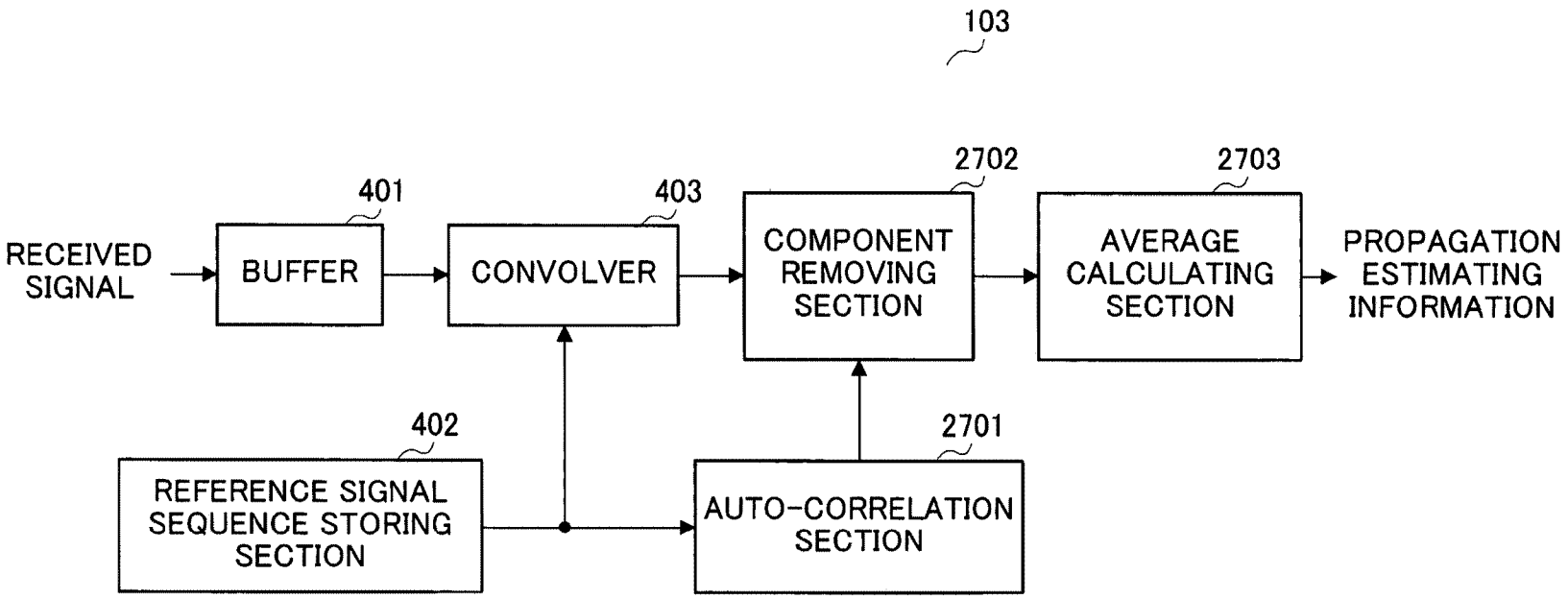
FIG. 27 is a block diagram illustrating a configuration of a propagation estimating section in the communication apparatus according to Embodiment 14 of the present invention.

FIG. 26 is a diagram illustrating a configuration of receiving apparatus 2600, and FIG. 27 is a diagram illustrating a configuration of propagation estimating section 103. In addition, the same sections as in FIG. 1 or 4 are assigned the same reference numerals as in FIG. 1 or 4, and descriptions thereof are omitted.

Receiving apparatus 2600 will be described first.

Reception demodulation section 2604 has receiving section 102, propagation estimating section 103, equalizing section 2602 and demodulation section 2603.

Equalizing demodulation section 2605 has equalizing section 2602 and demodulation section 2603.

Coding section 2601 extracts a characteristic from input propagation information, and outputs a propagation characteristic code (first data).

Equalizing section 2602 receives the estimated propagation information and the propagation characteristic code indicative of the characteristic, and outputs an equalized signal obtained by removing unnecessary components from the received signal.

Demodulation section 2603 receives the equalized signal to demodulate, and outputs a result of demodulation as demodulated information (second data).

Propagation estimating section 103 will be described next.

Auto-correlation section 2701 receives a reference signal sequence, and outputs the auto-correlation function of the sequence. Component removing section 2702 receives a first delay profile and the auto-correlation function, and outputs a second delay profile obtained by removing the auto-correlation function component from the first delay profile. Average calculating section 2703 receives the delay profile, and averages estimation results for a predetermined period.

The operation of receiving apparatus 2600 will be described below.

The basic operation is the same as in FIG. 1, and only differences are explained. Receiving section 102 receives an RF signal to output a received signal. Propagation estimating section 103 estimates the propagation state from the received signal. The information is input to receiving section 102, equalizing demodulation section 2605, and coding section 2601. Coding section 2601 extracts a characteristic from the input propagation information, and outputs a propagation characteristic code to equalizing demodulation section 2605. Equalizing section 2602 receives the estimated propagation information and the propagation characteristic code indicative of a characteristic of information, and outputs an equalized signal obtained by removing an unnecessary component from the received signal. Demodulation section 2603 demodulates the equalized signal from the propagation information and propagation characteristic code using suitable demodulation means, and outputs demodulated information.

In this way, the propagation information and propagation characteristic code is input to equalizing demodulation section 2605, and is used in equalizing or demodulation, and it is thereby possible to perform effective equalizing and demodulation using the information and code, thus resulting in a feature that increases in communication quality are expected.

In particular, when equalizing section 2602 that removes an unnecessary component (for example, multipath component) from the received signal is provided with a table of tap coefficient corresponding to the propagation characteristic code, and performs equalizing using the tap coefficient corresponding to the code, a significant feature is provided of reducing the calculation amount greatly. Then, performing equalizing on a difference between the propagation characteristic code and propagation information simplifies a configuration of the equalizing section.

The operation of propagation estimating section 103 will be described below.

In the section 103, the input received signal is temporarily held, and convolver 403 calculates the correlation value of the received signal and reference signal sequence, and outputs a first delay profile. Auto-correlation section 2701 calculates the auto-correlation of the reference signal sequence to output.

The delay profile is calculated by the following equation:

$$Ds(t)=\Sigma(Sr(t+n)R\cdot(n)) \tag{20}$$

Ds is an estimated delay profile, Sr is a received signal, and R is a reference signal sequence. The received signal is expressed using transmission signal St and propagation distortion Pd:

$$Sr(t) = \sum (St(t-n) \cdot Pd(n)) = St(t) * Pd(t) \quad (21)$$

(where '*' indicates the convolution)

Further, since transmission signal St is the reference signal:

$$Ds(t) = \sum ((St(t+n) * Pd(t+n)) \cdot R(-n)) = (R(t) * Pd(t)) * R(t) = R(t) * Pd(t) * R(t) \quad (22)$$

Using the following equation:

$$AR(t)=R(t)*R(t) \quad (23)$$

equation (22) is transformed:

$$Ds(t)=AR(t)*Pd(t) \quad (24)$$

Figure 28:
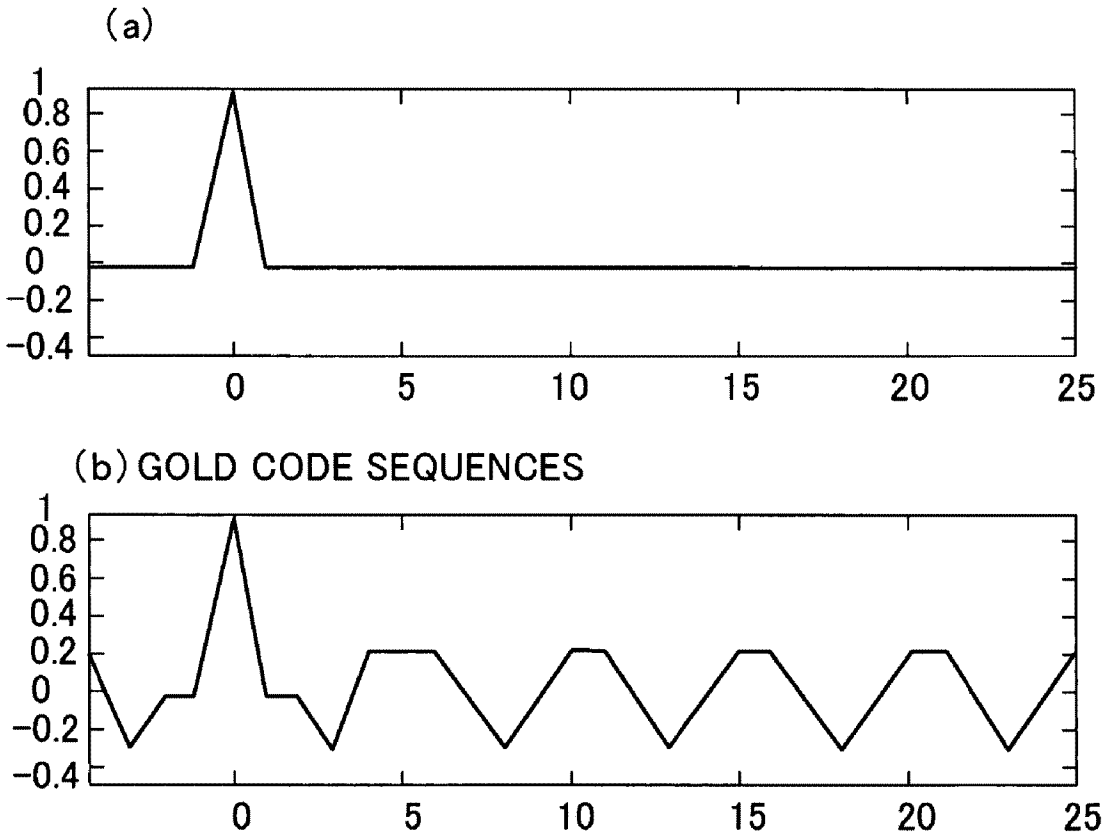
FIGS. 28(a) and 28(b) are views illustrating auto-correction sequences.
Figure 29:
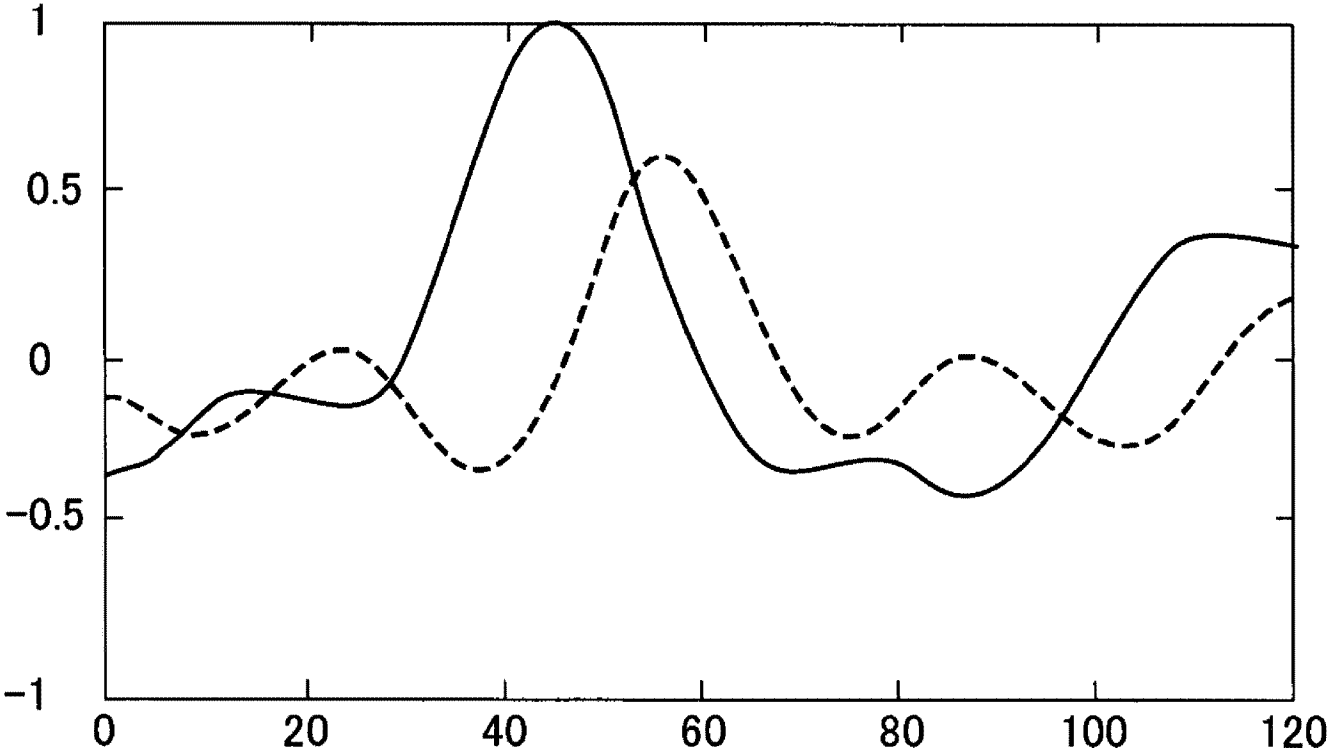
FIG. 29 is a graph illustrating a delay profile.

As an example, a case is considered of using maximal-length sequences (M sequences) as a reference signal. Codes of M sequences are 2^n−1 when t=0 (0≤t<2^n−1) in auto-correlation function AR(t) of equation (23), while being −1 except t=0 (FIG. 28(a)). It is thereby possible to regard the auto-correlation function as impulse, and to neglect it as frequency characteristics. Under some condition, the propagation characteristic (delay profile) as shown in FIG. 6 is obtained, and the frequency characteristic is assumed to be synthesized from the propagation characteristic and characteristic of the filter in the system. Meanwhile, in the case of using Gold sequences that is a kind of synthesis code for a reference signal sequence, as distinct from M sequences, Gold sequences are not constant when t≠0 in auto-correlation function AR(t) (FIG. 28(b)). Such an auto-correlation function is not impulse, and affects delay profile Ds(t) as a frequency characteristic. FIG. 29 shows estimation results in the case of using Gold sequences as the reference signal sequence. It is understood from the figure that the waveforms are affected by the auto-correlation function and differs from those in FIG. 6.

In this way, as indicated by equation (20), since the delay profile obtained herein includes the auto-correlation function of the reference signal sequence, and the function affects the characteristic of the reference signal sequence. Component removing section 2702 performs calculation for removing a component of auto-correlation function (AR(t)) calculated in auto-correlation section 2701 from the first delay profile. Specifically, it is known that the removal can be carried out by setting the impulse train given by the auto-correlation function as tap coefficients of IIR filter.

Further, average calculating section 2703 averages results (second delay profile) of a plurality of calculations, and it is thereby possible to suppress errors caused by distortion and/or noise.

Thus, according to the communication apparatus and communication system of Embodiment 14, in addition to the effects of Embodiment 1, since equalizing section 2602 performs equalizing on the security data and then demodulates the data, it is possible to obtain the security data with high quality. Further, according to the communication apparatus and communication system of Embodiment 14, since component removing section 2702 removes the frequency component of the reference signal, it is possible to obtain an estimation value of the propagation environment with high accuracy which is not affected by the frequency component of the reference signal.

In addition, in Embodiment 14, it is possible to incorporate propagation estimating section 103 as illustrated in FIG. 26 and reception demodulation section 2604 independently into a receiving apparatus, and it is apparent that the sections are applicable to apparatuses described in other Embodiments. In particular, implementing the section together provides significant effectiveness.

Embodiment 15

Figure 30:
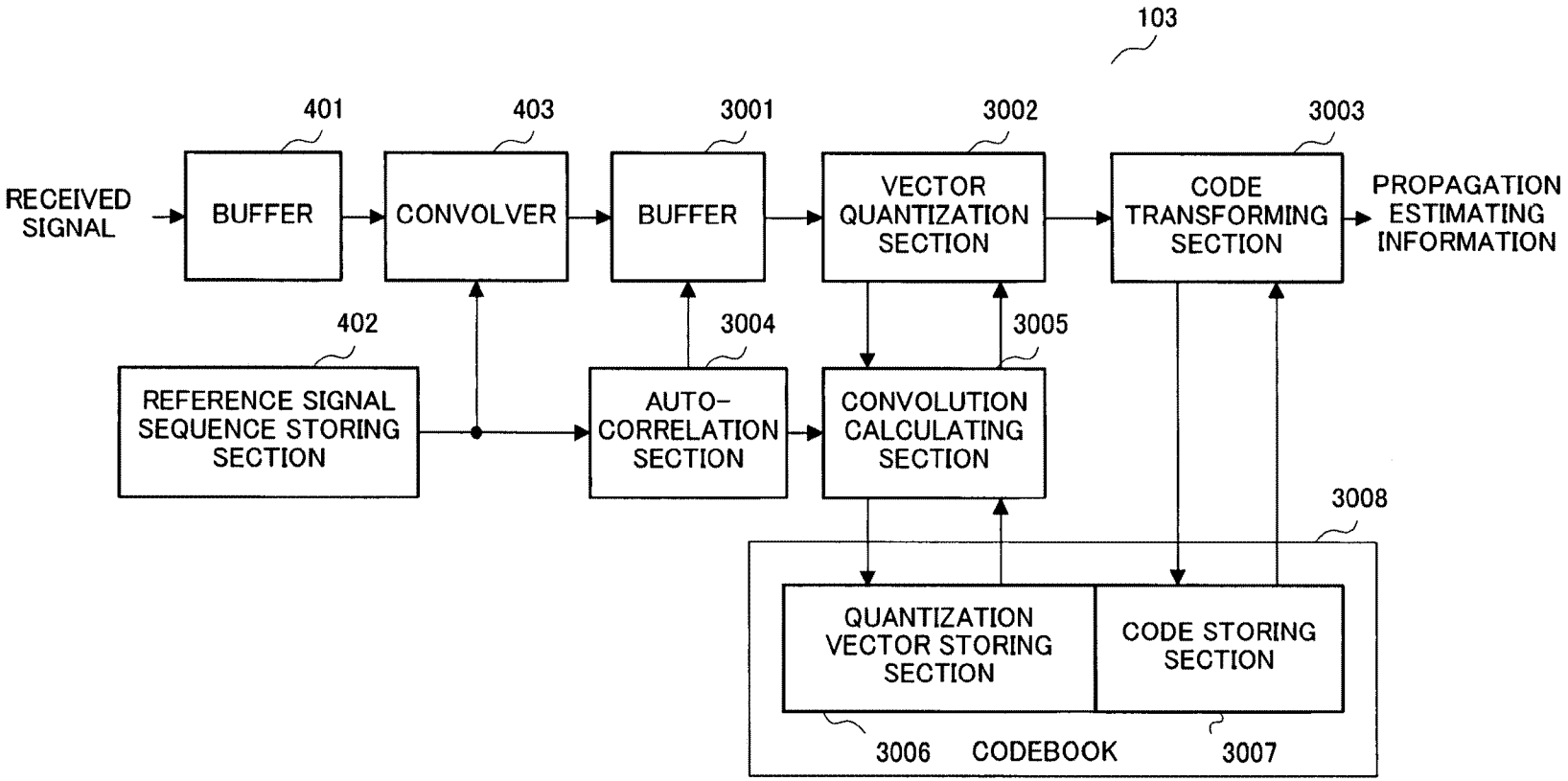
FIG. 30 is a block diagram illustrating a configuration of a propagation estimating section in a communication apparatus according to Embodiment 15 of the present invention.

FIG. 30 is a diagram illustrating a configuration of propagation estimating section 103 according to the communication apparatus of Embodiment 15. The communication apparatus using propagation estimating section 103 has the same configuration as in FIG. 1, and descriptions thereof are omitted.

Buffer 3001 temporarily stores the delay profile. Vector quantization section 302 compares the stored delay profile with the content of codebook 3008, and outputs the most similar code. Code transforming section 3003 receives the vector quantized code, and obtains a code corresponding to the code from code storing section 3007 in codebook 3008. Auto-correlation section 3004 receives a reference signal sequence and outputs the auto-correlation function. Convolution calculating section 3005 calculates the convolution of the auto-correlation function and the content of quantization vector in codebook 3008. Codebook 3008 stores quantization vectors to be compared in vector quantization and codes corresponding to the quantization vectors, and has a configuration as illustrated in FIG. 5. Codebook 3008 is comprised of quantization vector storing section 3006 and code storing section 3007, and configurations of the section 3006 and 3007 are the same as those in other Embodiments.

The operation of propagation estimating section 103 will be described below.

Buffer 401 temporarily stores a received signal. Convolver 403 receives the received signal sequence and reference signal sequence output from reference signal sequence storing section 402, and performs sliding correlation calculation of the reference signal sequence and received signal sequence to obtain delay profiles. Buffer 401 temporarily stores the delay profiles to output to vector quantization section 3002. Meanwhile, auto-correlation section 3004 calculates the auto-correlation of the reference signal sequence output from reference signal sequence storing section 402, and outputs the value to convolution calculating section 3005. Vector quantization section 3002 calculates a metric amount of the input delay profile and each vector in quantization vector storing section 3006 in codebook 3008, and selects a vector that minimizes the amount, while performing metric calculation using the vector of which the convolution with the auto-correlation function is calculated by auto-correlation section 3004. Vector quantization section 3002 outputs thus selected vector code. Code transforming section 3003 selects a code corresponding to the vector code output from vector quantization section 3002, from code storing section 3007 in codebook 3008, and outputs the propagation estimation information.

Thus, according to the communication apparatus and communication system of Embodiment 15, in addition to the effects of Embodiment 1, since convolution calculating 3005 calculates the convolution of the auto-correlation function and the quantization vector in vector quantization, it is possible to obtain impulse response characteristics with high accuracy. Further, according to the communication apparatus and communication system of Embodiment 15, there is provided the effectiveness of obtaining the propagation estimation information with high accuracy. Furthermore, according to the communication apparatus and communication system of Embodiment 15, the auto-correlation function of a reference signal sequence undergoes the convolution with a vector in quantization vector storing section 3006, which is equivalent to giving a component of auto-correlation function AR (n) to a vector to search. Therefore, it is possible to perform a search without being affected by AR(n) in Ds(t) given by equation (20), and to set quantization vectors that are not affected by the auto-correlation function of the reference signal sequence. Moreover, according to the communication apparatus and communication system of Embodiment 15, since a component of the auto-correlation function is added to the quantization vector, it is only required to calculate the convolution for the auto-correlation function, and there is a significant feature of enabling implementation with ease.

Embodiment 16

Figure 31:
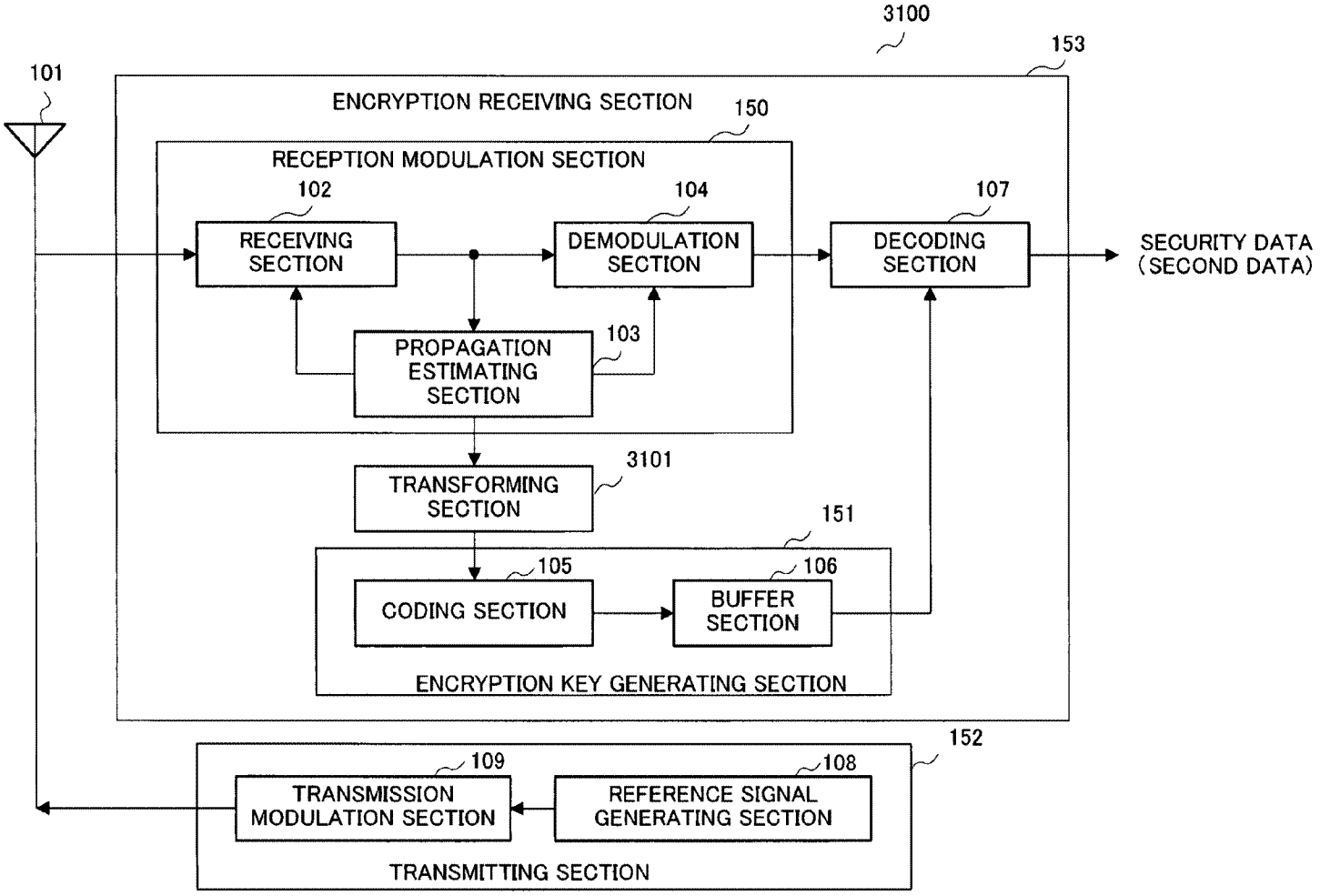
FIG. 31 is a block diagram illustrating a configuration of a communication apparatus according to Embodiment 16 of the present invention.
Figure 32:
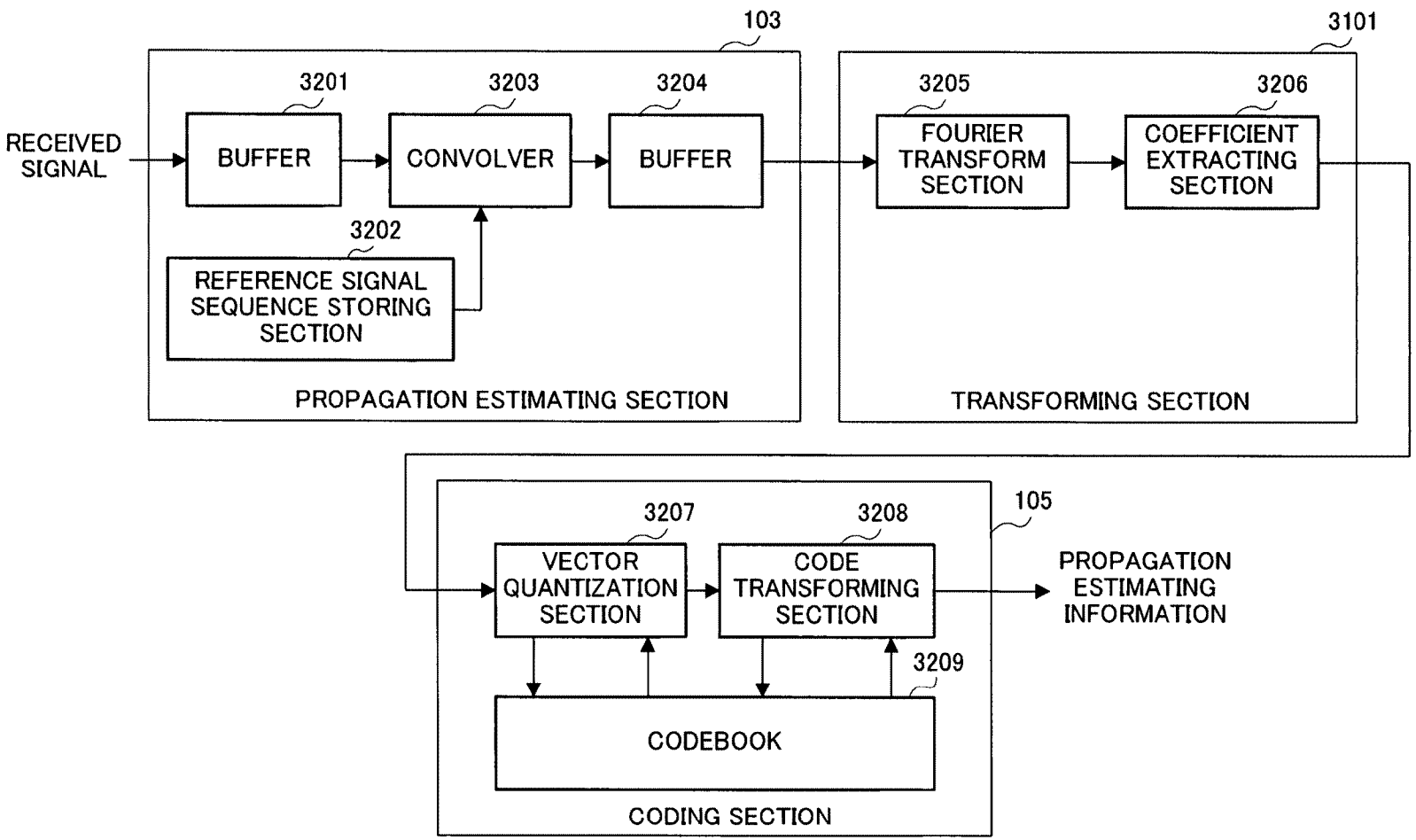
FIG. 32 is a block diagram illustrating configurations of a propagation estimating section, converting section and coding section in the communication apparatus according to Embodiment 16 of the present invention.

FIG. 31 is a diagram illustrating a configuration of receiving apparatus 3100 according to Embodiment 16. FIG. 32 is a diagram illustrating propagation estimating section 103, transforming section 3101 and coding section 105. In addition, the same sections as in FIG. 1 are assigned the same reference numerals as in FIG. 1, and descriptions thereof are omitted.

Transforming section 3101 performs Fourier transform on the delay profile, and selects primary coefficients from among coefficients obtained by Fourier transform to output.

Configurations of propagation estimating section 103, transforming section 3101 and coding section 105 will be described below with reference to FIG. 32. FIG. 32 illustrates a method of enabling efficient coding by adding Fourier transform means.

Propagation estimating section 103 will be described first.

Buffer 3201 holds an input received signal of a predetermined length.

Reference signal sequence storing section 3202 stores predetermined reference signal sequences to output sequentially.

Convolver 3203 calculates the convolution of the temporarily held received signal and reference signal sequence to output correlation values.

Buffer 3204 temporarily holds calculated correlation sequences.

Transforming section 3101 will be described below.

Fourier transform section 3205 receives a delay profile to perform orthogonal transform such as Fourier transform.

Coefficient extracting section 3206 receives the coefficients subjected to Fourier transform and selects only primary coefficients.

Coding section 105 will be described below.

Vector quantization section 3207 searches quantization vectors stored in codebook 3209 for a quantization vector that is the most similar to an input vector train, and outputs the code.

Code transforming section 3208 selects from codebook 3209 an encryption key corresponding to the code output from vector quantization section 3207.

Codebook 3209 stores quantization vectors and encryption keys as illustrated in FIG. 5.

Figure 33:
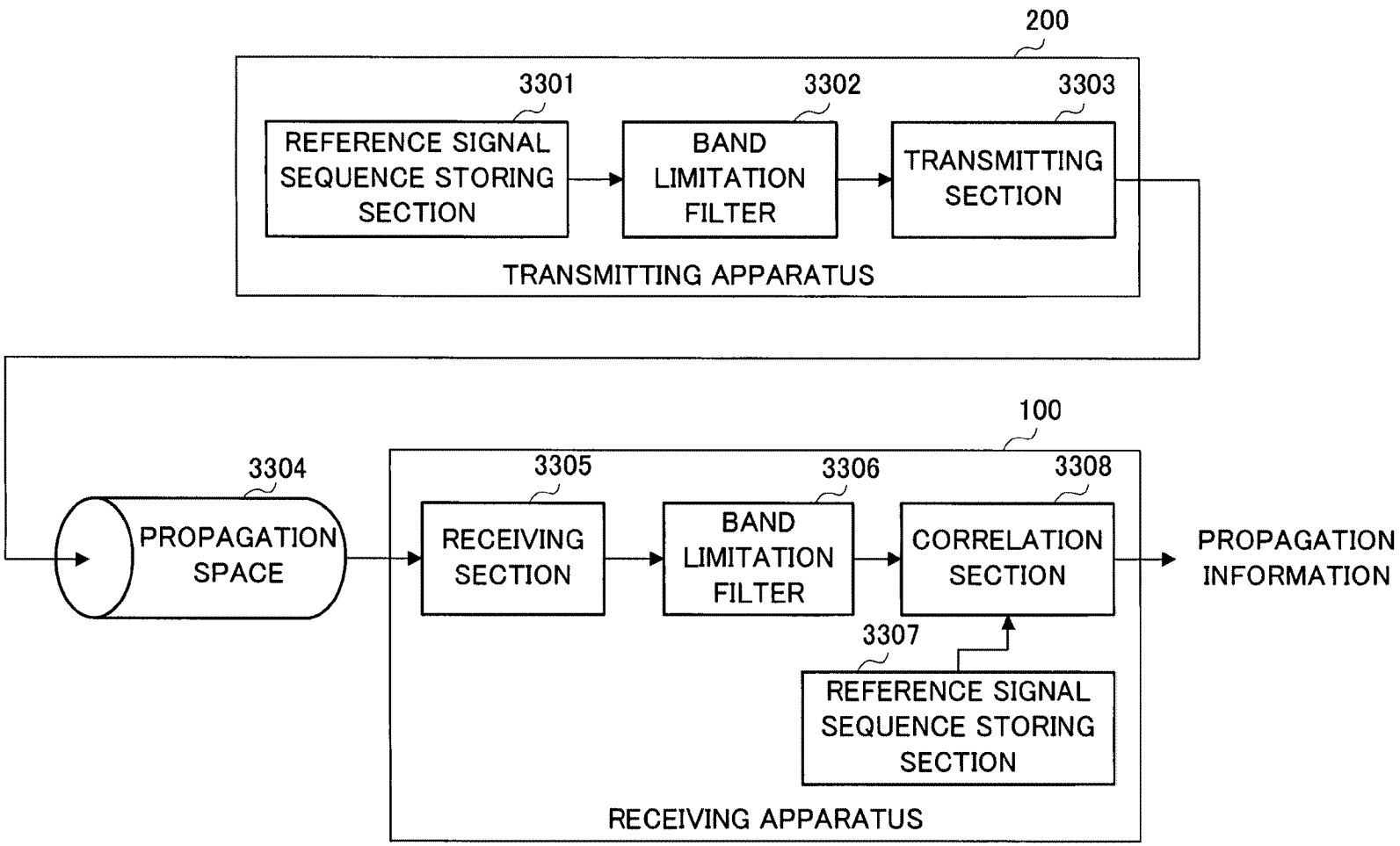
FIG. 33 is a block diagram illustrating a system according to Embodiment 16 of the present invention.

FIG. 33 illustrates a specific situation of delay profile, where the horizontal axis indicates time (sample timing in the figure), while the vertical axis indicates signal amplitude. The correlation value is obtained from an in-phase component (I component) and quadrature component (Q component) of the received signal sequence. In the figure, the solid line represents the correlation coefficients of I component, while the dotted lines represent correlation coefficients of Q component. Hereinafter, I component and Q component respectively represent the real part and complex part of a complex number, are normalized using a complex signal with the maximum instantaneous amplitude within a predetermined time.

FIG. 33 shows a block diagram of illustration where a reference signal sequence is generated and then the delay profile is obtained. As shown in FIG. 33, in transmitting apparatus 200, a reference signal sequence generated in reference signal sequence storing section 3301 is output to band limitation filter 3302, thereby forming a waveform of an output signal. The signal is transmitted over the air by transmitting section 3303. The transmitted electromagnetic wave arrives at receiving apparatus 100 via propagation space 3304 formed of various reflection and refraction. In receiving apparatus 100, a received signal sequence received in receiving section 3305 undergoes band limitation, channel selection and noise removal by band limitation filter 3306. Correlation section 3308 obtains the correlation with the band-limitation-processed received signal and reference signal sequence output from reference signal sequence storing section 3307, and obtains the reference signal sequence transmitted from transmitting section 200. The aforementioned descriptions are explained with reference to equations. Since received signal Sr(t) expressed with equation (17) is processed by band limitation filter 3306 (Fr(t)), Sr' is expressed by the following equation:

$$\begin{aligned} Sr'(t) &= Fr(t) * Sr(t) \\ &= Fr(t) * (St(t) * Pd(t)) \end{aligned} \tag{25}$$

Since transmission signal St(t) in equation (25) results from a reference signal sequence passed through band limitation filter 3302 (F(t)), Sr' (t) is:

$$Sr'(t)=Fr(t)*((Ft(t)*Rs(t))*Pd(t)) \tag{26}$$

Since the delay profile is obtained by calculating the convolution of the correlation sequence and reference signal sequence Rs(t) as described, Ds(t) is given as described below:

$$\begin{aligned} Ds(t) &= Sr'(t) * Rs(t) \\ &= Fr(t) * Ft(t) * Rs(t) * Rs(t) * Rs(t) * Pd(t) \\ &= F(t) * ARs(t) * Pd(t) \end{aligned} \tag{27}$$

Herein, F(t) is impulse response indicated by synthesis characteristic using band limitation filter 3302 and band limitation filter 3306, and the filtering characteristic is referred to as band limitation filter. Meanwhile, ARs(t) represents the auto-correlation function of reference signal sequence Rs (t). Thus obtained equation (27) represents the characteristic obtained by performing band limitation on a signal in which propagation characteristic Pd(t) is superimposed on auto-correlation function ARs(t) using the band limitation filter. When auto-correlation function ARs(t) is impulse characteristic, the characteristic of equation (27) is equivalent to the characteristic of propagation characteristic Pd(t) subjected to the band limitation filter.

When propagation characteristic Pd(t) is considered as a frequency characteristic, it is understood that Ds (t) is obtained as the propagation characteristic given the frequency characteristic expressed by F(t). For example, when F(t) is a band limitation filter of −½fbw to +½fbw, propagation characteristic Pd−bw(t) is obtained which is subjected to band limitation of fbw. In the environment of interior propagation, since bands of 1 MHz or more are dominant in the frequency characteristic of propagation characteristic, and therefore, it is efficient particularly in communications with a symbol rate of 1 MHz or more. Meanwhile, in the case of exterior propagation, since bands of 10 kHz or more are dominant in the frequency characteristic of propagation characteristic, and therefore, it is efficient particularly in communications with a symbol rate of 10 kHz or more.

Figure 34:
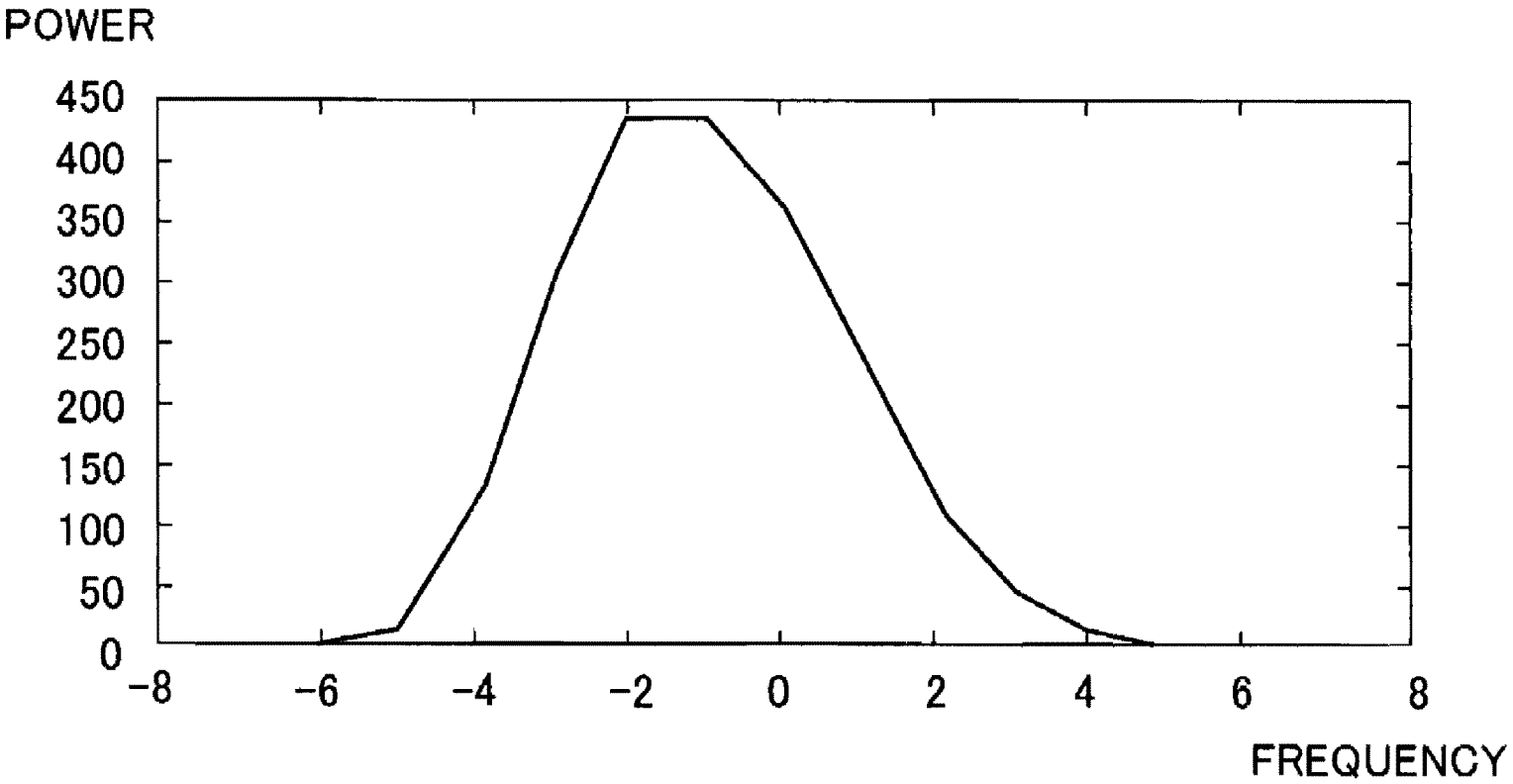
FIG. 34 is a graph illustrating a frequency characteristic of the delay profile.

Since only propagation characteristic component limited to the frequency band given as F(t) is obtained as propagation characteristic Ds (t) calculated from the received signal, by transforming Ds(t) into the frequency domain in Fourier transform section 3205 in transforming section 3101, parameters condense into low frequencies. By using coefficient extracting section 3206 for selecting and extracting low frequencies from signal sequence transformed into the frequency domain, it is possible to represent primary components of the propagation characteristic with a small number of parameters. Specifically, FIG. 29 illustrates a waveform of Ds(t) obtained as the propagation characteristic. FIG. 34 illustrates a signal sequence resulting from performing Fourier transform on the waveform. As can be seen from FIG. 34, primary signal components are condensed into about twelve elements. In other words, it is possible to represent a signal sequence of 100 samples×2 or more as shown in FIG. 29 using approximately ten elements, thus enabling vector quantization with an extremely simple configuration.

Thus, according to the communication apparatus and communication system of Embodiment 16, in addition to the effects of Embodiment 1, since transforming section 3101 performs Fourier transform on the propagation estimation value and extracts only primary coefficients, it is possible to represent the propagation environment with numerals in the most obvious way. Further, according to the communication apparatus and communication system of Embodiment 16, since vector quantization section 3207 performs vector quantization on primary coefficients extracted by performing Fourier transform on the propagation estimation value in transforming section 3101, vector quantization can be implemented with an extremely simple configuration. Furthermore, according to the communication apparatus and communication system of Embodiment 16, since only primary coefficients are selected by Fourier transform and encoded, it is possible to obtain the first data efficiently with a small number of propagation parameters. Moreover, according to the communication apparatus and communication system of Embodiment 16, by inserting transforming section 3101 between propagation estimating section 103 and coding section 105, there is provided a remarkably significant feature of enabling great reduction in construction.

In addition, while in Embodiment 16 transforming section 3101 uses Fourier transform, the present invention is not limited to Fourier transform. It is known that the same effectiveness is obtained when using DCT (Discrete Cosine Transform), wavelet transform, and Hilbert transform.

Embodiment 17

Figure 35:
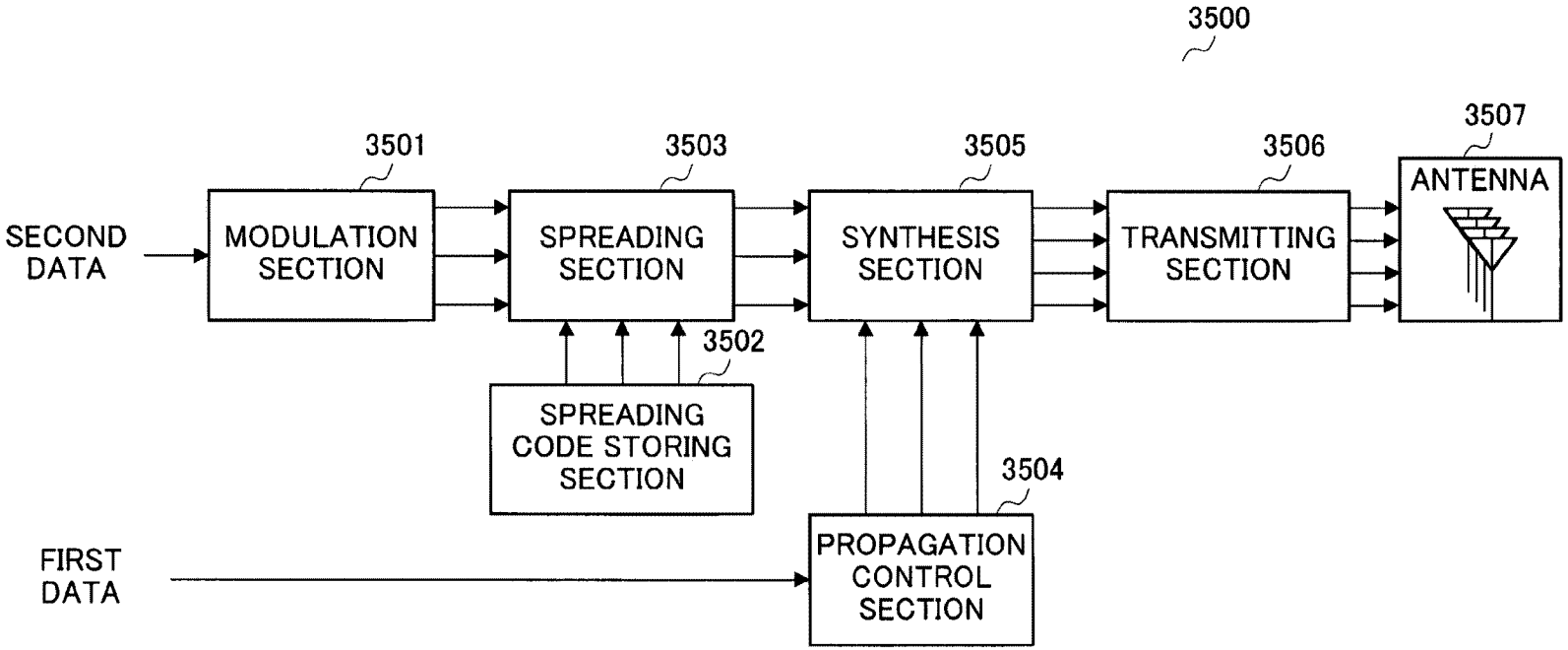
FIG. 35 is a block diagram illustrating a configuration of a communication apparatus according to Embodiment 17 of the present invention.
Figure 36:
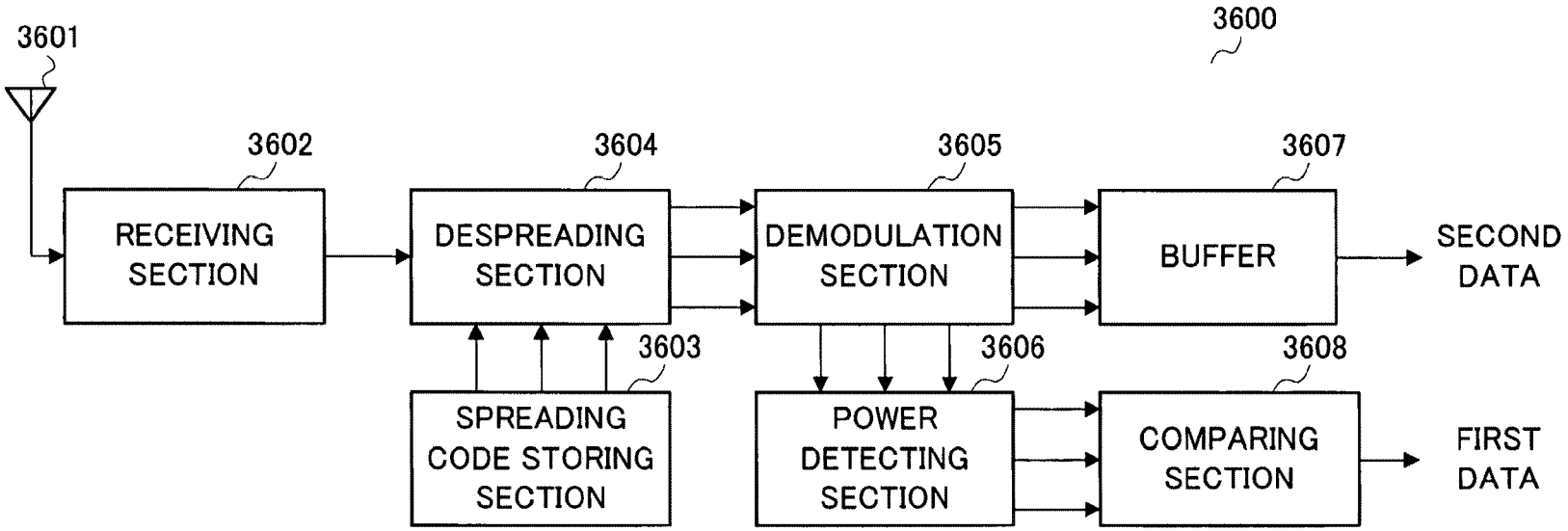
FIG. 36 is a block diagram illustrating another configuration of a communication apparatus according to Embodiment 17 of the present invention.

FIG. 35 is a diagram illustrating a configuration of transmitting apparatus 3500 according to Embodiment 17. FIG. 36 is a diagram illustrating a configuration of receiving apparatus 3600 according to Embodiment 17. Transmitting apparatus 3500 superimposes transmission data on signal power at the receiving end, as well as a modulated signal. Receiving apparatus 3600 detects the information superimposed on the reception power of a received signal.

Transmitting apparatus 3500 will be described first.

Modulation section 3501 temporarily holds the first transmission data, and outputs channel modulated signals corresponding to the number of channels. Spreading code storing section 3502 stores spreading codes corresponding to the number of channels to output. Spreading section 3503 calculates the convolution of channel data with a spreading code corresponding to the channel to perform spectrum spreading. Propagation control section 3504 receives the first transmission data, and calculates an antenna coefficient for each channel. Synthesis section 3505 multiplies a spread signal by the antenna coefficient to output an antenna signal. Transmitting section 3506 performs frequency conversion on the weighted signal to amplify. Antenna section 3507 transmits a signal of corresponding sequence.

Receiving apparatus 3600 will be described below.

Antenna section 3601 outputs a received RF signal. Receiving section 3602 receives the received RF signal, amplifies the power of the signal and converts the frequency of the signal. Spreading code storing section 3603 stores spreading codes corresponding to the number of spreading codes. Despreading section 3604 calculates the convolution of the received signal with the spreading code corresponding to the channel to despread, and outputs a channel signal. Demodulation section 3605 receives channel signals and outputs demodulated channel signals. Power detecting section 3606 detects reception power for each channel, and outputs reception power information. Buffer 3607 temporarily holds demodulated channel signals and outputs the second data. Comparing section 3608 receives the reception power information, compares the power level with one another, and outputs the first data.

Figure 37:
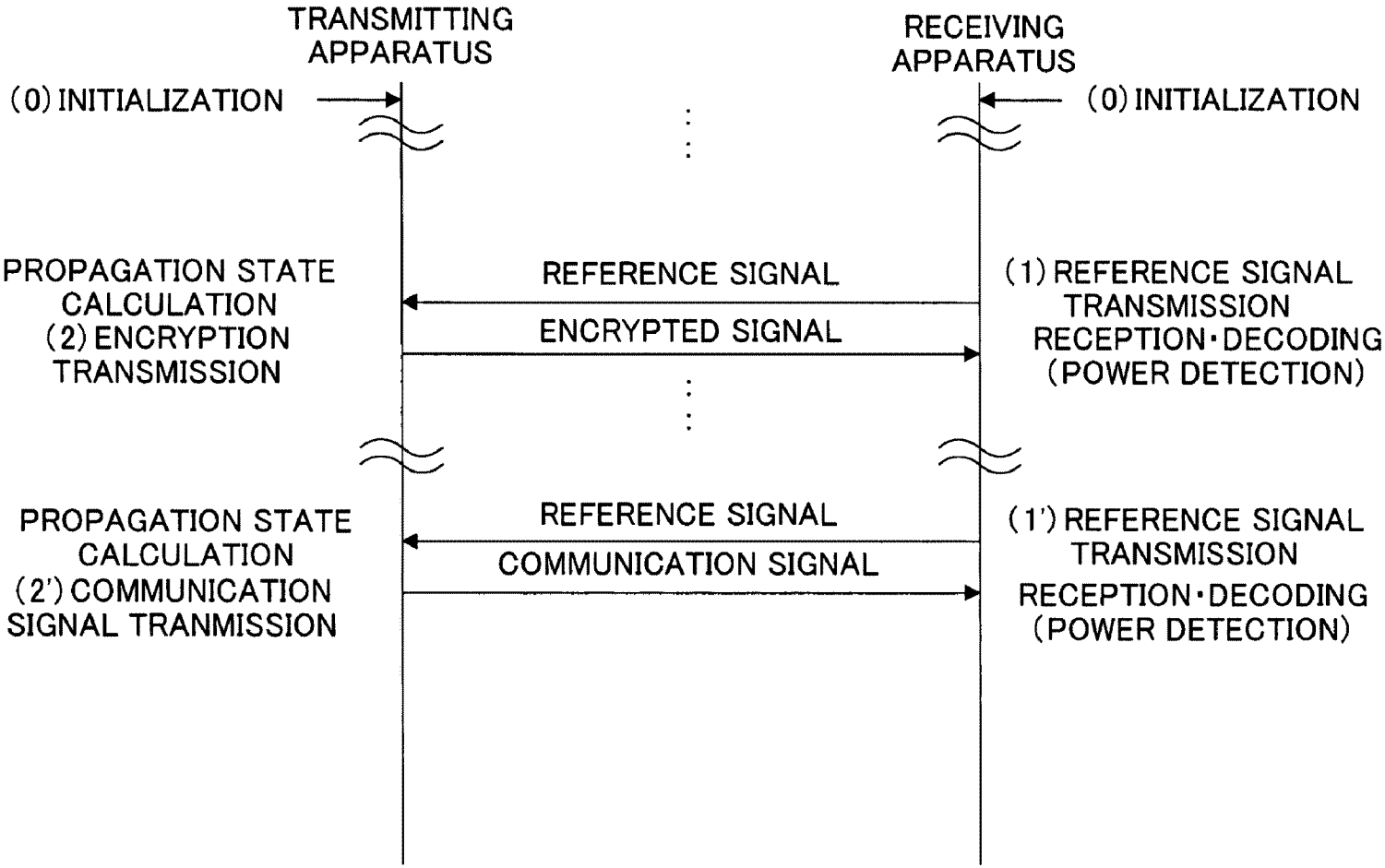
FIG. 37 is a sequence diagram illustrating the operation of the communication apparatus according to Embodiment 17 of the present invention.

The operation of transmitting apparatus 3500 and receiving apparatus 3600 will be described with reference to FIG. 37. FIG. 37 is to explain a communication method of superimposing information on reception power obtained as propagation information.

In FIG. 37, the transmission apparatus has the same configuration as in FIG. 35, and receiving apparatus has the same configuration as in FIG. 36, for the sake of convenience. Both apparatuses may be terminals enabling transmission and reception.

(0) Initialization

The transmitting apparatus and receiving apparatus perform the predetermined initial operation, and set various parameters, etc. at predetermined values after the power is supplied to the apparatuses.

(1) Transmission of Reference Signal

The receiving apparatus transmits a reference signal to detect a propagation state. Upon detecting the reference signal, the transmitting apparatus calculates the propagation state from the receiving apparatus based on the signal.

(2) Transmission of Encryption

Using the propagation state obtained in (1), the transmitting apparatus superimposes the information on power control at the receiving end, and outputs a communication signal. The receiving apparatus receives the communication signal, detects the reception power of the signal concurrently with demodulation of the received signal, and detects the information superimposed on the reception power. Subsequently, the receiving apparatus performs similar procedures.

According to the procedures in FIG. 37, the operation of each section will be described specifically.

It is herein assumed that the number of channels is three (channel A, channel B and channel C) and that the number of antennas is four (antenna 1, antenna 2, antenna 3 and antenna 4). It is further assumed that the transmitting apparatus has calculated the propagation state from the receiving apparatus according to communication procedure (1) as described earlier.

Upon receiving the first data and second data, modulation section 3501 temporarily holds the second data, and outputs modulated channel signals corresponding to three channels. Spreading section 3503 receives the modulated channel signals, performs spectrum spreading by the convolution of the signals with respective spreading codes provided from spreading code storing section 3502, and outputs spread channel signals. Propagation control section 3504 outputs antenna coefficients such that the power at the receiving end becomes a predetermined state, using the propagation state obtained in communication procedure (1) and the first data.

Among methods of superimposing information on the power are considered a method of superimposing the information on the order of the power of channels and a method of superimposing the information on differences between the power of channels or on ratio of the power of channels.

The method of superimposing the information on the order of power is described herein.

For example, when the first data is superimposed on the order of power of channels, six pieces of information can be superimposed as described below:

Power of channel A>Power of channel B>Power of channel C

Power of channel A>Power of channel C>Power of channel B

Power of channel B>Power of channel A>Power of channel C

Power of channel B>Power of channel C>Power of channel A

Power of channel C>Power of channel A>Power of channel B

Power of channel C>Power of channel B>Power of channel A

The six patterns are respectively assigned codes, which the transmitting apparatus and receiving apparatus share in advance.

Corresponding to the power information associated with the first data, propagation control section 3504 determines antenna coefficients corresponding to the modulated channel signals.

Figure 38:
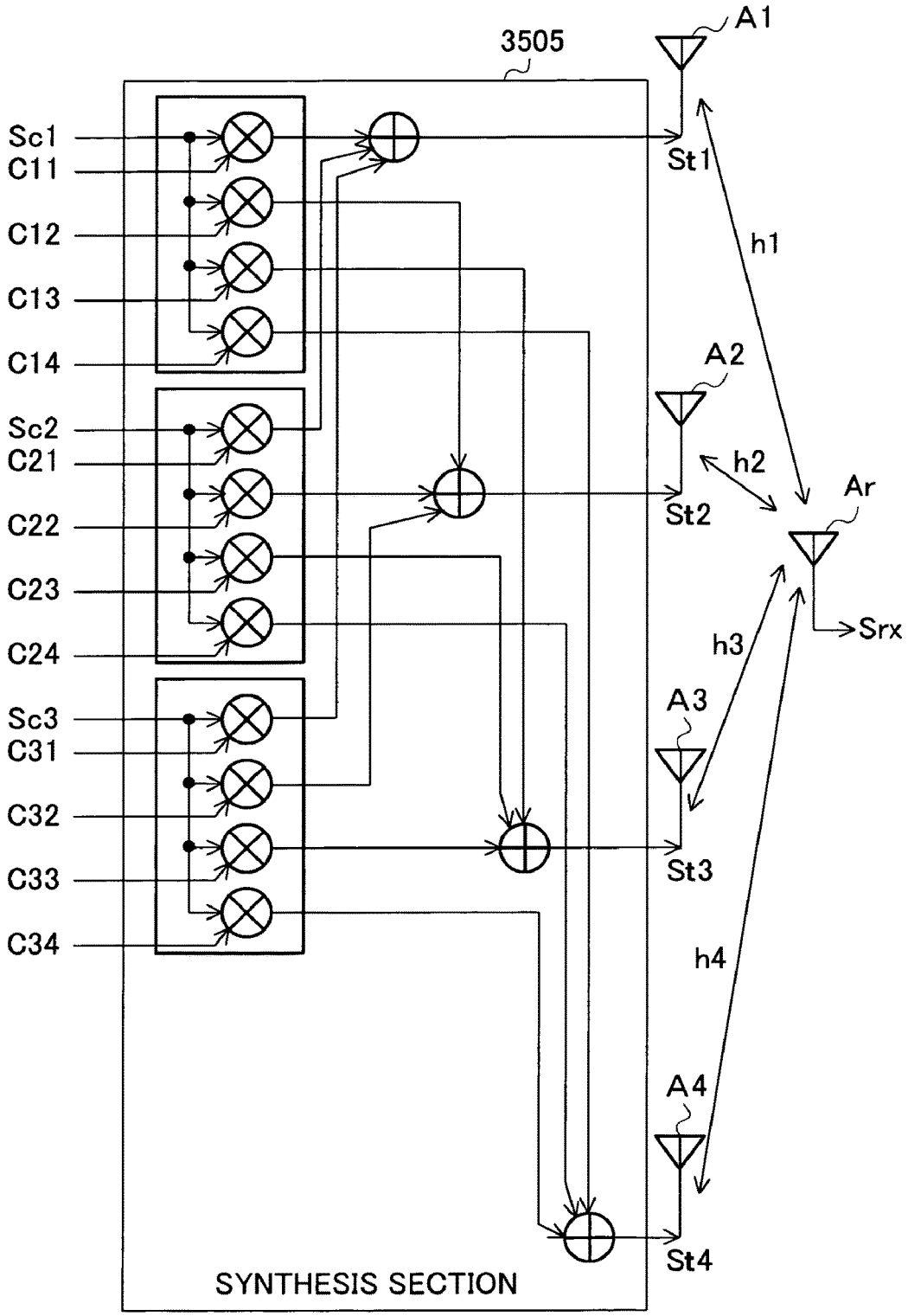
FIG. 38 is a view illustrating signal processing in the communication apparatus according to Embodiment 17 of the present invention.

A method of controlling the power using the antenna coefficients will be described below with reference to FIG. 38. FIG. 38 illustrates the relationship between antennas provided in the transmitting apparatus and receiving apparatus, propagation coefficients determined between the transmitting and receiving antennas, and signals input and output through the antennas. A1 to A4 denote antennas provided in the transmitting apparatus. Ar denotes an antenna provided in the receiving apparatus. St1 to St4 denote transmission RF signals. Srx denotes a received RF signal. h1 to h4 denote propagation coefficients. Synthesis section 3505 in the figure corresponds to synthesis section 3505 in FIG. 35, and illustrates relationships between calculations of spread channel signals Sc1 to Sc4 and antenna coefficients C11 to C34 (with the transmitting section omitted). These relationships are expressed by the following equation:

$$\begin{aligned} Srx(t) &= \sum Stn \cdot hn \\ &= \sum \left( \sum Scm \cdot Cmn \right) \cdot hn \end{aligned} \tag{28}$$

The transmitting apparatus adjusts values of C11 to C23 from h1 to h4 obtained using the reference signal in communication procedure (1), and thereby is capable of adjusting the reception power of received signal Srx received in antenna Ar for each spread channel signals Sc1 to Sc3 independently. In particular, controlling only by varying phases of C11 to C34 has such a feature that the power transmitted from each antenna does not vary.

For example, with respect to channel A (Sc1), C11 to C14 are calculated such that signals transmitted from A1 to A4 provide the maximum power in Ar by spatial synthesis. With respect to channel B (Sc2), C21 to C24 are calculated such that a notch is formed in the same way. With respect to channel C (Sc3), C31 to C34 are calculated such that the power is set at a value between channels A and B.

Synthesis section 3505 receives the antenna coefficients and modulated channel signals, and synthesizes antenna signals for antennas 1 to 4. The antenna signals undergo the frequency conversion and power amplification in transmitting section 3506, and are transmitted in antenna section 3507.

Antenna section 3601 in the receiving apparatus receives thus transmitted encrypted signals, and outputs the received RF signals to receiving section 3602. Receiving section 3602 receives the received RF signal, and outputs a received signal subjected to power amplification and frequency conversion. Despreading section 3604 receives the received signal, and calculates the convolution of the signal with a spreading code input from spreading code storing section 3603. Despreading is carried out corresponding to the number of channels (herein, three channels), and a channel signal divided for each channel is output. Demodulation section 3605 receives the channel signal to demodulate, and outputs the demodulated channel signal, while detecting a channel detection signal for power detection. Buffer 3607 temporarily holds the demodulated channel signal input from demodulation section 3605 to output as the first data. Power detection section 3606 receives the channel detection signal, estimates the reception power for each channel, and outputs channel power information. Comparing section 3608 compares a power level given from the channel power information with one another, and transforms the result into a code assigned in advance based on the order of power of channels to output as the first data.

The first data transmitted from transmitting apparatus 3500 can be used as the first data in receiving apparatus 3600, and in particular, the second data is of communications using actively the propagation path formed between transmitting apparatus 3500 and receiving apparatus. Therefore, such a feature is provided that another receiving apparatus cannot interpret the reception, and as a matter of course, there is provided effective communication means for information requiring high security.

Figure 39:
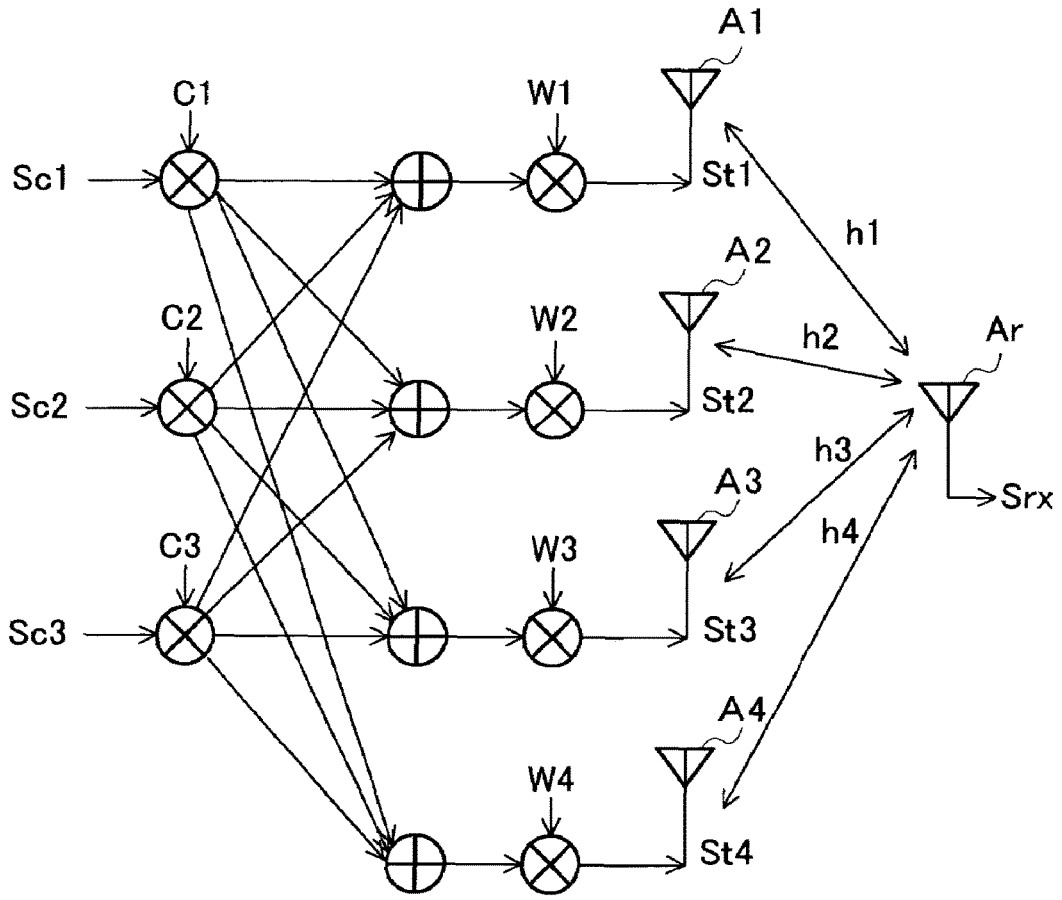
FIG. 39 is another view illustrating signal processing in the communication apparatus according to Embodiment 17 of the present invention.

In addition to aforementioned descriptions, differences between the present invention and conventional technique will be described below with reference to FIGS. 39 to 42. FIG. 39 shows an example of conventional technique, where output power of signals Sc1 to Sc3 is controlled using C1 to C3, and the directivity control is carried out using W1 to W4. While in FIG. 39 the same weighting coefficients (C1 to C3) are multiplied for all the antennas, in FIG. 38 weighting coefficients (C11 to C34) are controlled independently for each antenna with respect to Sc1 to Sc3. In the case where the same weighting coefficients are used for all the antennas as shown in FIG. 39, the radiation characteristic given by the directivity is provided with characteristics of the scale of the directivity.

Figure 40:
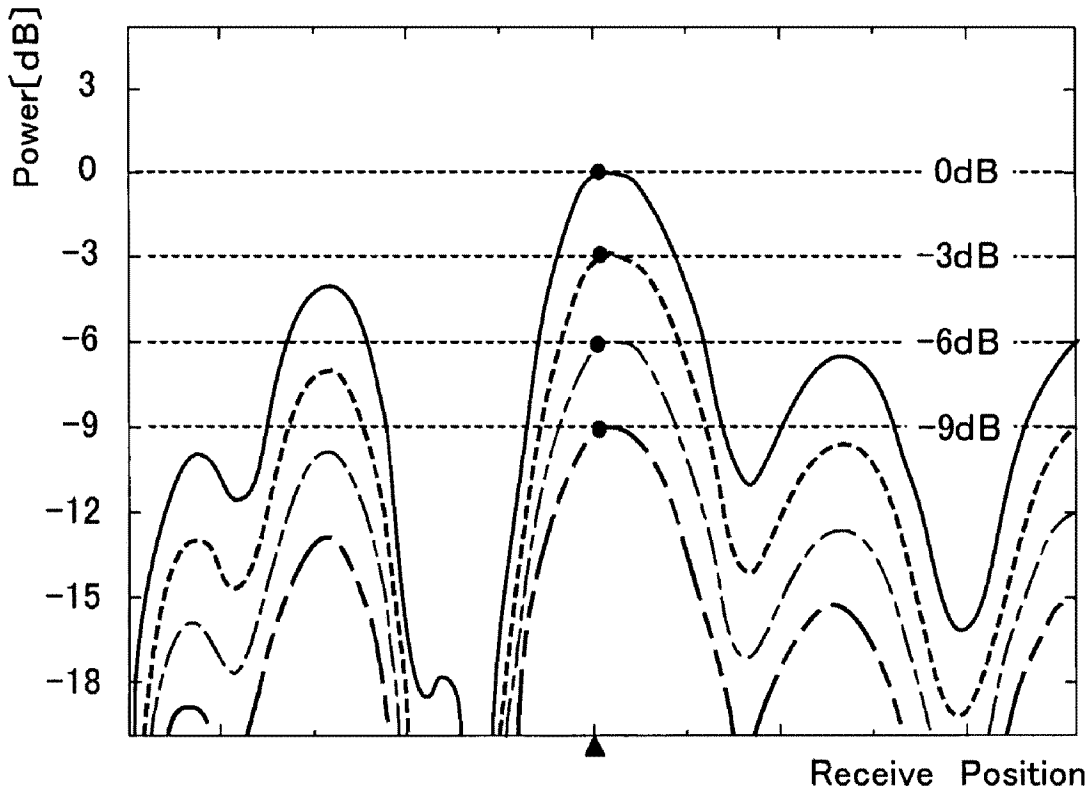
FIG. 40 is a view illustrating power distribution.
Figure 41:
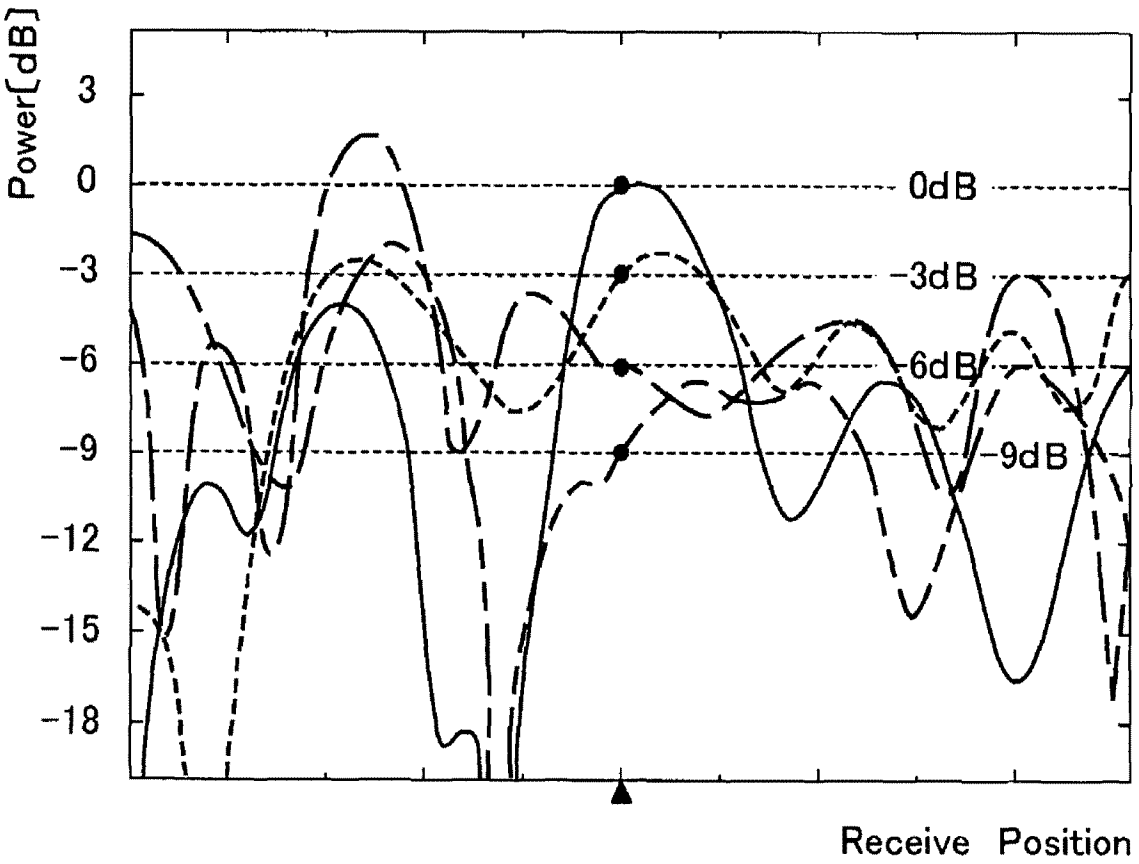
FIG. 41 is another view illustrating power distribution.
Figure 42:
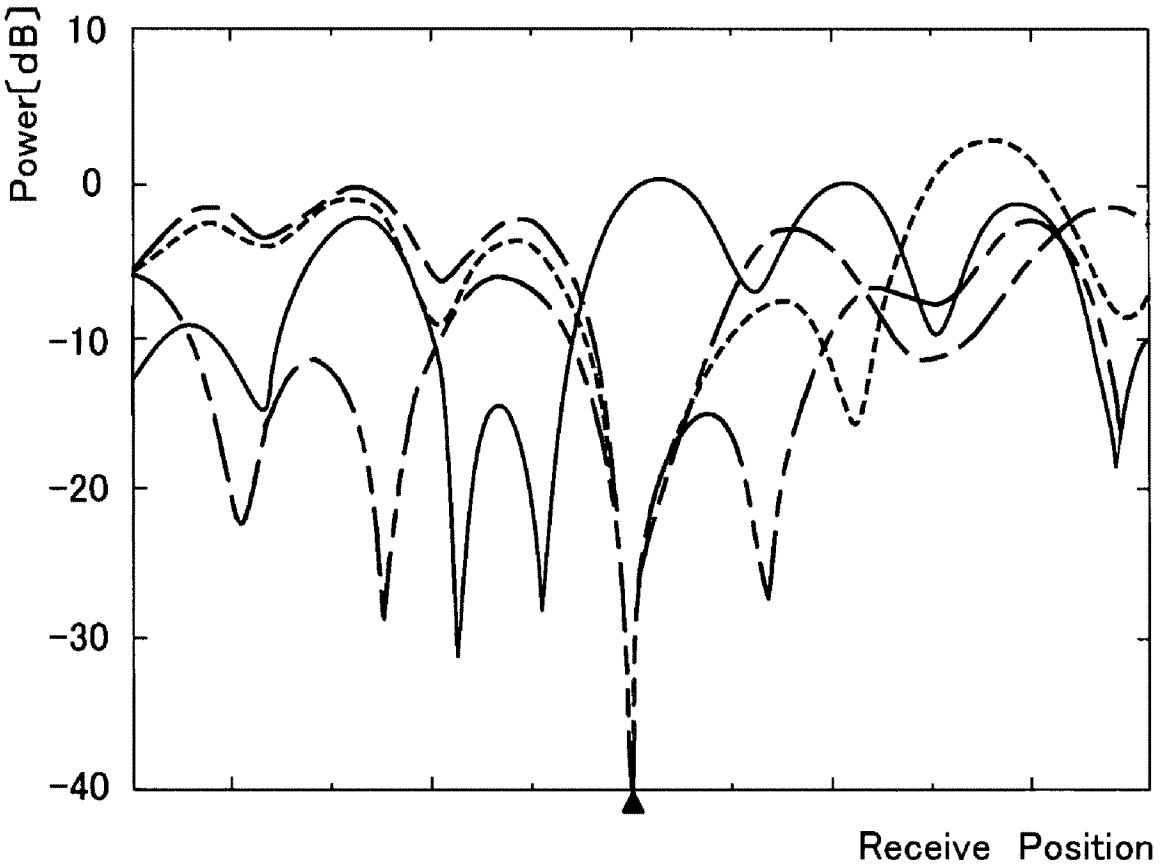
FIG. 42 is another view illustrating power distribution.

FIGS. 40 to 42 illustrate power distribution of signals, where the horizontal axis indicates a position in spatial section, the vertical axis indicates reception power at the position, and ▲ indicates a location of the receiving terminal. FIG. 40 illustrates characteristics obtained by the configuration in FIG. 39. As shown in FIG. 40, all signal distributions are similar, and the distribution form indicates characteristics of the directivity control given with W1 to W4. Therefore, even when a receive position shifts from a target position, the power of the received signal does not vary relatively. Meanwhile, FIG. 41 illustrates the signal distribution subjected to the propagation control by the configuration in FIG. 38. Since transmission signals are subjected to weighting with combinations of different coefficients for each antenna (as a result, directivity characteristics are different), reception power of each signal differs from one another with the receive position. In other words, while the controlled power ratio is obtained in the target receive position (●), the power ratios are different in positions other that the target position. By using this characteristic, it is not possible to perform demodulation using the reception power in places except a target receive position for a transmission terminal.

Further, it is possible to control a null point where the reception power is 0, using weighing coefficients C11 to C34 in FIG. 38. It is known that n output antennas enable control of n−1 null points. The transmission signal (for example, Sc1) is controlled so that adequate reception power is obtained in a receive position by the directivity control, while some or all of the other transmission signals (for example, Sc1 and Sc2) are controlled to provide controllable null points at the target receive position. Thus, it is possible that n (n≥2) antenna transmit m (m≥2) or more kinds of signals under the propagation control, and the transmission of the signals is controlled so that proper power is supplied to a reception antenna, while transmission of signals that are not required to be transmitted is controlled so that maximum n−1 nulls are provided to the reception antenna. In addition, in the m kinds of signals, as long as there is at least one signal to be transmitted, the number of signals to be transmitted may be two or more. FIG. 42 illustrates thus controlled state.

In FIG. 42, in the place of ▲, each signal (Sc2 and Sc3) indicated by dashed lines forms null where reception power is controlled to be low, while the signal (Sc1) indicated by solid line has adequate reception power. In this case, a transmission terminal superimposes information to transmit on Sc1, while superimposing pseudo information (or, non-important information) on Sc2 and Sc3. By communicating in this way, since a received signal is only Sc1 in the target receive position, the receiving terminal is capable of obtaining the information of Sc1 by demodulating the received signal without particular processing. Meanwhile, when these signals are received in other places, the received signals have power of Sc1 to Sc2, and therefore, are difficult to separate. Even if the separation is possible, since it is impossible to estimate which information is to be received among Sc1 to Sc3, it is not possible to perform proper demodulation.

When using the method of thus controlling a null point, since information to be received is only received in reception, the receiving terminal may have the conventional configuration. In other words, there is a significant feature that varying only a transmitting terminal enables implementation of communications with assured security.

Thus, according to the communication apparatus and communication system of Embodiment 17, in addition to the effects of Embodiment 1, synthesis section 3505 on the transmitting side transmits the first data to a communicating party on different propagation paths using a plurality of antennas, and comparing section 3608 on the receiving side receives incoming signals passed through different propagation paths, and obtains the first data from a result of comparison of estimation values of propagation environments of the paths, whereby it is possible to make it remarkably difficult that the first data is intercepted using a communication apparatus of a third party, thus enabling high security to be provided. Further, according to the communication apparatus and communication system of Embodiment 17, transmitting apparatus 3500 performs spectrum spreading on signals of a plurality of channels, multiplies the signals by antenna coefficients in multiplexing to control propagation states for each antenna, and thereby is capable of superimposing the information on the propagation states (herein, signal power, i.e., propagation loss). Further, according to the communication apparatus and communication system of Embodiment 17, as distinct from amplitude modulation typified by ASK as a method of super-imposing information on signal power, propagation states are used actively. In other words, since signal power in a reception antenna end is used, propagation characteristics are different in other reception points and signals are not received properly, and in this respect, this embodiment is significantly different from conventional amplitude modulation. For example, since it is possible to vary the signal power at the receiving end without varying the output power from antennas as described above, it is impossible to demodulate the second data even when a third party intercepts communications to demodulate, resulting in the significant feature that the high security is provided. Moreover, according to the communication apparatus and communication system of Embodiment 17, since communications are carried out noting differences in signal power between carriers using multicarrier signals, there is a significant advantage that detection can be carried out from received signals at the same time. The propagation conditions are assumed to be the same because of the same time and same frequency, and it is thereby possible to provide stable communications. For example, when using a spread signal on which two channels (assumed as channel R and channel S) are multiplexed, it is considered assigning a code to whether the signal power of channel S is higher or lower than the signal power of channel R that is set as a reference. In the case of superimposing information on signal phases, it is similarly considered detecting a reference phase of channel S based on a reference signal of channel R.

In addition, Embodiment 17 describes Spectrum Spread communications as an example. However, the present invention is not limited to such communications, and is applicable to multicarrier signals such as OFDM and to singlecarrier signals. OFDM communications can be implemented with spreading, despreading and channel respectively replaced with IFFT, FFT, and subcarrier. In the case of OFDM, since propagation characteristics appear in power of subcarriers, codes may be assigned using the envelop as a parameter.

Further, while Embodiment 17 describes the scheme of superimposing information on the signal power synthesized through propagation, the present invention is not limited to such a case. It is possible to superimpose information on a phase and frequency of signal, and further it is possible to superimpose information on polarization and delay profile.

Furthermore, in Embodiment 17, by arranging antennas with different polarization planes (for example, perpendicular to one another) as an antenna configuration, it is also possible to superimpose signals on polarized waves as described earlier. In this case, although a multicarrier signal is not required particularly, it is considered superimposing information on an angle of the polarization plane of channel S using the polarization plane of channel R as a reference when the multicarrier signal is used.

Still furthermore, in the case of superimposing information on the delay profile, by using the multicarrier signal, it is considered superimposing information on a difference of the delay profile obtained from channel S from the delay profile obtained from channel R as a reference. In this way, since the consistency of propagation state for the delay profile is maintained, it is possible to expect communications with high accuracy. Moreover, in Embodiment 17, superimposing the confidential information and pseudo information at the same time in the same frequency enables communications only in a target receive position, and further enables the communication system with high confidentiality.

Embodiment 18

Embodiment 18 extends the invention as described in Embodiment 17, and has a feature of superimposing information on propagation parameters obtained from a plurality of received signal sequences.

Figure 43:
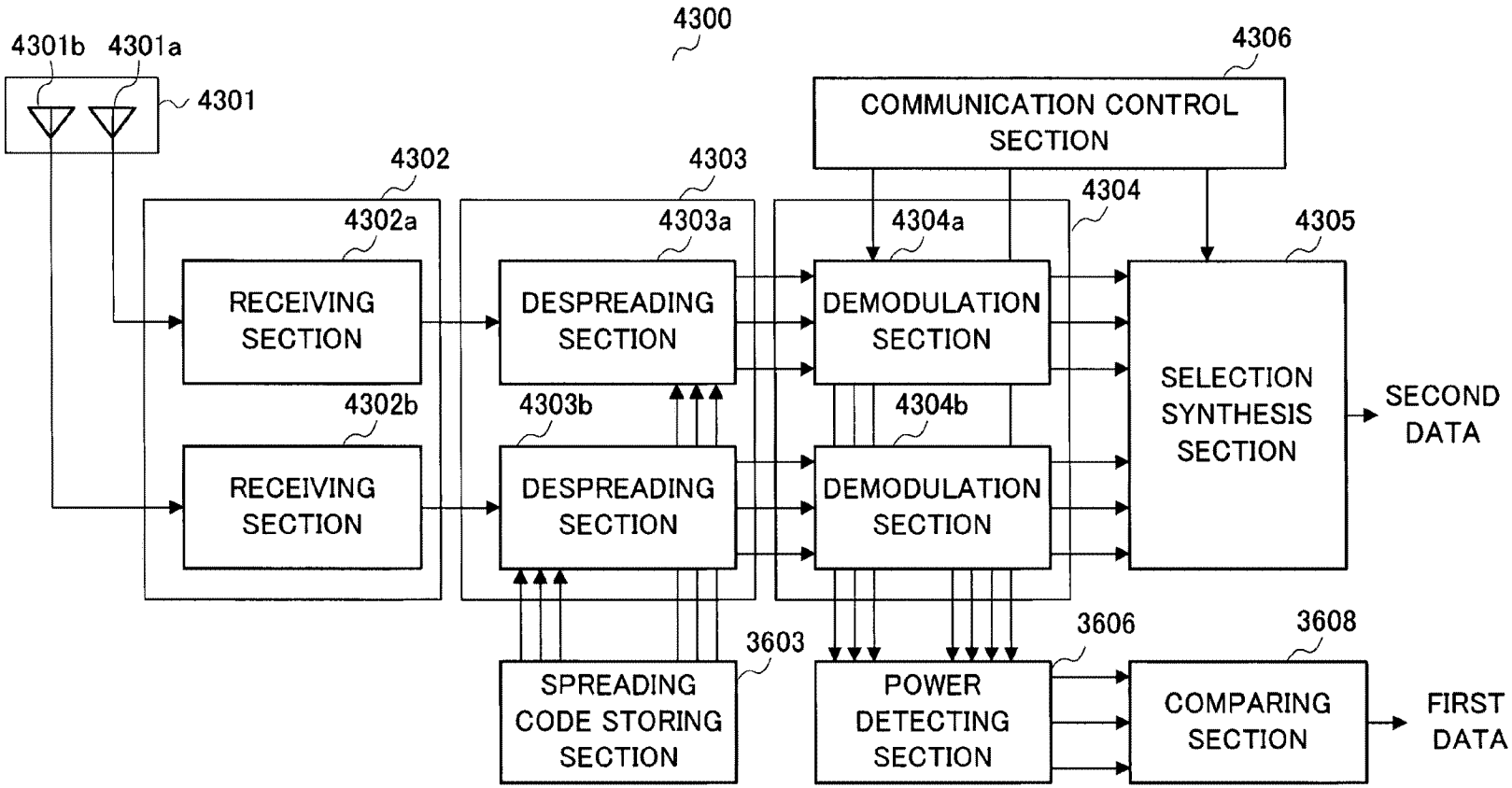
FIG. 43 is a block diagram illustrating a configuration of a communication apparatus according to Embodiment 18 of the present invention.
Figure 44:
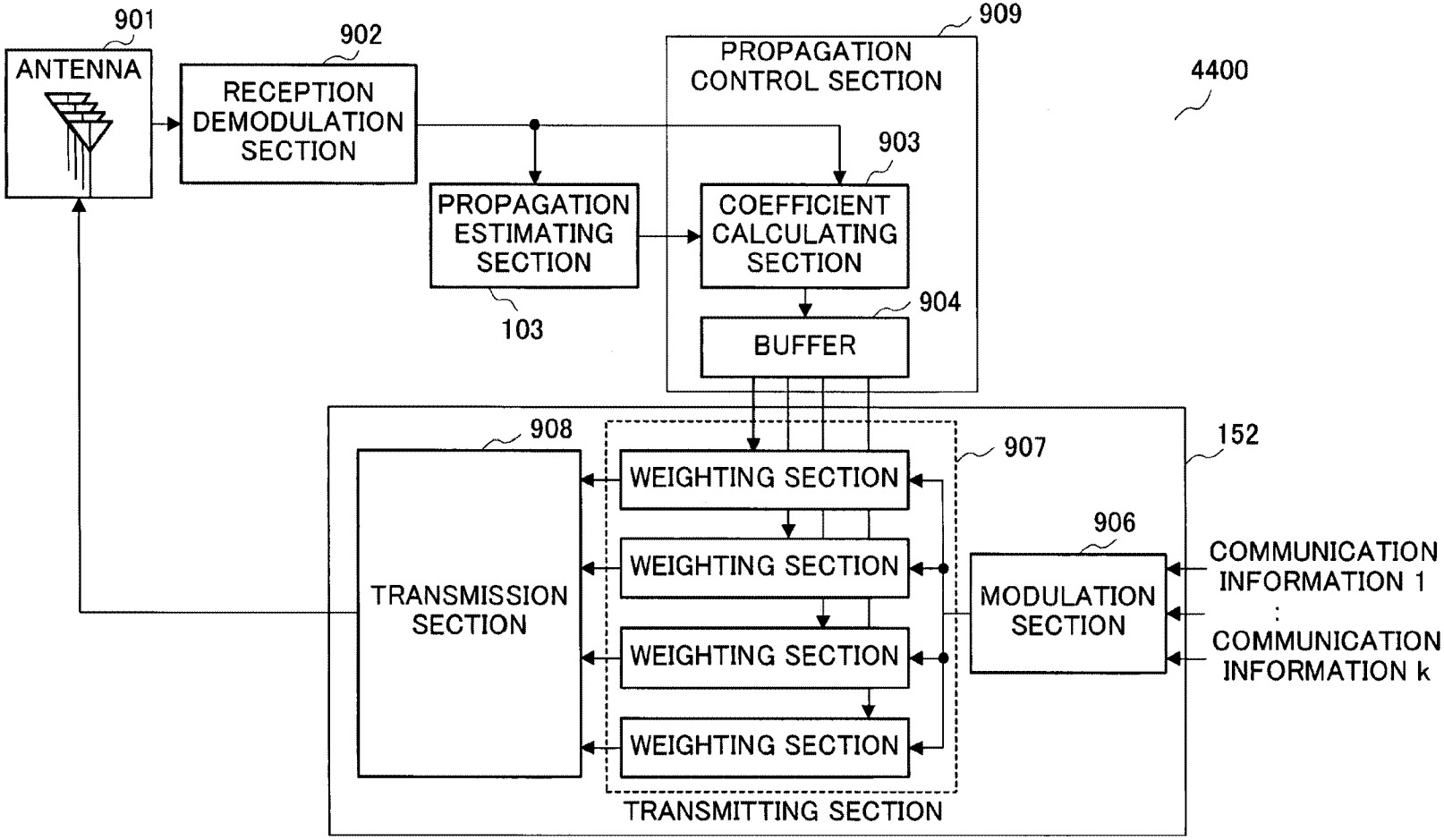
FIG. 44 is a block diagram illustrating another configuration of a communication apparatus according to Embodiment 18 of the present invention.

FIG. 43 is a diagram illustrating receiving apparatus 4300 that is a communication apparatus according to Embodiment 18. FIG. 44 is a diagram illustrating a configuration of transmitting/receiving apparatus 4400 according to Embodiment 18. In addition, the same sections as in FIG. 9 or FIG. 36 are assigned the same reference numerals as in FIG. 9 or FIG. 36, and descriptions thereof are omitted.

Receiving apparatus 4300 that is the communication apparatus according to Embodiment 18 of the present invention has receiving sections 4302a and 4302b substituting for receiving section 3602, despreading sections 4303a and 4303b substituting for despreading section 3604, and demodulation sections 4304a and 4304b substituting demodulation section 3605 in the configuration of receiving apparatus 3600 according to Embodiment 17 of the present invention as illustrated in FIG. 36.

Receiving apparatus 4302 is comprised of receiving sections 4302a and 4302b. Despreading apparatus 4303 is comprised of despreading sections 4303a and 4303b. Demodulation apparatus 4304 is comprised of demodulation sections 4304a and 4304b.

Receiving section 4302a performs power amplification and frequency conversion on a received RF signal input from antenna 4301a to output to despreading section 4303a.

Receiving section 4302b performs power amplification and frequency conversion on a received RF signal input from antenna 4301b to output to despreading section 4303b.

Despreading section 4303a calculates the convolution of the received signal input from receiving section 4302a with a spreading code corresponding to the channel to despread, and outputs the channel signal to demodulation section 4304a.

Despreading section 4303b calculates the convolution of the received signal input from receiving section 4302b with a spreading code corresponding to the channel to despread, and outputs the channel signal to demodulation section 4304b.

Demodulation section 4304a demodulates the channel signal input from despreading section 4303a, and outputs the modulated channel signal to synthesis selection section 4305, while outputting the demodulated signal to power detecting section 3606 according to an output instruction signal from communication control section 4306.

Demodulation section 4304b demodulates the channel signal input from despreading section 4303b, and outputs the modulated channel signal to synthesis selection section 4305, while outputting the demodulated signal to power detecting section 3606 according to an output instruction signal from communication control section 4306.

Based on a selection synthesis signal input from communication control section 4306, synthesis selection section 4305 selects (or synthesizes) a branch received signal (or branch received data) received from either antenna, and outputs a result of selection or synthesis as the second data. In this way, since the effect is obtained of switching the propagation space with time, the gain like spatial diversity is obtained.

Communication control section 4306 outputs the selection synthesis signal for instructing to select/synthesize a branch received signal (or branch received data) from a predetermined antenna at predetermined time to selection synthesis section 4305. The section 4306 further outputs the output instruction signal for instructing demodulation section 4304a or 4304b to output to power detecting section 3606 the demodulated signal of antenna 4301a or 4301b that receives a signal including confidential information, respectively. In this way, since a third party cannot estimate the propagation space nor divide communication signals of antennas 4301a and 4301b, there is provided an advantage of implementing higher security.

Comparing section 3608 (propagation parameter difference calculating means) calculates a difference (propagation parameter difference) between the reception power of a received signal received in antenna element 4301a and reception power of a received signal received in antenna element 4301b, and outputs the calculated difference information as the first data.

Figure 45:
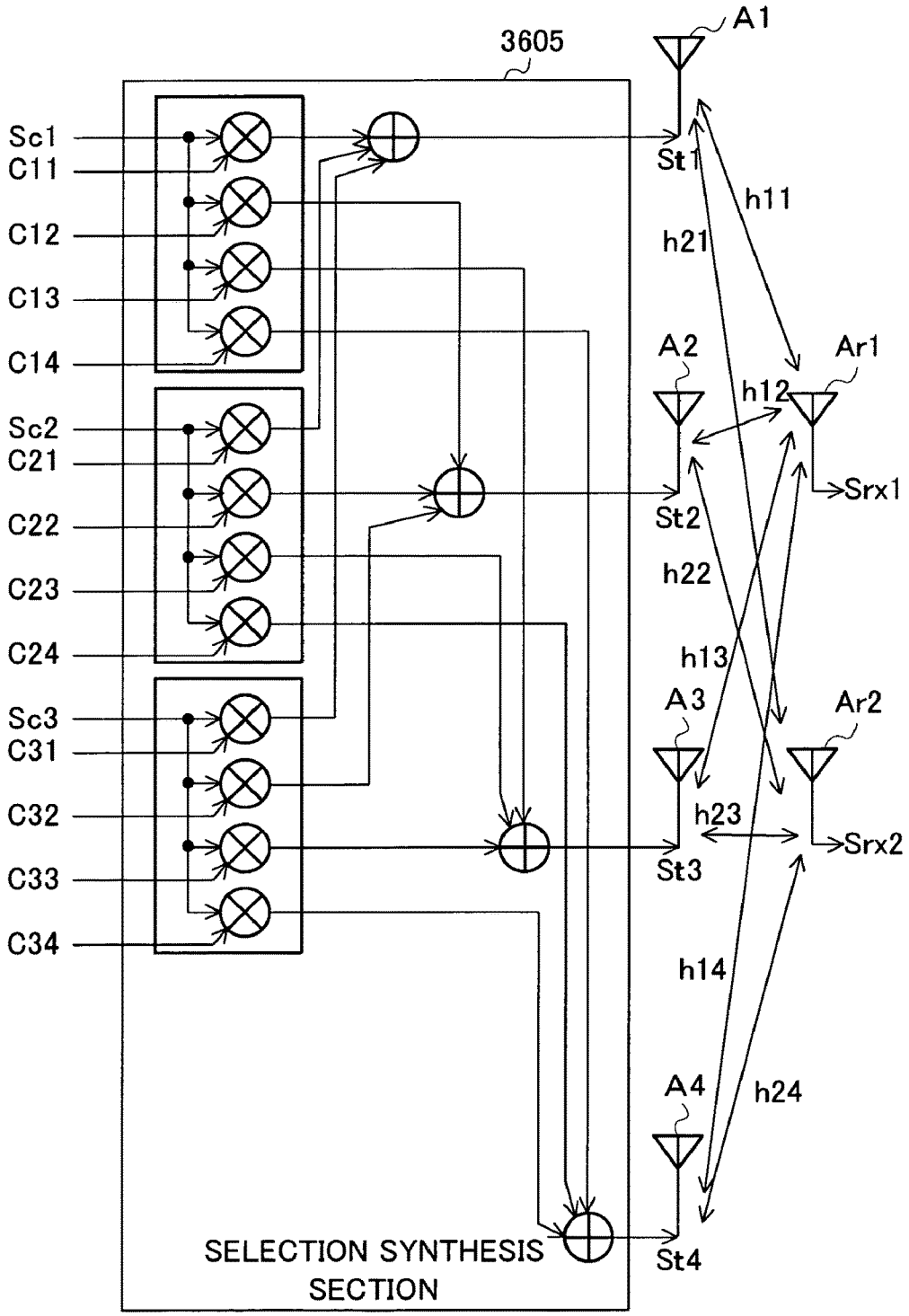
FIG. 45 is a view illustrating signal processing in the communication apparatus according to Embodiment 18 of the present invention.

FIG. 45 illustrates the relationship between antennas provided in the transmitting apparatus and receiving apparatus, propagation coefficients determined between the transmitting and receiving antennas, and signals input and output through the antennas. FIG. 45 shows two reception antennas, while FIG. 38 shows one antenna.

In the system configured as described above, received signals in antennas Ar1 and Ar2 are given by the following equations:

$$\begin{aligned} Srx1(t) &= \sum Stn \cdot h1n \\ &= \sum \left(\sum Scm \cdot Cmn\right) \cdot h1n \end{aligned} \tag{29}$$

$$\begin{aligned} Srx2(t) &= \sum Stn \cdot h2n \\ &= \sum \left(\sum Scm \cdot Cmn\right) \cdot h2n \end{aligned} \tag{30}$$

As is apparent from equations (29) and (30), since Srx1 and Srx2 are different from each other in the configuration of propagation path, propagation parameters h1n and h2n are also different from each other. The reception states of Srx1 and Srx2 are controllable by the operation of Cmn indicated in equations (29) and (30). It is considered that the receiving terminal uses a result of comparison of the propagation state obtained from Srx1 and the propagation state obtained from Srx2, as information for use in demodulation and decoding. In other words, the transmitting side superimposes information on a difference (such as a phase difference and reception power difference) of propagation parameters controlled with Srx1 and Srx2 to transmit, while the receiving side calculates the difference of propagation parameters obtained from received signals of Srx1 and Srx2, and uses the difference as part or all of the information to communicate, enabling various communications. Further, communicating in this way causes the need of estimating two-sequence propagation parameters, and thus enables high security to be provided. Naturally, increasing the number of antennas enables construction of more sophisticated system, and thus expects increases in security.

Further, it is possible to perform secure communications using a plurality of antennas Ar1 and Ar2. As descried above, antennas Ar1 and Ar2 have different propagation parameters, and receive different signals, and using this respect, controlling modulated signals for antennas Ar1 and Ar2 enables more complicated and secure communications. For example, confidential information is only transmitted to antenna Ar1, antenna Ar2, or both antennas Ar1 and Ar2, or these states are switched at predetermined time intervals.

Figure 71:
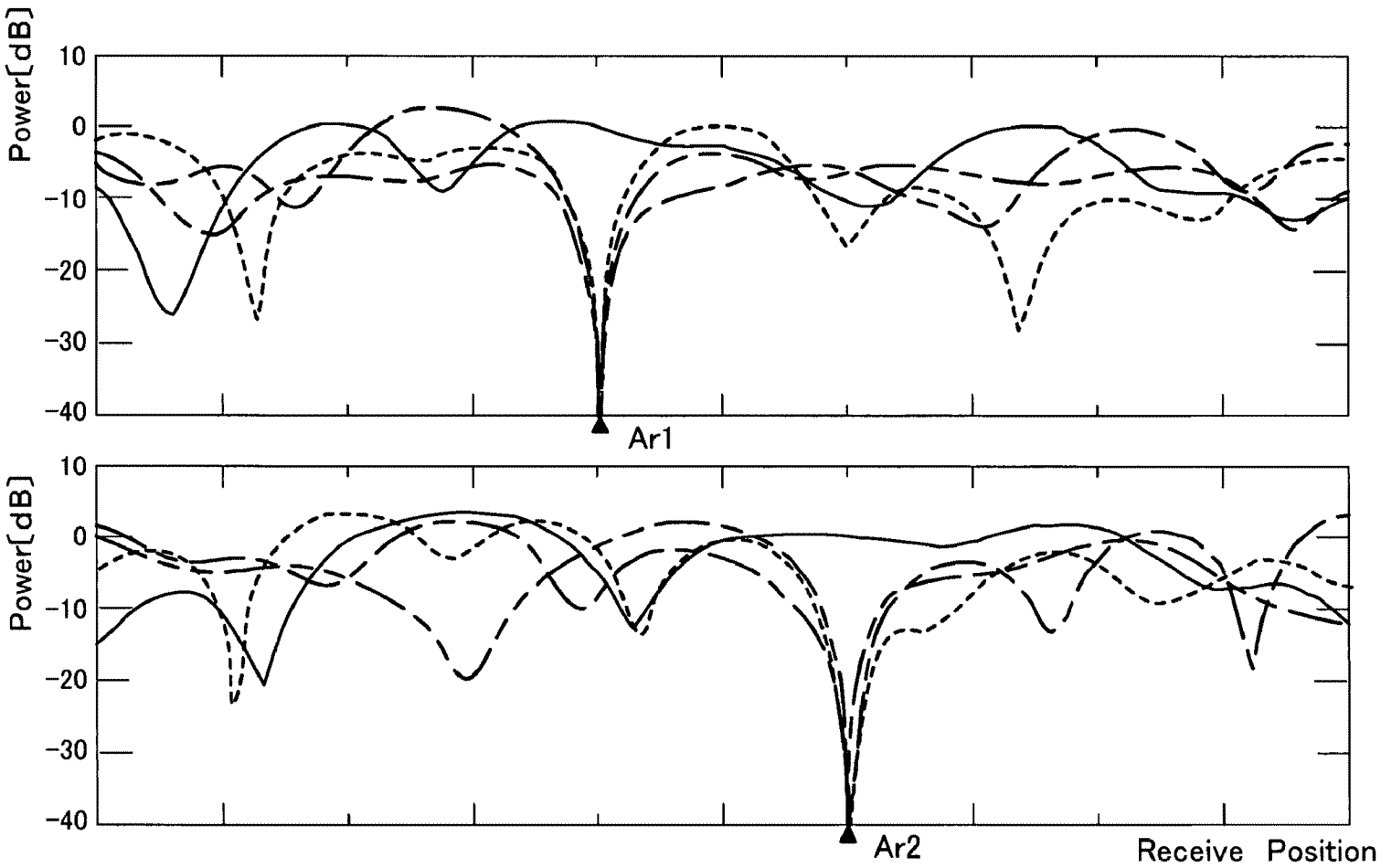
FIG. 71 is a view illustrating power distribution.
Figure 76:
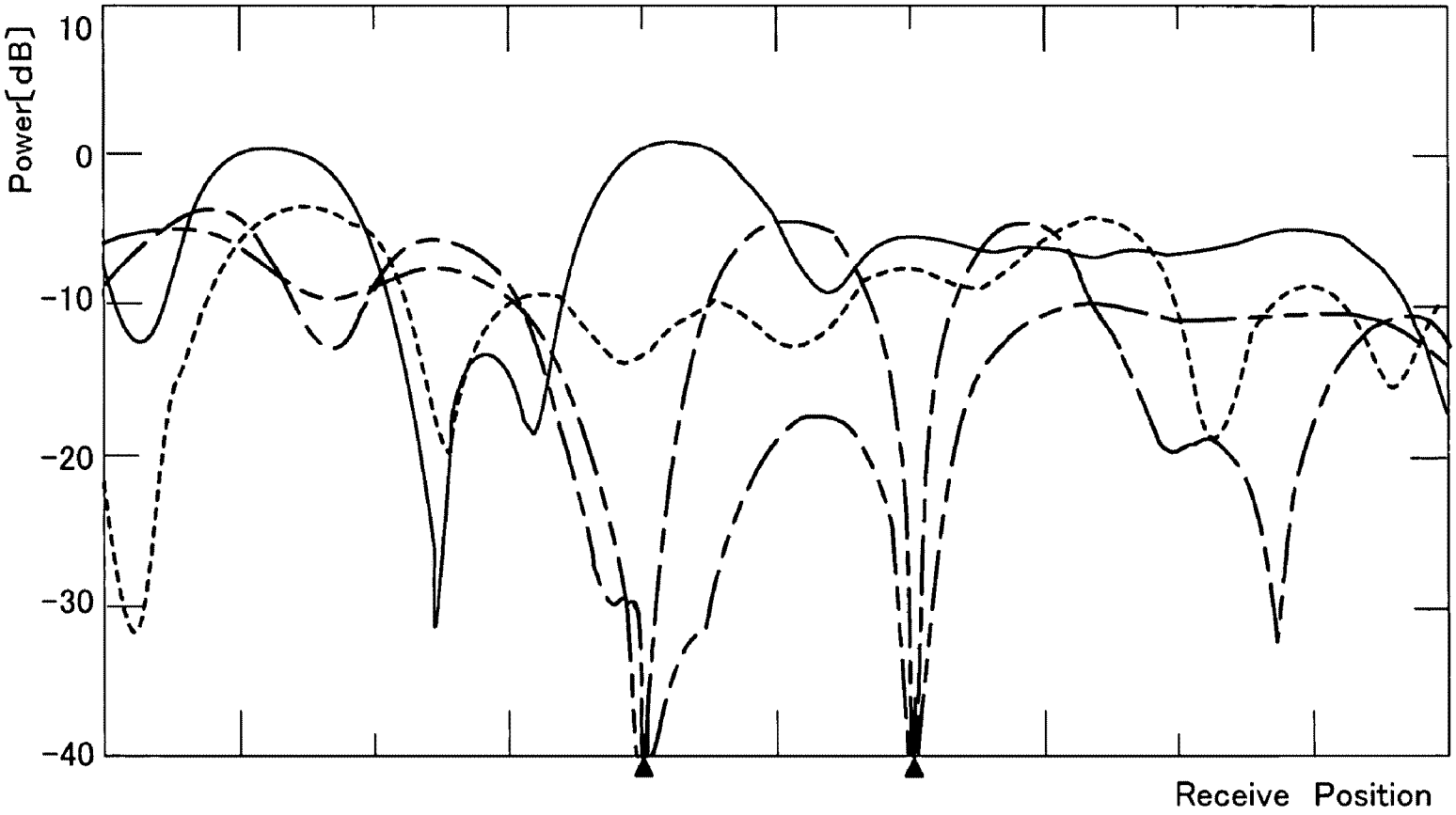
FIG. 76 is a graph illustrating power distribution.

The specific description is given below with reference to FIG. 71. FIG. 71 is similar to FIG. 42, and shows the case of two target positions. The upper and lower graphs are shown in FIG. 71, and indicate the power distribution as in FIG. 42. The upper and lower graphs indicate the same section. For example, as described in Embodiment 17, when a null point is formed at two positions and is switched with time while signals are transmitted, the power distribution is switched as in upper and lower graphs. In synchronization with the switching, the receiver side performs switching, and it is thereby possible to perform communications as in Embodiment 17. Further, as shown in FIG. 76, when communications are implemented with a null point formed at two positions, both antennas do not receive unnecessary components, and therefore, communications can be carried out similarly. Furthermore, received signals respectively received in antennas Ar1 and Ar2 can be separated, the bold line and slender line in the figure, using the propagation coefficients. When the number of antennas is n (Ar1 . . . Ar2), using Space Division Multiplex (SDM) or MIMO (Multi-Input Multi-Output) enables the communication capacity to be increased by n times that in FIG. 42. Further, using Space-Time Coding expects great improvements in characteristics. Thus, there are significant advantages in terms of communication capacity and communication quality.

Moreover, performing communications in this way increases the parameter elements constructing channels as illustrated in FIG. 45, and has a significant feature of greatly decreasing the risk that information leaks to a third party. The same effects are obtained when the confidential communication is applied to a pilot signal in space division used in MIMO or reference signal for phase or amplitude in communications.

In the foregoing, antenna coefficients (weighting coefficients) are calculated corresponding to propagation characteristics, and the calculation method will be described below. A n×m matrix H is described as an example (in other words, the number of transmission antennas is n, and the number of reception antennas is m). All the matrixes H are expressed as follows using orthogonal matrixes U (m×m) and V (n×n) and singular value matrix S (n×m):

$$U \times S \times V' = H \tag{31}$$

V' represents Hermitian transpose.

Assuming thus decomposed orthogonal matrix U (or V) to be arranged m(n) m×1 (1×n) singular value vectors which are referred to as respectively u1 to m (v1 to n). In this case, u1 to m (v1 to n) are:

$$ux \times H = \lambda x (\text{or, } H \times vx = \lambda x) \tag{32}$$

λx is a singular value corresponding to ux(vx). In this case, the matrix H representative of propagation characteristics is subjected to singular value decomposition, and each element of characteristic vector ux with singular value λx of 0 (λx=0) is used as an antenna coefficient (weighting coefficient), whereby it is possible to control reception power at the reception antenna end to be 0.

More specific descriptions are given with reference to FIG. 44. Since the configuration in FIG. 44 is almost the same as that in FIG. 9 but does not perform vector quantization, coding section 105 and codebook 905 are eliminated from the configuration in FIG. 9. Only differences from FIG. 9 are described below. Propagation estimating section 103 calculates propagation characteristics (propagation matrix H) between terminals from the received signal to output to coefficient calculating section 903. Coefficient calculating section 903 performs singular value decomposition on propagation matrix H, where it is assumed that singular value vectors vx (x=1, . . . , p) have the singular value λx≠0, and that singular value vectors vx (p+1, . . . , n) have the singular value λx=0. For convenience of description, each of the former vectors is referred to as singular value vector, while each of the latter vectors is referred to as a zero vector. All the vectors are stored in buffer 904 temporarily. Meanwhile, modulation section 906 receives communication information 1 to k to respectively output modulated signals 1 to k. Weighting section 907 receives the singular value vectors and modulated signals, and multiplies in vector a modulated signal corresponding to the communication information targeted for confidentiality (herein, assuming communication information 1 and modulated signal 1) by either of singular value vectors (v1 to vp) (for example, one having the maximum singular value or vector obtained by adding some or all the vectors). Further, in the case of increasing the confidentiality, the section 907 multiplies in vector communication information (herein, assuming communication information 3 and modulated signal 3) unnecessary for the receiving apparatus by either of zero vectors (vp+1 to vn) (some or all of the added vectors) among singular value vectors held in buffer 904. The modulated signal vectors resulting from the vector calculation are input to transmitting section 908. Transmitting section 908 adds modulated signal vectors for each antenna signal sequence to perform frequency conversion, and the resultant signals are transmitted via antenna 901.

Thus transmitted signals are received in the receiving apparatus via the propagation space, and expressed as follows using the characteristic (propagation matrix H) of the propagation space and modulated signal Smod:

$$H \times Smod \times vx = \lambda x \times Smod \tag{33}$$

As can be seen from equation (33), modulated signal 1 multiplied by the singular value vector can arrive at the receiving apparatus. Meanwhile, modulated signal 3 is multiplied by the vector with λx of 0 (λx=0), and therefore, cannot arrive at the receiving apparatus. In other words, the receiving apparatus is capable of demodulating only demodulated signal 1 by demodulating the received signal without performing particular processing.

The foregoing is equivalent to performing null control as described in FIGS. 42, 71 and 76. In other words, the figures indicate that singular decomposition is carried out when implementing confidential communications with the null control, and that it is possible to implement the communication readily by using thus obtained singular value vectors.

When a third apparatus that is not the transmitting/receiving apparatus receives these signals, since the propagation matrix H' that is the propagation characteristic shared by the transmitting apparatus is different, and equation (33) is not obtained. In other words, modulated signals 1 and 3 are given by correlation of propagation matrix H' and the singular value vector, and it is impossible to separate modulated signal 1 and 3.

Further, with respect to a modulated signal (assuming herein communication information 2 and modulated signal 2) associated with the communication information that is not confident, as coefficients multiplied in weighting section 907, coefficients except singular value vector held in buffer 904 (or a constant vector such as [1,1, . . . 1]) are used. In this case, since coefficients different from the singular value vector are provided, equation (33) is not obtained, and the signals are received in the receiving apparatus.

As described above, the transmitting apparatus decomposes a modulated signal to transmit by the propagation state (or propagation parameter) formed between the transmitting apparatus and the terminal that is a communicating party, and transmits the decomposed signals from antennas, and the signals form the original modulated signal at the receiving end by spatial synthesis. At this point, the method of decomposing a modulated signal includes using coefficients (values corresponding to elements of a characteristic vector of equation (32)) introduced from propagation parameters as antenna coefficients (or weighting coefficients), and multiplying the original modulated signal by the antenna coefficients. In this way, since a result of spatial synthesis is different in the third terminal that cannot share the propagation parameters, and the third terminal cannot perform accurate demodulation, thus resulting in confidentiality.

Further, it is indicated that selective communications are available even in a receiving apparatus that does not have a particular configuration for the communication system. In other words, the present invention has a remarkably significant feature that security communication can be implemented only by changing the transmitting apparatus.

Thus, according to the communication apparatus and communication system of Embodiment 18, in addition to the effects of Embodiments 1 and 17, since a modulated signal to transmit is decomposed corresponding to the propagation state and the signals are transmitted from different antennas, a third terminal with a different propagation state has a different result in spatial synthesis, and cannot demodulate the signals properly, thereby ensuring the high security. Further, in Embodiment 18, superimposing the confidential information and pseudo information on the same frequency at the same time enables communications only in a target receive position, and provides the communication method with high confidentiality.

In addition, while Embodiment 18 has the premise that antennas Ar1 and Ar1 are connected to the same terminal, the present invention is not limited to such a case. Antennas Ar1 and Ar2 may be connected to different terminals (for example, terminals 1 and 2). It is thereby possible to perform secure communications concurrently with terminals land 2, and to construct efficient systems.

Embodiment 19

It is a feature of Embodiment 19 to specify a terminal using the propagation characteristic superimposed on a received signal.

Figure 46:
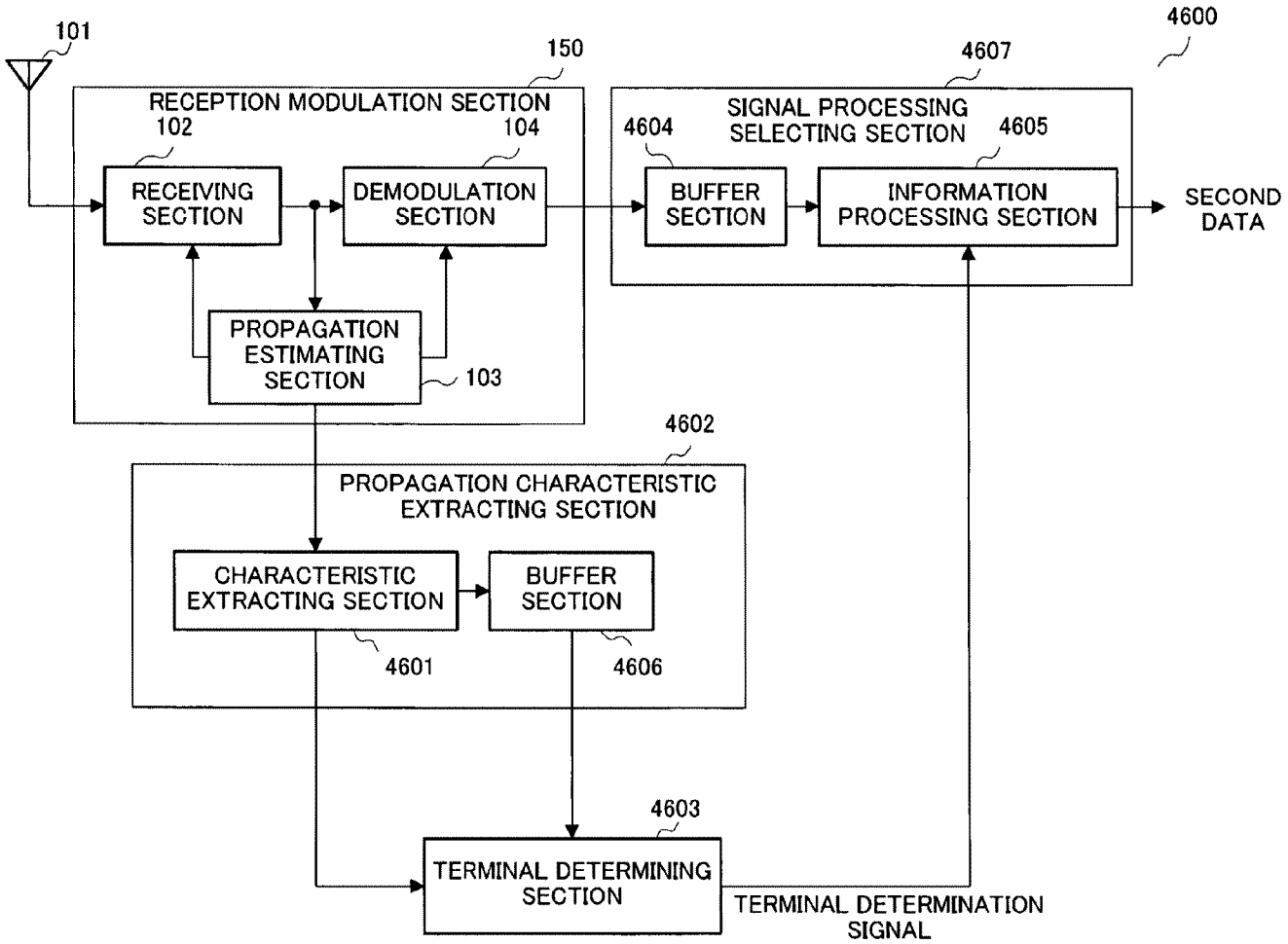
FIG. 46 is a block diagram illustrating a configuration of a communication apparatus according to Embodiment 19 of the present invention.

FIG. 46 illustrates a configuration of receiving apparatus 4600 according to Embodiment 19. The same sections as in FIG. 1 are assigned the same reference numerals as in FIG. 1, and descriptions thereof are omitted.

Propagation characteristic extracting section 4606 is comprised of characteristic extracting section 4601 and buffer section 4602. Characteristic extracting section 4601 extracts a characteristic of the propagation state from the propagation estimation information input from propagation estimating section 103, and outputs the characteristic extraction information to buffer 4602 and terminal determining section 4603. As buffer information, buffer section 4602 outputs the characteristic extraction information corresponding to the stored propagation state to terminal determining section 4603.

Signal processing selecting section 4607 is comprised of buffer section 4604 and information processing section 4605.

Characteristic extracting section 4601 receives the propagation information obtained from the received signal, and encodes the information to extract the characteristic. Examples of elements extracted as a characteristic include a phase characteristic, gain characteristic, polarization characteristic, propagation delay characteristic, delay dispersion characteristic, and angle profile by direction-of-arrival estimation. It may be possible to sample the characteristic obtained from use one or a combination of the elements as an analogue value. In this case, it is not required particularly to extract the characteristic, and determination in terminal determining section 4603 is obtained by comparing analogue information, enabling determination with high precision accuracy. Meanwhile, examples of the characteristic extracting method include transform typified by Fourier transform, discrete cosine transform and wavelet transform, filtering using a filter and multiband filter and coefficient extraction based on linear prediction. Further, characteristic extracting section 4601 may have the same configuration as that of coding section 105 as shown in FIG. 1 or others. By using vector quantization as shown in FIG. 4, coding section 105 is capable of representing various signal sequences as a single code, resulting in a feature of facilitating comparison in determining a terminal.

Buffer section 4604 temporarily stores the extracted characteristic extraction information, and outputs the stored characteristic extraction information to terminal determining section 4603 as the buffer information at predetermined timing.

Terminal determining section 4603 (determining means) compares the characteristic extraction information input from characteristic extracting section 4601 with the buffer information input from buffer section 4606 to determine matching, and outputs the determination result to information processing section 4605 as a terminal determining signal (first data). Terminal determining section 4603 outputs a final terminal determination result as a terminal determination signal in a binary signal, using the propagation information obtained for a predetermined time. In this case, by using multi-valued signal such as 0 to 9 instead of using a binary signal such as 1 and 0, it is possible to construct a more flexible system. Further, when characteristic extracting section 4601 extracts coefficients, terminal determining section 4603 obtains the Euclidean distance between obtained coefficient sequences, and when the value is less than or equal to a predetermined value, determines that a terminal is the same terminal, while determining that a terminal is a different terminal, when the value is not less than the predetermined value. When a determination is not stable due to noise or fluctuations in propagation characteristic in making a determination, a method is considered of storing determination results for a predetermined period, and making a determination after averaging the results for a fixed period. In this case, it is considered providing the determination result with a range of 0 to 9 to be a likelihood value, instead of indicating the result by binary, 0 or 1, for representing the same or difference. In particular, since making a strict terminal determination causes an erroneous determination to tend to occur, stable terminal determination is carried out by making a determination based on an average of likelihood values obtained for a predetermined period. Thus, terminal determining section 4603 monitors a currently communicating terminal based on the estimated propagation environment, and observes so as to prevent the confidential information from leaking, for example, by the communicating terminal being switched maliciously before being aware.

Buffer section 4604 temporarily stores received data input from demodulation section 104.

Information processing section 4605 switches the content of information processing from the received data sequence stored and input in/from buffer section 4604 and the terminal determination result input from terminal determining section 4603. For example, among received data, the information greatly dependent on the terminal such as privacy information, charging information and confidential information may be all discarded as error processing without being processed. Further, the fact is transmitted that access from another terminal is determined from the terminal determination result, and processing for security measure is carried out.

The operation of receiving apparatus 4600 will be described.

Descriptions are given herein assuming that a communication terminal targeted for terminal specification is communication terminal 1, and the communicating party is communication terminal 2. The case is only described that communication terminal 2 transmits signals, because the operation of terminal registration and terminal determination is performed on signals transmitted from communication terminal 2.

Communication terminal 1 performs the terminal registration operation for communication terminal 2.

Communication terminal 1 receives a reference signal from communication terminal 2 using antenna 101, and receiving section 102 receives the RF signal and output a received signal. Propagation estimating section 103 receives the received signal, and estimates the propagation characteristic from the received signal and reference signal to output the propagation information. Propagation characteristic extracting section 4606 receives the propagation information, and characteristic extracting section 4601 outputs the characteristic extraction information. The characteristic extraction information is stored in buffer section 4604 as information for specifying communication terminal 2 that is a communicating party. The terminal registration operation is thus completed.

Secondly, communication terminal 1 communicates information with communication terminal X, while determining whether communication terminal X is the registered terminal (communication terminal 2).

Communication terminal 1 receives a communication signal from communication terminal X in antenna 101, and receiving section 102 receives the RF signal, and outputs a received signal. Propagation estimating section 103 receives the received signal, estimates the propagation characteristic from the received signal, and outputs the propagation information. The propagation information is output to characteristic extracting section 4601, receiving section 102 and demodulation section 104. Based on the propagation information, receiving section 102 controls the RF signal to be the received signal in an optimal state, while performing frequency correction, time correction, gain correction, etc. Demodulation section 104 receives the received signal, performs detection and demodulation while performing frequency/phase correction and time correction based on the propagation information, and outputs a received data sequence.

Figure 47:
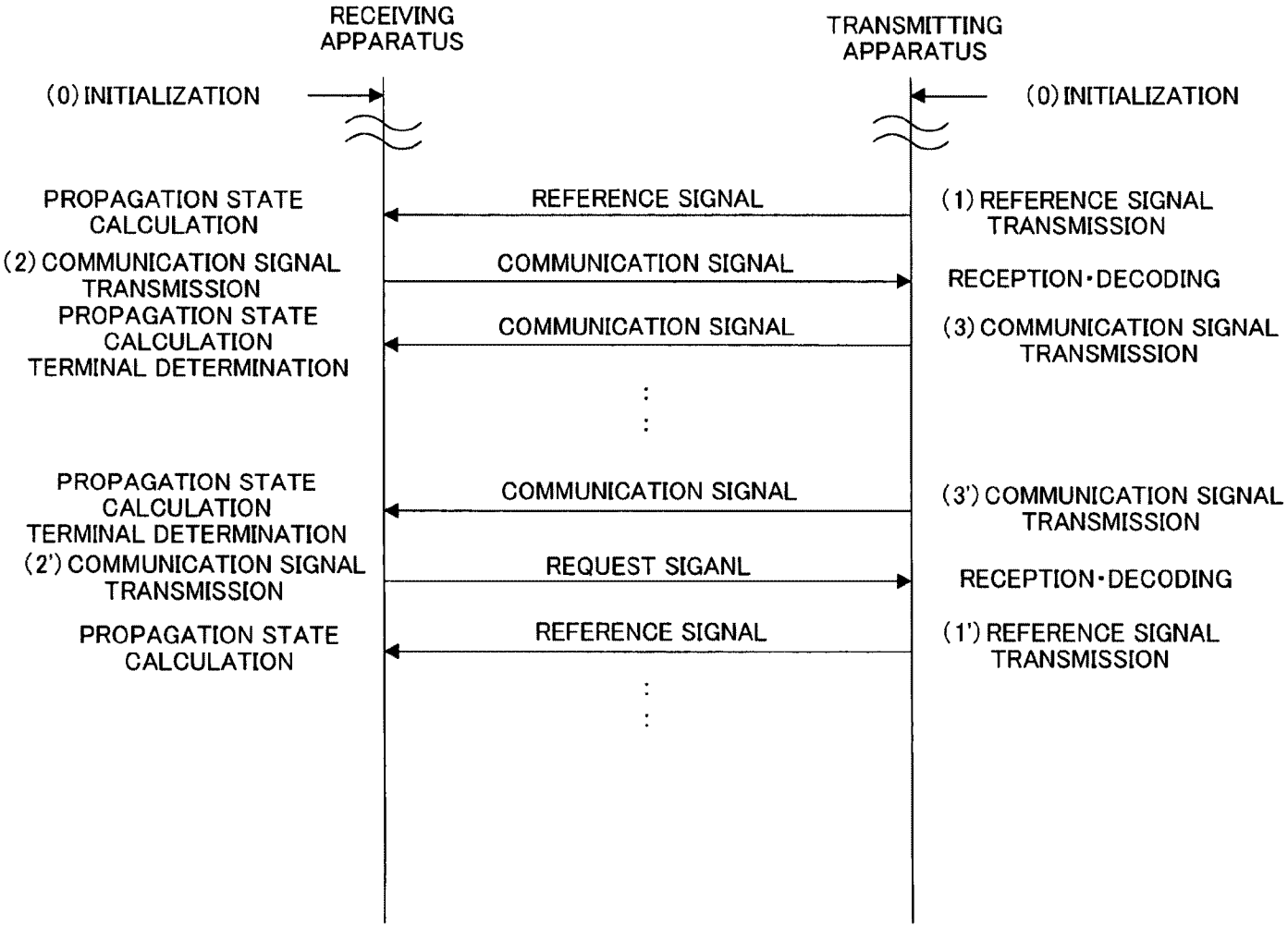
FIG. 47 is a sequence diagram illustrating the operation of the communication apparatus according to Embodiment 19 of the present invention.

Communication procedures in the case of making a terminal determination will be described with reference to FIG. 47. It is assumed herein that a base station performs terminal specification (receiving apparatus in FIG. 47), and that a terminal (transmitting apparatus in FIG. 47) undergoes the terminal specification.

(0) Base Station and Terminal: Initialization

After the power is supplied or upon receiving a specific signal, the base station and terminal are both set for the initial state. At the same time, states such as the frequency and time-synchronization are set according to predetermined procedures.

A predetermined time later after finishing the initial operation, the receiving apparatus transmits control information in a control signal at predetermined time intervals.

Meanwhile, the base station starts a search for the control signal after finishing the initial operation. When receiving the control signal transmitted from the base station, the terminal detects the time, frequency, etc. for synchronization with the time, frequency, etc. that the system has (system synchronization). After the system synchronization is finished properly, the terminal transmits a registration request signal for notifying the base station of existence of the terminal. In response to the registration request from the terminal, the base station transmits a registration permission signal and thus performs registration permission of the terminal.

(1) Terminal: Transmission of Reference Signal

The terminal outputs a reference signal for propagation estimation performed in the base station as a reference signal. Specific operation is the same as the operation in the method as described in Embodiment 1 or others. The base station extracts a characteristic from the propagation information obtained in the communication, and registers the characteristic information of the propagation characteristic obtained as the information for the terminal specification, together with the terminal information.

(2) Base station: Transmission of Communication Signal

The base station starts the communication and transmits a communication signal. When the encrypted communication is carried out, the base station may transmit an encrypted signal using the method as described in the other Embodiment.

When the terminal receives the communication signal, reception modulation section 150 demodulates the received signal into demodulated information, and outputs demodulated data. When encryption is performed in the communication, decoding is performed using the method as described in the other Embodiment.

(3) Terminal: Transmission of Communication Signal

The terminal transmits a communication signal. The base station estimates the propagation characteristic from the received signal from receiving section 102, and extracts the characteristic information from the propagation information. At the same time, the base station demodulates the received signal, and outputs received data. By comparing the characteristic information with the characteristic information registered in (1), a determination is made on the terminal. The received data is output together with right/wrong information indicative of a final determination result having thus obtained determination. Signal processing selecting section 4607 receives the received data and terminal determination signal, and stores the received data in buffer section 4604 for a predetermined time. Meanwhile, using the propagation information obtained for a predetermined time, terminal determining section 4603 outputs the final terminal determination result as a terminal determination signal in a binary signal. Information processing section 4605 switches the content of the information processing from a received data sequence stored in buffer section 4604 and terminal determination result. For example, among received data, information greatly dependent on the terminal such as privacy information, charging information and confidential information may be all discarded as error processing without being processed. Further, the fact is transmitted that access from another terminal is determined from the terminal determination result, and processing for security measure is carried out.

Subsequently, encrypted communications and general communications in (2) and (3) are repeated.

By performing communications based on the procedures as described above, it is possible to check a received signal and a terminal that outputs the signal. In particular, the method of making a terminal determination does not need procedure (2), and can be implemented only by procedures (1) and (3).

Further, it is considered changing the subsequent information processing operation based on the determination result in the operation in (3). By switching the processing based on the determination result, it is possible to maintain the safety of processing to a higher extent, and to prevent data fraud from being performed by a terminal that is not authenticated properly. Therefore, it is possible to construct an apparatus and system with distinctly high security.

The characteristic of a propagation path formed between communication terminals is determined by positions of the terminals and layout around the terminals, and it is not possible to change the characteristic to an optional one. Although the method is considered of using a plurality of antennas to control propagation, since it is impossible for a third terminal to measure the propagation path characteristic and it is difficult to predict the characteristic, it is extremely difficult to pretend as the communication terminal by operating the characteristic. Thus, the terminal specifying method using the present invention is capable of being implemented with extreme simplicity and with high accuracy.

Further, when a plurality of antennas 101 and receiving sections 102 is used and a terminal is determined by obtaining characteristics of two or more propagation paths from two or more received signal sequences, the propagation information of the terminal becomes diversity, enabling the determination to be made with higher accuracy.

The aforementioned method has a possibility that an erroneous determination result causes a significant loss to occur in communications. In order to relieve such a loss to secure stable communications, it is considered performing reconfirmation when the terminal determination results in a negative determination. The procedures will be described with reference to FIG. 47.

(3') Terminal: Transmission of Communication Signal

The base station makes a terminal determination using the propagation information obtained from the communication signal transmitted from the terminal (herein, it is assumed that a result is obtained that is different from the information registered in (1)). The base station determines that the information is from a terminal that is different from the registered terminal as a result of the determination, and outputs a negative terminal determination signal together with the received data.

(2') Base Station: Request Signal

To reconfirm the terminal according to the result of terminal determination, the base station transmits an authentication request signal to the terminal as a request signal.

(1') Terminal: Transmission of Reference Signal

Upon receiving the request signal, the terminal performs the operation in response to the signal. Herein, the terminal transmits the request signal again. Following procedures are the same as procedures (1) to (3). By performing the aforementioned procedures, when an erroneous determination occurs due to a variation in propagation environment, performing reconfirmation enables the stable communication to be provided.

Further, when the determination result is different, it is considered that signal processing selecting section 4607 in FIG. 46 suspends the processing of information processing section 4605, and after awaiting the re-determination result of procedure (1') and subsequent procedures, determines processing procedures. In order to cope with variations in propagation environment, it is considered that the base station updates the registered terminal specification information at predetermined intervals, independently of procedures (3') to (1').

Further, inserting a reference signal into part of communication signal of (3) and (3') enables the base station to perform stable propagation estimation, and as a result, the base station is capable of obtaining a stable terminal determination result. At this point, the reference signal does not need to be the same reference signal as used in (1), and may be replaced with a pilot signal or known signal sequence is generally used in communications.

As described above, for example, in a session during a period of time the communication is started and then finished, the present invention enables the information during a period of time authentication is finished between the base station and terminal and then the session finishes to be provided with efficiency. There is a significant feature that it is possible to prevent adverse effects from being imposed on the communication, for example, when another terminal transmits a fraud signal during the session in communicating the charged information via the internet.

In aforementioned descriptions, while a reference signal is used to estimate the propagation, any signal sequence is available as long as using the sequence enables error detection under the communication environment. As such a signal sequence, there are known a pilot signal, known signal, silk word signal, synchronization signal, synchronization word, preamble signal, midamble signal, postamble signal, reference signal, and unique word signal. Alternatively, it is possible to use a signal sequence sufficiently protected in demodulation error, and examples include a PSK signal sequence included in a signal sequence communicated in M-ary modulation scheme and a signal sequence coded in a scheme with high error correcting capability.

Further, it is considered inserting ID for specifying a terminal into part of communications from the terminal to base station, and using the value and result from the propagation information.

Thus, according to the communication apparatus and communication system of Embodiment 19, in addition to the effects of Embodiment 1, terminal determining section 4603 determines whether a terminal with which the apparatus is currently communicating is a desired communicating party from the propagation estimation value, and when the terminal is not a desired communicating party, switches the processing of received data to processing for not demodulating the received data, based on the terminal determination result. Therefore, it is possible to maintain a higher level of safety, and to prevent a terminal that is not authenticated properly from performing data fraud, enabling construction of apparatus and system with remarkably high security.

Embodiment 20

Figure 48:
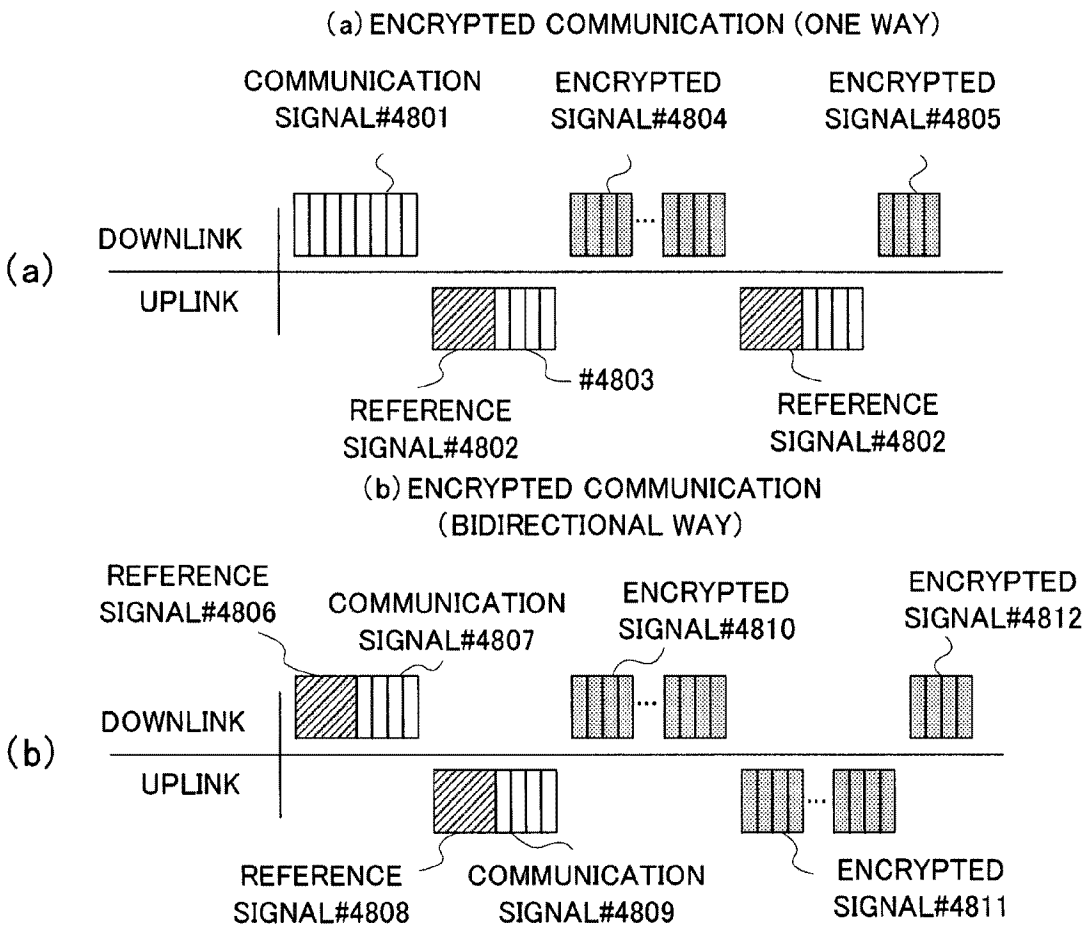
FIGS. 48(a) and 48(b) are views illustrating a frame structure of signal according to Embodiment 20 of the present invention.
Figure 49:
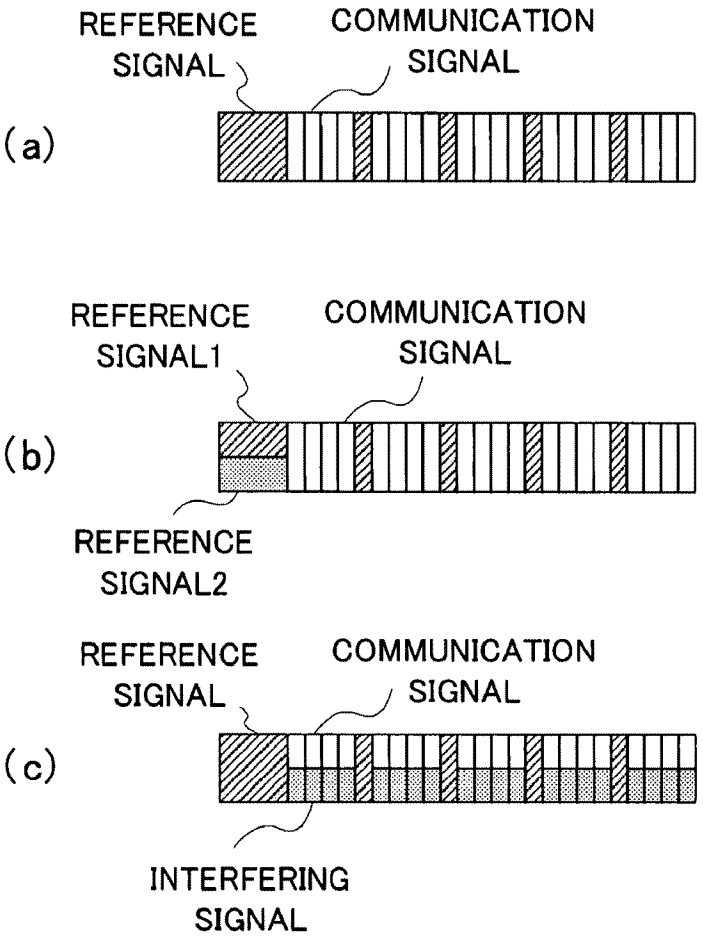
FIGS. 49(a), 49(b) and 49(c) are other views illustrating a frame structure of signal according to Embodiment 20 of the present invention.

FIGS. 48 and 49 are views illustrating a specific method of setting a communication frame in a system that multiplexes information on propagation parameters. In addition, the communication apparatus in Embodiment 20 has the same configuration as that in FIG. 7, and descriptions thereof are omitted.

For the sake of convenience, Embodiment 20 assumes an apparatus that transmits downlink signals as a base station, and that an apparatus that transmits uplink signals as a terminal to describe. FIG. 48 is a view to explain timings of uplink and downlink signals. FIG. 48(a) shows a case that secure information is communicated in one way, and FIG. 48(b) shows a case that secure information is communicated in bidirectional way. In addition, in Embodiment 20, the base station and terminal are assumed to have transmitting/receiving apparatus 700.

The case will be described first of communicating secure information in one way. In the case where the base station transmits general communication signal #4801 that is not encrypted to the terminal, the base station selects an encryption key corresponding to the propagation state based on reference signal #4802 when the terminal transmits communication signal #4803 including reference signal #4802 to the base station over the uplink, and transmits to the terminal encrypted communication signal #4804 encrypted using the selected encryption key common to the terminal. The terminal transmits a communication signal including reference signal #4802 to the base station at predetermined intervals. Whenever receiving reference signal #4802 transmitted from the terminal, the base station checks whether or not the encryption key is changed, and after the check, transmits encrypted signal #4805 to the terminal.

The case will be described next of performing bidirectional secure communications. The base station transmits communication signal #4807 including reference signal #4806 to the terminal. The terminal transmits communication signal #4809 including reference signal #4808 to the base station. The base station having received reference signal #4808 selects an encryption key corresponding to the propagation state based on reference signal #4806, and transmits encrypted signal #4810 encrypted using the selected encryption key to the terminal. Meanwhile, the terminal having received reference signal #4806 selects an encryption key corresponding to the propagation state based on reference signal #4806, and transmits encrypted signal #4811 encrypted using the selected encryption key to the base station. Then, the base station transmits encrypted signal #4812 to the terminal.

Timing at which the reference signal is transmitted will be described with reference to FIG. 49. FIG. 49 shows an example of burst structure.

In a frame structure in FIG. 49(a), a burst is comprised of a communication signal and reference signal. As the reference signal, for example, a pilot signal is used. By configuring in this way, it is possible to concurrently transmit the signal to estimate the propagation characteristic and the reference signal to transmit data, and to implement the efficient frame structure. Further, by configuring part or all of the reference signal using a signal with two or more consecutive symbols, it is possible to use symbols with a small variation in propagation characteristic to estimate in estimating the propagation characteristic, and to implement propagation estimation with high accuracy. Further, by arranging reference signals at predetermined intervals over the entire burst, it is possible to compensate for fading distortion based on the reference signal even when the transmission characteristic varies greatly in a burst due to fast fading, and it is thereby possible to implement transmission with high quality. Under such fast fading environment, it is difficult to implement communications using the propagation characteristic formed between terminals as described in each Embodiment, and therefore, it is possible for each terminal to switch between whether or not to perform communications using the propagation characteristic while detecting fast fading.

In a frame structure in FIG. 49(b), part or all of reference signals in the frame structure as illustrated in FIG. 49(a) are reference signals 1 and 2. With the frame structured in this way, the terminal (terminal 1) that transmits the burst to the terminal (terminal 2) targeted for transmission performs communications under control such that the reception power of reference signal 1 is larger than the reception power of reference signal 2 in a receive point using the propagation characteristic, and it is thereby possible for terminal 2 targeted for transmission to perform accurate demodulation by determining reference signal 1 as a reference of communication signal from the difference in reception power, while it is impossible for another terminal to perform accurate demodulation because reception power is different with position, thus providing an advantage. Further, in the case where terminal 2 has n antennas, it is considered multiplexing reference signals 1 to n for each antenna. In this way, superimposing the information on propagation parameters of reference signals 1 to n enables highly advanced communications. Further, when m terminals 2 exist, performing spatial multiplexing on communications to the terminals enables increases in spectral efficiency. (In this case, the relationship between n and m needs n>m.) It is thereby possible to construct the system with high spectral efficiency.

In a frame structure in FIG. 49(c), part or all of communication signals in the frame structure as illustrated in FIG. 49(a) are communication signals 1 and 2. With the frame structured in this way, terminal 1 communicates with terminal 2 under control such that the reception power of communication signal 1 is larger than the reception power of communication signal 2 in a receive point using the propagation characteristic, and it is thereby possible for terminal 2 targeted for transmission to perform demodulation by determining communication signal 1 from the difference in reception power, while it is impossible for another terminal to perform accurate demodulation because reception power is different with position, thus providing another advantage. The communication signal may be referred to as data, data symbol, modulated symbol, data modulated symbol, free symbol or user symbol, and indicates a symbol modulated by communication data.

Thus, according to the communication apparatus and communication system of Embodiment 20, in addition to the effects of Embodiment 1, transmission timing of reference signal is varied or a reference signal is transmitted while selecting an uplink channel or downlink channel, and it is thereby possible to transmit and receive efficiently encrypted signals.

In addition, in FIGS. 48(b) and (c), although Embodiment 20 notes the difference in reception power, the reception power is only an example of propagation parameter. It is considered superimposing information on a difference in propagation parameter between communication signal 1 (reference signal 1) and communication signal 2 (reference signal 2), or calculating a difference in propagation parameter based on communication signal (reference signal 1) in terminal 2 that receives communication signal 1 and communication signal 2 and obtaining the result as part or all of the demodulation result. Further, Embodiment 20 describes the case of multiplexing reference signals in FIG. 49(b) and the case of multiplexing communication signals in FIG. 49(c). However, it is apparently possible to multiplex a reference signal and communication signal.

Embodiment 21

Figure 51:
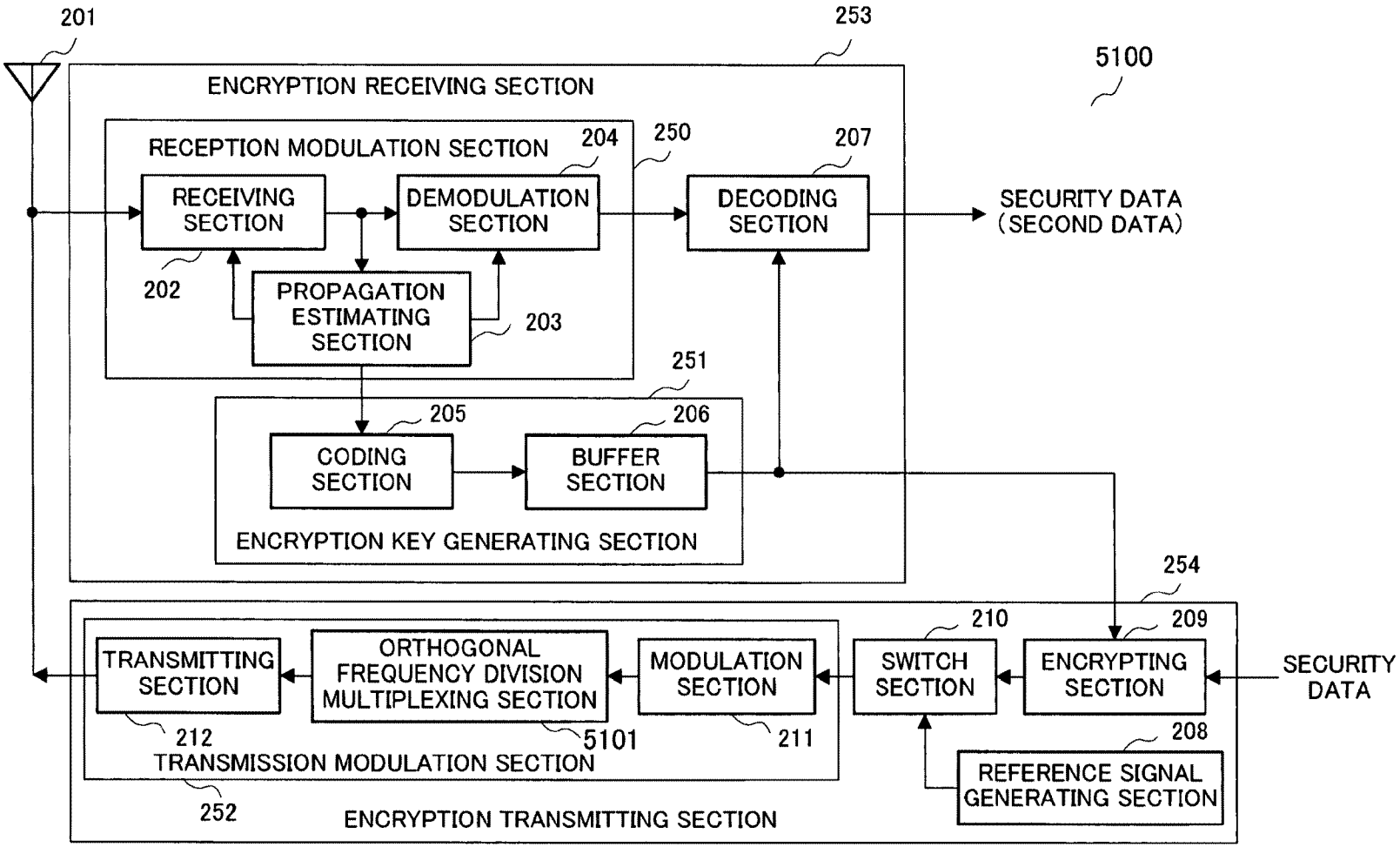
FIG. 51 is a block diagram illustrating a configuration of a communication apparatus according to Embodiment 22 of the present invention.

FIG. 51 is a view illustrating a specific method of setting a communication frame in a system that multiplexing information on propagation parameters. In addition, a communication apparatus in Embodiment 21 has the same configuration as that in FIG. 36, and descriptions thereof are omitted.

FIG. 50 shows an example of frame structure of code division multiplexing (CDM).

A frame in FIG. 50(a) is comprised of a pilot signal and data signal. The pilot signal indicates references of phase and amplitude of a data signal. The receiving apparatus uses the information of phase and amplitude obtained from the pilot signal as a reference in demodulating a data signal, and calculates propagation states such as synchronization of time and frequency and multipath state from the reference signal. Data 1 to n (n is an integer of 1 or more) is multiplexed on a data signal in code division multiplexing. It is assumed herein that data 1 to n is respectively assigned code 1 to m. Terminal 1 controls the propagation parameter (herein, assumed as reception power) for data 1 to n corresponding to the estimated propagation characteristic. At this point, when weighing is performed so as to superimpose information on reception power, signals are received at the receiving end of terminal 2 under the condition that reception power of each of data 1 to n is controlled. Since the reception power is obtained as amplitude of signals obtained by despreading with codes 1 to m, it is possible to detect the superimposed information from the amplitude information. Herein, it is assumed that the number of items of data to multiplex is n, the number of kinds of codes is m, and that n is larger than or equal to m (n>=m). Further, setting the reception power that terminal 1 controls at 0 enables communications of n>m. Further, when m is 1 (m=1), it is not necessary to perform code division multiplexing.

A frame in FIG. 50(b) is different from the frame structure in FIG. 50(a), and has a feature that pilot signals are multiplexed on data 1 to n in code division multiplexing. In FIG. 50(b), it is possible to superimpose information on propagation parameters as in the frame structure in FIG. 50(a), and it is also considered controlling a phase and amplitude of a pilot signal.

In a frame in FIG. 50(c), pilot signals 1 to m are multiplexed on data 1 to n by code division multiplexing. By adopting this structure, maximum m pilot signals can be controlled independently, and for example, data 1 to j is modulated based on a phase and amplitude of pilot signal 1, while data j+1 to k is modulated based on a phase and amplitude of pilot signal 2, whereby it is possible to construct an intelligent communication system. In this way, it is possible to communicate with a plurality of reception terminals using respective pilot signals and data signals corresponding to the pilot signals, and the pilot signals are controlled to be proper signal references respectively at the receiving ends in reception terminals each as a communicating party. There is obtained a significant feature that the reception terminals cannot demodulate data signals of the other reception terminals even when receiving and trying to demodulate the signals. The communication signals may be referred to as data, data symbol, modulation symbol, data modulation symbol, free symbol or user symbol, and indicates a symbol modulated by communication data.

Thus, according to the communication apparatus and communication system according to Embodiment 21, in addition to the effects of Embodiment 1, since a pilot signal and data are subjected to code division multiplexing, it is possible to transmit and receive encrypted signals resistant to interference.

In addition, in Embodiment 21, a pilot signal is used to be reference for a phase and amplitude of a data signal. However, the present invention is not limited to the pilot signal, and allows any reference signal besides the pilot signal to be selected.

Embodiment 22

FIG. 51 is a diagram illustrating a configuration of transmitting/receiving apparatus 5100 that is a communication apparatus according to Embodiment 22 of the present invention. Transmitting/receiving apparatus 5100 has orthogonal frequency division multiplexing section 5101 in transmitting/receiving apparatus 200 according to Embodiment 1 as illustrated in FIG. 2. In addition, the same sections as in FIG. 2 are assigned the same reference numerals as in FIG. 2, and descriptions thereof are omitted.

Switching section 210 switches between encrypted security data output from encrypting section 209 and a reference signal output from reference signal generating section 208 so that desired subcarriers are assigned to transmission signals subjected to processing of orthogonal frequency division multiplexing in orthogonal frequency division multiplexing section 5101 described later.

Orthogonal frequency division multiplexing 5101 performs the processing of orthogonal frequency division multiplexing on a transmission signal input from modulation section 211 to output to transmitting section 212. In other words, orthogonal frequency division multiplexing section 5101 performs inverse fast Fourier Transform on the transmission signal input from modulation section 211, thereby converts parallel data into serial data, and outputs the resultant to transmitting section 212. Transmission signals subjected to the processing of orthogonal frequency division multiplexing are assigned to subcarriers.

Figure 52:
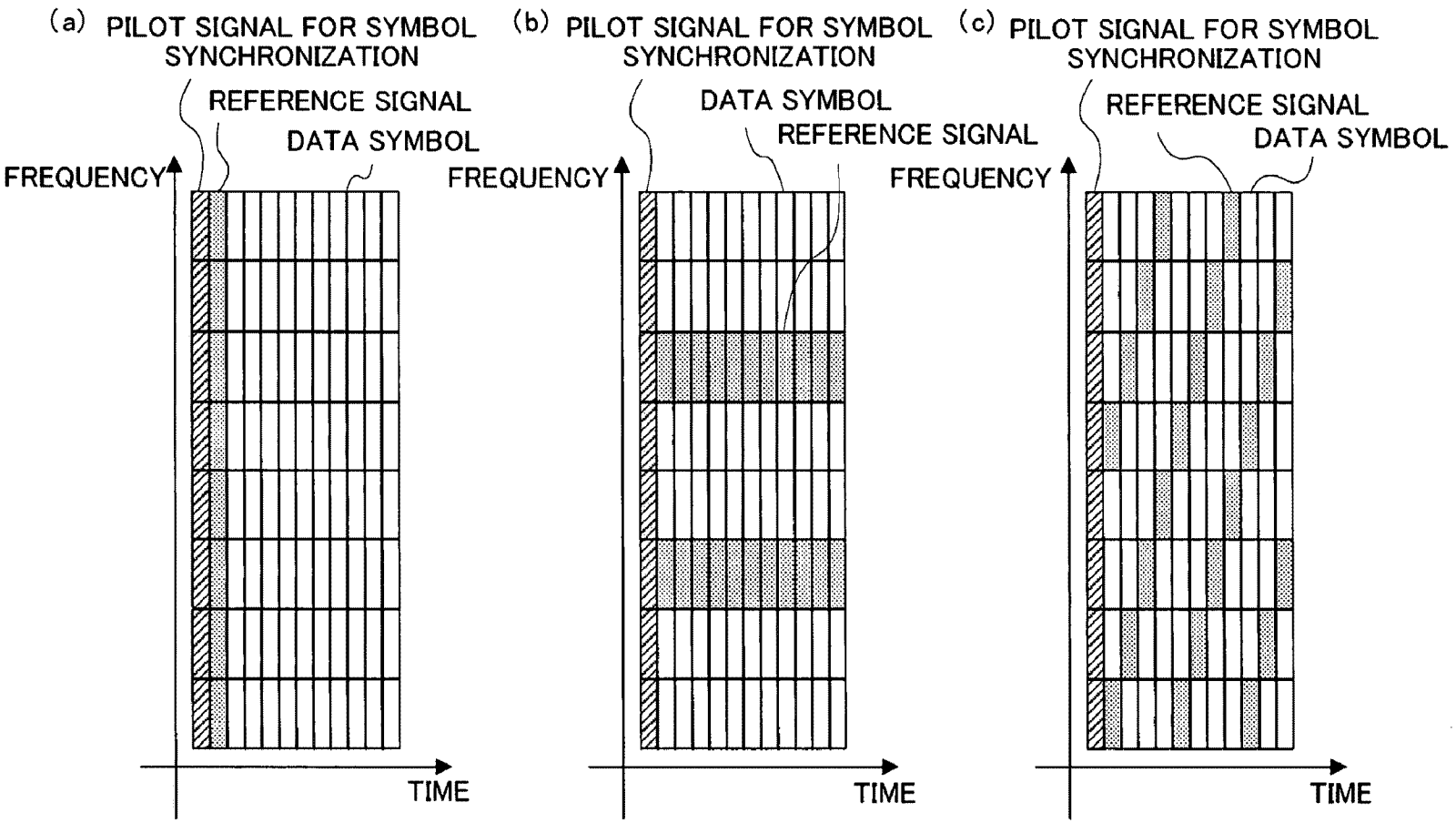
FIGS. 52(a), 52(b), and 52(c) are views illustrating a frame structure of signal according to Embodiment 22 of the present invention.

FIG. 52 shows an example of frame structure of orthogonal frequency division multiplexing (OFDM). The vertical axis indicates the frequency, and the horizontal axis indicates the time. A square indicates a subcarrier of a symbol.

A frame shown in FIG. 52(a) is comprised of a pilot signals for symbol synchronization, reference signal for data demodulation, and data signal for data transmission. The pilot signal for synchronization is used to acquire the synchronization in time and frequency of the OFDM symbol. There are known a null symbol, short word symbol and long word symbol. Meanwhile, the reference signal for data demodulation is inserted to correct frequency characteristics, propagation delay and phase rotation generated by propagation distortion, and to provide a reference for a phase and amplitude of a data signal to be modulated. Inserting the reference signal into the frame enables stable communications in environments where the propagation environment varies and/or the delay profile varies. According to the present invention, by transmitting the reference signal corresponding to the propagation characteristic while controlling the phase and amplitude at the receiving end, since an accurate reference signal cannot be obtained in places except the set receiving end, it is difficult to perform accurate modulation, resulting in a significant feature.

A frame in FIG. 52(b) is comprised of a pilot signal for symbol synchronization, reference signal for data demodulation and data signal, as in the frame structure in FIG. 52(a). As distinct from the frame structure in FIG. 52(a) where a reference signal in transmitted in a specific symbol, part of all the symbols are reference signals, and it is thereby possible to vary the reference signal corresponding to the symbols. In other words, control coefficients using the propagation characteristic are varied in switching symbols to vary the phase and amplitude of the reference signal every instant, and it is thereby possible to perform more complicated control, and to ensure high security in the security system. Further, the reference signal is a known signal, and therefore, can be used as a pilot signal, whereby correction can be performed for temporal variations in environment.

In a frame shown in FIG. 52(c), the reference signal in the frame structure in FIG. 52(b) is varied with time. Varying the position of the reference signal every instant has the effect of frequency hopping for the reference signal and data signal. In other words, even when power of a certain subcarrier is decreased by notch in the propagation state, since the signal pattern is switched, the effect caused by the notch is suppressed to be temporarily one. For example, when a portion of the reference signal is affected by the notch, the great effect is imposed on the data signal, and in frame structure 2, the effect lasts until the propagation state changes. However, in this structure, it is possible to limit the effect of the reference signal. The communication signal may be referred to as data, data symbol, modulated symbol, data modulated symbol, free symbol or user symbol, and indicates a symbol modulated by communication data.

Thus, according to the communication apparatus and communication system according to Embodiment 22, in addition to the effects of Embodiment 1, orthogonal frequency division multiplexing section 5101 performs the processing of orthogonal frequency division multiplexing on the encrypted data and pilot signal to assign subcarriers, and it is thereby possible to improve the spectral efficiency in transmitting encrypted signals.

Embodiment 23

In Embodiment 23, whether or not perform secure communications is determined by instructions from an upper layer.

Figure 53:
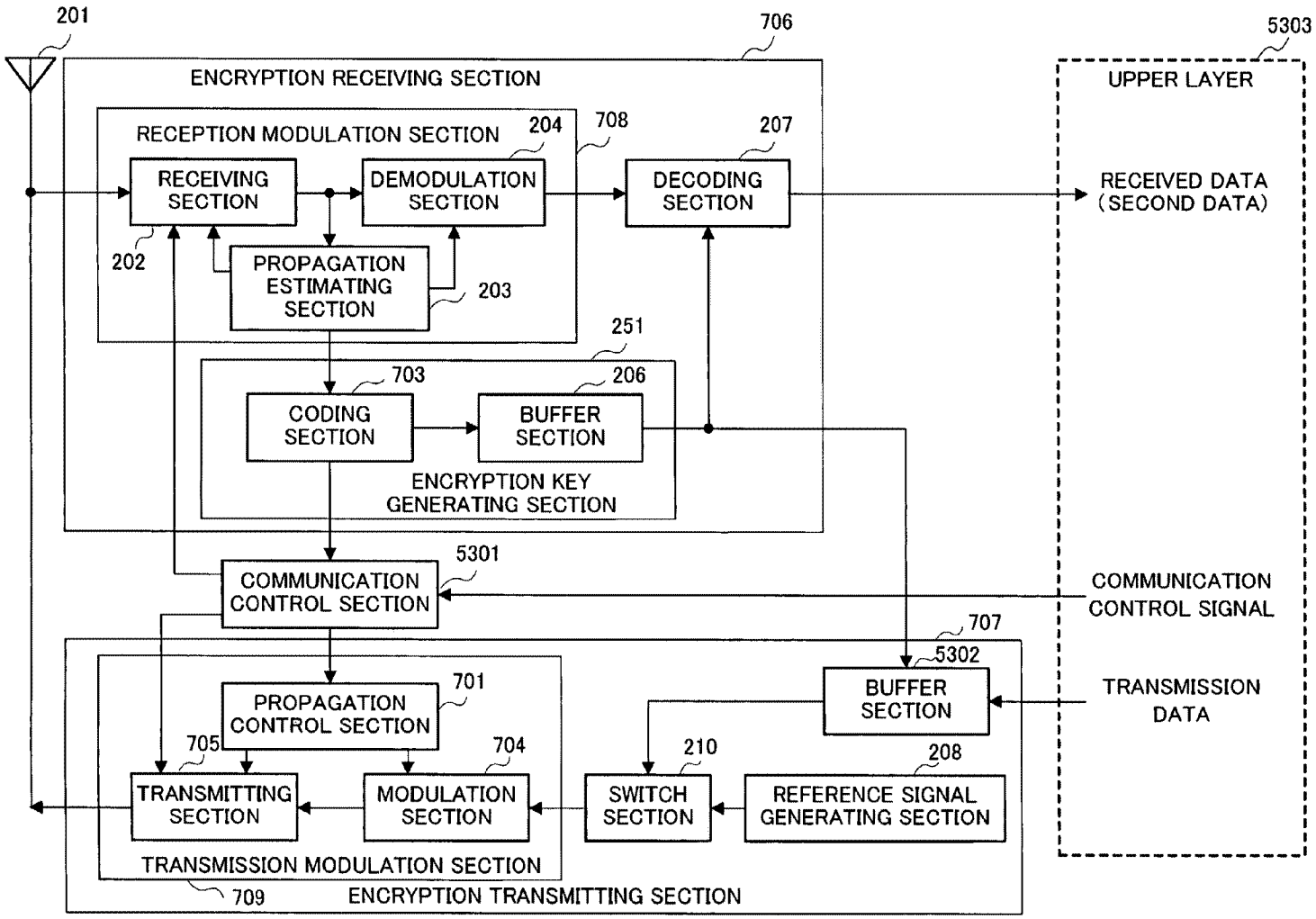
FIG. 53 is a block diagram illustrating a configuration of a communication apparatus according to Embodiment 23 of the present invention.

FIG. 53 is a diagram illustrating a configuration of a transmitting/receiving apparatus according to Embodiment 23. In addition, the same sections as in FIG. 7 are assigned the same reference numerals as in FIG. 7, and descriptions thereof are omitted.

Communication control section 5301 controls switching of communication methods and synthesis corresponding to the communication time. In other words, when communication control section 5301 receives a communication control signal to perform secure communications from upper layer 5303, the section 5301 outputs the propagation information input from coding section 703 to propagation control section 701, outputs a reception control section for performing secure communications to receiving section 202, and further outputs a transmission control signal for performing secure communications to transmitting section 705. Meanwhile, when communication control section 5301 receives a communication control signal not to perform secure communications, the section 5301 outputs a reception control section for not performing secure communications to receiving section 202, and further outputs a transmission control signal for not performing secure communications to transmitting section 704. With respect to the propagation control method, it is considered that the propagation control as described in the other Embodiments is performed when the secure communications are performed, and that the propagation control is not performed when conventional communication methods are performed, or the directivity is controlled as the propagation control to improve the communication quality.

Buffer section 5302 holds the transmission data temporarily to output to switching section 210.

Upper layer 5303 is either layer (among data link layer, network layer, transport layer, session layer, presentation layer and application layer) higher than L1 in communication layer structure. In the upper layer, received data and transmission data is input and output, and at the same time, when necessary, a communication method is selected and a control signal for the method is output as a communication control signal.

The communication method using the present invention is high in compatibility with conventional communication methods, and it is possible to switch between the communication method using the present invention and conventional communication method to use. In this way, corresponding to situations such as:

(1) whether a communication apparatus as a communicating party supports the security communication;
(2) whether the application supports the communication method of the present invention;
(3) whether the application needs the communication method of the present invention; and
(4) whether the user needs the communication method of the present invention, it is possible to switch between the conventional communication method and the communication method using the present invention. Further, as described in the other Embodiments, even when the security communication is required, it is possible to ensure the communication quality by protecting in security only important information to communicate.

The operation of transmitting/receiving apparatus as shown in FIG. 53 will be described below with reference to FIG. 54.

Figure 54:
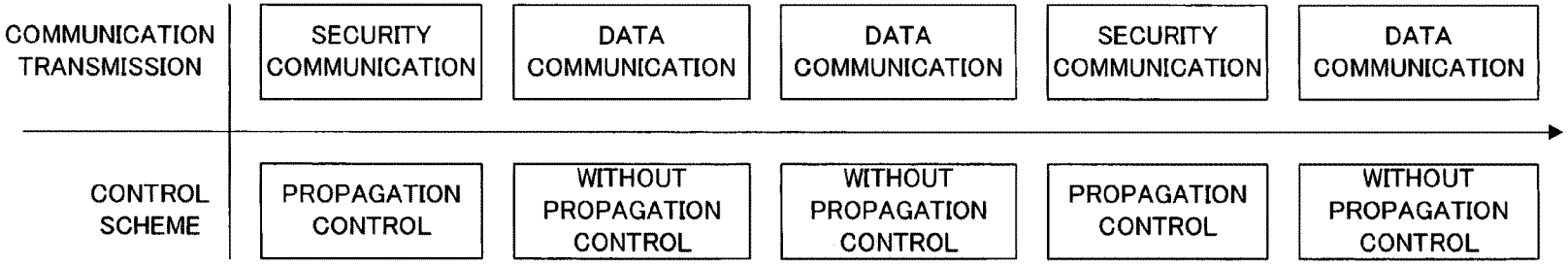
FIG. 54 is a view illustrating a frame structure of signal according to Embodiment 23 of the present invention.

When the upper layer section outputs a communication control signal so as to implement the security communication, the communication control section outputs transmission and reception control signals so as to perform propagation control for security communications ((1) and (4) in FIG. 54)). Meanwhile, when the upper layer section outputs a communication control signal so as not to implement the security communication, the communication control section outputs transmission and reception control signals so as not to perform propagation control for security communications ((2), (3) and (5) in FIG. 54)).

Thus, according to the communication apparatus and communication system of Embodiment 23, in addition to the effects of Embodiment 1, based on instructions from upper layer 5303, communication control section 5301 switches between the conventional method and the security communication method for protecting in security the important information which is the communication scheme for performing transmission and reception of the first using the propagation estimation value, thereby enabling a versatility communication apparatus to be provided.

In addition, in Embodiment 23, using the transmission control signal and reception control signal, the propagation control in receiving section 202 and transmitting section 7095 is turned ON/OFF. However, the present invention is not limited to such a method, and when either receiving section 202 or transmitting section 705 has the same configuration as that in the conventional communication apparatus, the need of a control signal eliminated for such a section. Examples of such a section include transmitting section 152 in the communication apparatus as illustrated in FIG. 1, and encryption receiving section 706 in the communication apparatus corresponding to the communication apparatus as illustrated in FIG. 7.

Embodiment 24

Embodiment 24 has a feature that antenna coefficients include confidential information.

Figure 55:
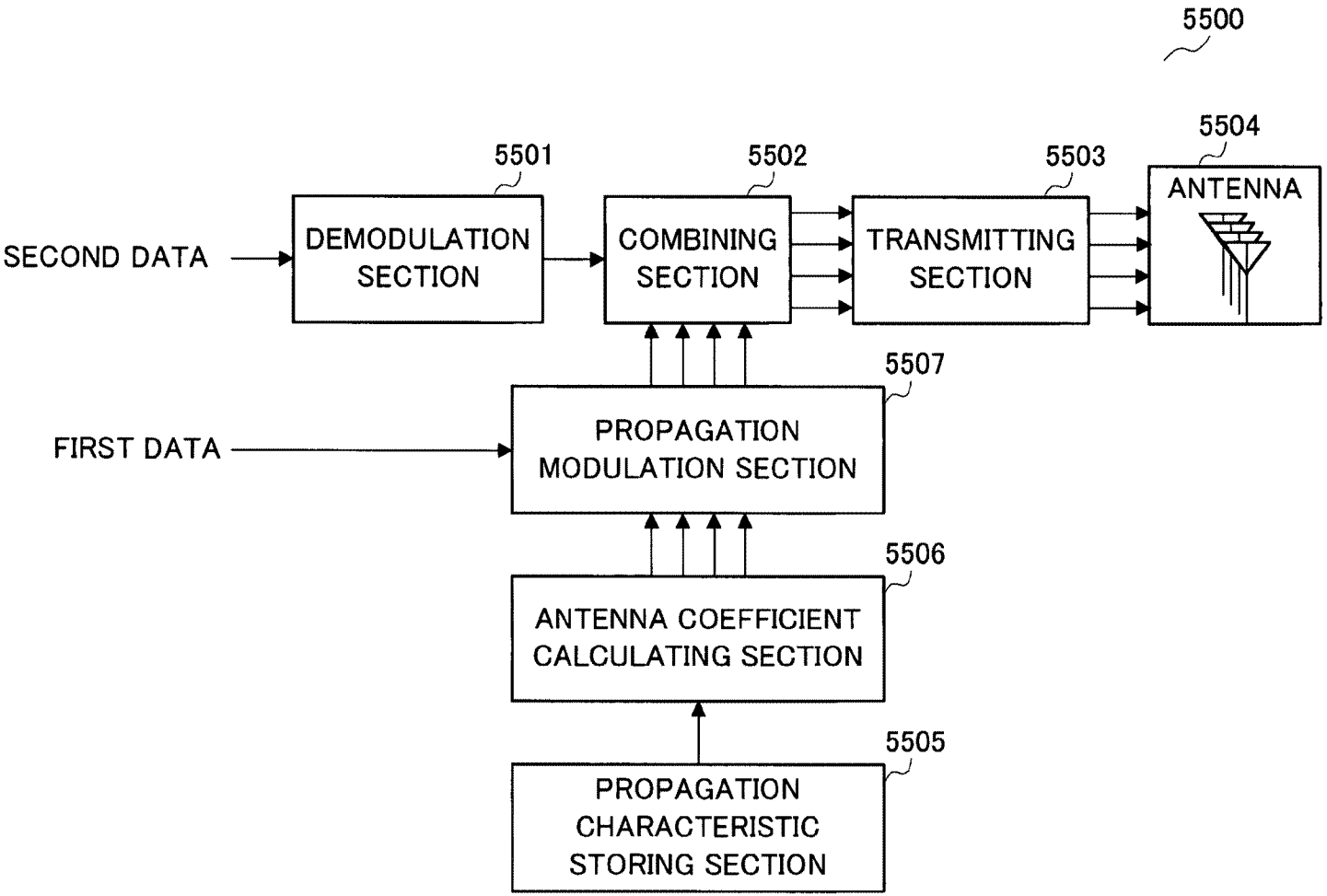
FIG. 55 is a block diagram illustrating a configuration of a communication apparatus according to Embodiment 24 of the present invention.
Figure 56:
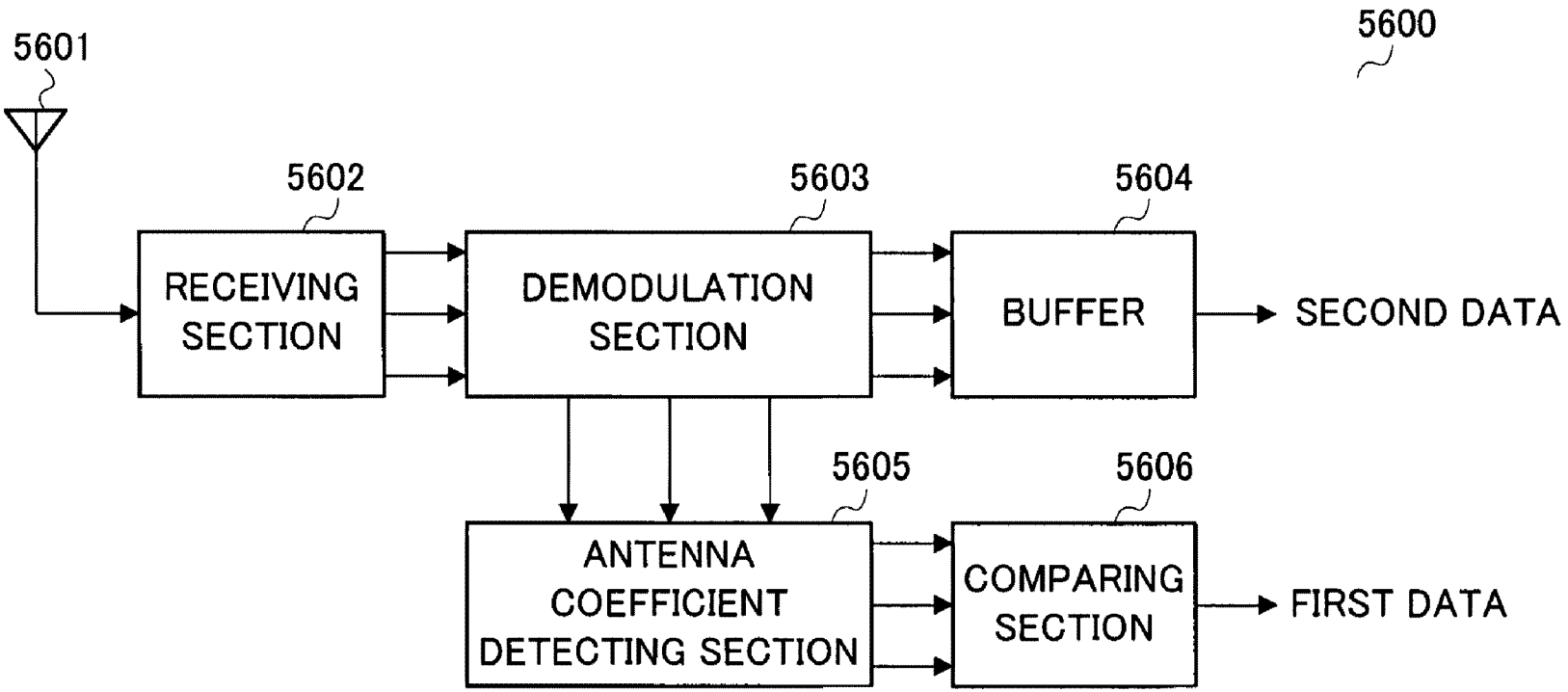
FIG. 56 is a block diagram illustrating another configuration of a communication apparatus according to Embodiment 24 of the present invention.

FIG. 55 is a diagram illustrating a configuration of transmitting apparatus 5500 that is a communication apparatus according to Embodiment 24. FIG. 56 is a diagram illustrating a configuration of receiving apparatus 5600 that is a communication apparatus according to Embodiment 24.

Transmitting apparatus 5500 will be described first.

Modulation section 5501 temporarily holds the second data, and outputs channel phase modulated signals corresponding to the number of channels to combining section 5502.

According to modulation antenna coefficients input from propagation modulation section 5507, combining section 5502 performs combining calculation of the modulated signals input from modulation section 5501.

Transmitting section 5503 performs frequency conversion and power amplification on the input combined signal input from combining section 5502.

Antennas 5504 transmit respective signal sequences.

Propagation characteristic storing section 5505 stores propagation characteristics such as the propagation profile to output to antenna coefficient calculating section 5506.

In order to superimpose the information on the propagation state represented by antenna coefficients, antenna coefficient calculating section 5506 calculates antenna coefficients based on the propagation characteristics input from propagation characteristic storing section 5505. Antenna coefficients are obtained using various methods, and as one of the methods, singular value decomposition is known.

Propagation modulation section 5507 superimposes the first data to transmit as the confidential information on antenna coefficients input from antenna coefficient calculating section 5506, performs amplitude modulation on the resultant, and outputs the obtained modulated antenna coefficients to combining section 5502.

Receiving apparatus 5600 will be described below.

Antenna 5601 outputs a received RF signal to receiving section 5602.

Receiving section 5602 performs power amplification, frequency conversion, etc. on the received RF signal received and input in/from antenna 5601 to output to demodulation section 5603.

Demodulation section 5603 demodulates each channel signal input from receiving section 5602, and outputs a channel demodulated signal to antenna coefficient detecting section 5605 and buffer 5604. In receiving apparatus 5600, since a QAM signal (or phase·amplitude modulated signal) subjected to phase modulation and amplitude modulation is received, demodulation section 5603 performs phase·amplitude demodulation on the received signal.

Buffer 5604 temporarily holds the channel modulated signal input from demodulation section 5603, and outputs the second data.

Antenna coefficient detecting section 5605 detects an antenna coefficient for each channel from the channel demodulated signal input from demodulation section 5603, and outputs the detected antenna coefficient information to comparing section 5606.

Comparing section 5606 encodes the antenna coefficient information input from antenna coefficient detecting 5605, and outputs a result of comparison in level between encoded antenna coefficient information as received data. In addition, the operation of transmitting apparatus 5500 and receiving apparatus 5600 is the same as that in FIG. 37 except using antenna coefficients substituting for reception power, and descriptions thereof are omitted.

Superimposing the information on the propagation characteristic of the present invention has a significant feature that the modulation scheme of signal output from an antenna differs from the modulation scheme of signal to be demodulated in the receiving apparatus. In other words, it is possible to set the modulation scheme of signal output from an antenna to be different from a modulation scheme that the receiving apparatus supports. In this way, the modulated signal is a proper modulated signal only in the receiving apparatus targeted for transmission, and the proper modulated signal is not obtained in the other receiving apparatuses, whereby it is possible to secure high confidentiality. Further, since it is possible to add the confidential information to the information of differences between antenna coefficients of a plurality of channel signals, it is possible to transmit signals of a plurality of channels while providing security, and to improve transmission efficiency.

Thus, according to the communication apparatus and communication system of Embodiment 24, in addition to the effects of Embodiment 1, combining section 5502 combines the first data modulated in propagation modulation section 5507 and the second data modulated in modulation section 5501 in a modulation scheme different from that in propagation modulation section 5507, and transmitting section 5503 transmits the first data and second data in a modulation scheme with phase, amplitude or frequency. Therefore, communicating parties with different modulation schemes cannot demodulate the data, and it is thereby possible to ensure high security.

In addition, Embodiment 24 describes the case where an antenna output signal is subjected to phase modulation, while the propagation modulation is amplitude modulation. However, the present invention is not limited to such a case, and the same modulation scheme may be used, and/or the modulation scheme is not limited to such modulation scheme. As each modulation scheme, there are considered frequency modulation, phase modulation, amplitude modulation, PWM, PAM, orthogonal amplitude modulation, and CCK (Complimentary Code Keying).

Embodiment 25

Embodiment 25 has a feature that antenna coefficient information is superimposed on spread signals of a plurality of channels, and the antenna coefficient information is extracted as confidential data.

Figure 57:
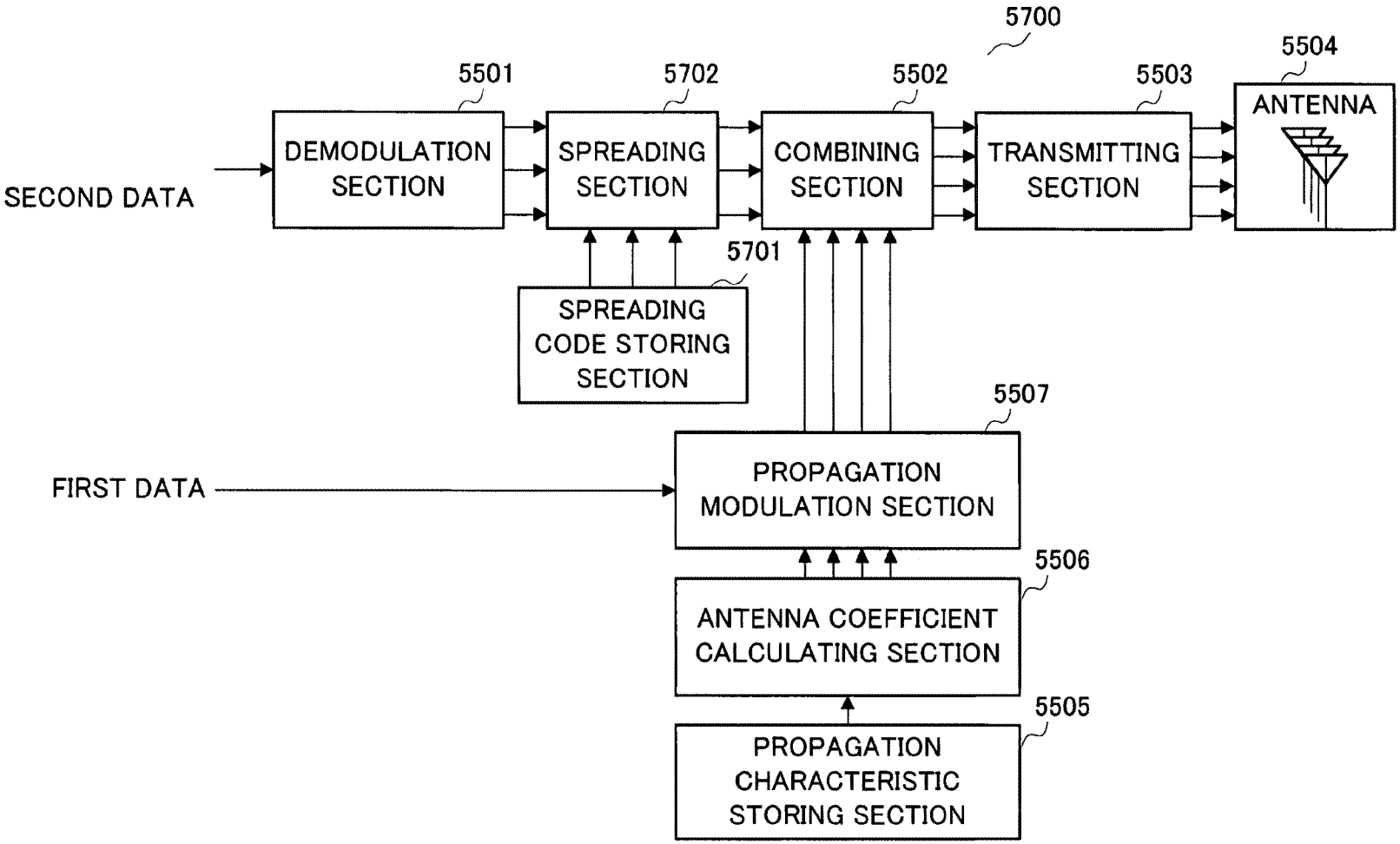
FIG. 57 is a block diagram illustrating a configuration of a communication apparatus according to Embodiment 25 of the present invention.
Figure 58:
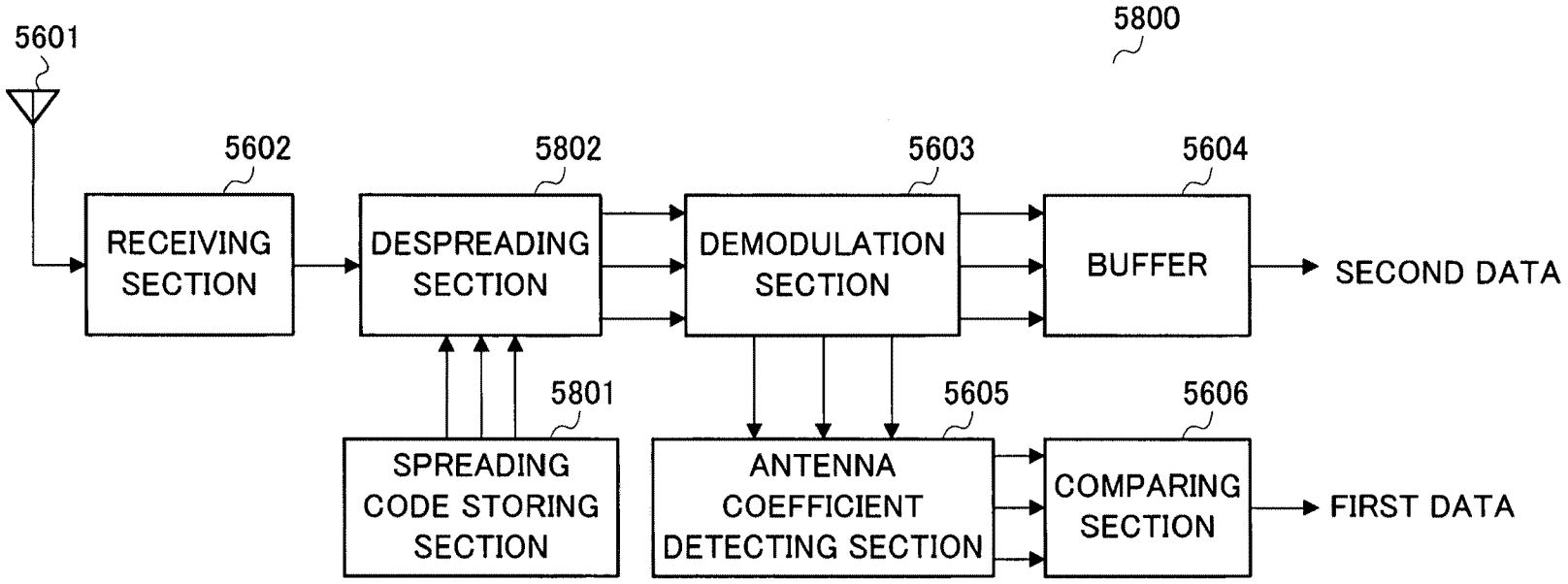
FIG. 58 is a block diagram illustrating another configuration of a communication apparatus according to Embodiment 25 of the present invention.

FIG. 57 is a diagram illustrating a configuration of transmitting apparatus 5700 that is a communication apparatus according to Embodiment 25. FIG. 58 is a diagram illustrating a configuration of receiving apparatus 5800 that is a communication apparatus according to Embodiment 25. In addition, in FIGS. 57 and 58, the same sections as in FIGS. 55 and 56 are assigned the same reference numerals as in FIGS. 55 and 56, and descriptions thereof are omitted.

Spreading code storing section 5701 stores spreading codes corresponding to the number of channels to output to spreading section 5702.

Spreading section 5702 calculates the convolution of channel data that is the first data input from modulation section 5501 and a spreading code corresponding to the channel of the data input from spreading code storing section 5701 to perform spectral spreading, and outputs the resultant to combining section 5502.

Spreading code storing section 5801 stores spreading codes corresponding to the number of channels to output to despreading section 5802.

Despreading section 5802 calculates the convolution of the spreading code corresponding to the channel input from spreading code storing section 5801 and a received signal input from receiving section 5602 to perform despreading, and outputs the resultant to demodulation section 5800. In addition, the operation of transmitting apparatus 5700 and receiving apparatus 5800 is the same as that in FIG. 37 except using antenna coefficients substituting for reception power, and descriptions thereof are omitted.

Superimposing the information on the propagation characteristic of the present invention has a significant feature that the modulation scheme of signal output from an antenna differs from the modulation scheme of signal to be demodulated in the receiving apparatus. In other words, it is possible to set the modulation scheme of signal output from an antenna to be different from a modulation scheme that the receiving apparatus supports. In this way, the modulated signal is a proper modulated signal only in the receiving apparatus targeted for transmission, and the proper modulated signal is not obtained in the other receiving apparatuses, whereby it is possible to secure high confidentiality.

Thus, according to the communication apparatus and communication system of Embodiment 25, in addition to the effects of Embodiments 1 and 24, combining section 5502 combines the first data modulated in propagation modulation section 5507 and the spread second data modulated in modulation section 5501 in a modulation scheme different from that in propagation modulation section 5507, and transmitting section 5503 transmits the first data and second data in a modulation scheme with phase, amplitude or frequency. It is thereby possible to ensure high security in data with high spectral efficiency.

In addition, Embodiment 25 describes the case where, an antenna output signal is subjected to phase modulation, while the propagation modulation is amplitude modulation. However, the present invention is not limited to such a case, and the same modulation scheme may be used, and/or the modulation scheme is not limited to such modulation scheme. As each modulation scheme, there are considered frequency modulation, phase modulation, amplitude modulation, PWM, PAM, orthogonal amplitude modulation, and CCK (Complimentary Code Keying).

Embodiment 26

Embodiment 26 has a feature that first modulation is super-imposed on second modulation by controlling antenna coefficients.

Figure 68:
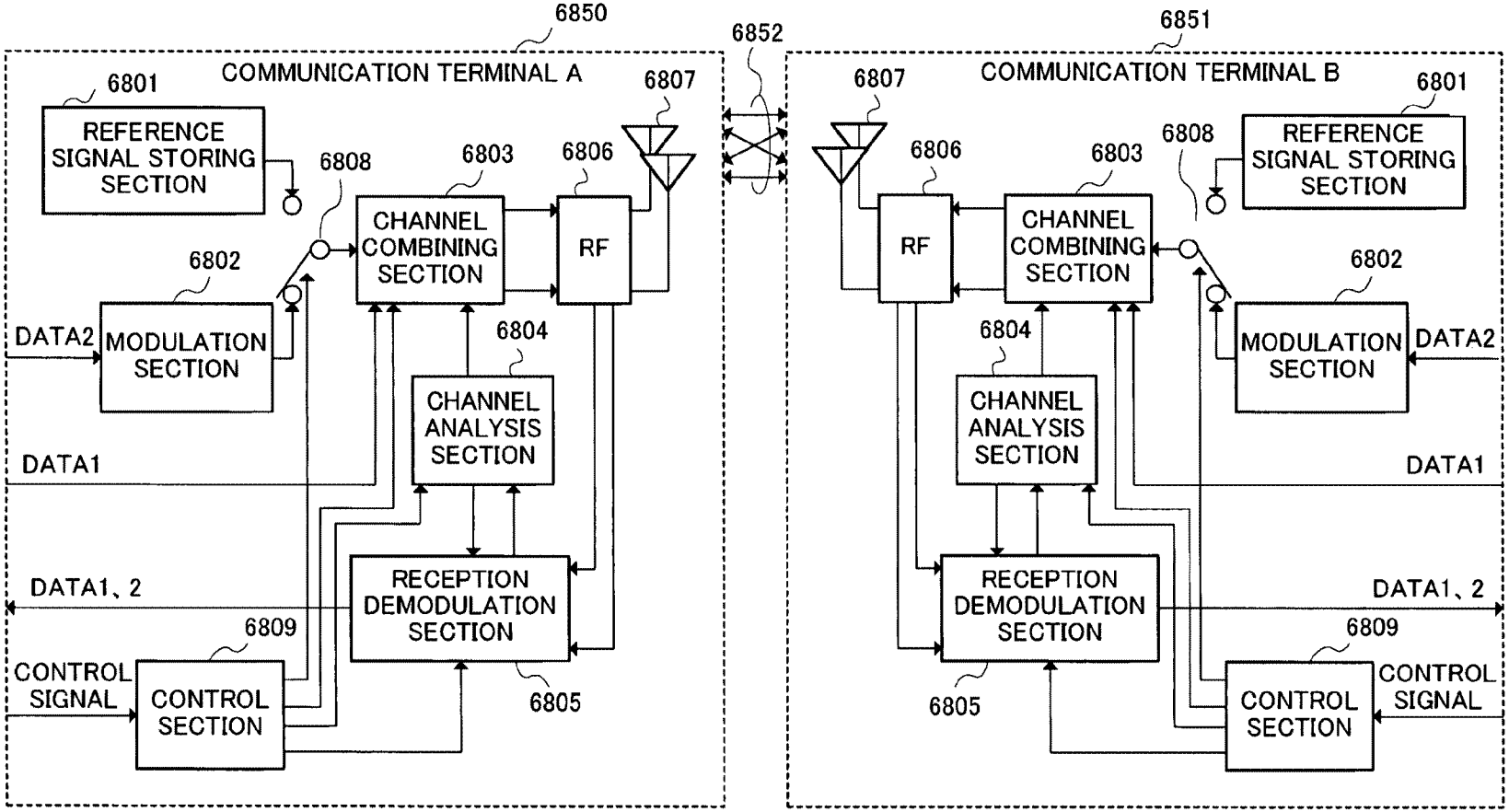
FIG. 68 is a block diagram illustrating a communication system using a communication apparatus according to Embodiment 26 of the present invention.
Figure 69:
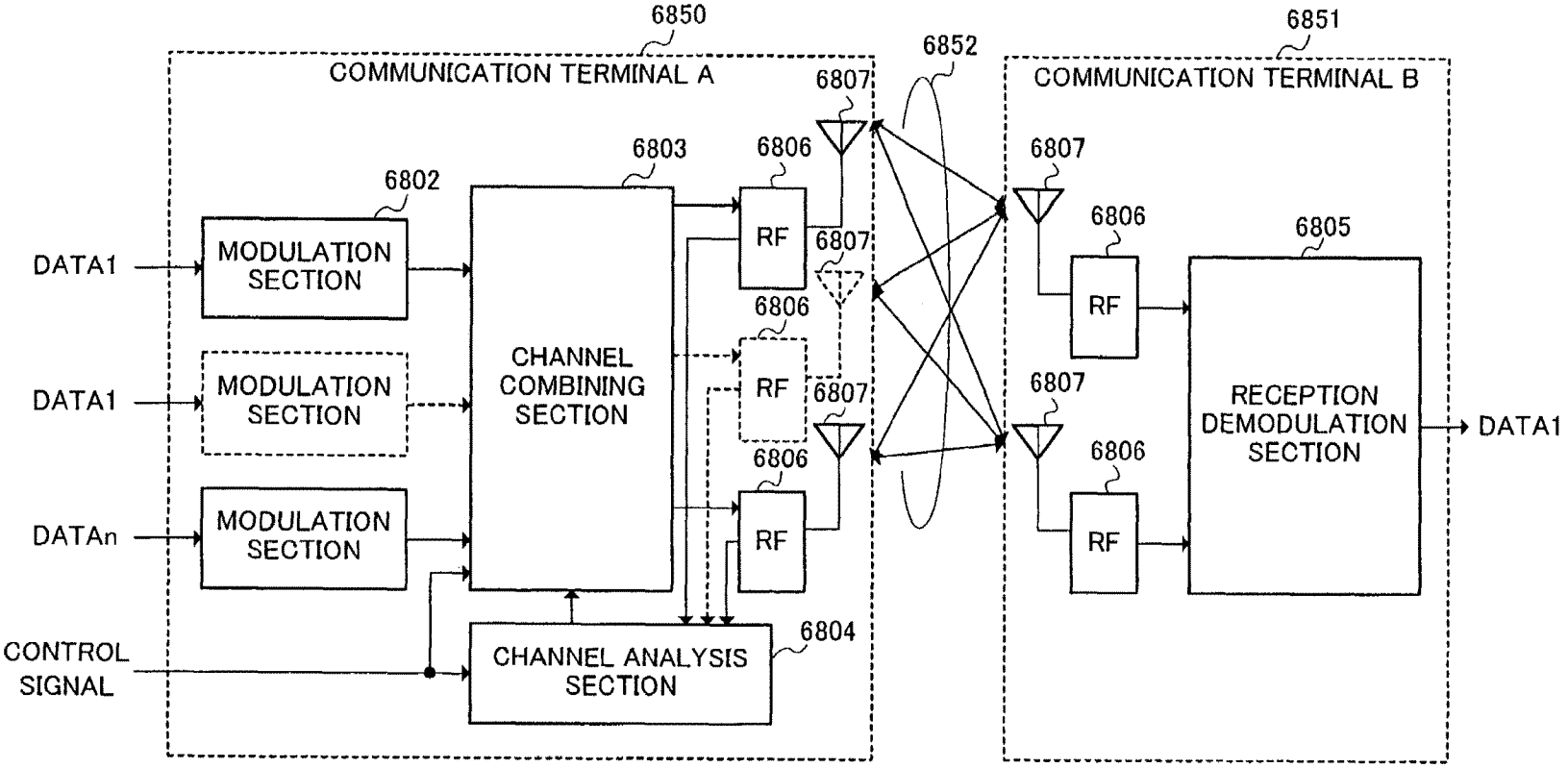
FIG. 69 is another block diagram illustrating the communication system using the communication apparatus according to Embodiment 26 of the present invention.

FIG. 68 is a diagram illustrating a communication system according to Embodiment 26. FIG. 69 illustrates sections pertinent to transmission and reception in detail. FIG. 68 will be described first.

The system as illustrated in FIG. 68 is comprised of communication terminal A 6850, propagation space 6852, and communication terminal B 6851 with the same configuration as that of the terminal A 6850. In addition, in FIG. 68, two terminals have the same configuration, but do not need to be the same in configuration.

Communication terminals A 6850 and B 6851 will be described below.

Reference signal storing section 6801 outputs a reference signal for providing references for time synchronization, frequency synchronization and phase/amplitude.

Modulation section 6802 receives data 2 (second data), generates a predetermined modulated signal, and outputs a modulated signal.

Channel combining section 6803 receives the modulated signal, channel parameter resulting from extraction of channel component, and data 1 (first data), performs weighting so as to perform channel combining through propagation, and outputs transmission RF signals.

Channel analysis section 6804 receives propagation coefficients extracted from a received signal to analyze, and calculates and outputs coefficients for channel combining.

Reception demodulation section 6805 receives received RF signals, and outputs propagation coefficients to channel analysis section 6804, while outputting demodulated data 1 and 2.

RF section 6806 outputs transmission RF signals to antenna 6805, while receiving a signal received in antenna 6807 and outputting the received RF signal to reception demodulation section 6805.

Antennas 6807 transmit respective sequences of transmission RF signals, while outputting a received RF signal to reception demodulation section 6805.

Switch 6808 selects a signal from reference signal storing section 6801 and a signal from modulation section 6802, as a modulated signal to output to channel combining section 6803.

Control section 6809 receives a control signal, and performs control of channel combining section 6803, channel analysis section 6804, reception demodulation section 6805, and switch 6806. Specifically, as described in Embodiment 23, control section 6809 receives a control signal from an upper layer, and sets whether or not to perform confidential communication. Further, according to communication procedures as described in Embodiment 1 or the other Embodiment, the section 6809 outputs a propagation estimation signal, and controls the operation conforming to the specified communication frame.

FIG. 69 that illustrates transmission and reception portions specifically will be described below. FIG. 69 specifically illustrates part of FIG. 68, and the same sections are assigned the same reference numerals. Herein, descriptions of each section are omitted, and the operation will be described specifically.

Modulation sections 6802 having received data (data 1 to n) respectively generate modulated signals 1 to n corresponding data to output to channel combining section 6802. Channel combining section 6803 receives modulated signals from modulation sections 6802, while receiving channel parameters from channel analysis section 6804 as antenna coefficients. Channel analysis section 6804 receives a control signal and the received signal received in RF section 6806, extracts characteristics of propagation properties such as phase, amplitude and propagation dispersion using the received signal sequence and known signal sequence such as the reference signal, and outputs the channel parameters to channel combining section 6803.

Channel combining section 6803 calculates antenna coefficients corresponding to the antenna sequence from the channel parameters and modulated signals. Further, when the propagation control is required through the control signal, the section 6803 transmits a weighted transmission signal obtained by multiplying thus calculated antenna coefficient by the modulated signal to respective RF section 6806, and the signal is amplified in power in the section 6806 and transmitted from antenna section 6807.

Meanwhile, when the propagation control is not required, the section 6803 performs control suitable for communications (i.e., such that the signal has the maximum sensitivity at a receive point), and sets weighting coefficients at predetermined values or sets at least one coefficient at 0. Performing control suitable for communications provides a feature of improving the communication quality. When weighting coefficients are set at predetermined values, there arises a feature that the communication quality is improved without performing complicated control if the situation allows communication environments to be almost fixed and the directivity to be set in advance. When the directivity is not set in advance, setting all the coefficients at the same value enhances the total transmission power, and results in increases in communication quality. Setting part of weighting coefficients at 0 suppresses the transmission power and enables reduction in power consumption.

It is possible to perform the weighting operation in the configuration as illustrated in FIG. 35. Herein, it is apparent that a hierarchical information structure is capable of being implemented readily by separating a modulated signal to be weighted and a modulated signal for use in calculating antenna coefficients. (Herein, the former is referred to as first modulation, while the latter one is referred to as second modulation). When performing in this way, it is possible to set modulated signals 1 to k for first modulation, while setting modulated signals k+1 to n for second modulation. For example, as described in Embodiment 17, in the case of the scheme of controlling power of all the signals except one modulated signal to be zero, it is possible to regard that as second modulation, modulated signals of (1,0) are applied as modulated signals 1 to k subjected to first modulation, and that similarly as second modulation, modulated signals of (0,0) are applied as modulated signals k+1 to n subjected to first modulation. When the number of patterns of modulated signal subjected to second modulation is thus small, it is possible to implement the hierarchical information structure by preparing antenna coefficients corresponding to the number of patterns, and switching the coefficients according to the data corresponding to second modulation.

Herein, the antenna coefficient is given by equation (34):

$$H \cdot W(x) = x \tag{34}$$

x is in equation (34) is a component on which information is superimposed in second modulation, and amplitude in ASK, phase in PSK or frequency in FSK.

Thus transmitted radio signal is received in antenna 6807 in communication terminal B 6851 via propagation space 6852. The channel parameter is superimposed on the signal in channel combining 6803, and received signal Srx is represented as in equation (35) using first modulation signal st_1, second modulation signal St_2, channel property H and antenna coefficient W:

$$Srx = H \cdot W(St_2) \cdot St_1 \tag{35}$$

Using equation (34) obtains the following equation:

$$Srx = St_2 \cdot St_1 \tag{36}$$

As indicated by equation (36), at the receiving end of communication terminal B 6861, a received signal is obtained as a signal resulting from multiplication of the first modulation signal by the second modulation signal. For example, when the first modulation is PSK modulation and the second modulation is ASK modulation, reception modulation section 6805 is capable of demodulating data 2 corresponding to first modulation by detecting a phase component, and demodulating data 1 corresponding to second modulation by detecting an amplitude component.

Figure 70:
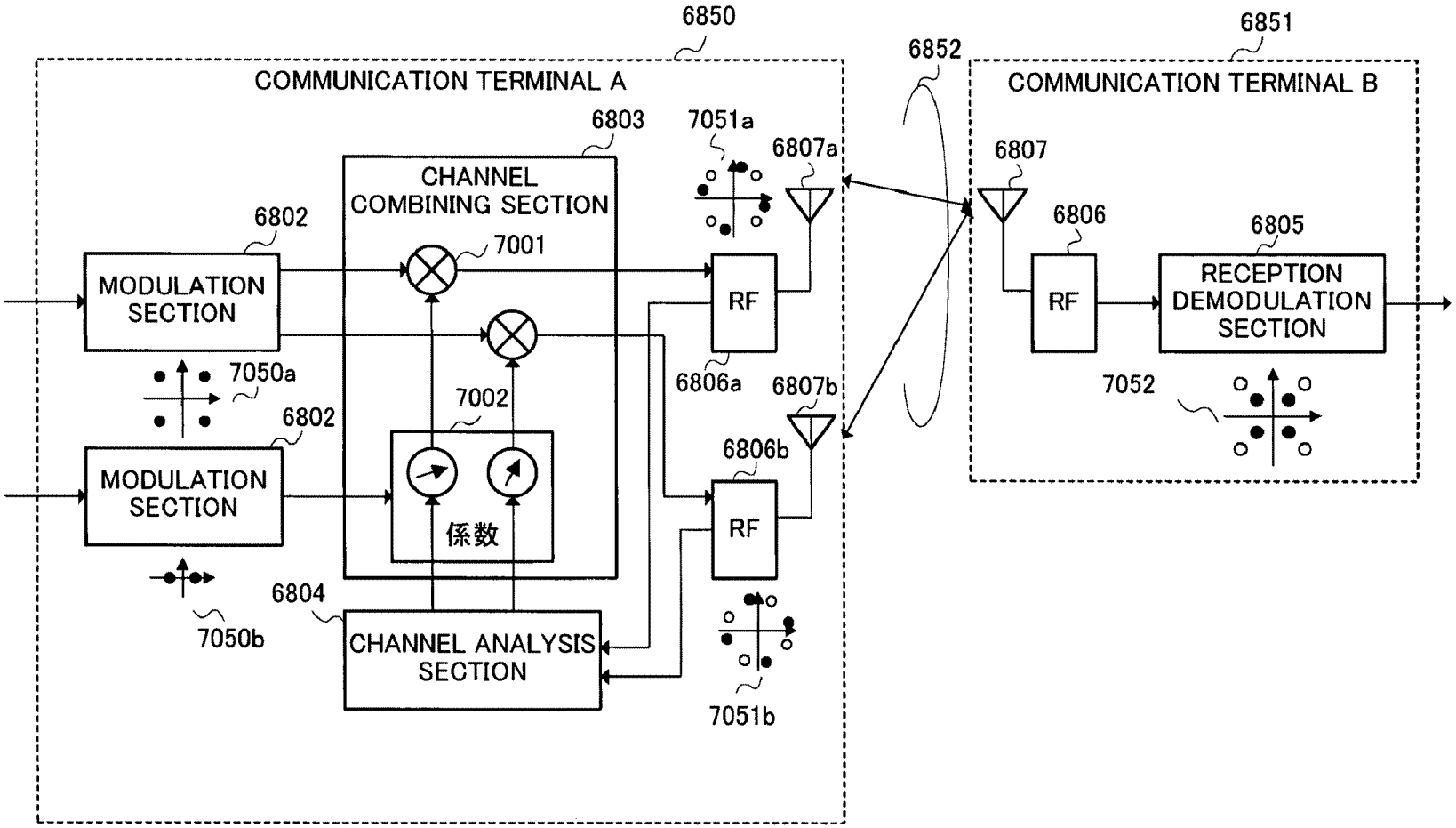
FIG. 70 is another block diagram illustrating the communication system using the communication apparatus according to Embodiment 26 of the present invention.

The above explanation is described more specifically with reference to FIG. 70.

FIG. 70 illustrates FIG. 69 more specifically, and each of reference numerals 7050a to 7052 denotes a signal constellation.

Weighting multiplying section 7001 multiplies the first modulation signal by an antenna coefficient, and outputs a weighted transmission signal.

Coefficient storing section 7002 receives channel parameters calculated in channel analysis section 6804 to hold as basic coefficients. The section 7002 converts the held basic coefficients into antenna coefficients corresponding to the second modulation. At this point, as described above, when the number of patterns of second modulation is small, basic coefficients are prepared corresponding to the number of patterns, it is possible to implement by switching between the antenna coefficients corresponding to data 1 associated with second modulation.

It is assumed herein that first modulation is QPSK and that second modulation is ASK. Signal 7050a indicates a constellation of QPSK, and signal 7050b indicates a constellation of ASK.

Channel combining section 6803 performs weighting of the first modulation signal using an antenna coefficient output from coefficient storing section 7002, and outputs the weighted transmission signal to a respective antenna 6807. Since antenna coefficients are different in phase and amplitude between second modulation symbol "space" and "mark", each of weighted transmission signals has eight signal points, despite the first modulation signal having four signal points.

It is herein assumed that antenna coefficients for "space" and "mark" of second modulation signal are different in phase and amplitude. However, it is possible to fix either coefficient as a constant value. Making the amplitude constant provides an advantage that the power supplied from each antenna is equal to one another. Making the phase constant provides an advantage of simplifying the configuration of weighting multiplying section 7001.

Signal 7052 indicates a signal received in communication terminal B 6851 via propagation space 6852, and as indicated in equation (36), becomes an 8-APSK signal where QPSK is multiplexed on ASK. Reception demodulation section 6805 is capable of demodulating data 2 by detecting the phase, and demodulating data 1 by detecting the amplitude.

Thus, according to Embodiment 26, first modulation is multiplexed on second modulation by controlling antenna coefficients, and the modulated signal forms a proper modulated signal only at a receive point, whereby it is possible to perform communications with high confidentiality.

Embodiment 27

Embodiment 27 describes a communication protocol for performing control of confidential communications in the physical layer in upper-layer communications.

Figure 59:
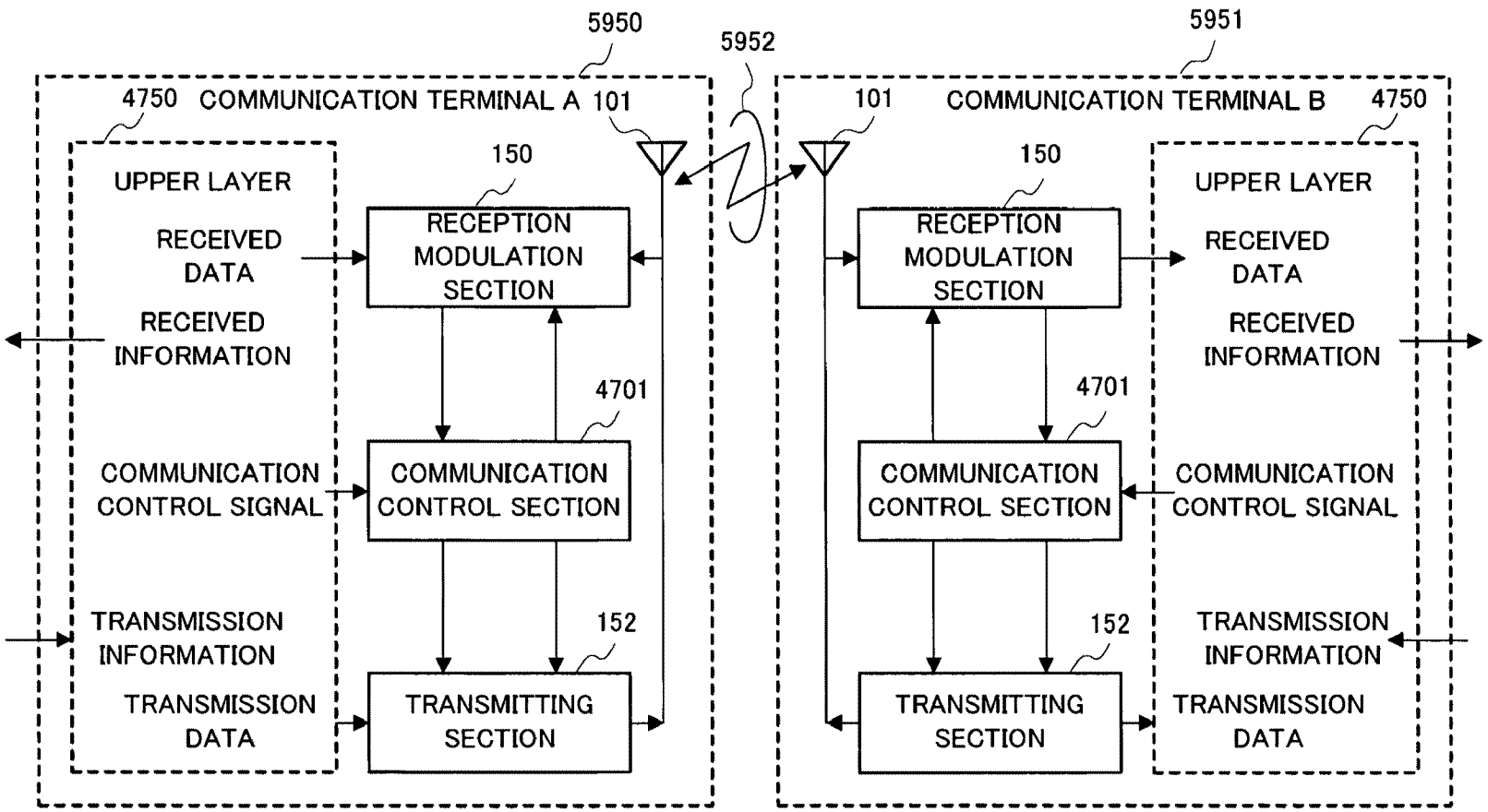
FIG. 59 is a block diagram illustrating a communication system using a communication apparatus according to Embodiment 27 of the present invention.

FIG. 59 illustrates a communication system used in Embodiment 27.

In the communication system, communication terminal A 5950 communicates with communication terminal B 5951 via propagation space 5952. Herein, communication terminal A 5950 has the same configuration as that of communication terminal B 5951.

Communication terminal A 5950 will be described below.

Upper layer 4750 is to provide and receive transmission information and received information to/from the application (either case is considered outside or inside the terminal) respectively, outputs transmission data to transmitting section 152, outputs a control signal to communication control section 4701, and receives received data from reception demodulation section 150.

Reception demodulation section 150 receives a received RF signal from antenna 101 to demodulate, and outputs received data.

Transmitting section 152 receives the transmission data, generates a modulated signal, and outputs a transmission RF signal to antenna 101.

Communication control section 4701 receives a control signal, and outputs a transmission control signal to transmitting section 152, while outputting a reception control signal to reception demodulation section 150. Further, the section 4701 receives propagation parameters from reception demodulation section 150, and outputs the propagation parameters to transmitting section 152.

Antenna 101 receives the transmission RF signal from transmitting section 152 to transmit, while outputting a received RF signal to reception demodulation section 150.

Communication control section 4701 performs communication control such as channel control and time control essential for communications, and receives a command from an upper layer through a control signal. Upon receiving the command, communication control section 4701 performs a command issue of the physical layer and confidential communication control through a transmission control signal and reception control signal.

Figure 61:
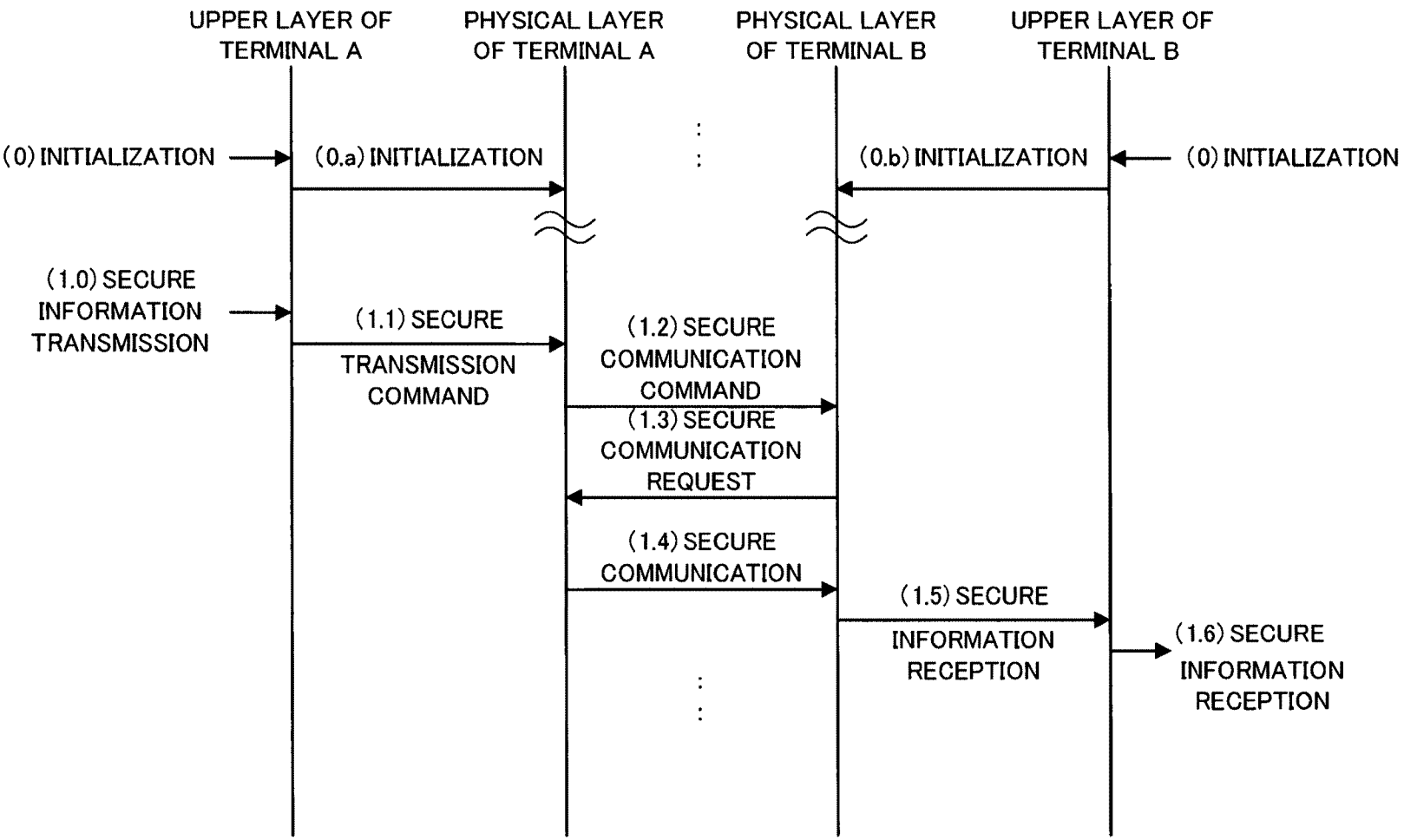
FIG. 61 is a sequence diagram illustrating the operation of the communication apparatus according to Embodiment 27 of the present invention.

Based on the configuration as described above, communication procedures will be described specifically with reference to FIG. 61. Herein, descriptions are given based on the confidential communication as described in Embodiment 1. However, the present invention is not limited to such communications, and is apparently applicable to confidential communications as described in the other Embodiments.

(0) Initialization

In order to set each of communication terminals A 5950 and B 5951 for the initial state based on predetermined procedures at the time power is supplied or of starting communication, the upper layer outputs a control signal for initialization.

(0.a), (0.b) Based on the control signal received from the upper layer, communication terminal A 5950 initializes the setting state related to the physical layer.

(1) Transmission of Secure Information (1.0) The application of the communication terminal A outputs secure information and a request for transmitting the information to the upper layer.

(1.1) Upon receiving the secure transmission request, the upper layer of the communication terminal A issues a secure transmission command to the physical layer together with the secure information.

(1.2) Upon receiving the secure transmission request command, the physical layer of the communication terminal A transmits a secure communication command to the terminal B in accordance with communication timing between the terminals A and B.

(1.3) Upon receiving the secure communication command, the physical layer of the communication terminal B transmits the secure communication request to the communication terminal A together with a propagation estimation signal in accordance with the communication timing.

(1.4) Upon receiving the secure communication request, the physical layer of the communication terminal A estimates the propagation from the propagation estimation signal, and calculates the propagation parameter. Further, the physical layer transmits the secure information input in (1.2) using the propagation parameter to the communication terminal B by using the confidential communication method.

(1.5) The physical layer of the communication terminal B receives and demodulates the secure information transmitted using the confidential communication method, and outputs the information to the upper layer.

(1.6) The upper layer of the communication terminal B outputs the secure information output from the physical layer to the application.

According to the series of operation as described above, the secure information is transmitted from the application of the communication terminal A to the application of the communication terminal B using the confidential communication of the present invention. According to the procedures, it is possible to transmit the information in the most simplified communication procedures between the applications.

In the operation as described above, a practical communication signal in the physical layer will be described with reference to FIG. 64. The shaded portion in the figure indicates a signal from the communication terminal B to the communication terminal A, while the other portions indicate signals from the communication terminal A to the communication terminal B. When the secure communication command is issued (1.2), the secure communication request is received after a lapse of predetermined interval (Tgurad) together with the propagation estimation signal. Based on the propagation parameter calculated from the propagation estimation signal, the secure communication is executed (1.4).

The time indicated in the figure will be described below.

"Tguard" is a time provided to avoid collision of communication signals, and is obtained generally from a support communication distance.

"Taccess" indicates a time taken to complete the secure communication after the secure command is issued, and it is possible for the upper layer to manage the communication condition using the value in performing the secure communication.

"Treply" is a time taken to finish the secure communication after the secure communication request (propagation estimation signal) is provided. As described in the other Embodiments, the present invention uses the propagation parameter, thereby has the premise that there are no changes in propagation environment, and results in deterioration of communication quality when the propagation environment changes. The effects will be descried with reference to FIGS. 72 to 74.

Figure 72:
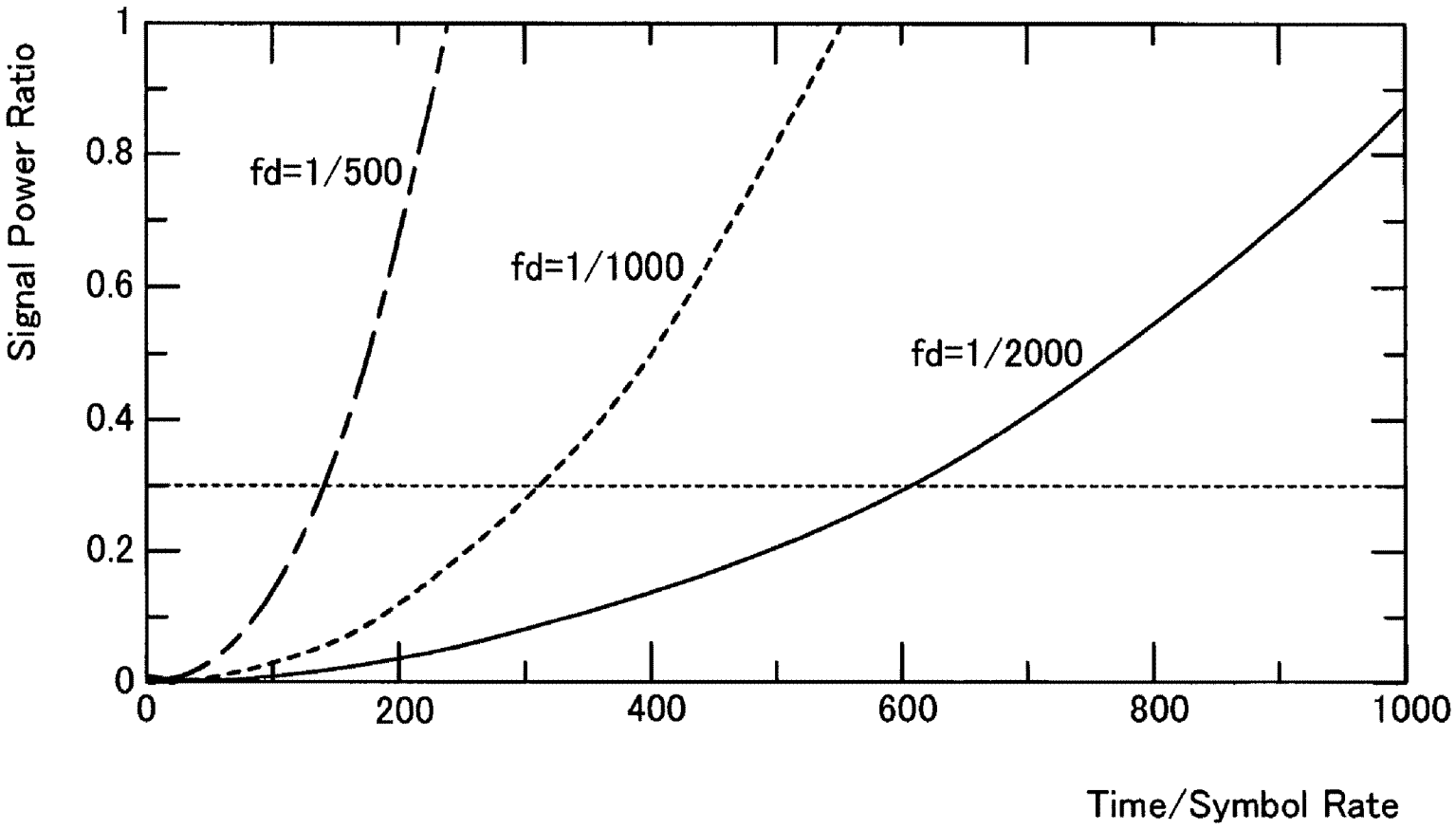
FIG. 72 is a graph illustrating time variations in orthogonality in propagation parameter.

FIG. 72 indicates time variations in orthogonality of propagation parameters, and represents variations in propagation environment at predetermined time using an index referred to as orthogonality. The vertical axis indicates the scale of index, and the horizontal axis indicates the symbol time. In other words, the index indicates the degree of orthogonality between the orthogonal vector obtained from a propagation state at a specific time (t=0) by singular value decomposition and the actual propagation state, and indicates that the propagation parameter is in accordance with the propagation state when the value is 0. The value indicates the difference between the propagation parameter and propagation state, and when the value exceeds 0.3 (shown by the dotted lines), the characteristic deteriorates largely.

Figure 73:
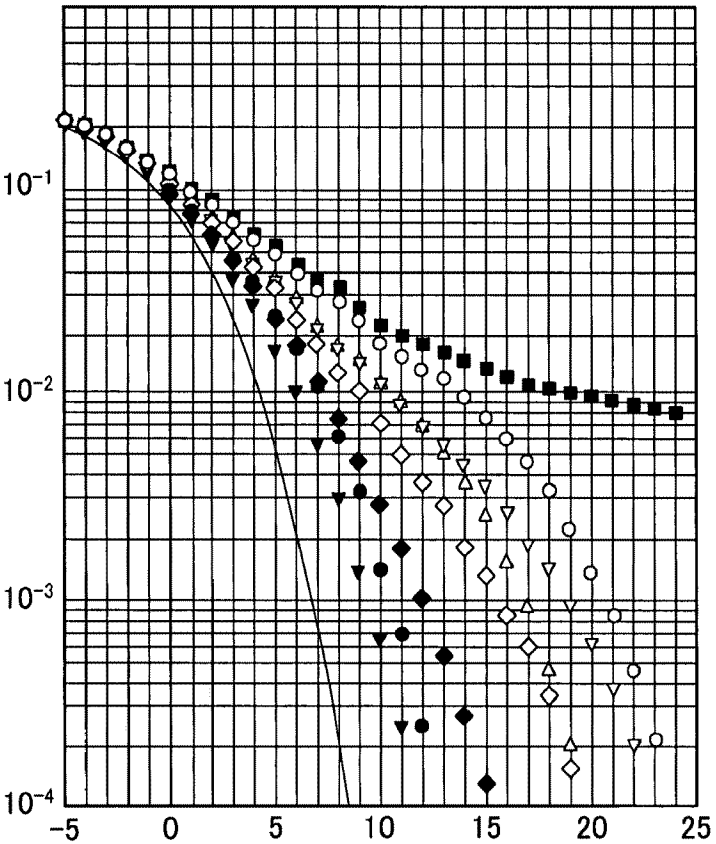
FIG. 73 is a graph illustrating communication quality with Bit Error Rate (BER)
Figure 74:
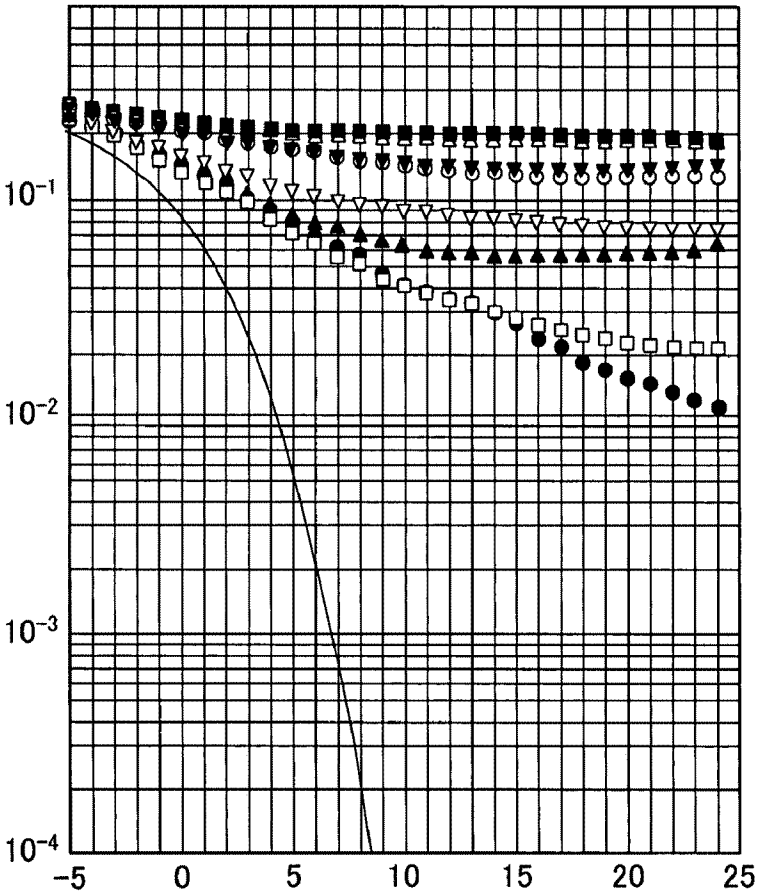
FIG. 74 is another graph illustrating communication quality with Bit Error Rate (BER)

FIGS. 73 and 74 indicate the communication quality using Bit Error Rate (BER), and in terms of versatility of variations in communications, show the communication quality in eight fading patterns. FIG. 73 indicates the communication state with the index of approximately 0.25, and FIG. 74 indicates the communication state with the index of approximately 0.35. In FIG. 73, BER falls below 0.01 in all the communications. On the contrary, in FIG. 74, BER remains above 0.01 in almost all the communications. When it is possible to restore information by error correction when BER is 0.01 or less, the target of the index is 0.3 or less in the confidential communication of the present invention.

fd shown in FIG. 72 represents a fading pitch, and is given by the following equation:

$$fd=(Smax/C)*Fc/Fbaud \tag{37}$$

where Smax is maximum shift speed, C is the velocity of light, Fc is a carrier frequency, and Fbaud is a symbol rate frequency. When thus obtained values are substituted into fd=1/n, as can be seen from the figure, the index exceeds 0.3 near n/4 to n/3 (symbol time). In other words, in order to perform stable communications, it is necessary to meet Treply<n/4 (symbol time) Specifications of wireless LAN are considered herein. Assuming that the maximum shift speed in communications is 30 km/h, and that the carrier frequency is 2.45 GHz, a value meeting Treply is obtained from equation (36). (Since fd and Treply are specified in Fbraud, Fbraud is canceled.)

$$Treply=C/Smax/Fc/4 \tag{38}$$

Substituting the above conditions enables communications with high communication quality when Treply is about 3.5 ms or less.

Thus, since the value of Treply has limitations, it is effective in prohibiting access from another communication terminal within Taccess in TDD (Time Division Duplex) communications where duplex transmission is performed using the same frequency band. In other words, it is considered that the upper layer sets Taccess at a value (for example, 10 ms) larger than Treply, and executes the control such that terminals that perform confidential communications only occupy communication resources for this period.

Further, when there is much information to transmit, it is possible to cope with the transmission of much information by repeating procedures (1.3) and (1.4). In this case, it is desired to reserve long Taccess in response to the communication charge.

Figure 62:
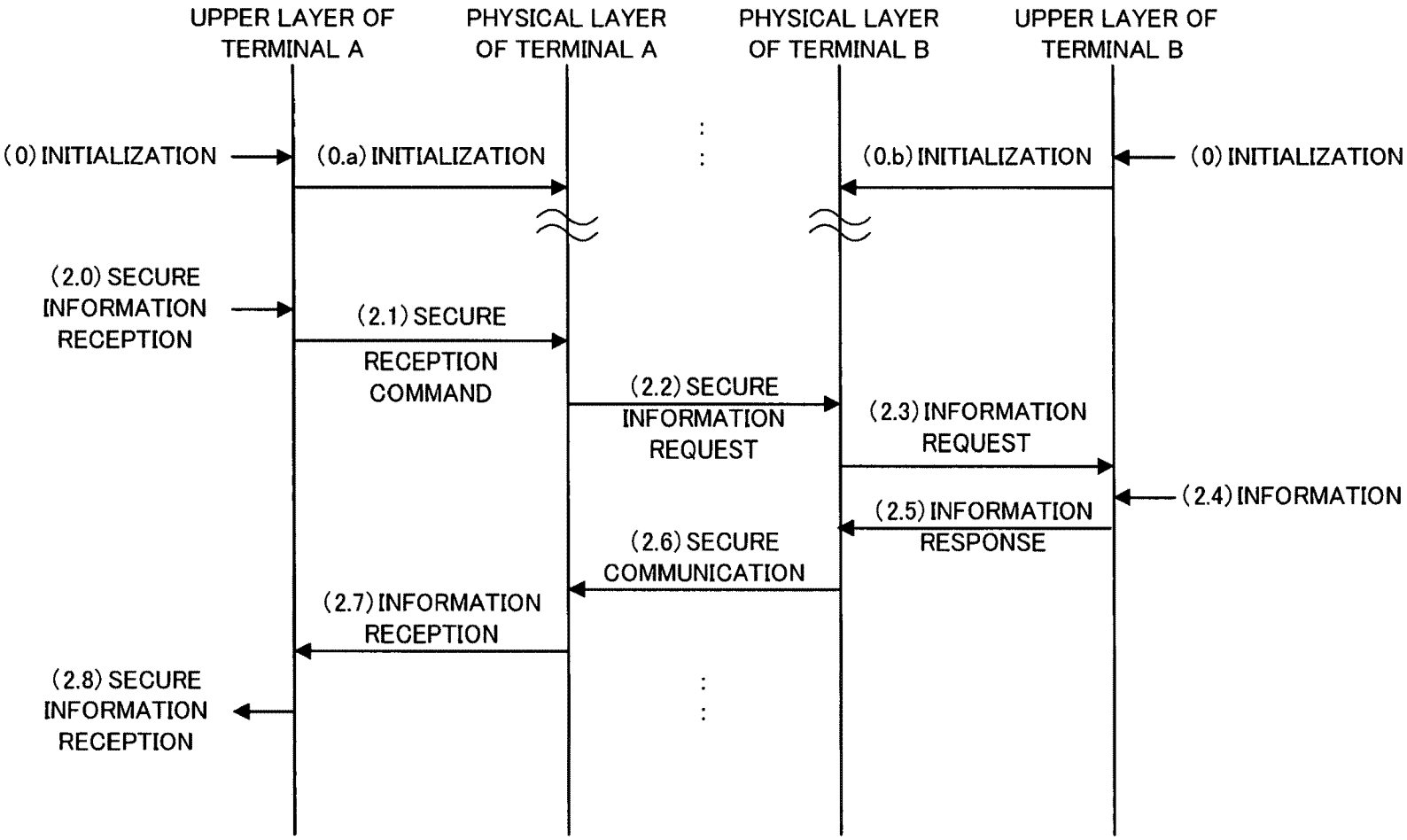
FIG. 62 is another sequence diagram illustrating the operation of the communication apparatus according to Embodiment 27 of the present invention.
Figure 63:
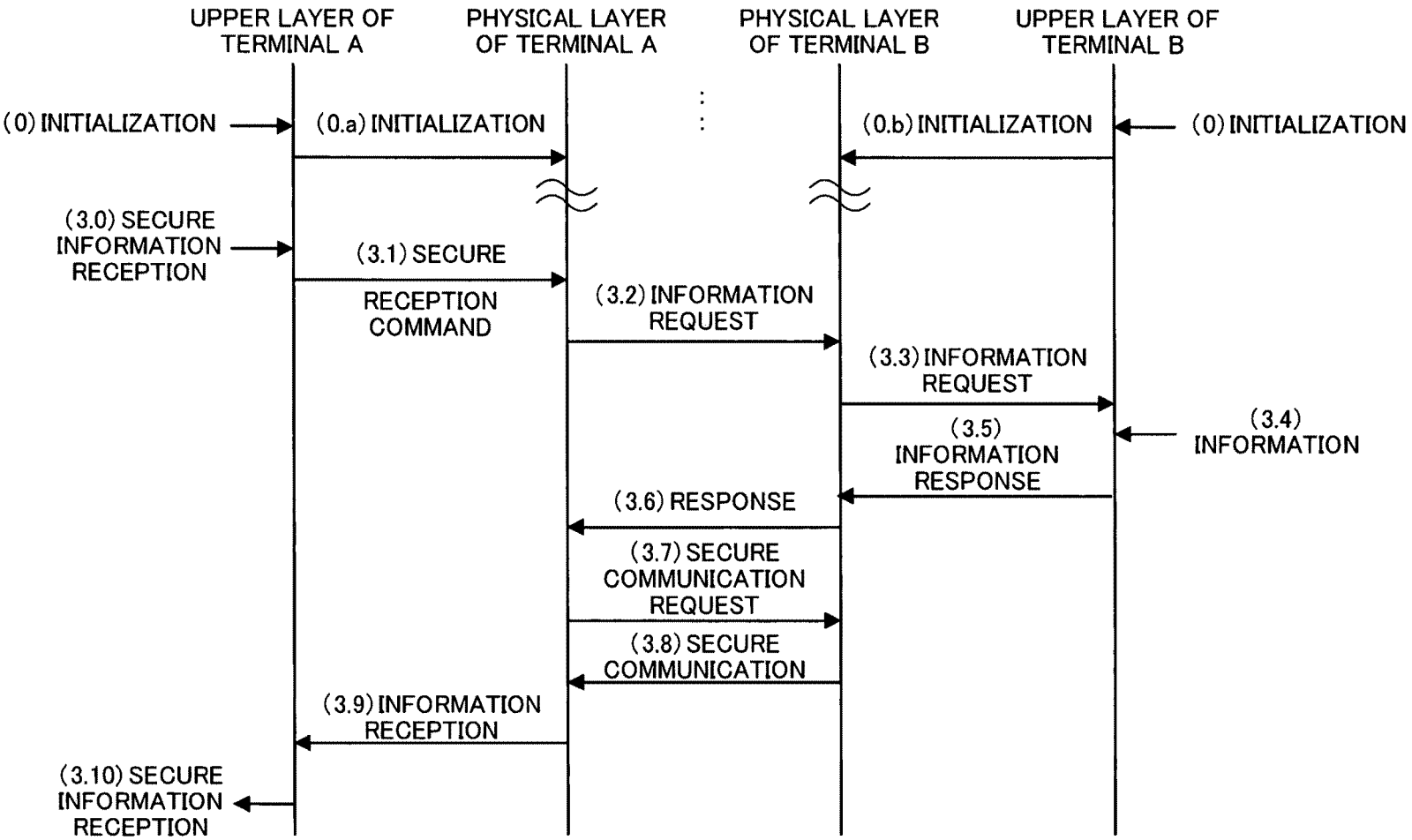
FIG. 63 is another sequence diagram illustrating the operation of the communication apparatus according to Embodiment 27 of the present invention.

Procedures of the case of requesting secure information will be described with reference to FIG. 62.

(0) Initialization

The same operation as in the initialization as described earlier is performed.

(2) Reception of Secure Information (2.0) The application of the communication terminal A outputs a request for secure information reception to the upper layer.

(2.1) Upon receiving the secure information reception request, the upper layer of the communication terminal B issues a secure reception command to the physical layer.

(2.2) Upon receiving the secure reception command, the physical layer of the communication terminal B transmits a secure communication request to the communication terminal B in accordance with communication timing together with the propagation estimation signal.

(2.3) Upon receiving the secure communication request, the physical layer of the communication terminal B estimates the propagation from the propagation estimation signal and calculates the propagation parameter. At the same time, the physical layer issues an information request command to the upper layer. (When the information is managed in the physical layer, the command is not issued to the upper layer, and procedures (2.4) and (2.5) are eliminated. Meanwhile, when the information is managed in the upper layer, (2.4) is eliminated.)

(2.4) Upon receiving the information request command from the physical layer, the upper layer of the communication terminal B acquires the information from the application.

(2.5) The upper layer of the communication terminal B issues an information response command to the physical layer together with the set information.

(2.6) The physical layer of the communication terminal B transmits the acquired information to the communication terminal A in the confidential communication method using the propagation parameter estimated in (2.4).

(2.7) The physical layer of the communication terminal A receives and demodulates the secure information transmitted using the confidential communication method to output to the upper layer.

(2.8) The upper layer of the communication terminal A outputs the secure information output from the physical layer to the application.

According to the series of operation as described above, it is possible that the application of the communication terminal A requests secure information to the application of the communication terminal B, and that communication terminal B transmits the secure information to the communication terminal A. According to the procedures, it is possible to receive the secure information in the most simplified procedures.

In the operation as described above, practical communication signals in the physical layer will be described with reference to FIG. 65. In the figure, shaded portions indicate signals from the communication terminal A to the communication terminal B, and the other portions indicate signals from the communication terminal B to the communication terminal A.

When a secure communication request is issued together with the propagation estimation signal (2.2), the secure communication is executed based on the propagation parameter calculated using the propagation estimation signal after a lapse of a predetermined interval (Tguard) (2.6).

Figure 64:
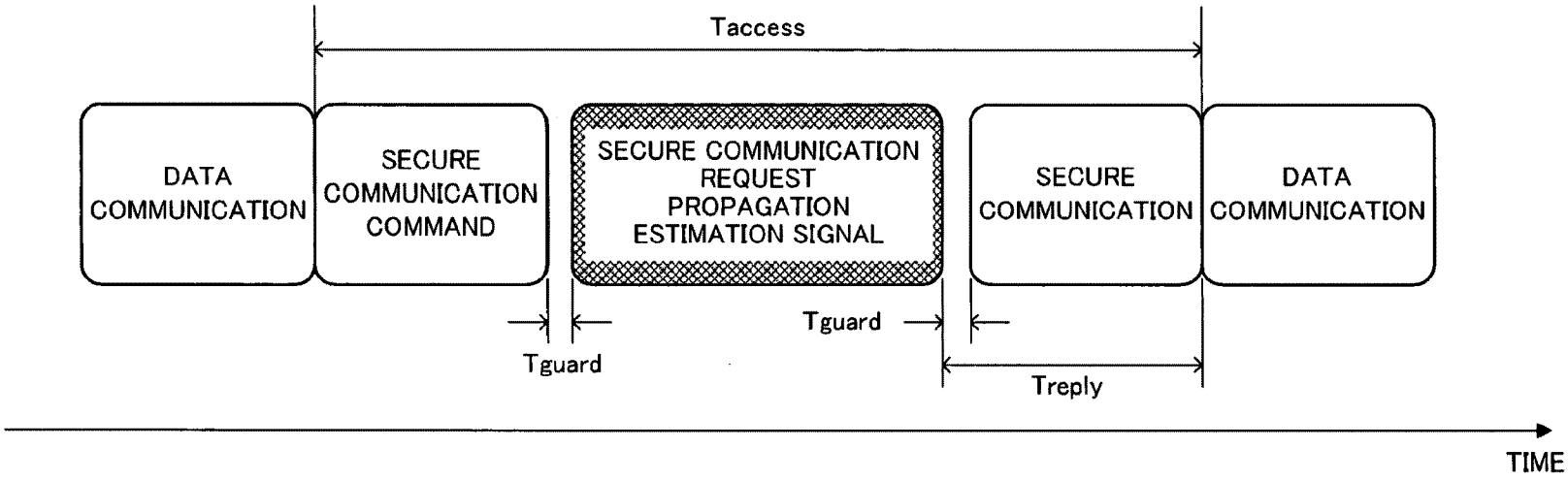
FIG. 64 is a view illustrating a transmission state of signal on the time axis.

Descriptions of the time are the same as in FIG. 64, and are omitted.

As described earlier, when Treply has limitations in time, the case is considered that the information according to (2.3) is not obtained soon. Communication procedures effective in such a case will be described below with reference to FIG. 64.

(0) Initialization

The same operation as in the initialization as described earlier is performed.

(3) Reception of Secure Information (3.0) The application of the communication terminal A outputs a request for secure information reception to the upper layer.

(3.1) Upon receiving the secure information reception request, the upper layer of the communication terminal A issues a secure reception command to the physical layer.

(3.2) Upon receiving the secure reception command, the physical layer of the communication terminal A transmits an information preparation request to the communication terminal B in accordance with communication timing.

(3.3) Upon receiving the information preparation request, the physical layer of the communication terminal B issues an information request command to the upper layer. (When the information is managed in the physical layer, the command is not issued to the upper layer, and procedures (3.4) and (3.5) are eliminated. Meanwhile, when the information is managed in the upper layer, (3.4) is eliminated.)

(3.4) Upon receiving the information request command from the physical layer, the upper layer of the communication terminal B acquires the information from the application.

(3.5) The upper layer of the communication terminal B issues an information response command to the physical layer together with the set information.

(3.6) When it is notified that the information is set using the information response command, the physical layer of the communication terminal B notifies the communication terminal A of completion of the information preparation.

(3.7) Upon receiving the notification of completion of the information preparation from the communication terminal B, the physical layer of the communication terminal A transmits a secure communication request to the communication terminal B in accordance with communication timing together with the propagation estimation signal.

(3.8) Upon receiving the secure communication request, the physical layer of the communication terminal B estimates the propagation from the propagation estimation signal and calculates the propagation parameter. The acquired information is transmitted to the communication terminal A in the confidential communication method using the estimated propagation parameter.

(3.9) The physical layer of the communication terminal A receives and demodulates the secure information transmitted using the confidential communication method to output to the upper layer.

(3.10) The upper layer of the communication terminal A outputs the secure information output from the physical layer to the application.

Figure 65:
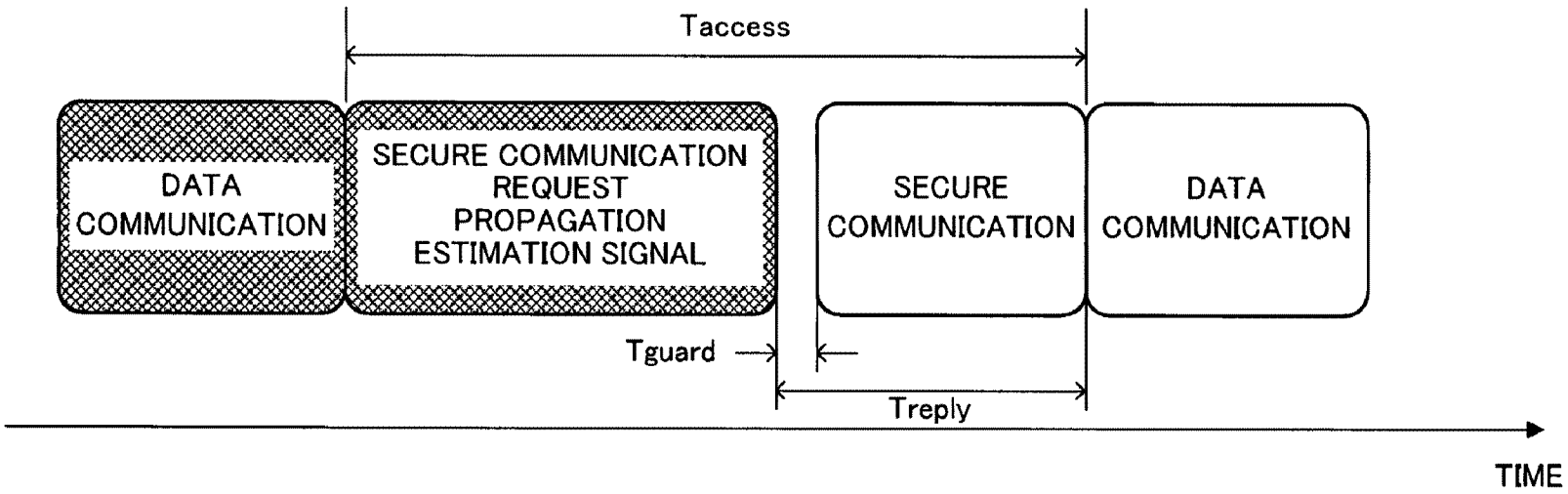
FIG. 65 is another view illustrating a transmission state of signal on the time axis.
Figure 66:
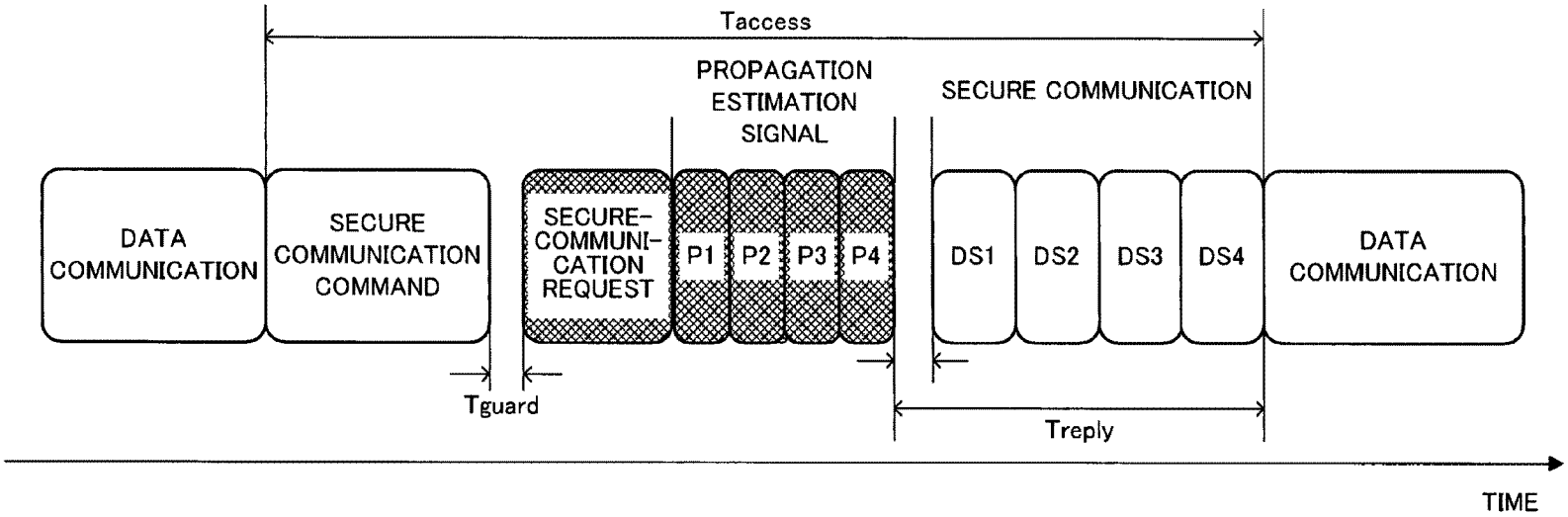
FIG. 66 is another view illustrating a transmission state of signal on the time axis.

In the above operation, practical communication signals in the physical layer are the same as in descriptions of FIG. 65, and descriptions thereof are omitted.

Figure 60:
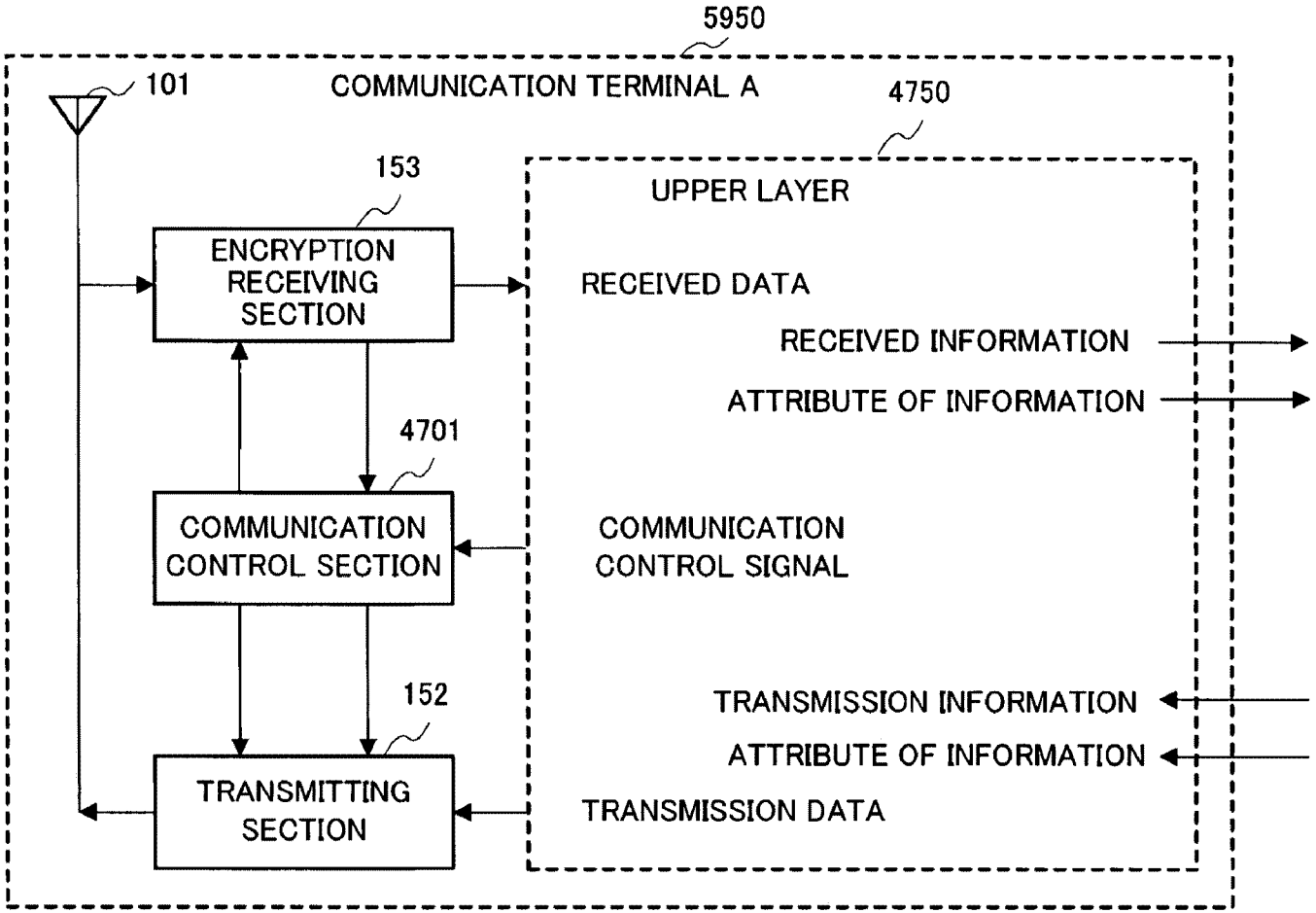
FIG. 60 is a block diagram illustrating a configuration of the communication apparatus according to Embodiment 27 of the present invention.

According to the operation as described above, it is possible to perform confidential communications without the application needs awareness of the communication state in particular. In addition, there is a case that the application needs to provide and receive specific information in confidential communications or needs information of whether the received information is in the confidential communication. In such a case, as shown in FIG. 60, in the processing in upper layer 4750, a flag is set indicative of using the confidential communication as an attribute of the information in communicating the information, for example, in steps of (1.0), (2.0), (3.0), (1.6), (2.8) and (3.10)

In this way, using Embodiment 27 enables efficient control of the confidential communication in the psychical layer from the upper layer, and provides stable communication protocols.

Embodiment 28

Embodiment 28 further extends the invention described in Embodiments 17 and 18, enables increases in the apparent number of transmission antennas that the communication terminal has, and improves the confidentiality.

Figure 77:
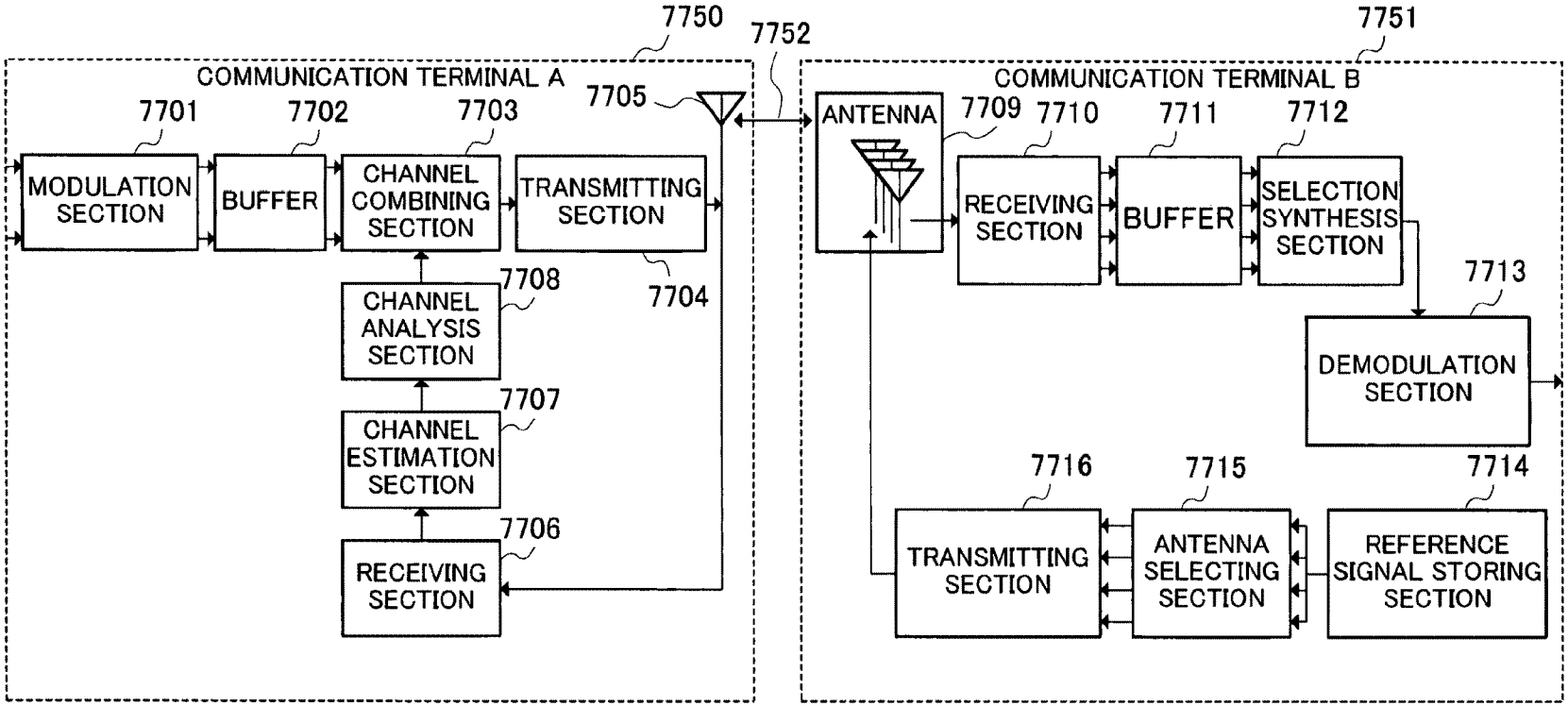
FIG. 77 is a block diagram illustrating a communication system using a communication apparatus according to Embodiment 28 of the present invention.

FIG. 77 illustrates a communication system used in this Embodiment.

Communication terminal A 7750 communicates with communication terminal B 7751 through channel 7752. Communication terminal A 7750 has a single transmission/reception antenna element, while communication terminal B 7751 has four transmission/reception antenna elements.

Communication terminal A 7750 will be described first.

Modulation section 7701 receives data to modulate, and outputs the modulated signal.

Buffer 7702 receives the modulated signal, and outputs the held modulated signal to channel combining section 7703.

Channel combining section 7703 performs combining using the modulated signal and channel parameter, and outputs a transmission signal to transmitting section 7704.

Transmitting section 7704 performs frequency conversion and power amplification on the transmission signal, and outputs a transmission RF signal to antenna 7705.

Antenna 7705 transmits the transmission RF signal, while outputting a received RF signal to receiving section 7706.

Receiving section 7706 converts the received RF signal input from antenna 7705 into a baseband signal to output to channel estimation section 7707.

Channel estimation section 7707 estimates the characteristic of channel 7752 from the baseband signal input from receiving section 7706, and outputs the estimated channel information.

Channel analysis section 7708 receives the channel estimated information, and calculates the channel parameter using a predetermined analysis method to output.

Communication terminal B 7751 will be described below.

Antennas 7709 receive transmission RF signals to transmit, while outputting a received RF signal to receiving section 7710.

Receiving section 7710 converts the received RF signal into a baseband signal to output to buffer 7711.

Buffer 7711 temporarily holds the baseband signal, and outputs a signal delayed by a predetermined time to selection synthesis section 7712.

Selection synthesis section 7712 synthesizes a signal with a time difference, and outputs a synthesized signal.

Demodulation section 7713 receives the synthesized signal to demodulate, and obtains the data.

Reference signal storing section 7714 stores reference signals for use in estimating channel 7752 to output.

Antenna selecting section 7715 receives a reference signal, and outputs the reference signal to a selected antenna as a transmission signal.

Transmitting section 7716 receives the transmission signal, and outputs the transmission RF signal to antenna element 7709.

Channels of communication propagation path are assumed to be channel matrix H comprised of h1, h2, h3 and h4. Communication terminal A 7750 estimates the propagation using the reference signal from communication terminal B 7751, and at this point, communication terminal B 7751 transmits signals orthogonal to each other from respective antennas so that communication terminal A 7750 is capable of measuring a coefficient of each of the antennas of communication terminal B 7751. Herein, as a typified example, reference signals are transmitted in Time Division. In this way, communication terminal A is capable of measuring h1, h2, h3 and h4.

In other words, antenna selecting section 7715 sequentially switches between antennas to transmit a reference signal output from reference signal storing section 7714. The transmission signal output in this way is amplified in transmitting section 7716, and transmitted from a corresponding antenna.

In the communication terminal A, antenna 7705 receives the reference signal and inputs a received RF signal to receiving section 7706, and the section 7706 converts the RF signal into a baseband signal. Channel estimation section 7707 receives the baseband signal, performs channel estimation using the reference signal, and outputs channel information. Channel analysis section 7708 receives the channel information to analyze. The analysis will be described using singular value decomposition described in Embodiment 18. Singular value vector V obtained in singular value decomposition is divided into singular value vector with the singular value being not 0, and zero vectors with the singular vector being 0. Herein, it is assumed that vectors are v1 to v4, vi is the singular value vector, v2 to v4 are zero vectors, and the singular value is λ. Further, a vector element is defined as vn=(vn1 t vn4) (n=1 . . . 4). The singular value vector and zero vectors are output as channel parameters.

Modulation section 7701 receives four sequences of data, and generates four sequences of modulated signals in a predetermined modulation scheme to output. It is assumed that the modulated signals are d1 to d4, d1 is a communication modulated signal, and that d2 to d4 are pseudo modulated signals. Buffer section 7702 receives the four sequences of modulated signals to hold. Buffer section 7702 continues to hold the same signal for four time slots.

In a first time slot, channel combining section 7703 receives the four sequences of modulated signals and channel parameters, and performs calculation as described below:

$$DS1=\Sigma(vn1\cdot dn) \tag{39}$$

(n is Σ variable, the same as in the following)

The section 7703 outputs thus obtained transmission signal to transmitting section 7704.

Subsequently, in a similar way, channel combining section 7703 receives modulated signals d1 to d4 and performs calculation in a kth time slot as described below:

$$DSk=\Sigma(vnk\cdot dn) \tag{40}$$

Figure 78:
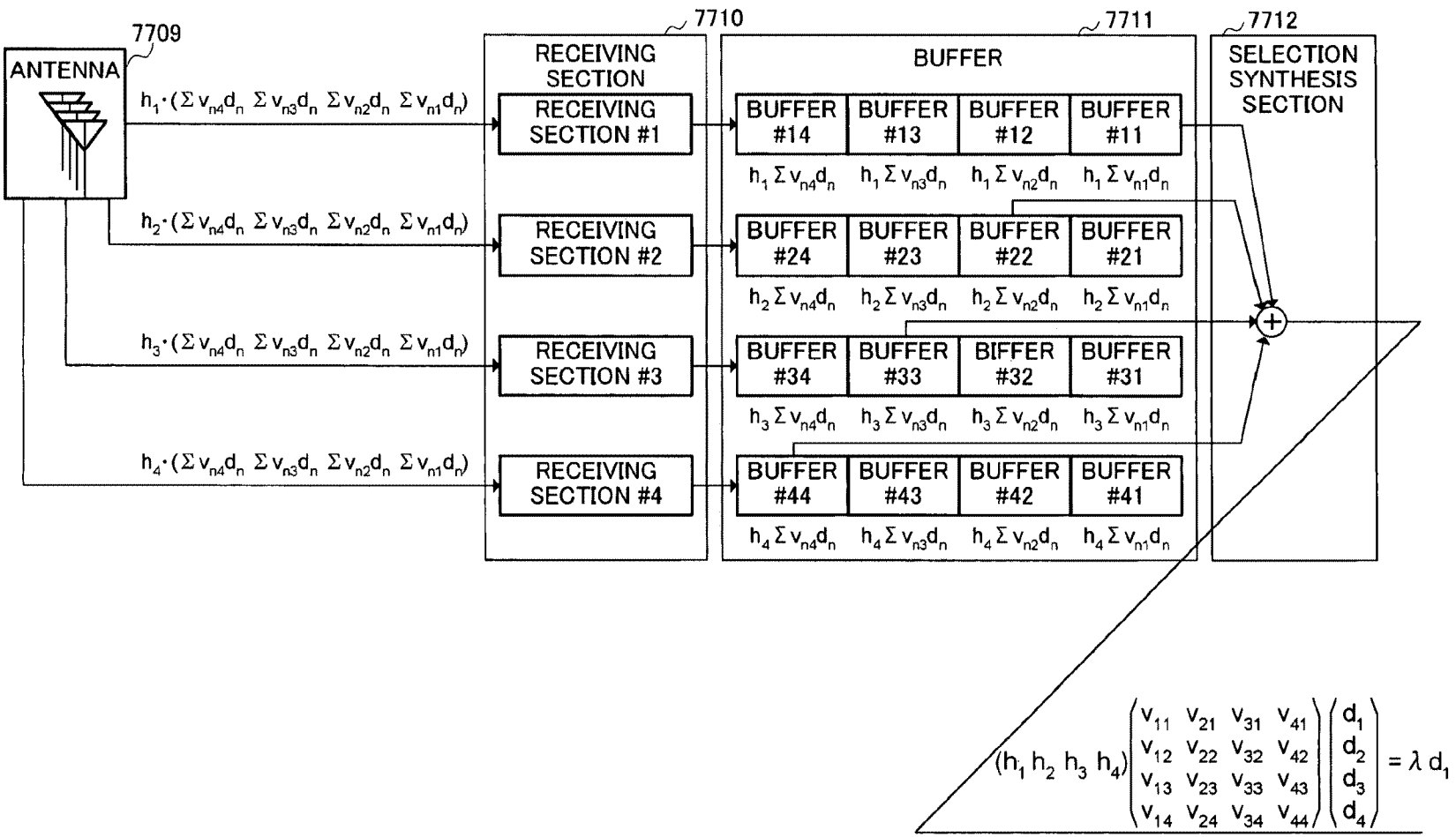
FIG. 78 is a view illustrating reception processing in the communication apparatus according to Embodiment 28 of the present invention.

Transmission signals corresponding to four time slots are thus transmitted, and received in communication terminal B 7751 via propagation path 7752. FIG. 78 illustrates the specific reception processing in communication terminal B 7751. Received RF signals received in antennas are converted into baseband signals in receiving sections 7710 to be output, respectively. Buffer section 7711 temporarily holds the baseband signals. Sixteen buffers are described for four time slots of four antenna sequences (4 time slots×4 antenna sequences). Signals of four time slots held in buffer section 7711 in the above operation are assumed to be Srx11 to Srx44. The signals are expressed as described below, using channel elements h1 to h4, channel parameter elements v11 to v44, and modulated signals St1 to St4:

$$Srxjk=hj\cdot\Sigma(vnk\cdot dn) \tag{41}$$

Herein, as shown in FIG. 68, noting a signal of Srj=Srxjk (j=k, J=1 . . . 4) obtains the following equation:

$$Srj=hj\cdot\Sigma(vnj\cdot dn) \tag{42}$$

Further, ΣSrn is given by the following equation using V and D, where D is [d1, d2, d3, d4]T (AT is the transpose of A).

$$\Sigma Srn=H\cdot V\cdot D=\lambda d1 \tag{43}$$

It is understood that according to the operation as described above, modulated signal d1 is obtained which communication terminal A 7750 intends to transmit, and the other modulated signals are canceled. Demodulation section 7713 demodulates thus obtained signal without any particular processing, and obtains the data.

Even when a third party tries to demodulate the data, as in the other Embodiments, since the channel parameter is unknown, the third party cannot separate d1 nor demodulate. In this way, there is provided a significant feature that the confidential communication is implemented without needing particular calculation in reception and demodulation.

Figure 67:
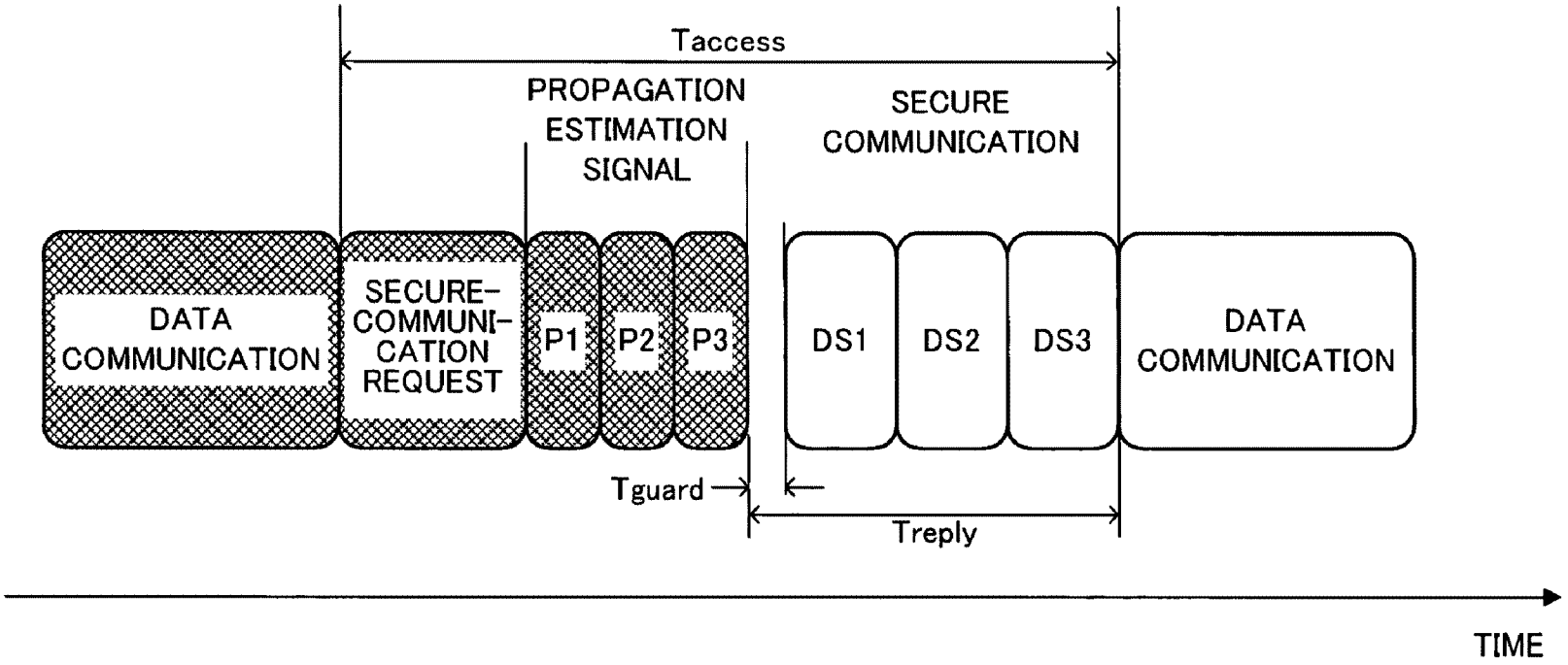
FIG. 67 is another view illustrating a transmission state of signal on the time axis.
Figure 75:
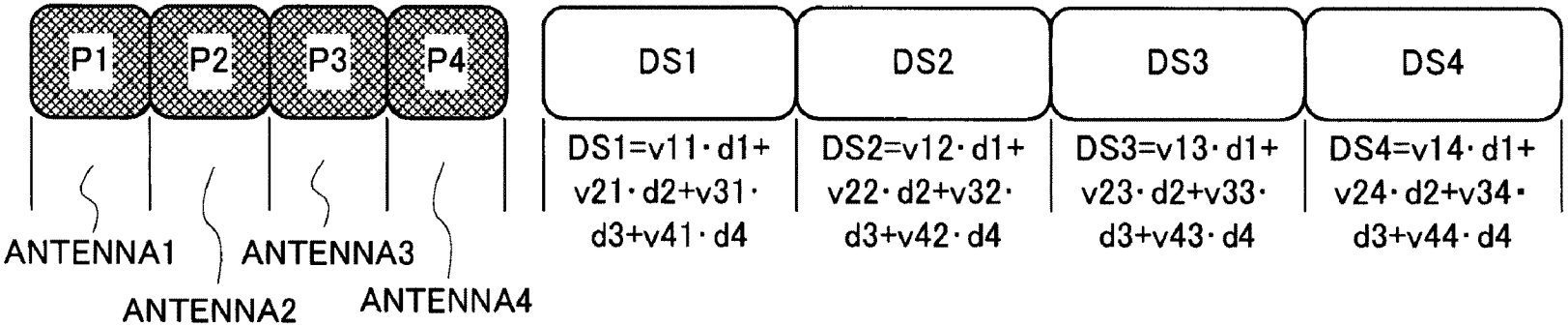
FIG. 75 is a view illustrating a transmission state of signal on the time axis.

Communication signals as described above will be described with reference to FIGS. 67 and 75.

Shaded portions in the figures indicate signals transmitted from communication terminal B 7751 to communication terminal A 7750, and the other portions indicate signals transmitted from communication terminal A 7750 to communication terminal B 7751.

As indicated in the figures, propagation estimation signals are transmitted together with secure communication request signals. In this Embodiment, the number of time slots provided to transmit is the number of antenna elements of communication terminal B 7751. However, the present invention is not limited to such a number, as long as signals transmitted from antenna elements are orthogonal to each other, as described above. P1 to P4 indicated in the figure are known signals respectively transmitted from antennas, and based on the signals, channel estimation section 7707 in communication terminal A 7750 estimates the propagation path. Then, communication terminal A 7750 prepares four time slots (DS1 to DS4) provided by equation (40) in performing the confidential communication to transmit, and the confidential communication is thereby performed.

In the above descriptions, it is assumed that antenna 7705 in communication terminal A 7750 has a single antenna element, and antenna 7709 in communication terminal B 7751 has four antenna elements, but the present invention is not limited to such a case. The present invention provides a more sophisticated communication system when m is less than n (m<n) where m is the number of elements of communication terminal A 7750 and n is the number of elements of communication terminal B 7751. When m is two or more, it is possible to perform the confidential communication as described in the other Embodiments by performing antenna selection such that k is selected among k (k<m). However, the present invention allows the confidential communication to be performed with the maximum number of channel elements, and thereby provides the communication protection of the highest degree.

In this way, using Embodiment 28 provides a feature that a communication terminal with a less number (m) of antenna elements provides the communication protection of the highest degree to a communication terminal with a larger number (n) of antenna elements, and in particular, exhibits the significant effect when m is 1.

In Embodiments 1 to 28, confidential information corresponding to the propagation environment is acquired by the configuration of hardware. However, the present invention is not limited to such a case, and confidential information corresponding to the propagation environment may be acquired by processing in software using a program or the like. In this case, it may be possible to use a program or the like acquired in any method such as a program or the like stored in a storage medium such as CD-ROM and a program or the like transmitted through a network.

As described above, according to the present invention, since it is possible to extract data corresponding to the propagation state, it is possible to ensure high security without a significant change in communication system.

This application is based on the Japanese Patent Applications No.2002-054064 filed on Feb. 28, 2002, No.2002-132068 filed on May 7, 2002, and No.2003-48364 filed on Feb. 25, 2003, entire contents of which are expressly incorporated by reference herein.

INDUSTRIAL APPLICABILITY

The present invention is for use in a technique used in a digital communication, and in particular, is suitable for use in a technique related to security.

The invention claimed is:

[1. A communication apparatus, comprising:

a reference signal generating section that generates a first reference signal to enable a communicating party to estimate a propagation environment;

a transmitting section that transmits the first reference signal;

a storing section that stores a known signal known between the apparatus and the communicating party a propagation estimating section that obtains correlation between the known signal and a second reference signal transmitted from the communicating party, and generates a delay profile as an estimation value of propagation environment;

a first data acquiring section that reads out first data associated with the delay profile generated in the propagation estimating section, from a reference table that associates the delay profile with the first data; and a decoding section that decodes a transmission signal encoded and transmitted using an estimation value of the propagation environment estimated by the communicating party using the first reference signal, to obtain second data using the first data read out by the first data acquiring section.]

[2. The communication apparatus according to claim 1, wherein the first data acquiring section calculates convolution of correlation between the known signal and the second reference signal, and a quantization vector stored in the reference table, and selects and reads out a vector code as the first data by performing metric calculation using the delay profile and the quantization vector subjected to the convolution.]

[3. The communication apparatus according to claim 1, wherein the first data acquiring section performs orthogonal conversion on the delay profile generated in the propagation estimating section to condense signal components, and reads out the first data using signal components.]

[4. A communication method, comprising:

generating, in a first communication apparatus, a first reference signal to enable a second communication apparatus to estimate a propagation environment;

transmitting the first reference signal from the first communication apparatus to the second communication apparatus;

storing, in the first communication apparatus, a known signal known between the first communication apparatus and the second communication apparatus;

obtaining, in the first communication apparatus, correlation between the known signal and a second reference signal transmitted from the second communication apparatus, and generating, in the first communication apparatus, a delay profile as an estimation value of the propagation environment;

reading out, in the first communication apparatus, first data associated with the generated delay profile, from a reference table that associates the delay profile with the first data; and decoding, in the first communication apparatus, a transmission signal encoded and transmitted using an estimation value of the propagation environment estimated by the second communication apparatus using the first reference signal, to second data using the first data read out.]

*5. A transmitting signal generating apparatus, comprising:*

*A first transmission antenna and a second transmission antenna;*

*a plurality of outputs that output, to the first transmission antenna and to the second transmission antenna, a plurality of outputting signals simultaneously using a same frequency; and*

*a plurality of weighting coefficient sets stored in one or more buffers;*

*wherein the communication apparatus generates the plurality of outputting signals by multiplying a plurality of data by one weighting coefficient set of the plurality of weighting coefficient sets;*

*each of the outputting signals is a non-multiplexed signal or is a multiplexed signal into which the plurality of data is multiplexed;*

*the multiplexed signal and the non-multiplexed signal are multiplied by the one weighting coefficient set, selected from the plurality of weighting coefficient sets, for each of the outputting signals;*

*each of the plurality of weighting coefficient sets includes a weighting coefficient for each of the plurality of outputting signals; and*

*the plurality of weighting coefficient sets are vectors having no correlation with each other.*

*6. The transmitting signal generating apparatus according to claim 5, wherein,*

*the one or more buffers store a relationship between the plurality of weighting coefficient sets and a polarization code indicating polarization information obtained from a plurality of inputs received by a plurality of reception antennas within the communication apparatus, and*

*each weighting coefficient set is calculated based on the polarization code and includes the weighting coefficient for each of the plurality of outputting signals.*

*7. A transmitting signal generating method, comprising:*

*outputting to a first and a second transmission antenna within a communication apparatus a plurality of outputting signals simultaneously using a same frequency;*

*storing a plurality of weighting coefficient sets in one or more buffers; and*

*generating, by the communication apparatus, the plurality of outputting signals by multiplying a plurality of data by one weighing coefficient set of the plurality of weighting coefficient sets, wherein:*

*each of the outputting signals is a non-multiplexed signal or is a multiplexed signal into which the plurality of data is multiplexed;*

*the multiplexed signal and the non-multiplexed signal are multiplied by the one weighting coefficient set, selected from the plurality of weighting coefficient sets for each of the outputting signals;*

*each of the plurality of weighting coefficient sets includes a weighting coefficient for each of the plurality of outputting signals; and*

*the plurality of weighting coefficient sets are vectors having no correlation with each other.*

*8. The transmitting signal generating method according to claim 7, further comprising,*

*storing a relationship between the plurality of weighting coefficient sets and a polarization code indicating polarization information obtained from a plurality of inputs received by a plurality of reception antennas within the communication apparatus, and*

*wherein each weighting coefficient set is calculated based on the polarization code and includes the weighting coefficient for each of the plurality of outputting signals.*

* * * * *